(12) United States Patent
Kondo et al.

(10) Patent No.: US 7,499,895 B2
(45) Date of Patent: Mar. 3, 2009

(54) SIGNAL PROCESSOR

(75) Inventors: Tetsujiro Kondo, Tokyo (JP); Kazushi Yoshikawa, Kanagawa (JP); Tetsushi Kokubo, Chiba (JP); Hisakazu Shiraki, Kanagawa (JP); Michimasa Obana, Chiba (JP); Hideo Kasama, Kanagawa (JP); Masanori Kanemaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 10/475,361

(22) PCT Filed: Feb. 21, 2002

(86) PCT No.: PCT/JP02/01543

§ 371 (c)(1),
(2), (4) Date: Oct. 20, 2003

(87) PCT Pub. No.: WO03/071479

PCT Pub. Date: Aug. 28, 2003

(65) Prior Publication Data

US 2005/0007159 A1  Jan. 13, 2005

(51) Int. Cl.
*G06F 17/00* (2006.01)
*G06N 5/00* (2006.01)

(52) U.S. Cl. .............................. 706/45; 706/22; 706/15

(58) Field of Classification Search .................. 706/45, 706/22, 15; 382/206, 155
See application file for complete search history.

(56) References Cited

U.S. PATENT DOCUMENTS

| 6,031,543 | A | 2/2000 | Miyashita et al. |
| 6,259,824 | B1 | 7/2001 | Sekiya |
| 6,597,737 | B1* | 7/2003 | Kondo et al. ............ 375/240.12 |
| 6,757,443 | B1* | 6/2004 | Kondo et al. ................. 382/275 |
| 6,912,014 | B2* | 6/2005 | Kondo et al. ................. 348/581 |
| 7,068,845 | B2* | 6/2006 | Kondo et al. ................. 382/224 |
| 2001/0033618 | A1* | 10/2001 | Hamamatsu et al. ... 375/240.16 |
| 2002/0009284 | A1* | 1/2002 | Murabayashi ................ 386/46 |

FOREIGN PATENT DOCUMENTS

| EP | 1 001 371 | 5/2000 |
| EP | 1 001 373 | 5/2000 |
| EP | 1 363 234 | 11/2003 |
| EP | 1 363 235 | 11/2003 |
| JP | 5 183389 | 7/1993 |
| JP | 10 243240 | 9/1998 |
| JP | 11-039369 | 2/1999 |
| JP | 2001-238185 | 8/2001 |
| JP | 2001 319228 | 11/2001 |

\* cited by examiner

*Primary Examiner*—David R Vincent
*Assistant Examiner*—Adrian L Kennedy
(74) *Attorney, Agent, or Firm*—Frommer Lawrence & Haug LLP; William S. Frommer; Thomas F. Presson

(57) ABSTRACT

A signal processing device for learning operations made by a user, and for generating signal optimal to the user based on the learning results. A learning unit monitors supplied operating signals generated based on user operations, and judges whether to learn the operating signals. When the operating signals are to be learned, the learning unit learns a correction norm for correcting input signals, based on the learning operating signals and outputs the correction norm to a correcting unit. The correcting unit corrects input signals based on the correction norm and outputs the corrected signals as output signals. The present invention can be applied to an NR (Noise Reduction) circuit which removes noise.

34 Claims, 113 Drawing Sheets

FIG. 36

|  | LEAST-SQUARE NORM | LEAST-N'TH-POWER NORM<br>a = 40<br>b = 0.1<br>c = 1 |
|---|---|---|
| SQUARE ERROR SUM | 10160281 | 10828504 |
| CUBIC ERROR SUM | 165988823 | 161283660 |

|  |  | FEATURE A | | | | | | | |
|---|---|---|---|---|---|---|---|---|---|
|  |  | 1/8 | 2/8 | 3/8 | 4/8 | 5/8 | 6/8 | 7/8 | 1 |
| FEATURE B | 1/8 | X | X | X | Y | Y | Y | Z | Z |
|  | 2/8 | X | X | X | Y | Y | Y | Z | Z |
|  | 3/8 | X | X | X | Y | Y | Y | Z | Z |
|  | 4/8 | Y | Y | Y | Y | Y | Y | Y | Y |
|  | 5/8 | Y | Y | Y | Y | Y | Y | Y | Y |
|  | 6/8 | Y | Y | Y | Y | Y | Y | Y | Y |
|  | 7/8 | Z | Z | Z | Y | Y | Y | Z | Z |
|  | 1 | Z | Z | Z | Y | Y | Y | Z | Z |

|  | FEATURE A | | | | | | | |
|---|---|---|---|---|---|---|---|---|
| FEATURE B | X | X | X | X | X | X | X | X |
| | X | X | X | X | X | Y | X | X |
| | X | X | Y | X | Y | X | Y | X |
| | X | Y | X | X | Y | Y | X | X |
| | Y | X | X | X | X | Y | X | X |
| | X | X | X | X | X | Y | Y | X |
| | X | X | Y | Y | Y | Y | Y | X |
| | X | Y | Y | Y | X | Y | X | X |

|  | FEATURE A | | | | | | | |
|---|---|---|---|---|---|---|---|---|
| FEATURE B | X | X | X | X | X | X | X | X |
|  | X | X | X | X | X | Y | X | X |
|  | X | X | Y | X | X | X | Y | X |
|  | X | Y | X | X | Y | Y | X | X |
|  | Y | X | X | X | X | Y | X | X |
|  | X | X | X | X | X | Y | Y | X |
|  | X | X | Y | Y | Y | Y | Y | X |
|  | X | Y | Y | Y | X | Y | X | X |

FIG. 101

|  | FEATURE A | | | | | | | |
|---|---|---|---|---|---|---|---|---|
| FEATURE B | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |

FIG. 102A

|  | FEATURE A | | | | | | | |
|---|---|---|---|---|---|---|---|---|
| FEATURE B | Z | Z | Z | Z | Z | Z | Z | Z |
| | Z | Z | Z | X | Y | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |
| | Z | Z | Z | Z | Z | Z | Z | Z |

FIG. 102B

|  | FEATURE A | | | | | | | |
|---|---|---|---|---|---|---|---|---|
| FEATURE B | X | X | X | X | Y | Y | Y | Y |
| | X | X | X | X | Y | Y | Y | Y |
| | X | X | X | X | Y | Y | Y | Y |
| | X | X | X | X | Y | Y | Y | Y |
| | X | X | X | X | Y | Y | Y | Y |
| | X | X | X | X | Y | Y | Y | Y |
| | X | X | X | X | Y | Y | Y | Y |
| | X | X | X | X | Y | Y | Y | Y |

FIG. 103A

| | FEATURE A | | | | | | | |
|---|---|---|---|---|---|---|---|---|
| FEATURE B | Z | Z | Z | Z | Z | Z | Z | Z |
| | Z | Z | Z | X | Y | Z | Z | Z |
| | Z | Z | Z | Z | Z | Z | Z | Z |
| | Z | Z | Z | Z | Z | Z | Z | Z |
| | Z | Z | Z | Y | Z | Z | Z | Z |
| | Z | Z | Z | Z | Z | Z | Z | Z |
| | Z | Z | Z | Z | Z | Z | X | Z |
| | Z | Z | Z | Z | Z | Z | Z | Z |

FIG. 103B

| | FEATURE A | | | | | | | |
|---|---|---|---|---|---|---|---|---|
| FEATURE B | X | X | X | X | Y | Y | Y | Y |
| | X | X | X | X | Y | Y | Y | Y |
| | X | X | X | X | Y | Y | Y | Y |
| | Y | Y | Y | Y | Y | Y | Y | X |
| | Y | Y | Y | Y | Y | Y | X | X |
| | Y | Y | Y | Y | Y | X | X | X |
| | Y | Y | Y | Y | X | X | X | X |
| | Y | Y | Y | Y | X | X | X | X |

FIG. 104A

|  | FEATURE A | | | | | | | |
|---|---|---|---|---|---|---|---|---|
| FEATURE B | Z | Z | Z | Z | Z | Z | Z | Z |
|  | Z | Z | Z | X | Y | Z | Z | Z |
|  | Z | Y | Z | Z | Z | Z | Z | Z |
|  | Z | Z | Z | Z | Z | Z | Y | Z |
|  | Z | Z | Z | Y | Z | Z | Z | Z |
|  | Z | Z | Z | Z | Z | Z | Z | Z |
|  | Z | Z | Z | Z | Z | Z | X | Z |
|  | Z | Z | Z | Z | Z | Z | Z | Z |

FIG. 104B

|  | FEATURE A | | | | | | | |
|---|---|---|---|---|---|---|---|---|
| FEATURE B | X | X | X | X | Y | Y | Y | Y |
|  | X | X | X | X | Y | Y | Y | Y |
|  | X | X | X | X | Y | Y | Y | Y |
|  | Y | Y | Y | Y | Y | Y | Y | Y |
|  | Y | Y | Y | Y | Y | Y | Y | Y |
|  | Y | Y | Y | Y | Y | X | X | X |
|  | Y | Y | Y | Y | X | X | X | X |
|  | Y | Y | Y | Y | X | X | X | X |

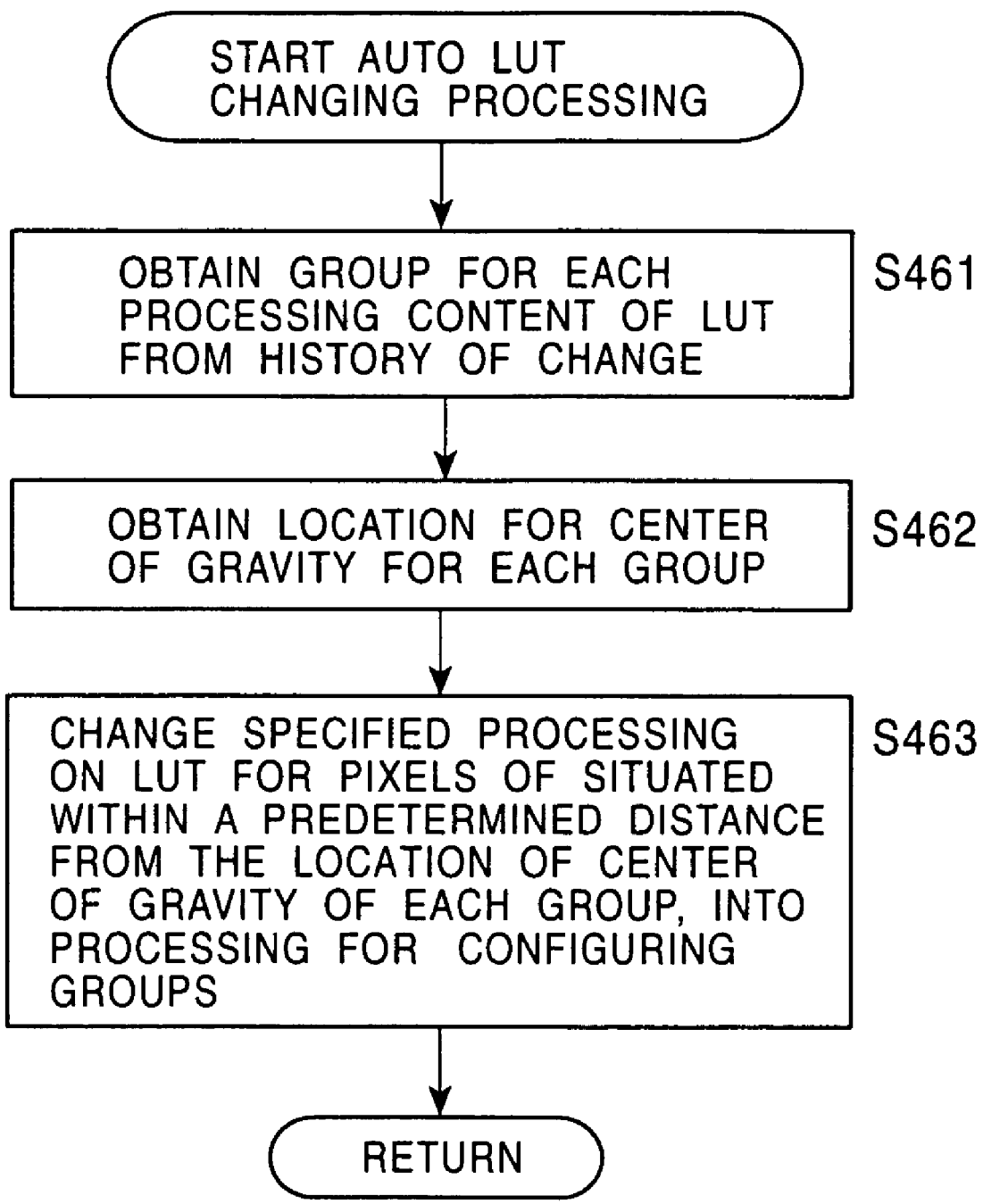

FIG. 108

| | FEATURE A | | | | | | | |
|---|---|---|---|---|---|---|---|---|
| FEATURE B | X | X | X | Y | X | X | Z | Y |
| | X | X | X | X | Y | Y | Z | Z |
| | X | Y | X | Y | Y | Y | Z | Z |
| | X | X | X | X | Y | Y | Z | Z |
| | X | X | X | X | X | X | Z | Z |
| | X | X | X | Y | Y | Y | Y | Z |
| | X | X | X | Y | X | X | Y | Y |
| | X | X | X | Y | X | X | Y | Y |

FIG. 109

| | FEATURE A | | | | | | | |
|---|---|---|---|---|---|---|---|---|
| FEATURE B | X | X | X | Y | X | X | Z | Y |
| | X | X | X | X | Y | Y | Z | Z |
| | X | X | X | Y | Y | Y | Z | Z |
| | X | X | X | X | Y | Y | Z | Z |
| | X | X | X | X | X | X | Z | Z |
| | X | X | X | Y | Y | Y | Y | Z |
| | X | X | X | Y | X | X | Y | Y |
| | X | X | X | Y | X | X | Y | Y |

FIG. 114

| | FEATURE A | | | | | | | |
|---|---|---|---|---|---|---|---|---|
| FEATURE B | X | X | X | X | X | X | X | X |
| | X | X | X | X | X | Y | X | X |
| | X | X | Y | X | Y | X | Y | X |
| | X | Y | X | X | X | X | X | X |
| | Y | X | X | X | X | Y Z | X | X |
| | X | X | X | X | X | X | Y | X |
| | X | X | Y | Y | Y | Y | Y | X |
| | X | Y | Y | Y | X | Y | X | X |

| | FEATURE A | | | | | | | |
|---|---|---|---|---|---|---|---|---|
| FEATURE B | X | X | X | X | X | X | X | X |
| | X | X | X | X | X | Y | X | X |
| | X | X | Y | X | X | X | Y | X |
| | X | Y | X | X | Y | Y | X | X |
| | Y | X | X | X | X | Y | X | X |
| | X | X | X | X | X | X | Y | X |
| | X | X | Y | Y | Y | Y | Y | X |
| | X | Y | Y | Y | X | Y | X | X |

- 1192

SIGNAL PROCESSOR

TECHNICAL FIELD

The present invention relates to a signal processing device, and particularly relates to a signal processing device which, for example, changes the contents of processing or the structure of processing by operations made by the user, so as to perform optimal processing for the user.

BACKGROUND ART

For example, with conventional NR (Noise Reduction) circuits, in the event that a user operates an adjustment knob thereof and sets it at a certain position, noise removal processing corresponding to the position of the knob is performed.

Now, the S/N (Signal to Noise Ratio) and frequency properties and the like of signals input to the NR circuit are not necessarily always constant, rather, it is common for these to change. In the event that the S/N, frequency properties, etc., of the signals input to the NR circuit change, suitable processing is not necessarily performed with regard to the signals input to the NR circuit in the noise removal processing corresponding to the position where the user has set the knob, and accordingly, the user needs to frequently operate the knob so that suitable noise removal processing is performed for him/herself, which has been troublesome.

DISCLOSURE OF INVENTION

The present invention has been made in light of such, and accordingly, it is an object thereof to change the contents of processing or the structure of processing by operations made by the user, so as to perform optimal processing for the user.

A first signal processing device according to the present invention comprises: signal processing means for performing signal processing on input signals; and presenting means for presenting signal processing results of the signal processing means, and internal information of the signal processing means; wherein the structure of processing of the signal processing means is changed based on operating signals supplied according to user operations.

The signal processing means may comprise output signal generating means for generating output signals by linear combination of the input signals and predetermined prediction coefficients; the presenting means may present the prediction coefficients as internal information of the signal processing means; and the structure of processing of the signal processing means may be changed by the prediction coefficients being changed based on the operating signals.

The signal processing means may further comprise: tutor data generating means for generating tutor data from predetermined learning data; student data generating means for generating student data from the learning data; and learning means for learning a prediction value of the tutor data obtained by linear combination of the student data and the prediction coefficients, and the prediction coefficients which minimize error with the tutor data; and the output signal generating means may generate the output signals using the prediction coefficients obtained by learning with the learning means.

The learning means may learn the prediction coefficients by least-N'th-power error which statistically minimizes an N'th-power-error which is the error to the N'th power; and the structure of processing of the signal processing may be changed by the error to the N'th power being changed based on the operating signals.

The signal processing means may further comprise storing means for storing the prediction coefficients obtained by predetermined learning beforehand.

The storing means may store multiple sets of the prediction coefficients.

The prediction coefficients may be obtained by performing learning to minimize an error between a prediction value of tutor data serving as a tutor for learning that is obtained by linear combination of student data serving as a student for learning and the prediction coefficients, and the tutor data; and the multiple sets of prediction coefficients stored in the storing means may contain a set of prediction coefficients obtained by learning by least-N'th-power error which statistically minimizes an N'th-power-error which is the error to the N'th power, and a set of prediction coefficients obtained by learning by least-N'th-power error which statistically minimizes an N'th-power-error which is different from N.

A first signal processing means according to the present invention comprises: a signal processing step for performing signal processing on input signals; and a presenting step for presenting signal processing results of processing in the signal processing step, and internal information of processing in the signal processing step; wherein the structure of processing of the signal processing step is changed based on operating signals supplied according to user operations.

A first program of a recording medium according to the present invention comprises: a signal processing controlling step for controlling signal processing on input signals; and a presentation controlling step for controlling presentation of signal processing results in the processing of the signal processing controlling step, and internal information in the processing of the signal processing controlling step; wherein the structure of processing of the signal processing controlling step is changed based on operating signals supplied according to user operations.

A first program according to the present invention causes a computer to execute: a signal processing controlling step for controlling signal processing on input signals; and a presentation controlling step for controlling presentation of signal processing results in the processing of the signal processing controlling step, and internal information in the processing of the signal processing controlling step; wherein the structure of processing of the signal processing controlling step is changed based on operating signals supplied according to user operations.

A second signal processing device according to the present invention comprises: characteristics detecting means for detecting characteristics from input signals; processing deciding means for deciding the contents of processing with regard to the input signals, based on characteristics detected by the characteristics detecting means; processing executing means for executing processing with regard to the input signals, following the processing contents decided by the processing deciding means; and presenting means for presenting at least one of the internal information of the characteristics detecting means, the processing deciding means, and the processing executing means; wherein the processing contents of at least one of the characteristics detecting means, the processing deciding means, and the processing executing means, changes, based on operating signals supplied according to user operations.

The contents of processing of the characteristics detecting means may be changed based on the operating signals.

The operating signals may be signals specifying, of multiple types of characteristics, a predetermined number of types of characteristics; and the characteristics detecting means may change the contents of processing thereof so as to detect the predetermined number of types of characteristics.

The characteristics detecting means may detect the predetermined number of types of characteristics from the input signals; and the processing deciding means may decide the contents of processing at the processing executing means with regard to the input signals, based on the predetermined number of types of characteristics detected from the input signals by the characteristics detecting means.

The operating signals may be signals specifying which of a first or second processing object the input signals are; and the presenting means may present a distribution of characteristics of the input signals serving as the first and second processing objects, as the internal information.

In the event that there is input of the operating signals specifying which of a first or second processing object the input signals are, with regard to the distribution presented by the presenting means, the contents of processing performed on the input signals may be changed, based on the operating signals.

The input signals may be image signals; the processing deciding means may decide whether or not to output the input signals without change, as the processing contents with regard to the input signals, based on the predetermined number of types of characteristics detected from the input signals by the characteristics detecting means; and the processing executing means may detect a telop within image signals which are the input signals, by selectively outputting the input signals following the decision made by the processing deciding means.

The processing contents of the processing deciding means may be changed based on the operating signals.

The processing deciding means may comprise storing means for storing a table indicating the correlation relationship between the characteristics and the processing contents with regard to the input signals having the characteristics; the processing deciding means may decide the processing contents correlated on the table to the characteristics of the input signals detected by the characteristics detecting means, as processing contents for the input signals; and the presenting means may present the table as internal information of the processing deciding means.

The processing deciding means may change the processing contents of itself, by changing the processing contents in the table, based on the operating signals.

Processing for outputting output signals of a first value, and processing for outputting output signals of a second value, may exist in the table as processing contents with regard to the input signals; and the processing executing means may binarize the input signals into the first and second values, following the decision of the processing deciding means.

The processing contents of the processing executing means may be changed based on the operating signals.

The processing executing means may generate output signals by linear combination of the input signals and predetermined prediction coefficients; and may change the contents of processing thereof, by changing the prediction coefficients based on the operating signals.

The prediction coefficients linearly combined with the input signals may be changed so that the sum thereof is 1.

Of prediction coefficients other than prediction coefficients changed based on the operating signals of the array of prediction coefficients linearly combined with the input signals, those close to prediction coefficients changed based on the operating signals may be changed in the same direction as the prediction coefficients changed based on the operating signals, and those distant from prediction coefficients changed based on the operating signals may be changed in the opposite direction as the prediction coefficients changed based on the operating signals.

Of prediction coefficients other than prediction coefficients changed based on the operating signals of the array of prediction coefficients linearly combined with the input signals, those having extreme value with the same polarity as prediction coefficients changed based on the operating signals may be changed in the same direction as the prediction coefficients changed based on the operating signals, and those having extreme value with a different polarity as prediction coefficients changed based on the operating signals changed in the opposite direction as the prediction coefficients may be changed based on the operating signals.

A second signal processing-method according to the present invention comprises: a characteristics detecting step for detecting characteristics from input signals; a processing deciding step for-deciding the contents of processing with regard to the input signals, based on characteristics detected in the characteristics detecting step; a processing executing step for executing processing with regard to the input signals, following the processing contents decided in the processing deciding step; and a presenting step for presenting at least one of the internal information of processing in the characteristics detecting step, processing in the processing deciding step, and processing in the processing executing step; wherein the processing contents of at least one of the processing in characteristics detecting step, processing in the processing detecting step, and processing in the processing executing step, changes, based on operating signals supplied according to user operations.

A program of a second recording medium according to the present invention comprises: a characteristics detection controlling step for controlling detection of characteristics from input signals; a processing decision controlling step for controlling decision of the contents of processing with regard to the input signals, based on characteristics detected by the processing in the characteristics detection controlling step; a processing execution controlling step for controlling execution of processing with regard to the input signals, following the processing contents decided by the processing in the processing decision controlling step; and a presentation controlling step for controlling presentation of at least one of the internal information of processing in the characteristics detection controlling step, processing in the processing decision controlling step, and processing in the processing execution controlling step; wherein the processing contents of at least one of the processing in characteristics detection controlling step, processing in the processing decision controlling step, and processing in the processing execution controlling step, changes, based on operating signals supplied according to user operations.

A second program according to the present invention causes a computer to execute: a characteristics detection controlling step for controlling detection of characteristics from input signals; a processing decision controlling step for controlling decision of the contents of processing with regard to the input signals, based on characteristics detected by the processing in the characteristics detection controlling step; a processing execution controlling step for controlling execution of processing with regard to the input signals, following the processing contents decided by the processing in the processing decision controlling step; and a presentation controlling step for controlling presentation of at least one of the internal information of processing in the characteristics detection controlling step, processing in the processing decision controlling step, and processing in the processing execution controlling step; wherein the processing contents of at least one of the processing in characteristics detection controlling step, processing in the processing decision controlling step, and processing in the processing execution controlling step, changes, based on operating signals supplied according to user operations.

A third signal processing device according to the present invention comprises: output value generating means for generating output values by linear combination of input signals and a plurality of coefficients stored beforehand; and presenting means for presenting the output values and the plurality of coefficients; wherein one or more of the plurality of coefficients is changed based on operating signals supplied according to user operations.

The coefficients linearly combined with the input signals are may be changed so that the sum thereof is 1.

In the event that one of the plurality of coefficients is changed based on the operating signals, of coefficients other than coefficients changed based on the operating signals of the array of the plurality of coefficients, those close to coefficients changed based on the operating signals may be changed in the same direction as the coefficients changed based on the operating signals, and those distant from coefficients changed based on the operating signals may be changed in the opposite direction as the coefficients changed based on the operating signals.

In the event that one of the plurality of coefficients is changed based on the operating signals, of coefficients other than coefficients changed based on the operating signals of the array of the plurality of coefficients, those having extreme value with the same polarity as coefficients changed based on the operating signals may be changed in the same direction as the coefficients changed based on the operating signals, and those having extreme value with a different polarity as coefficients changed based on the operating signals may be changed in the opposite direction as the coefficients changed based on the operating signals.

The plurality of coefficients may be obtained by performing learning wherein an error between a prediction value of tutor data serving as a tutor for learning which is obtained by linear combination of student data serving as a student for learning and the plurality of coefficients, and the tutor data thereof, is minimized.

A third signal processing method according to the present invention comprises: an output value generating step for generating output values by linear combination of input signals and a plurality of coefficients stored beforehand; and a presenting step for presenting the output values and the plurality of coefficients; wherein one or more of the plurality of coefficients is changed based on operating signals supplied according to user operations.

A program of a third recording medium according to the present invention comprises: an output value generation controlling step for controlling generation of output values by linear combination of input signals and a plurality of coefficients stored beforehand; and a presentation controlling step for controlling presentation of the output values and the plurality of coefficients; wherein one or more of the plurality of coefficients is changed based on operating signals supplied according to user operations.

A third program according to the present invention causes a computer to execute: an output value generation controlling step for controlling generation of output values by linear combination of input signals and a plurality of coefficients stored beforehand; and a presentation controlling step for controlling presentation of the output values and the plurality of coefficients; wherein one or more of the plurality of coefficients is changed based on operating signals supplied according to user operations.

With the first invention, input signals are subjected to signal processing, the results of signal processing and internal information are presented, and the structure of processing of the signals processing means is changed based on operating signals supplied according to operations made by the user.

With the second invention, characteristics are detected from input signals, the contents of processing with regard to the input signals are decided based on the detected characteristics, processing on the input signals is executed following the contents of processing decided upon, the internal information of at least one of characteristics detecting, processing deciding, or processing execution, is presented, and the contents of processing of at least one of characteristics detecting, processing deciding, or processing execution, is changed based on operating signals supplied according to operations made by the user.

With the third invention, output values are generated by linear combination of input signals and multiple coefficients stored beforehand, the output values and multiple coefficients are presented, and one or more of the multiple coefficients are changed based on operating signals supplied according to operations made by the user.

BRIEF DESCRIPTION OF THE DRAWINGS

FIG. 36 is a diagram illustrating a comparison between a least-N'th-power norm and a least-square norm.

FIG. 101 is a diagram describing manual LUT changing processing in image optimizing processing with the optimizing device shown in FIG. 91.

FIG. 102A is a diagram describing manual LUT changing processing in image optimizing processing with the optimizing device shown in FIG. 91.

FIG. 102B is a diagram describing manual LUT changing processing in image optimizing processing with the optimizing device shown in FIG. 91.

FIG. 103A is a diagram describing manual LUT changing processing in image optimizing processing with the optimizing device shown in FIG. 91.

FIG. 103B is a diagram describing manual LUT changing processing in image optimizing processing with the optimizing device shown in FIG. 91.

FIG. 104A is a diagram describing manual LUT changing processing in image optimizing processing with the optimizing device shown in FIG. 91.

FIG. 104B is a diagram describing manual LUT changing processing in image optimizing processing with the optimizing device shown in FIG. 91.

FIG. 105 is a flowchart describing auto LUT changing processing in image optimizing processing with the optimizing device shown in FIG. 91.

FIG. 108 is a diagram describing auto LUT changing processing in image optimizing processing with the optimizing device shown in FIG. 91.

FIG. 109 is a diagram describing auto LUT changing processing in image optimizing processing with the optimizing device shown in FIG. 91.

FIG. 114 is a diagram describing manual LUT changing processing in image optimizing processing with the optimizing device shown in FIG. 110.

FIG. 115 is a diagram describing manual LUT changing processing in image optimizing processing with the optimizing device shown in FIG. 110.

FIG. 116 is a block diagram illustrating a configuration example of another embodiment of an optimizing device to which the present invention has been applied.

FIG. 117 is a block diagram illustrating a configuration example of the processing unit shown in FIG. 116.

FIG. 118 is a block diagram of a learning device for generating coefficient sets stored in the coefficient memory shown in FIG. 116 by learning.

FIG. 119 is a block diagram illustrating a configuration example of the mapping processing unit shown in FIG. 117.

FIG. 120 is a flowchart describing learning processing with the optimizing device shown in FIG. 116.

FIG. 121 is a flowchart describing mapping processing with the optimizing device shown in FIG. 116.

FIG. 122 is a block diagram illustrating a configuration example of another embodiment of an optimizing device to which the present invention has been applied.

FIG. 123 is a block diagram illustrating a configuration example of the processing unit shown in FIG. 122.

FIG. 124 is a flowchart describing learning processing by the optimizing device shown in FIG. 122.

FIG. 125 is a flowchart describing mapping processing by the optimizing device shown in FIG. 122

FIG. 126 is a block diagram illustrating a configuration example of another embodiment of an optimizing device to which the present invention has been applied.

FIG. 127 is a block diagram illustrating a configuration example of the processing unit shown in FIG. 126.

Figure 127:
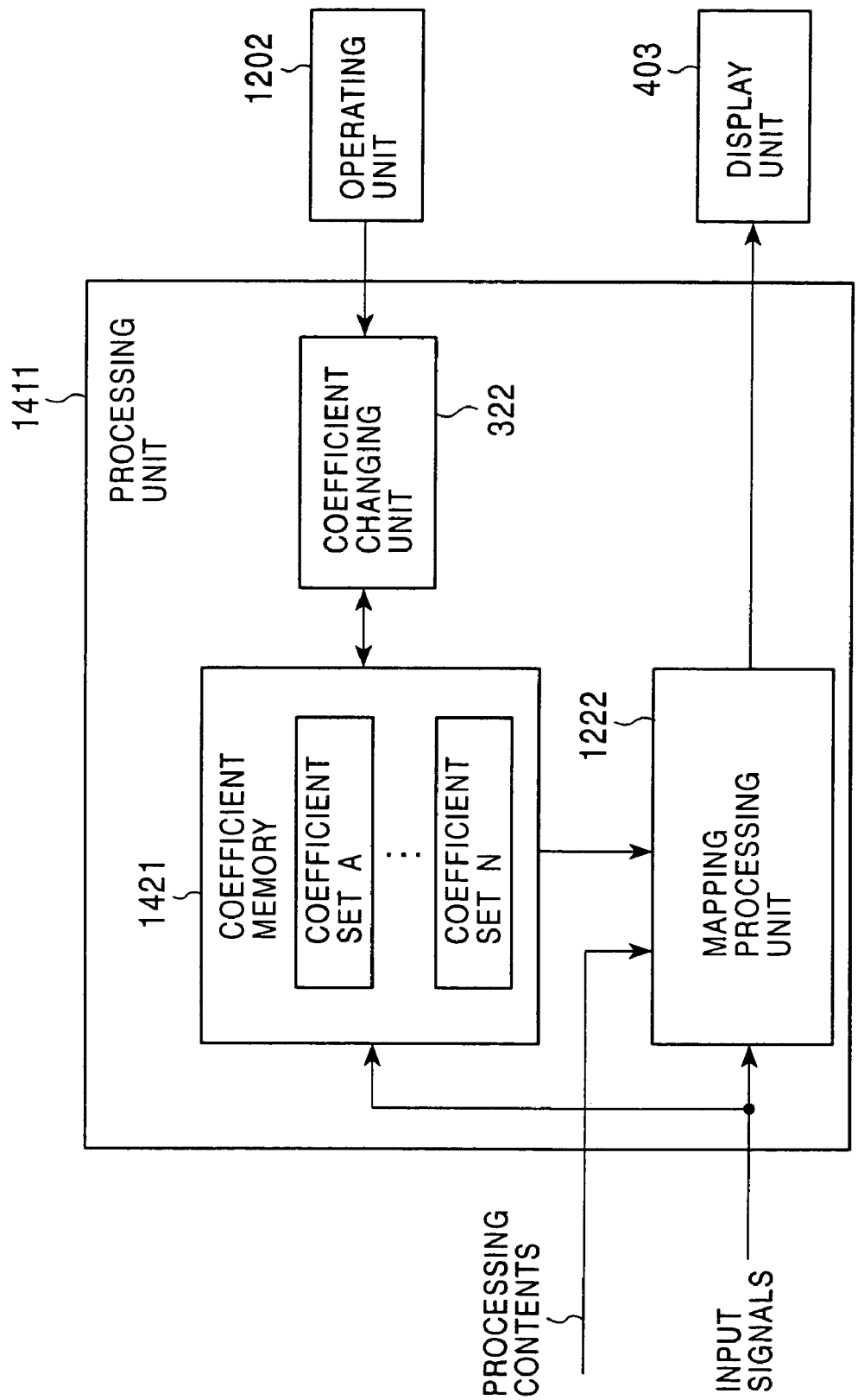
Figure 128:
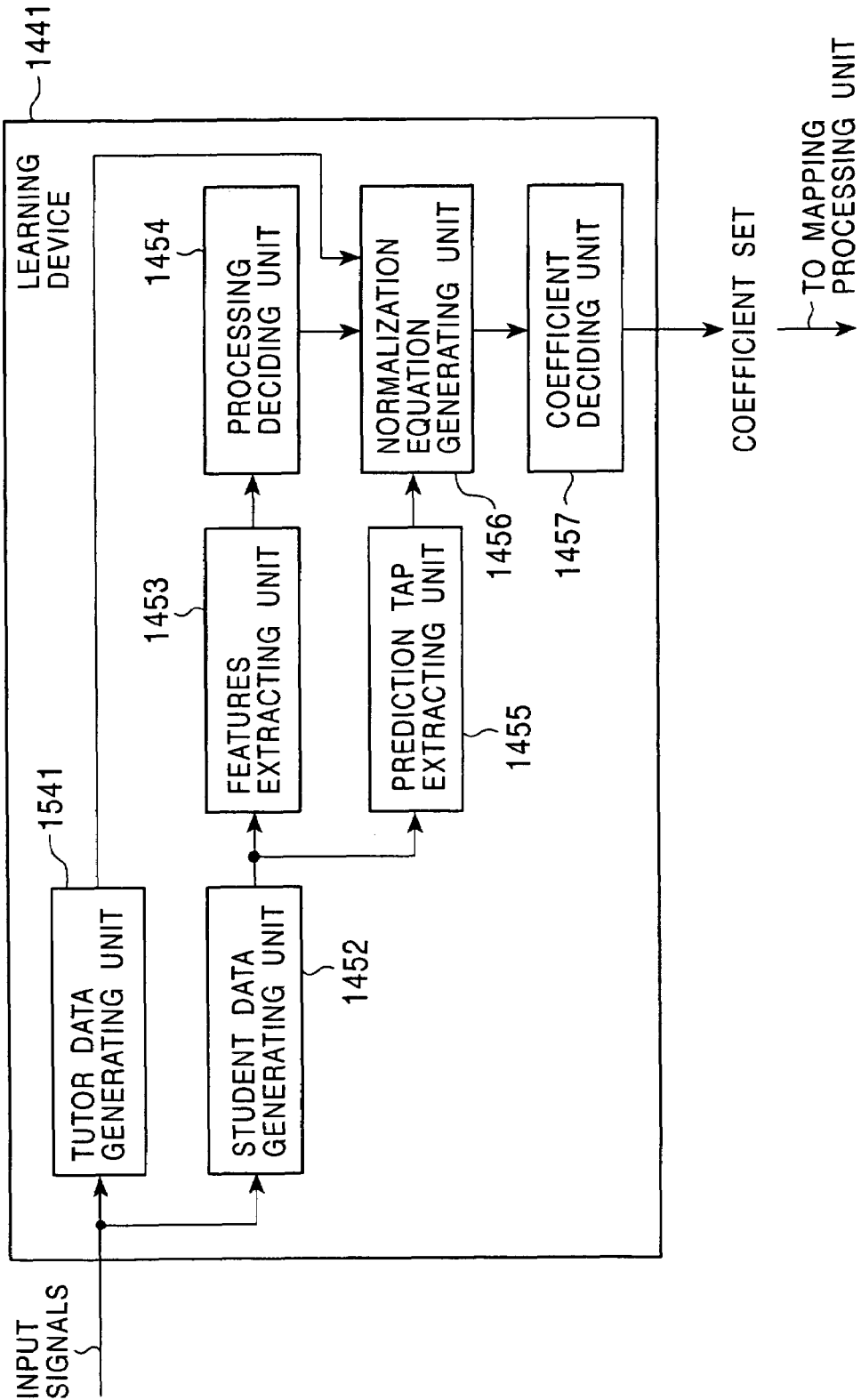

FIG. 128 is a block diagram of a learning device for generating coefficient sets stored in the coefficient memory shown in FIG. 127 by learning.

Figure 129:
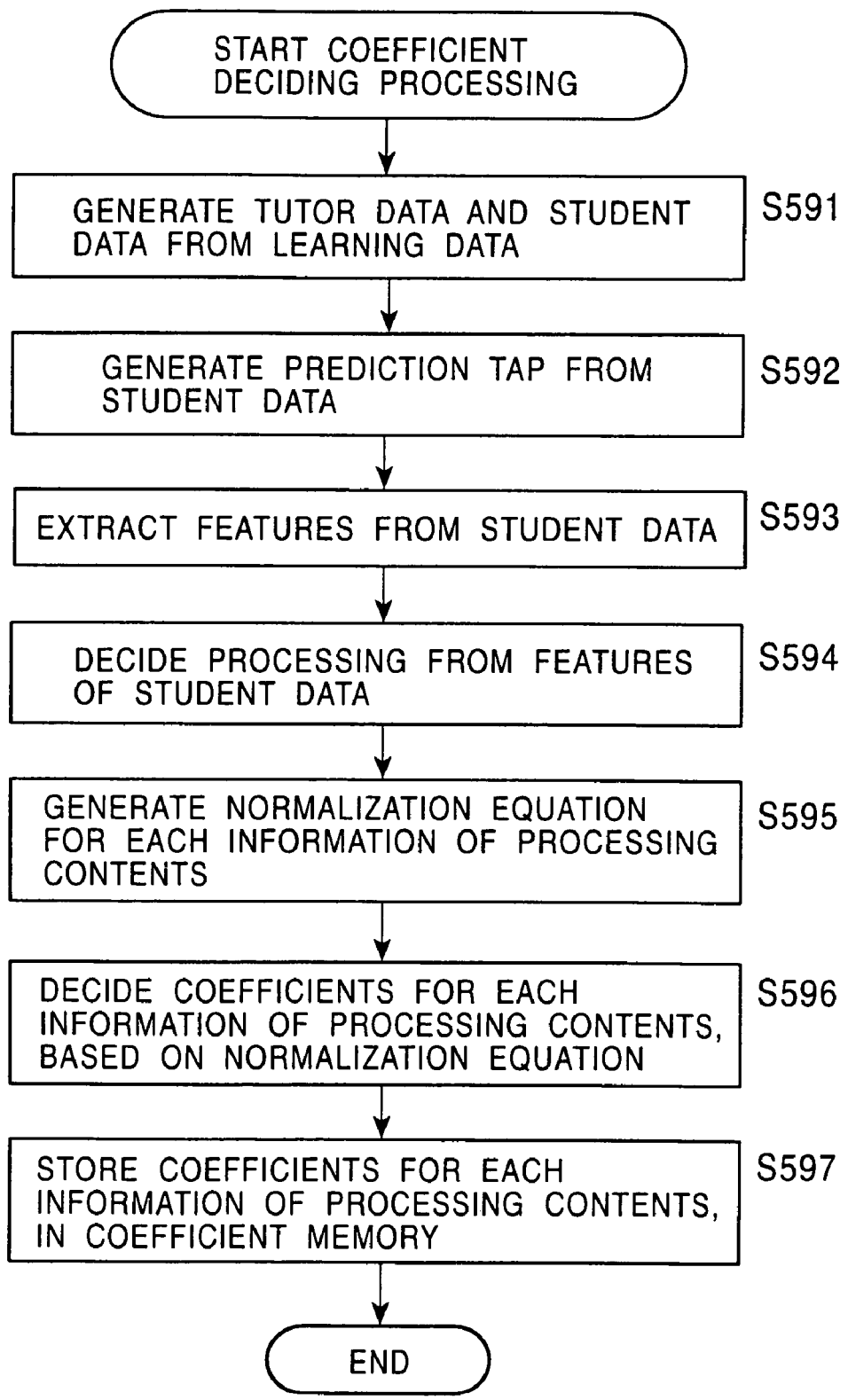

FIG. 129 is a flowchart describing coefficients deciding processing with the learning device shown in FIG. 128.

Figure 126:
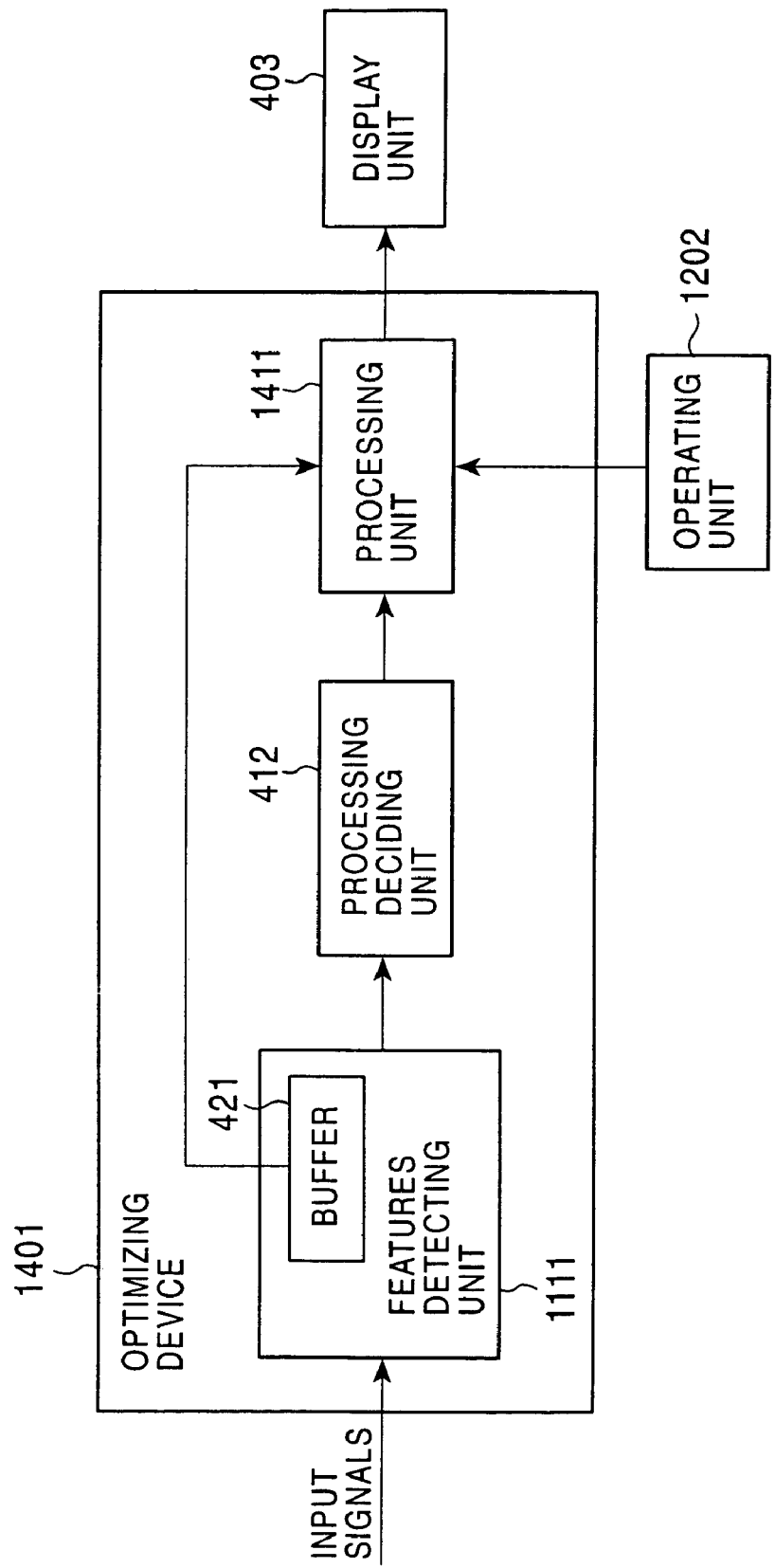
Figure 130:
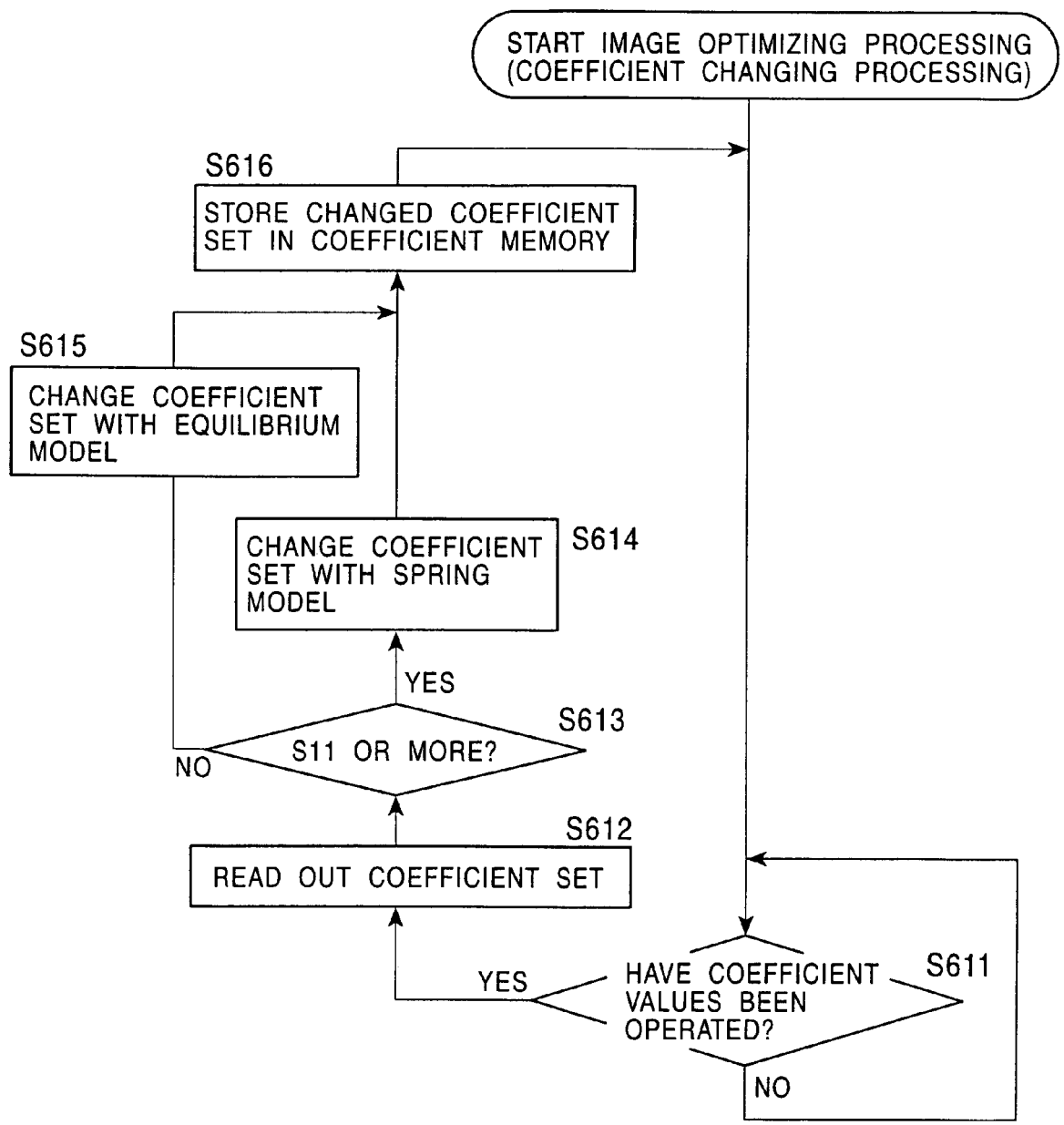

FIG. 130 is a flowchart describing image optimizing processing with the optimizing device shown in FIG. 126.

Figure 131:
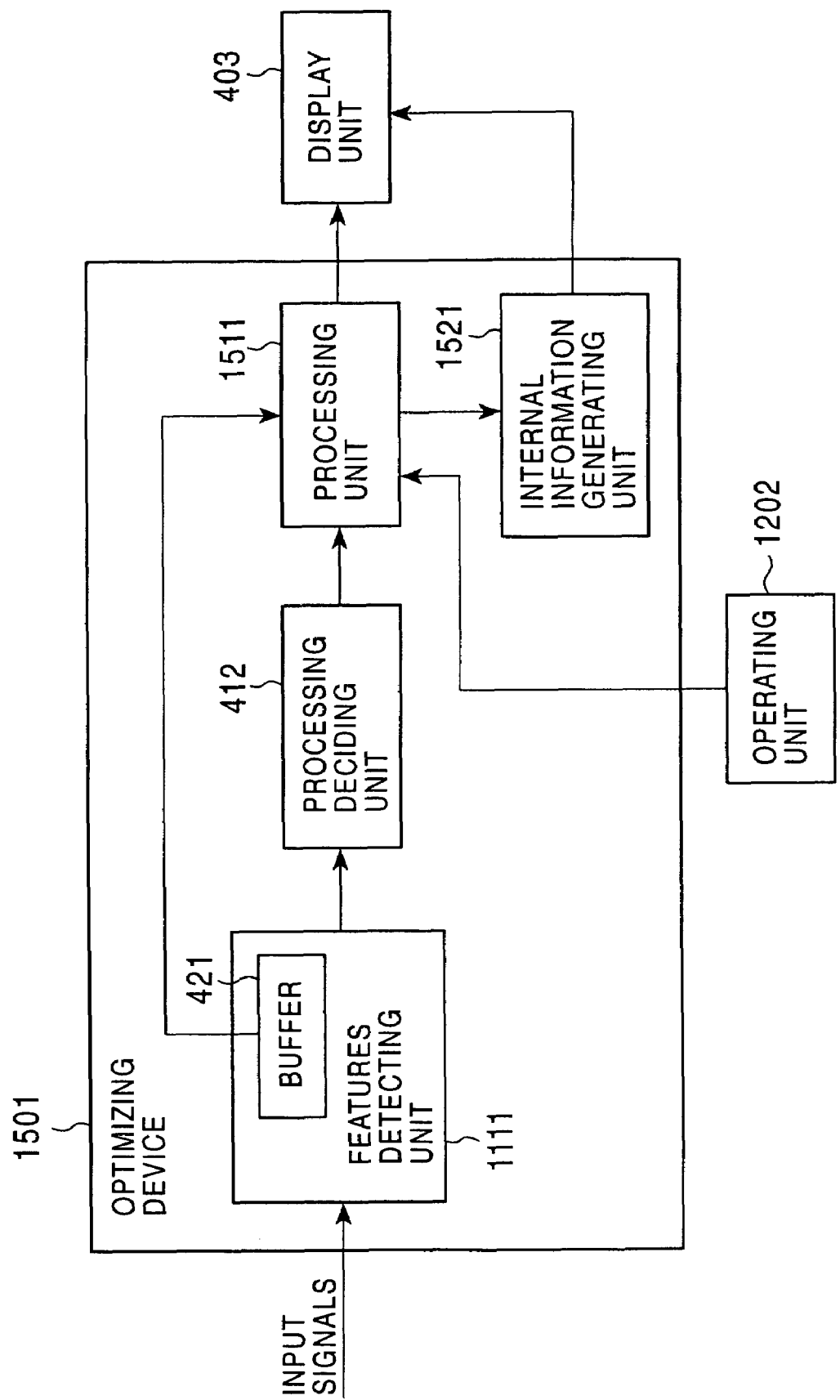

FIG. 131 is a block diagram illustrating a configuration example of another embodiment of an optimizing device to which the present invention has been applied.

Figure 132:
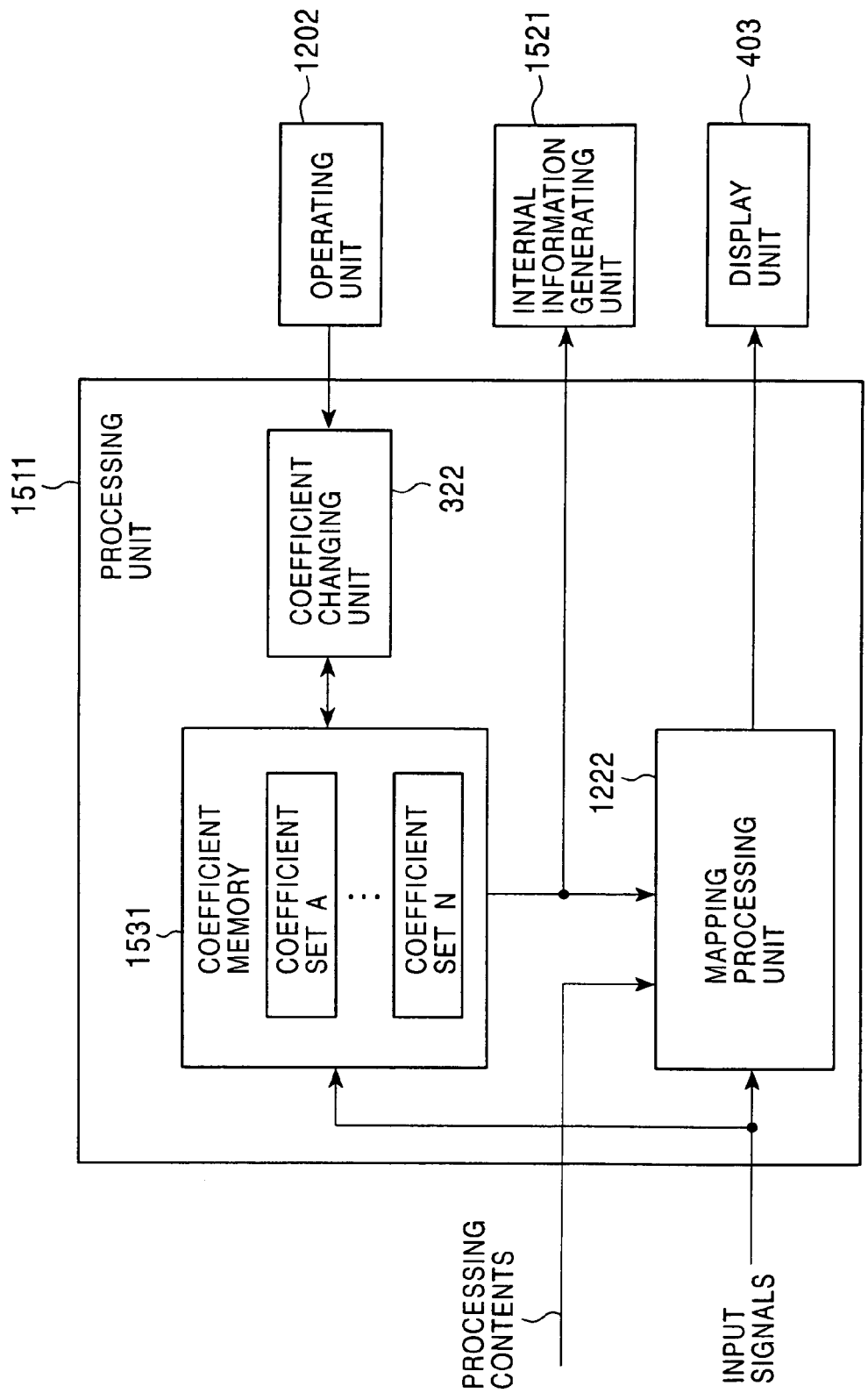

FIG. 132 is a block diagram illustrating a configuration example of the processing unit shown in FIG. 131.

Figure 133:
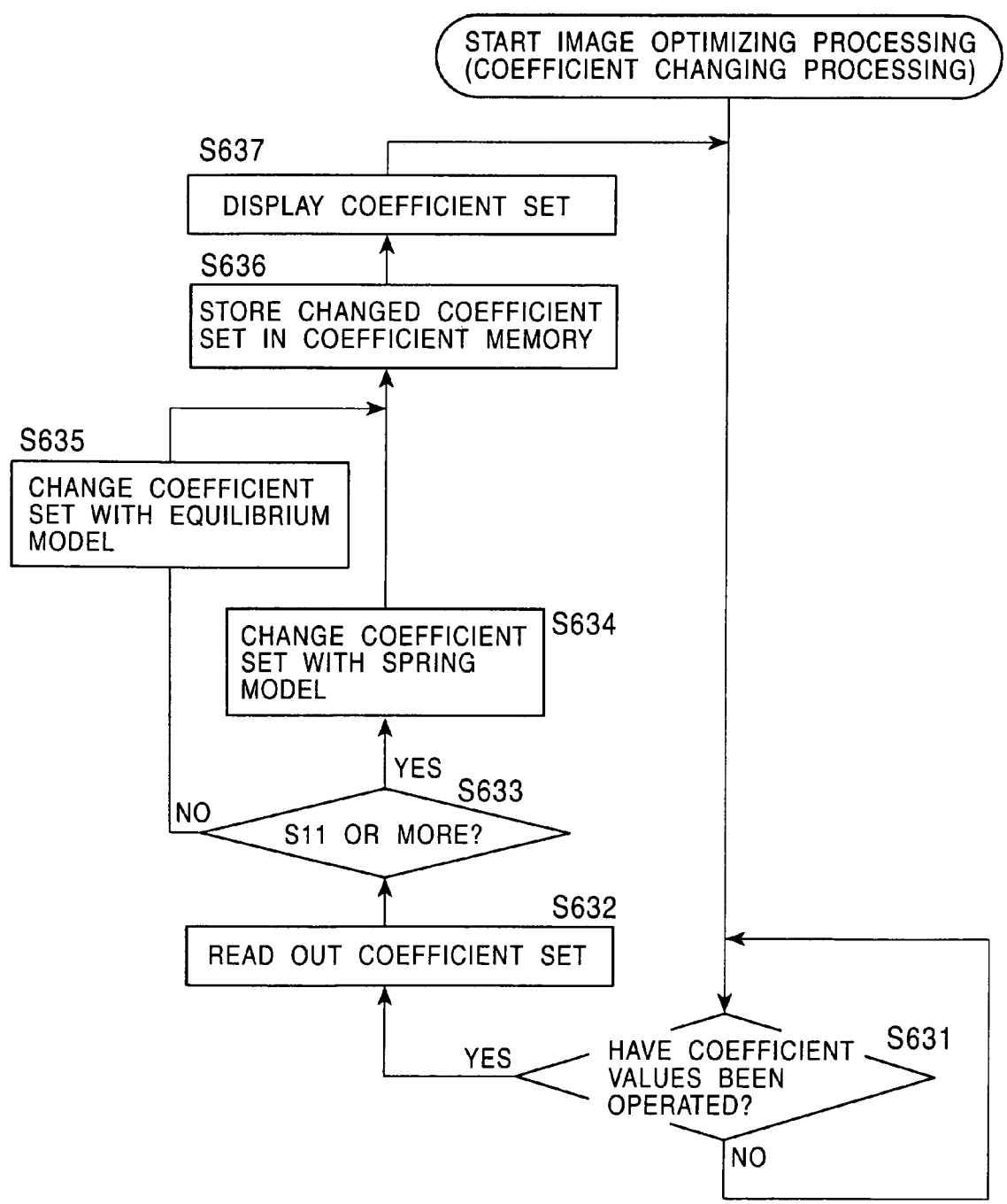

FIG. 133 is a flowchart describing image optimizing processing with the optimizing device shown in FIG. 131.

Figure 134:
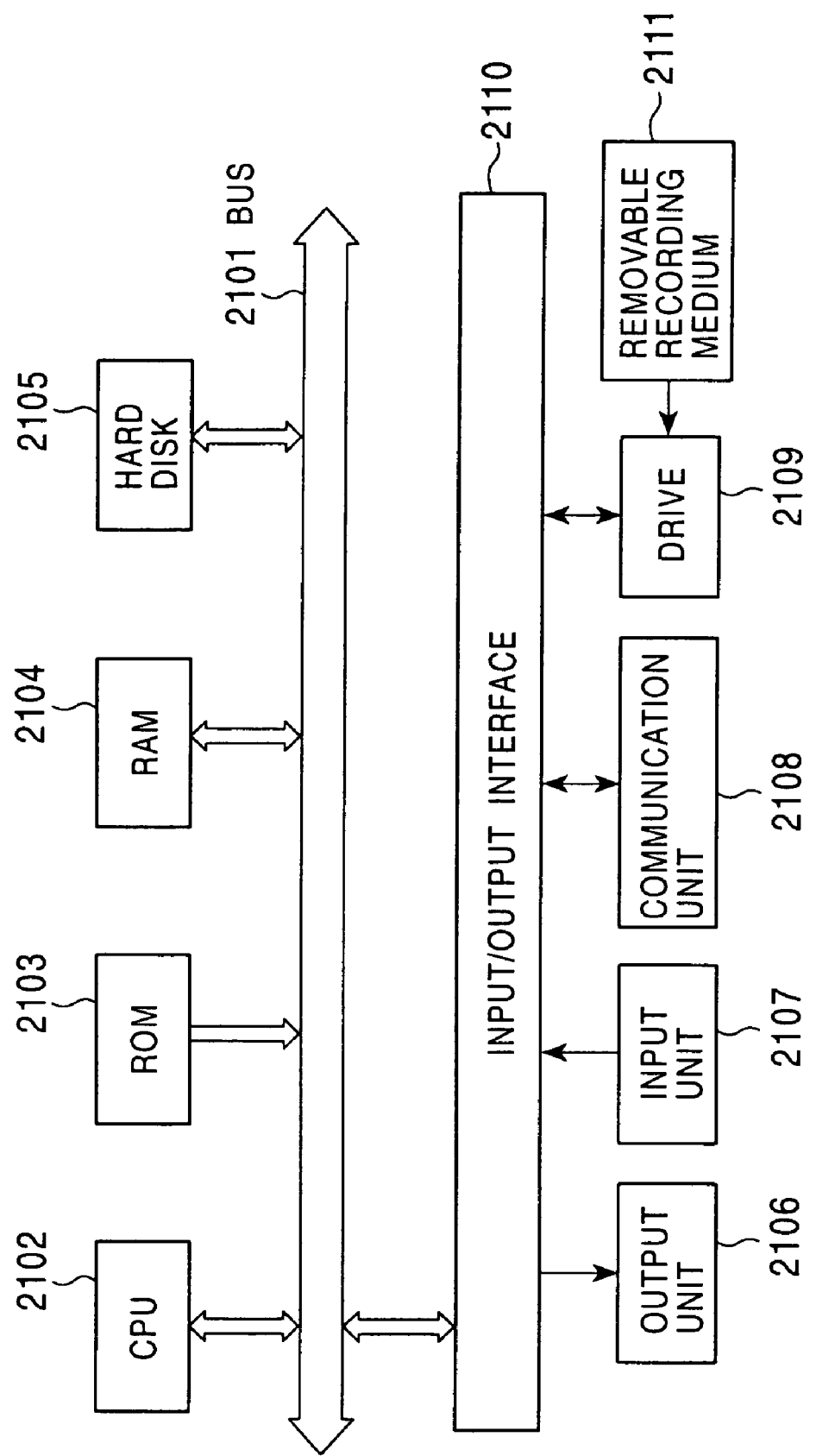

FIG. 134 is a block diagram illustrating a configuration example of an embodiment of a computer to which the present invention has been applied.

BEST MODE FOR CARRYING OUT THE INVENTION

Figure 1:
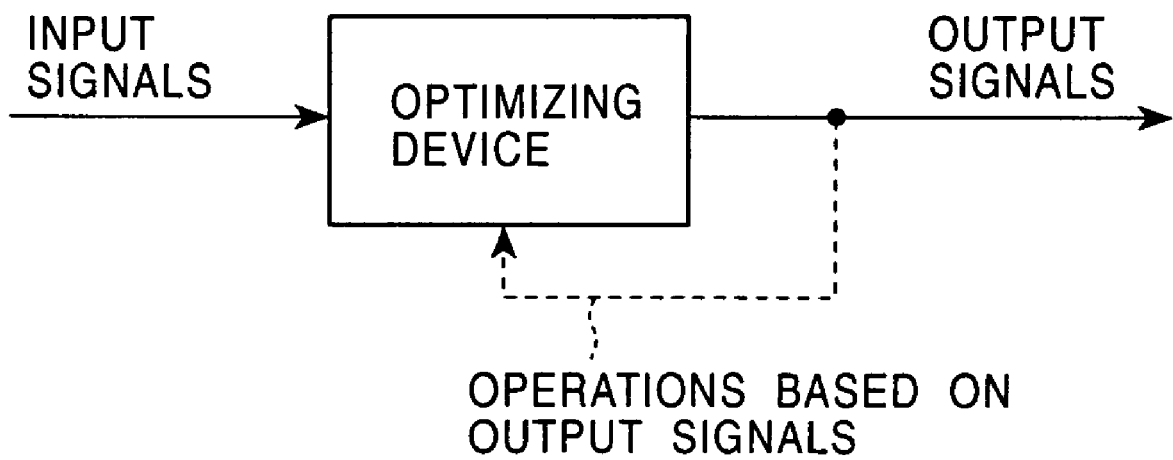
FIG. 1 is a diagram illustrating an optimizing device to which the present invention has been applied.

FIG. 1 illustrates a configuration example of an embodiment of an optimizing device to which the present invention has been applied. Following executing predetermined processing with regard to input signals (signal processing), the optimizing device outputs signals obtained as the results of the processing, as output signals. The user examines (qualitatively evaluates) the output signals, and in the event that the output signals do not match personal preferences, inputs operating signals corresponding to the preferences of the user, to the optimizing device. The optimizing device changes the contents of processing and structure of processing based on the operating signals, subjects the input signals to the predetermined processing again, and outputs the output signals, The optimizing device subjects the input signals to optimal processing (processing which is optimal for the user) while repeating changing the contents of the processing and structure of processing corresponding to operating signals input by user operations, thereby outputting output signals which are closer to the preferences of the user.

Figure 2:
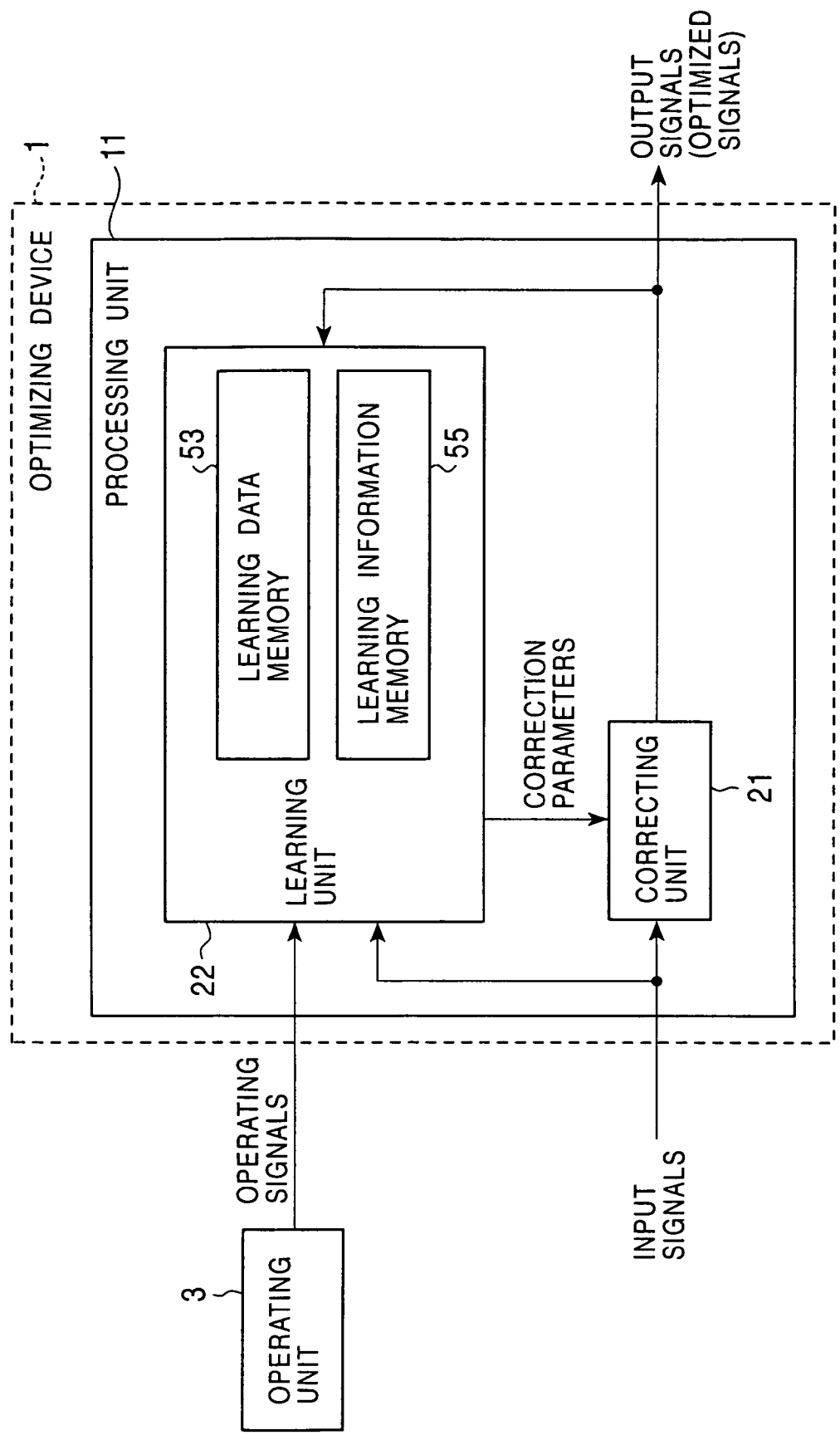
FIG. 2 is a block diagram illustrating a configuration example of an embodiment of an optimizing device to which the present invention has been applied.

FIG. 2 illustrates a first detailed configuration example of the optimizing device shown in FIG. 1.

With this optimizing device 1, processing which is optimal for the user is performed by learning the operations of the user without the user knowing. That is, with the optimizing device, operating signals supplied corresponding to operations of the user are monitored, and judgment is passed regarding whether or not these can be used for learning. In the event that the operating signals are learning operating signals which can be used for learning, a correction norm which is the norm for correcting the input signals is learned, based on the learning operating signals. On the other hand, input signals are corrected based on the correction norm obtained by learning, and signals following the correction are output as output signals.

The optimizing device 1 is configured of a processing unit 11 made up of a correcting unit 21 and a learning unit 22, to which are supplied operating signals corresponding to user operations, besides input signals which are subject to processing.

The operating signals are supplied from an operating unit 2. That is, the operating unit 2 is configured of, for example, rotary or slide knobs, switches, pointing devices, etc., and operating signals corresponding to user operations are supplied to the processing unit 11 making up the optimizing device 1.

Digital input signals, for example, are supplied to the correcting unit 21 making up the optimizing device 1, as well as, for example, correction parameters serving as correction norm for correcting input signals, from the learning unit 22. The correcting unit 21 corrects input signals based on the correction parameters (signal processing), and outputs signals following the correction, as output signals.

As well as operating signals from the operating unit 2 being supplied to the learning unit 22, input signals or output signals are also supplied thereto, as necessary. The learning unit 22 monitors the operating signals, and judges whether or not these can be used for learning. In the event that the operating signals are learning operating signals which can be used for learning, the learning unit 22 learns correction parameters used for correcting input signals using the input signals or the output signals based on the learning operating signals, as necessary, and supplies these to the correcting unit 21.

Note that the learning unit 22 has built-in learning data memory 53 and learning information memory 55, wherein the learning data memory 53 stores learning data used for learning, and the learning information memory 55 stores later-described learning information obtained by learning.

Figure 3:
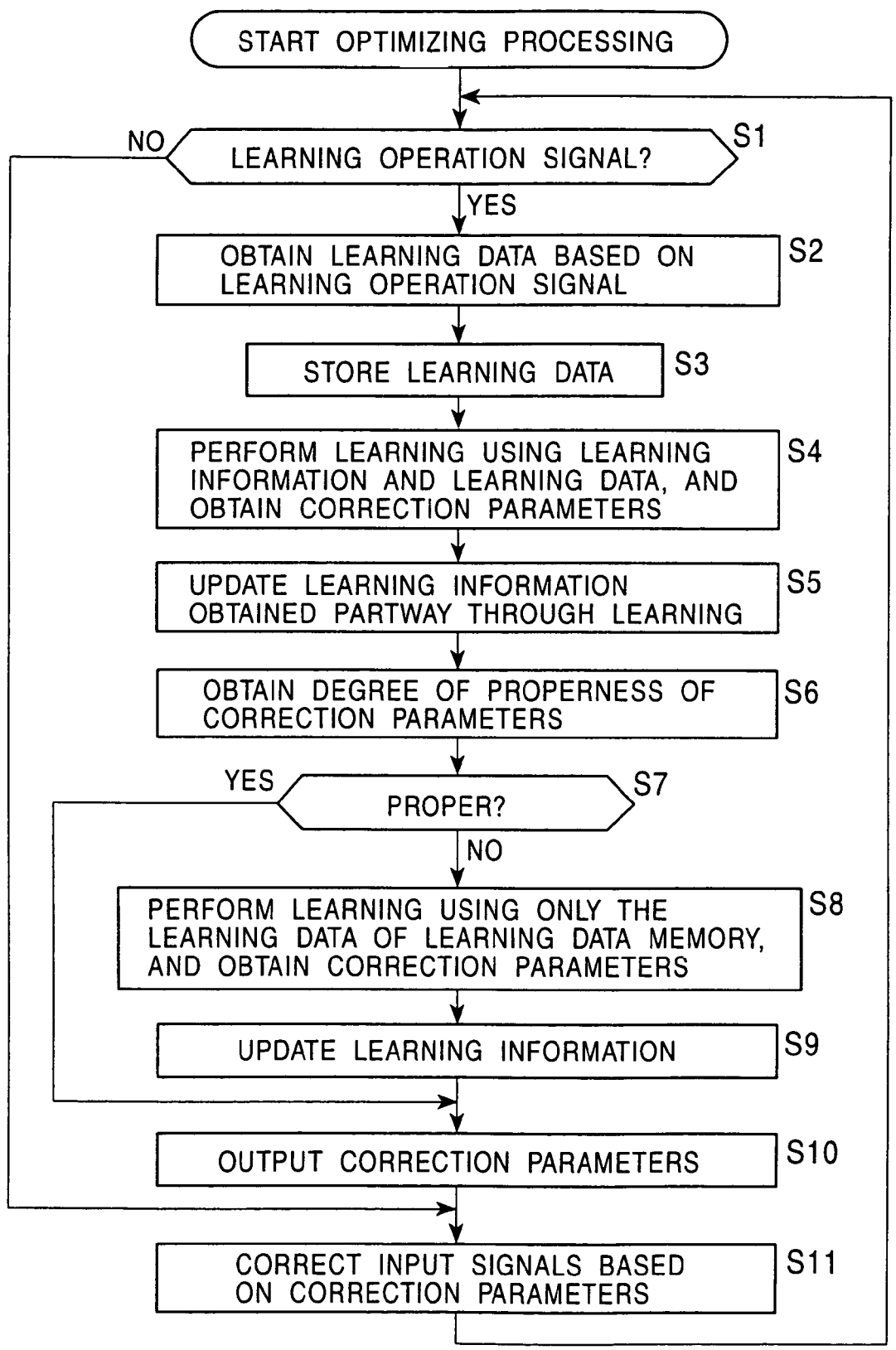
FIG. 3 is a flowchart describing optimizing processing with the optimizing device shown in FIG. 2.

Next, the processing (optimizing processing) which the optimizing device 1 shown in FIG. 2 performs, will be described with reference to the flowchart shown in FIG. 3.

First, in step S1, the learning unit 22 judges whether or not learning operating signals have been received from operating unit 2. Here, in the event of operating the operating unit 2, usually, the user first performs general operations, and then performs detailed operations while confirming the output signals output according to the operations, and then stops operations at the point that output signals which the user thinks are ultimately optimal are obtained. The operating signals corresponding to the position of the operating unit 2 at the point where output signals which the user thinks are optimal are obtained are the learning operating signals, and accordingly, in the event that the operating unit 2 is operated for a predetermined amount of time or longer and then the operating is stopped, the learning unit 22 judges the operating signals at the time of stopping as being learning operating signals.

In step S1, in the event that judgement is made that learning operating signals are not received, i.e., in the event that the user has not operated the operating unit 2, or has operated but is still looking for an optimal position, for example, step S2 through step S10 are skipped, the flow proceeds to step S11, and the correcting unit 21 corrects the input signals according to the correction parameters already set, output signals are output as the correction results, and the flow returns to step S1.

Also, in step S1, in the event that judgement is made that learning operating signals have been received, the flow proceeds to step S2, the learning unit 22 obtains learning data used for learning, based on the learning operating signals, and the flow proceeds to step S3. In step S3, the learning data memory 53 stores the newest learning data obtained in step S2.

Here, the learning data memory 53 has storage capacity capable of storing multiple sets of learning data. Also, in the event that this storage capacity is filled up, the learning data memory 53 is arranged so as to overwrite the oldest stored values with the next learning data. Accordingly, there are multiple sets of learning data in the learning data memory 53, with the newest stored.

Following storing of the learning data in the learning data memory 53 in step S3, the flow proceeds to step S4, where the learning unit 22 performs learning using the newest learning data stored in the learning data memory 53 and the learning information stored in the learning information memory 55, obtains correction parameters, and proceeds to step S5. In step S5, the learning unit 22 updates the stored contents of the learning information memory 55 with new learning information obtained part way through the learning in step S4, and the flow proceeds to step S6.

In step S6, the learning unit 22 obtains a later-described properness which represents the properness of the correction parameters obtained in step S4, the flow proceeds to step S7, and judgment is made regarding whether or not the correction parameters obtained in step S4 are proper, based on the properness.

In the event that judgement is made in step S7 that the correction parameters are proper, steps S8 and S9 are skipped, the flow proceeds to step S10, and a learning unit 22 outputs the correction parameters judged to be proper to the correcting unit 21, and the flow proceeds to step S11. Accordingly, in this case, subsequent input signal correction is performed at the correcting unit 21 following the correction parameters newly obtained by the learning in step S4.

On the other hand, in the event that judgment is made in step S7 that the correction parameters are not proper, the flow proceeds to step S8, the learning unit 22 performs learning using only the newest learning data of the learning data stored in the learning data memory 53, obtains correction parameters, and proceeds to step S9. In step S9, the learning unit 22 updates the stored contents of the learning information memory 55 with the new learning information obtained partway through the learning in step S8, and the flow proceeds to step S10. In this case, in step S10, the learning unit 22 outputs the correction parameters obtained only from the newest learning data in step S8 to the correcting unit 21, and the flow proceeds to step S11. Accordingly, in this case, subsequent input signal correction is performed at the correcting unit 21 following the correction parameters newly obtained by the learning in step S8.

Figure 4:
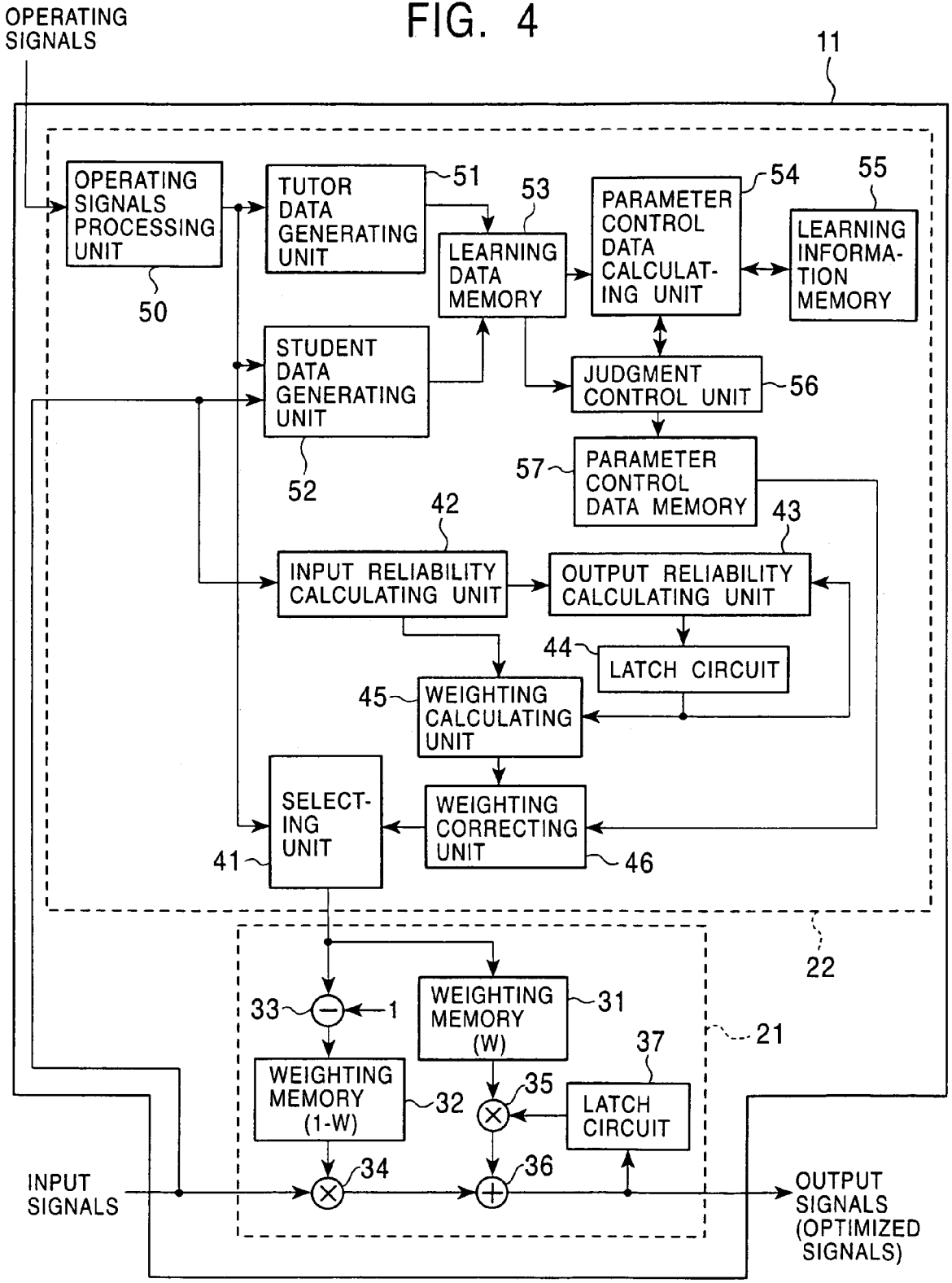
FIG. 4 is a block diagram illustrating a configuration example of an embodiment of an NR circuit using an optimizing device.

Next, FIG. 4 illustrates a detailed configuration example of a case wherein the processing unit 11 shown in FIG. 2 is applied to an NR circuit which removes noise from image signals and audio signals, for example.

Weight memory 31 stores a weight (coefficient) W (e.g., a value that is 0 or greater but 1 or smaller) as correction parameters supplied from a later-described selecting unit 41 of the learning unit 22. The weight memory 32 stores weight 1−W supplied from the computing unit 33.

The computing unit 33 supplies a subtracted value 1−W wherein the weight w supplied from the selecting unit 41 of the learning unit 22 is subtracted from 1.0, which is supplied to the weighting memory 32 as weight. The computing unit 34 multiplies the input signals and the weight 1−W stored in the weight memory 32, and supplies the multiplied value to a computing unit 36. A computing unit 35 multiplies the weight W stored in the weight memory 31 and the output signals stored (latched) at the latch circuit 37, and supplies the multiplied value thereof to the computing unit 36. The computing unit 36 adds the outputs of the computing units 34 and 35, and outputs the added value thereof as output signals.

A latch circuit 37 latches on the output signals which the computing unit 36 outputs, and supplies these to the computing unit 35.

With the embodiment shown in FIG. 4, the correcting unit 21 of the processing unit 11 is configured of the above weight memory 31 and 32, computing units 33, 34, 35, and 36, and the latch circuit 37.

This selecting unit 41 selects one or the other of the weight output by the weight correcting unit 46 or the weight output by the operating signal processing unit 50, and supplies this to the correcting unit 21 as correction parameters.

The input reliability calculating unit 42 is arranged so as to be supplied with input signals, and obtains the input reliability which represents the reliability of the input signals thereof, which are output to the output reliability calculating unit 43 and the weighting calculating unit 45. The output reliability calculating unit 43 obtains output reliability representing the reliability of the output signals, based on the input reliability from the input reliability calculating unit 42, and supplies this to the latch circuit 44 and the weighting calculating unit 45. The latch circuit 44 stores (latches) the output reliability from the output reliability computing unit 43, and supplies this to the output reliability calculating unit 43 and the weighting calculating unit 45.

The weighting calculating unit 45 calculates the weighting from the input reliability from the input reliability calculating unit 42 and the output reliability from the output reliability calculating unit 43, and outputs this to the weighting correcting unit 46. The weighting correcting unit 46 is arranged so as to be supplied from parameter control data memory 57 with parameter control data which controls the weighting serving as correction parameters, in addition to weight, and the weighting correcting unit 46 processes (corrects) the weighting with the parameter control data, and supplies this to the selecting unit 41.

An operating signal processing unit 50 is arranged so as to be supplied with operating signals from the operating unit 2 (FIG. 2), with the operating signal processing unit 50 processing the operating signals supplied thereto, and supplying the weight corresponding to the operating signals thereof to the selecting unit 41, a tutor data generating unit 51, and a student data generating unit 52. Further, the operating signal processing unit 50 judges whether or not the operating signals are the above-described learning operating signals, and in the event that the operating signals are learning operating signals, a flag to that effect (hereafter may be referred to as learning flag) is added to the weight to be output.

Upon receiving the weight with a learning flag added thereto from the operating signal processing unit 50, the tutor data generating unit 51 generates tutor data which serves as a tutor for learning, and supplies this to the learning data memory 53. That is, the tutor data generating unit 51 supplies the weight to which a learning flag has been added, to the learning data memory 53, as tutor data.

The student data generating unit 52, upon receiving the weight with the learning flag added from the operating signal processing unit 50, generates students data to serve as a student for learning, and supplies this to the learning data memory 53. That is, the student data generating unit 52 is configured in the same way as the above-described input reliability calculating unit 42, output reliability calculating unit 43, latch circuit 44, and weighting calculating unit 45, to calculate weighting from input signals supplied thereto, and supplying the weighting calculated from the input signals upon reception of weighting with a learning flag added thereto to the learning data memory 53, as student data.

The learning data memory 53 stores a set of tutor data serving as weighting corresponding to learning operating signals, supplied from the tutor data generating unit 51, and student data serving as weighting calculated from the input signals at the time of reception of the learning operating signals, supplied from the student data generating unit 52, as one set of learning data. As described above, the learning data memory 53 is capable of storing multiple sets of learning data, and further, upon storing learning data to the storage capacity, is arranged so as to store the next learning data by overwriting the oldest stored values. Accordingly, the learning data memory 53 basically has several of the newest learning data sets stored therein at all times.

A parameter control data calculating unit 54 learns the tutor data and student data serving as learning data stored in the learning data memory 53, as well as, if necessary, parameter control data which minimizes a predetermined statistical error by computing new learning information using the learning information stored in the learning information memory 55, under control of a judgment control unit 56, which is supplied to the judgment control unit 56. Also, the parameter control data calculating unit 54 updates the stored contents of the learning information memory 55 with new learning information obtained by learning. The learning information memory 55 stores the learning information from the parameter control data calculating unit 54.

The judgment control unit 56 judges the properness of the parameter control data supplied from the parameter control data calculating unit 54, by making reference to the newest learning data stored in the learning data memory 53. Also, the judgment control unit 56 controls the parameter control data calculating unit 54 and supplies the parameter control data supplied from the parameter control data calculating unit 54, to the parameter control data memory 57. The parameter control data memory 57 updates the stored contents thereof by the parameter control data supplied from the judgment control unit 56, and supplies this to the weighting correcting unit 46.

With the embodiment shown in FIG. 4, the learning unit 22 of the processing unit 11 is configured of the above-described selecting unit 41 through weighting correcting unit 46, and the operating signal processing unit 50 through parameter control data memory 57.

With the processing unit 11 of the optimizing device 1 serving as an NR circuit configured as described above, noise in input signals is removed as follows.

Figure 5A:
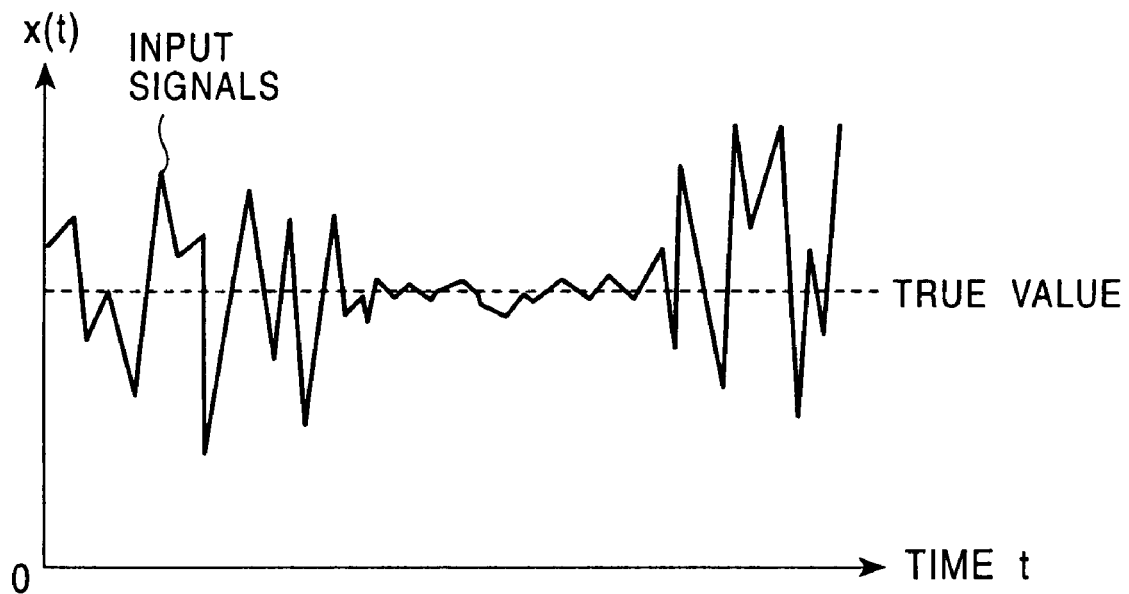
FIG. 5A is a waveform diagram representing input signals.

That is, for example, to simplify description, considering removing noise which fluctuates over time with regard to input signals having a constant true value upon which noise which fluctuates over time is superimposed, as shown in FIG. 5A, by taking the average thereof, noise can be effectively removed by making the weighting small (not giving much consideration) for input signals with a high noise level (i.e., signals with poor S/N), for example, as the degree of noise, while making the weighting great for input signals with a low noise level (i.e., signals with good S/N).

Figure 5B:
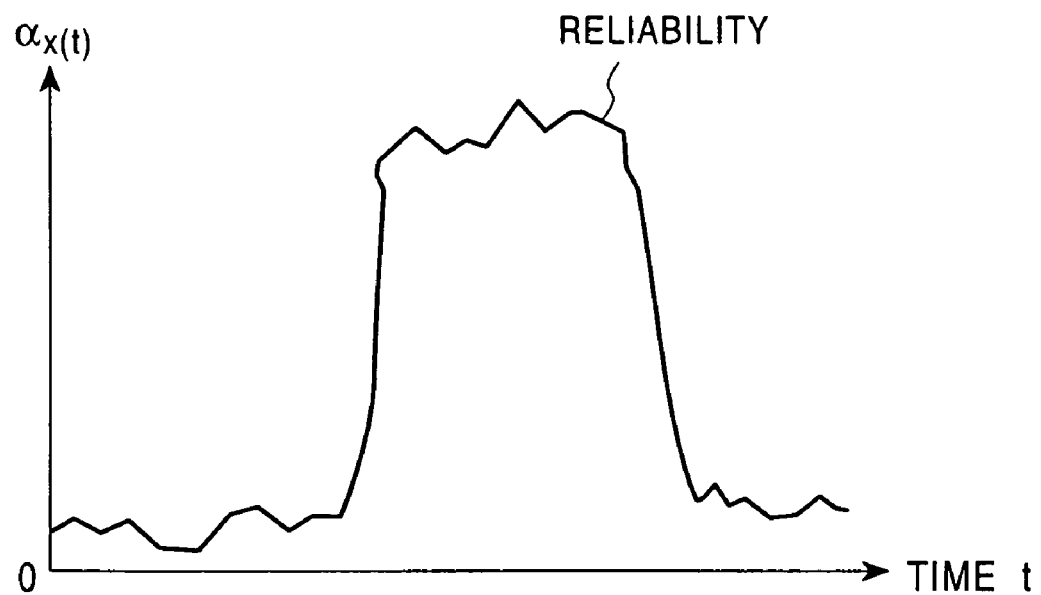
FIG. 5B is a waveform diagram representing input reliability.

Accordingly, with the NR circuit shown in FIG. 4, noise can be effectively removed by obtaining the closeness of the input signals to the true value as an evaluation value of input signals, as shown in FIG. 5B for example, i.e., the input reliability representing the reliability that the input signals are the true value, and calculating the average thereof by performing weighting corresponding to the input reliability for the input signals.

Accordingly, with the NR circuit shown in FIG. 4, the weight average using the weighting corresponding to the input reliability thereof is obtained with regard to the input signals, and output as output signals, and the output signals y(t) can be obtained with the following Expression, wherein the input signals, the output signals, and input reliability, at time t, are represented by x(t), y(t), and $\alpha_{x(t)}$.

[Expression 1] (1)

$$y(t) = \frac{\sum_{i=0}^{t} \alpha_{x(i)} x(i)}{\sum_{i=0}^{t} \alpha_{x(i)}}$$

Here, the greater the input reliability $\alpha_{x(t)}$ is, the greater the weighting provided is.

From Expression (1), the output signal y(t-1) from one sample back from the current time t can be obtained from the following Expression.

[Expression 2] (2)

$$y(t-1) = \frac{\sum_{i=0}^{t-1} \alpha_{x(i)} x(i)}{\sum_{i=0}^{t-1} \alpha_{x(i)}}$$

Also, with regard to the output signals y(t) as well, output reliability $\alpha_{y(t)}$ which represents the closeness to the true value, i.e., the reliability that the output signals y(t) are the true value, is introduced as the evaluation value of the output signals y(t), and the output reliability $\alpha_{y(t-1)}$ for the output signal y(t-1) from one sample back from the current time t is defined by the following Expression.

[Expression 3] (3)

$$\alpha_y(t-1) = \sum_{i=0}^{t-1} \alpha_{x(i)}$$

In this case, from the Expressions (1) through (3), the output signals y(t) and the output reliability $\alpha_{y(t)}$ thereof can be expressed as follows.

[Expression 4] (4)

$$y(t) = \frac{\frac{\alpha_{y(t-1)} y(t-1)}{\sum_{i=0}^{t-1} \alpha_{x(i)} x(i) + \alpha_{x(t)} x(t)}}{\frac{\sum_{i=0}^{t-1} \alpha_{x(i)} + \alpha_{x(t)}}{\alpha_{y(t-1)}}}$$

$$= \frac{\alpha_{y(t-1)} y(t-1) + \alpha_{x(t)} x(t)}{\alpha_{y(t-1)} + \alpha_{x(t)}}$$

[Expression 5]

$$\alpha_{y(t)} = \alpha_{y(t-1)} + \alpha_{x(t)} \quad (5)$$

Also, the weight used for obtaining the output signal y(t) at the time t is represented by w(t), and is defined by the following Expression.

[Expression 6]

$$w(t) = \frac{\alpha_{y(t-1)}}{\alpha_{y(t-1)} + \alpha_{x(t)}} \quad (6)$$

From Expression (6), the following Expression holds.

[Expression 7]

$$1 - w(t) = \frac{\alpha_{x(t)}}{\alpha_{y(t-1)} + \alpha_{x(t)}} \quad (7)$$

Using Expressions (6) and (7), the output signals y(t) in Expression (4) can be represented by a weighted average from the following multiplication and addition.

[Expression 8]

$$y(t) = w(t)y(t-1) + (1-w(t))x(t) \quad (8)$$

Note that the weight w(t) (and 1−w(t)) used in Expression (8) can be obtained from Expression (6), from the output reliability $\alpha_{y(t-1)}$ for the output signal y(t−1) from one sample back, and the input reliability $\alpha_{x(t)}$ for the current input signal x(t). Also, the output reliability $\alpha_{y(t)}$ for the current output signal y(t) in Expression (5) can also be obtained from the output reliability $\alpha_{y(t-1)}$ for the output signal y(t−1) from one sample back, and the input reliability $\alpha_{x(t)}$ for the current input signal x(t).

Now, using the inverse numbers of the respective variances $\sigma_{x(t)}^2$ or $\sigma_{y(t)}^2$ as the input reliability $\alpha_{x(t)}$ for the input signals x(t) or the output reliability $\alpha_{y(t)}$ for the output signals y(t), i.e., defining the input reliability $\alpha_{x(t)}$ and the output reliability $\alpha_{y(t)}$ as in the following Expression,

[Expression 9] (9)

$$\alpha_{x(t)} = \frac{1}{\sigma_{x(t)}^2}$$

$$\alpha_{y(t)} = \frac{1}{\sigma_{y(t)}^2}$$

the weight w(t) in Expression (6) and the weight 1−w(t) in Expression (7) can be obtained from the following Expressions.

[Expression 10] (10)

$$w(t) = \frac{\sigma_{x(t)}^2}{\sigma_{y(t-1)}^2 + \sigma_{x(t)}^2}$$

[Expression 11] (11)

$$1 - w(t) = \frac{\sigma_{y(t-1)}^2}{\sigma_{y(t-1)}^2 + \sigma_{x(t)}^2}$$

Further, $\sigma_{y(t)}^2$ can be obtained by the following Expression.

[Expression 12]

$$\sigma_{y(t)}^2 = w(t)^2 \sigma_{y(t-1)}^2 + (1-w(t))^2 \sigma x(t)^2 \quad (12)$$

The NR circuit shown in FIG. 4 basically follows Expression (6) to perform correction parameter computing processing for computing correction parameters serving as the weight w(t), and uses the weight w(t) to calculate the weighting average between the output signal y(t−1) from one sample back and the current input signal x(t) following Expression (8), thereby performing correcting processing for effectively removing noise contained in the input signals x(t).

Now, the user will not necessarily feel that the output signals obtained as the result of correction processing of the input signals by the weight w(t) obtained following Expression (6) are optimal. Accordingly, the NR circuit shown in FIG. 4 performs control data learning processing for obtaining parameter control data for controlling (correcting) the weight w(t) serving as the correction parameter, by learning the operations of operating unit 2 by the user, and performs correction processing of input signals using weighting corrected by the parameter control data.

The control data learning processing is performed as follows.

That is, a weight $W_i$ corresponding to learning operating signals provided at the i'th time by the user operating the operating unit 2 can be considered to be that which the user thinks to be optimal with regard to the input signals input at the time that the learning operating signals are provided, and accordingly, obtaining parameter control data which can correct the weight w(t) obtained following Expression (6) to a value near the weight $W_i$ corresponding to the learning operating signals (ideally, the same value) is sufficient for the control data learning processing.

To this end, let us now consider taking the weight w(t) obtained following Expression (6) as student data serving as a student for learning, and the weight $W_i$ corresponding to the learning operating signals as tutor data serving as a tutor for learning, and obtaining, from the weight w(t) serving as student data, a prediction value $W_i'$ for the weight $W_i$ serving as tutor data predicted by a linear expression defined by a parameter control data a and b such as shown in the following Expression.

[Expression 13]

$$W_i' = aw_i + b \quad (13)$$

Note that in Expression (13) (as with the later-described Expression (14) and Expressions (16) through (21)), $w_i$ represents the weight w(t) serving as student data obtained following Expression (6) as to input signals input at the time that the weight $W_i$ corresponding to the learning operating signals serving as tutor data is input.

From Expression (13), the error (prediction error) $e_i$ between $W_i$ serving as the tutor data and the prediction value $W_i'$ thereof is represented as shown in the following Expression.

[Expression 14] (14)

$$e_i = W_i - W_i'$$
$$= W_i - (aw_i + b)$$

Now, let us consider obtaining parameter control data a and b which minimizes the sum of the square (second power) error of the prediction error $e_i$ in Expression (14) as represented in the following Expression,

[Expression 15] (15)

$$\sum_{i=1}^{N} e_i^2$$

using the least-square method (also called the least-square error method). Note that in Expression (15) (as with the later-described Expressions (16) through (21)), N represents the number of sets of tutor data and student data.

First, partial differentiation of the sum of the square error in Expression (15) with each of the parameter control data a and b yields the following expressions.

[Expression 16] (16)

$$\frac{\partial \sum_{i=1}^{N} e_i^2}{\partial a} = -2 \sum_{i=1}^{N} w_i(W_i - (aw_i + b))$$

[Expression 17] (17)

$$\frac{\partial \sum_{i=1}^{N} e_i^2}{\partial b} = -2 \sum_{i=1}^{N} (W_i - (aw_i + b))$$

Since the minimum value (minimal value) of the sum of the square error in Expression (15) can be obtained by a and b which make the right-hand side in Expressions (16) and (17) to be 0, setting the right-hand side in both Expressions (16) and (17) to 0 yields Expression (18) from Expression (16), and Expression (19) from Expression (17), respectively.

[Expression 18] (18)

$$N \sum_{i=1}^{N} w_i W_i = Nb \sum_{i=1}^{N} w_i + Na \sum_{i=1}^{N} w_i^2$$

[Expression 19] (19)

$$Nb = \sum_{i=1}^{N} w_i - a \sum_{i=1}^{N} w_i$$

Substituting Expression (19) into Expression (18) allows the parameter control data a to be obtained from the following Expression.

[Expression 20] (20)

$$a = \frac{N \sum_{i=1}^{N} w_i W_i - \sum_{i=1}^{N} w_i \sum_{i=1}^{N} W_i}{N \sum_{i=1}^{N} w_i^2 - \left(\sum_{i=1}^{N} w_i\right)^2}$$

Also, from Expressions (19) and (20), the parameter control data b can be obtained from the following Expression.

[Expression 21] (21)

$$b = \frac{\sum_{i=1}^{N} W_i - a \sum_{i=1}^{N} w_i}{N}$$

With the NR circuit shown in FIG. 4, control data learning processing is performed for obtaining parameter control data a and b, as described above.

Figure 6:
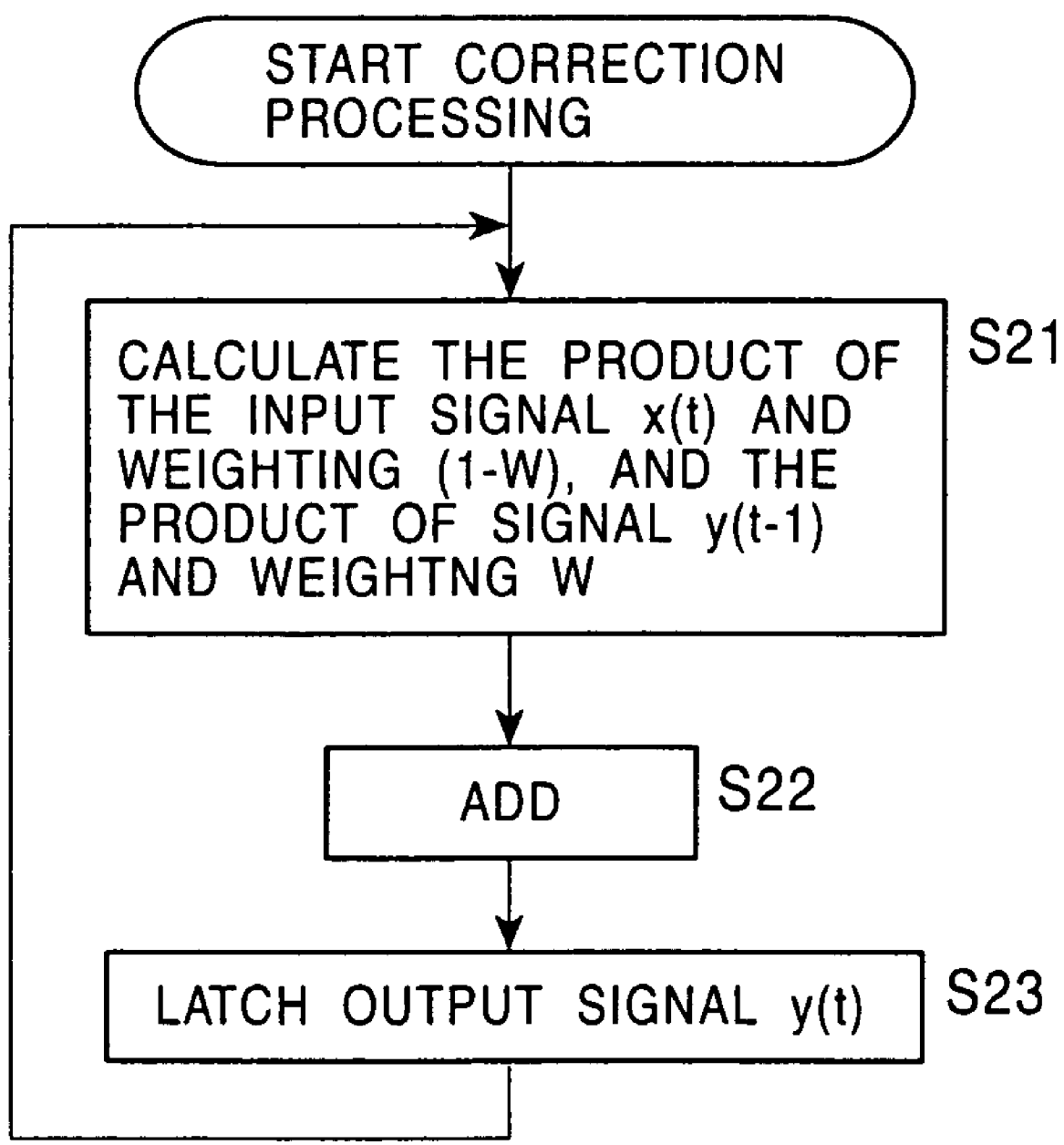
FIG. 6 is a flowchart describing correction processing with an NR circuit.

Next, the correction processing, correction parameter computing processing, and control data learning processing, which the NR circuit shown in FIG. 4 performs, will be described with reference to the flowcharts in FIG. 6 through FIG. 8.

First, correction processing will be described with reference to the flowchart in FIG. 6.

Upon weight w(t) serving as correction parameters being supplied from the selecting unit 41 of the learning unit 22 to the correcting unit 21, the weight memory 31 of the correcting unit 21 stores the weight w(t) in the form of overwriting. Further, the computing unit 33 of the correcting unit 21 subtracts the weight w(t) from 1.0, obtains the weight 1−w(t), supplies this to the weight memory 32, and stores this in the form of overwriting.

Then, upon input signals x(t) being supplied, in step S21 the computing unit 34 computes the product of the input signals x(t) and the weight 1−w(t) stored in the weight memory 32, and supplies this to the computing unit 36. Further, in step S21, the computing unit 35 computes the product of the weight w(t) stored in the weight memory 31 and output signal y(t−1) from one sample back latched by the latch circuit 37, and supplies this to the computing unit 36.

The flow then proceeds to step S22, where the computing unit 36 adds the product of the input signal x(t) and the weight 1−w(t), with the product of the weight w(t) and the output signal y(t−1), thereby obtaining the weighted addition value (1−w(t))x(t)+w(t)y(t−1) of the input signal x(t) and output signal y(t−1), which is output as the output signal y(t). This output signal y(t) is also supplied to the latch circuit 37, and the latch circuit 37 stores the output signal y(t) in the form of overwriting. Subsequently, the flow returns to step S21, waits for input signals of the next sample to be supplied, and subsequently, the same processing is repeated.

Next, correction parameter computing processing will be described with reference to the flowchart shown in FIG. 7.

With correction parameter computing processing, first, in step S31, the input reliability calculating unit 42 obtains input reliability $\alpha_{x(t)}$ based on dispersion of the input signals, for example.

That is, the input reliability calculating unit 42 has built-in unshown FIFO (first in first out) memory which is capable of latching, besides a sample x(t) of the current input signal, several past sample is, with the dispersion thereof being calculated using the sample x(t) of the current input signal and several past samples, the inverse number thereof being obtained as the input reliability $\alpha_{x(t)}$, and supplied to the output reliability calculating unit 43 and weight calculating unit 45. Note that there are cases wherein there is not a sufficient number of input signal samples necessary for calculating dispersion immediately following starting input of the input signals, but in such cases, a default value, for example, is output as the input reliability $\alpha_{x(t)}$.

Subsequently, the flow proceeds to step S32, and the weight calculating unit 45 obtains the weight w(t) following Expression (6), using the input reliability $\alpha_{x(t)}$ from the input reliability calculating unit 42.

That is, at the timing that the input reliability ax(t) is supplied from the input reliability calculating unit 42 to the weight calculating unit 45, the output reliability $\alpha_{y(t-1)}$) which the output reliability calculating unit 43 has output one sample back is latched at the latch circuit 44, and in step S32, the weight calculating unit 45 obtains the weight w(t) following Expression (6) using the input reliability $\alpha_{x(t)}$ from the input reliability calculating unit 12 and the output reliability $\alpha_{y(t-1)}$ latched by the latch circuit 14. This weight w(t) is supplied to the weight correcting unit 46.

Subsequently, the flow proceeds to step S33, and the weight correcting unit 46 reads the parameter control data out from the parameter control data memory 57, and proceeds to step S34. In step S34, the weight correcting unit 46 judges whether or not the parameter control data read out from the parameter control data memory 57 is data of a mode wherein the weight w(t) is not corrected, i.e., auto mode data representing a mode wherein the weight w(t) is obtained automatically, so to speak, from the input reliability and output reliability at the weight calculating unit 45 regardless of operations by the user at the operating unit 2 is used without change as weight W for correcting the input signals x(t) (hereafter may be referred to as auto mode).

In step S34, in the event that judgement is made that the parameter control data is not auto mode data, the flow proceeds to step S35, the weight correcting unit 46 corrects the weight w(t) supplied from the weight correcting unit 45 following the linear expression in Expression (13) defined by the parameter control data a and b supplied from the parameter control data memory 57, and proceeds to step S36. At step S36, the weight correcting unit 46 supplies the post-correction weight to the selecting unit 41, and proceeds to step S37. Here, in Expression (13), $w_i$ is equivalent to the weight w(t) supplied from the weight calculating unit 45, and $W_i'$ is equivalent to the post-correction weight W.

On the other hand, in step S34, in the event that judgement is made that the parameter control data is auto mode data, the flow skips step S35, proceeds to step S36, where the weight correcting unit 46 supplies the weight w(t) from the weight calculating unit 45 to the selecting unit 41 without change, and the flow proceeds to step S37.

In step S37, the output reliability calculating unit 43 updates the output reliability. That is, the output reliability calculating unit 43 adds, following Expression (5), the input reliability $\alpha_{x(t)}$ which the input reliability calculating unit 42 has calculated at the immediately previous step S31, and the output reliability $\alpha_{y(t-1)}$ from one sample back which the latch circuit 44 has latched, thereby obtaining the current output reliability $\alpha_{y(t)}$, which is stored in the latch circuit 44 in the form of overwriting.

Then, the flow proceeds to step S38, and the selecting unit 41 judges whether or not the operating unit 2 is being operated by the user, from the output of the operating signal processing unit 50. In the event that judgement is made that the operating unit 2 is not being operated in step S38, the flow proceeds to step S39, where the selecting unit 41 selects the weight supplied from the weight correcting unit 46 (hereafter may be referred to as correcting weight), which is output to the correcting unit 21, and the flow returns to step S31.

Also, in step S38, in the event that judgement is made that the operating unit 2 is being operated, the flow proceeds to step S40, where the selecting unit 41 selects the weight to be output by the operating signal processing unit 50 according to the operation, outputs this to the correcting unit 21, and the flow returns to step S31.

Figure 7:
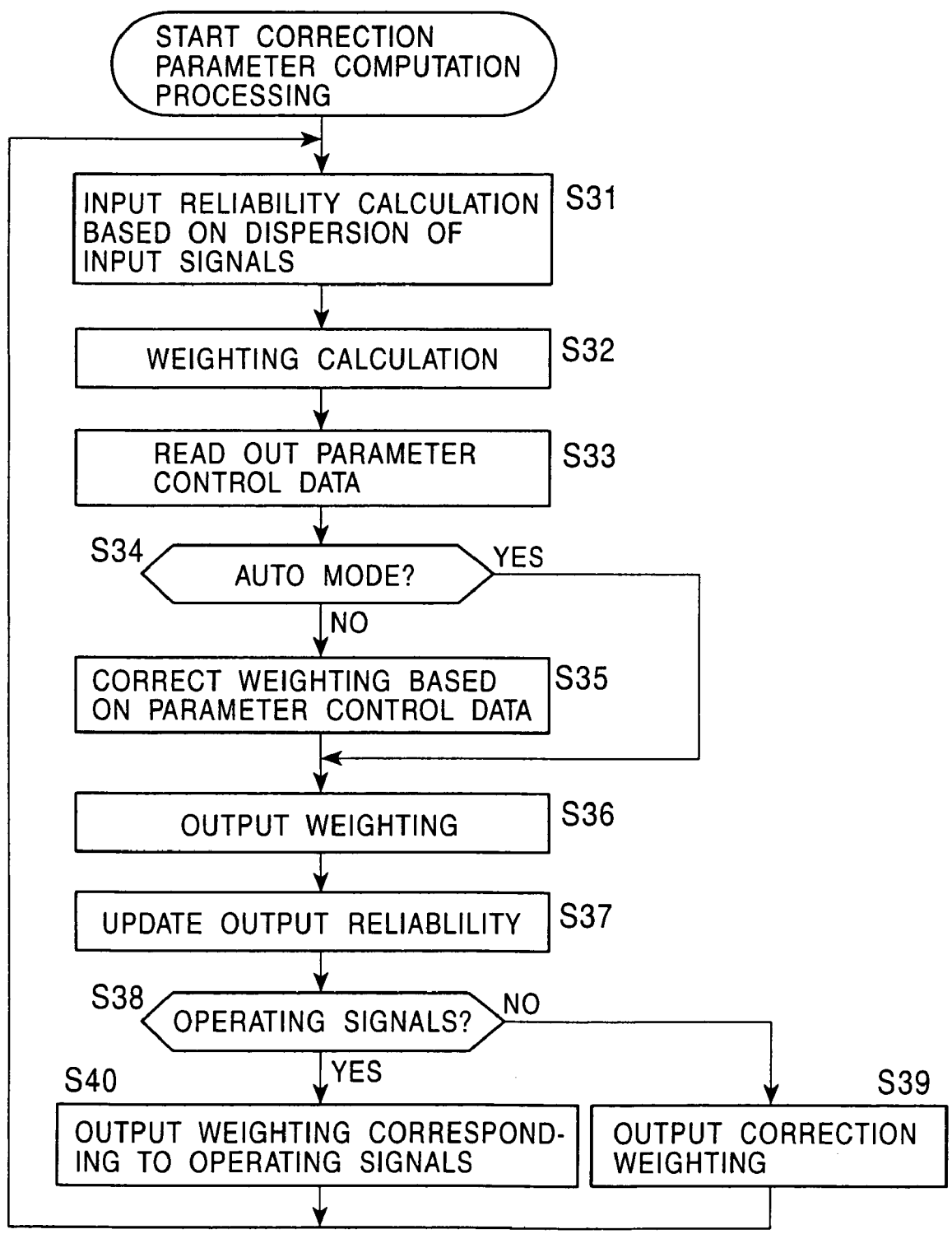
FIG. 7 is a flowchart describing correction parameter computing processing with an NR circuit.

Accordingly, in the correction parameter computing processing shown in FIG. 7, in the event that the operating unit 2 is not being operated, the correcting weight is supplied to the correcting unit 21, while in the event that the operating unit 2 is being operated, weighting corresponding to the operating signals is supplied to the correcting unit 21. As a result, at the correcting unit 21, in the event that the operating unit 2 is not being operated, the input signals are corrected by the correction weighting, and in the event that the operating unit 2 is being operated, the input signals are corrected by a weighting corresponding to the operating signals.

Figure 8:
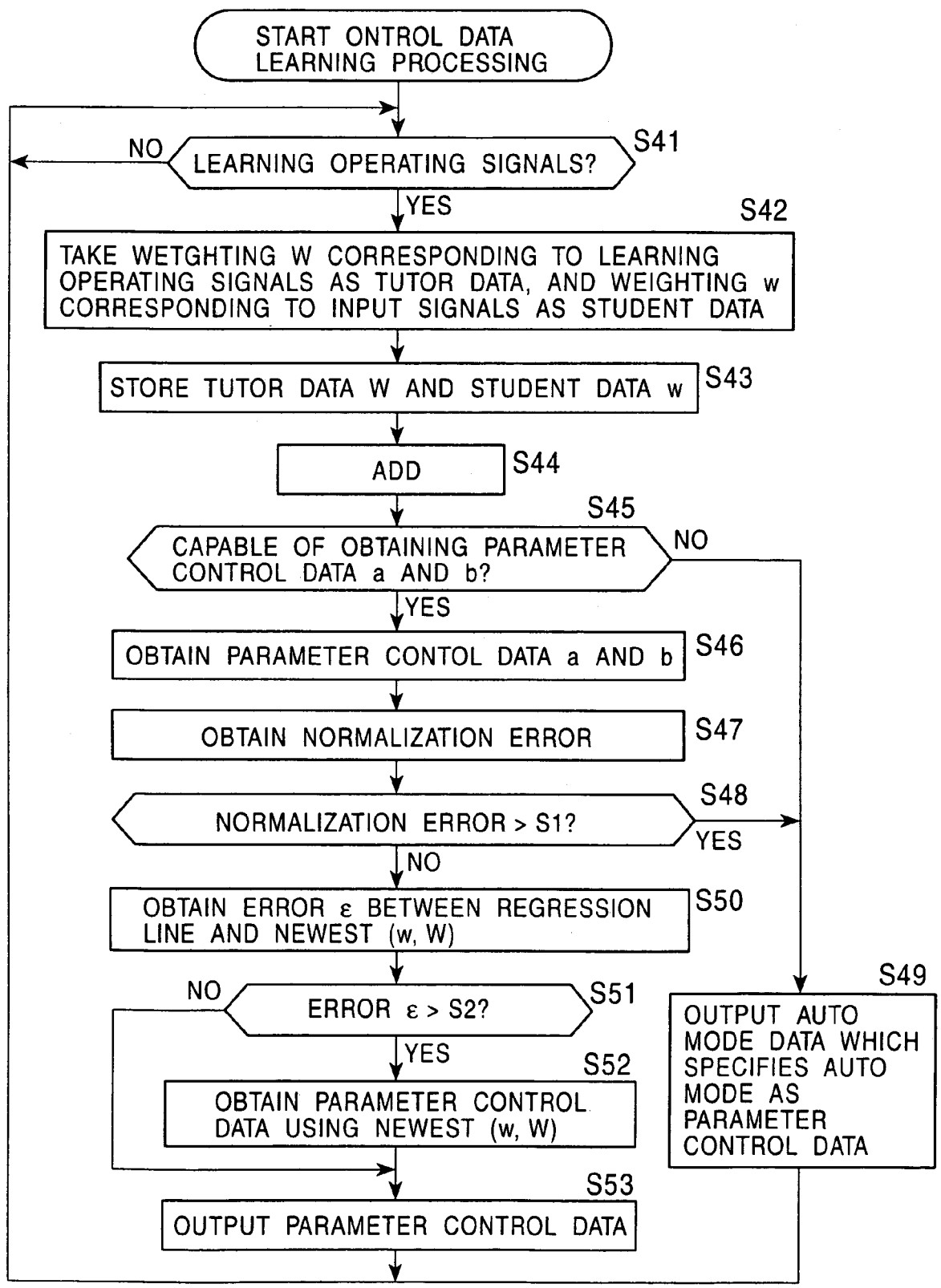
FIG. 8 is a flowchart describing control data learning processing with an NR circuit.

Further, in the correction parameter computing processing in FIG. 7, in the case of auto mode, weighting to be used for correction processing is obtained only from the input reliability and output reliability, regardless of the operations of operating unit 2, and if not in the auto mode, weighting to be used for correction processing is obtained using the parameter control data obtained by learning in the control data learning processing shown in FIG. 8, which will be described later, based on the operation of operating unit 2.

Next, the control data learning processing will be described with reference to the flowchart shown in FIG. 8.

In the control data learning processing, first, in step S41, the operating signal processing unit 50 judges whether or not learning operating signals have been received from the operating unit 2, and in the event that judgement is made that these have not been received, the flow returns to step S41.

Also, in the event that judgement is made in step S41 that learning operating signals have been received from the operating unit 2, that is to say, in the event that judgment can be made that the user has operated the operating unit 2 so as to obtain a desired output signal, such as in cases wherein, for example, the operating unit 2 starts to be operated, following which, without elapsing of a first time t1 or longer, operating is performed continuously for a second time t2 or longer, following which the operations thereof are stopped continuously for a third time t3 or longer, or in cases wherein the operating unit 2 starts to be operated, following which the operations thereof are stopped continuously for a third time t3 or linger, the flow proceeds to step S42, where the tutor data generating unit 51 generates tutor data, while the student data generating unit 52 generates student data.

That is, in the event of receiving learning operating signals, the operating signal processing unit 50 supplies weight W corresponding to the learning operating signals (for example, weight W corresponding to the amount of operating of the operating unit 2 or the position of knobs or levers serving as operating unit 2) to the tutor data generating unit 51 and student data generating unit 52, along with a learning flag. Upon receiving a weight W with a learning flag, the tutor data generating unit 51 obtains the weight W as tutor data, and supplies this to the learning data memory 53. Also the student data generating unit 52, upon receiving the weight with a learning flag, obtains a weight w corresponding to the input signals at that time as student data, and supplies this to the learning data memory 53.

Here, the weight w corresponding to input signals means weight which is obtained automatically, so to speak, from the input reliability and output reliability, following Expression (6), and as described above, the student data generating unit 52 calculates this weight w corresponding to the input signals, from the input signals.

Upon receiving the tutor data W from the tutor data generating unit 51 and receiving the student data w from the student data generating unit 52, the learning data memory 53 stores the set of the newest tutor data W and student data w in step S43, and proceeds to step S44.

In step S44, the parameter control data calculating unit 54 performs adding in for the least-square, with regard to the tutor data and student data.

That is, the parameter control data calculating unit 54 performs computation equivalent to the multiplication ($w_i W_i$) and summation ($\Sigma w_i W_i$) of the student data $w_i$ and the tutor data $W_i$, computation equivalent to the summation ($\Sigma w_i$) of the student data $w_i$, computation equivalent to the summation ($\Sigma W_i$) of the tutor data $W_i$, and computation equivalent to the summation of the product of the student data $w_i$ with itself ($\Sigma w_i^2$) in Expressions (20) and (21).

Now, saying that, for example, N−1 sets of tutor data and student data have already been obtained, and that the N'th set of tutor data and student data has been obtained as the newest tutor data and student data, at this point adding in with regard to the N−1'th set of tutor data and student data has already been performed at the parameter control data calculating unit 54. Accordingly, with regard to the N'th set of tutor data and student data, as long as the results of the adding in which has already been performed with regard to the N−1'th set of tutor data and student data has been saved, the results of adding in the N sets of tutor data and student data can be obtained including the newest tutor data and student data, by adding in the N'th set of tutor data and student data.

Accordingly, the parameter control data calculating unit 54 is arranged so as to store the previous adding in results in the learning information memory 55 as learning information, and so as to perform adding in with regard to the N'th set of tutor data and student data, using this learning information. Now, the number of sets N of the tutor data and student data used for the adding in so far is also necessary for the adding in, and the learning information memory 55 is arranged so as to also store the number of sets N as learning information.

Following performing the adding-in in step S44, the parameter control data calculating unit 54 stores the results of adding in, in the form of overwriting in the learning information memory 55 as learning information, and the flow proceeds to step S45.

In step S45, the parameter control data calculating unit 54 judges whether or not it is possible to obtain the parameter control data a and b with the Expressions (20) and (21), from the results of adding in serving as learning information stored in the learning information memory 55.

That is, with the set of tutor data and student data hereafter taken as a learning pair where appropriate, the parameter control data a and b cannot be obtained from the Expressions (20) and (21) unless learning information obtained by at least two learning pairs exists. Accordingly, in step S45, judgement is made regarding whether or not it is possible to obtain the parameter control data a and b from the learning information.

In the event that judgement is made in step S45 that obtaining the parameter control data a and b is not possible, the parameter control data calculating unit 54 supplies notification to that effect to the judgment control unit 56, and the flow proceeds to step S49. In step S49, the judgment control unit 56 supplies auto mode data indicating the auto mode to the parameter control data memory 57, where it is stored as parameter control data. The flow then returns to step S41, and subsequently, the same processing is repeated.

Accordingly, in the event that learning information sufficient for obtaining the parameter control data a and b does not exist, the weight w(t) automatically obtained from the input reliability and output reliability is used without change for correction of the input signals x(t), as described with reference to FIG. 7.

On the other hand, in the event that judgement is made in step S45 that the parameter control data a and b can be obtained, the flow proceeds to step S46, where the parameter control data calculating unit 54 obtains the parameter control data a and b by calculating the Expressions (20) and (21) using the learning information, which is supplied to the judgment control unit 56, and the flow proceeds to step S47.

In step S47, the judgment control unit 56 follows the linear expression in Expression (13) defined by the parameter control data a and b from the parameter control data calculating unit 54 to obtain, from each piece of student data stored in the learning data memory 53, prediction values of corresponding tutor data, and the sum of the square error indicated in Expression (15) for the prediction error of the prediction value thereof (the error as to the tutor data stored in the learning data memory 53), is obtained. Further, the judgment control unit 56 obtains a normalization error wherein the sum of the square error is divided by the number of learning pairs stored in the learning data memory 53, for example, and the flow proceeds to step S48.

In step S48, the judgment control unit 56 judges whether or not the normalization error is greater than (equal to or more than) a predetermined threshold value S1. In step S48, in the event that the normalization error is judged to be greater than the predetermined threshold value S1, i.e., in the event that the linear expression in Expression (13) defined by the parameter control data a and b does not approximate the relation between the student data and tutor data stored in the learning data memory 53 in a precise manner, the flow proceeds to step S49, where the judgment control unit 56 supplies auto mode data representing the auto mode to the parameter control data memory 57 as parameter control data, where it is stored, as described above. The flow then returns to step S41, and the same processing is repeated.

Accordingly, even if the parameter control data a and b can be obtained, in the event that the linear expression in Expression (13) defined by the parameter control data a and b does not approximate the relation between the student data and tutor data stored in the learning data memory 53 in a precise manner, the weight w(t) automatically obtained from the input reliability and output reliability is used without change for correction of the input signals x(t), in the same manner as with cases wherein learning information sufficient for obtaining the parameter control data a and b does not exist.

On the other hand, in step S48, in the event that judgement is made that the normalization error is not greater than the predetermined threshold value S1, i.e., in the event that the linear expression in Expression (13) defined by the parameter control data a and b approximates the relation between the student-data and tutor data stored in the learning data memory 53 in a precise manner, the flow proceeds to step S50, where the judgment control unit 56 obtains the error (distance) $\epsilon$ between the regression line represented by the linear expression in Expression (13) defined by the parameter control data a and b from the parameter control data calculating unit 54, and the point stipulated by the newest tutor data and student data stored in the learning data memory 53.

The flow then proceeds to step S51, where the judgment control unit 56 judges whether or not the magnitude of the error $\epsilon$ is greater than (equal to or more than) the predetermined threshold value S2, and in the event that judgement is made that it is not greater, step S52 is skipped, the flow proceeds to step S53, and the judgment control unit 56 outputs the parameter control data a and b obtained in step S46 to the parameter control unit data memory 37. The parameter control data memory 57 stores the parameter control data a and b from the judgment control unit 56 in the form of overwriting, and the flow returns to step S41.

On the other hand, in the event that judgement is made in step S51 that the magnitude of the error ϵ is greater than the predetermined threshold value S2, the flow proceeds to step S52, where the judgment control unit 56 recalculates the parameter control data a and b using only a predetermined number of learning pairs back from the newest learning pair serving as the newest tutor data and student data stored in the learning data memory 53, by controlling the parameter control data calculating unit 54 (without using the learning information in the learning information memory 55). The flow then proceeds to step S53, where the judgment control unit 56 outputs the parameter control data a and b obtained in step S52 to the parameter control unit data memory 37, where it is stored in the form of overwriting, and the flow returns to step S41.

Accordingly, in the event that the parameter control data a and b can be obtained and also in the event that the linear expression in Expression (13) defined by the parameter control data a and b approximates the relation between the student data and tutor data stored in the learning data memory 53 in a precise manner, the weight w(t) obtained from the input reliability and output reliability following Expression (13) defined by the parameter control data a and b obtained by learning being performed using the learning pairs obtained based on operation of operating unit 2 by the user is corrected, and corrected weight W obtained by the correction thereof is used for correction of the input signals x(t).

Figure 9A:
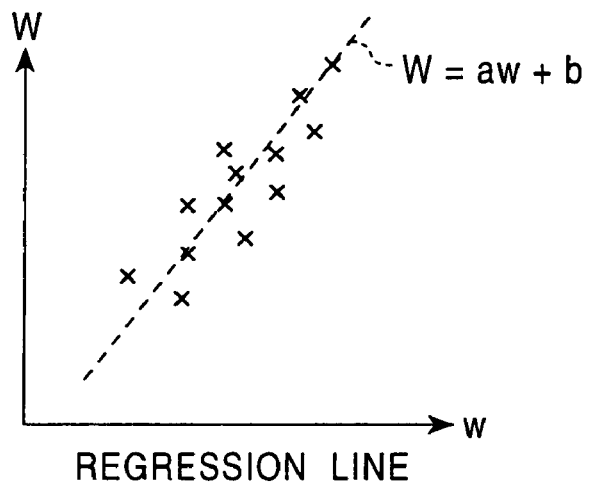
FIG. 9A through FIG. 9C are diagrams describing control data learning processing.

Now, the regression line represented by the linear expression in Expression (13) defined by the parameter control data a and b obtained in step S46 is a line which minimizes (the sum of) the square error with the N points stipulated by the N sets of tutor data and student data as shown in FIG. 9A, and in step S50, the error ϵ between this line and the point stipulated by the newest tutor data and student data, is obtained.

In the event that the magnitude of this error ϵ is not greater than the threshold value S2, the regression line represented by the linear expression in Expression (13) defined by the parameter control data a and b obtained in step S46 can be thought to be approximating each of the points stipulated by tutor data and student data provided so far, including the point stipulated with the newest tutor data and student data, in a relatively precise manner.

Figure 9B:
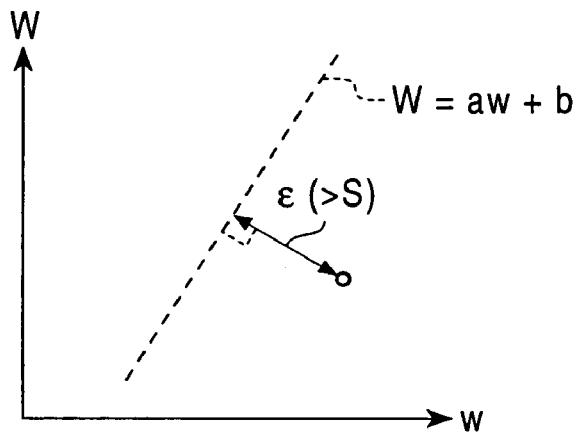

However, in the event that the magnitude of the error ϵ is greater than the threshold value S2, i.e., in the event that, as shown in FIG. 9B, the point stipulated by the newest tutor data and student data (indicated by a circle in FIG. 9B) greatly deviates from the regression line represented by the linear expression in Expression (13) defined by the parameter control data a and b obtained in step S46, it can be conceived that the user has performed operations of the operating unit 2 with a tendency that differs from those so far, for some reason.

Accordingly, in this case, the judging control unit 56 recalculates the parameter control data a and b in step S52 using only several of the newest learning pairs of the learning pairs that are stored in the learning data memory 53, by controlling the parameter control data calculating unit 54.

That is to say, in this case, the parameter control data calculating unit 54 recalculates the parameter control data a and b defining the line in Expression (13) which most closely approximates the group of points stipulated by a tutor data and student data, using only several recent tutor data and student data sets, without using (forgetting) the learning information serving as past results of adding in that are stored in the learning information memory 55.

Figure 9C:
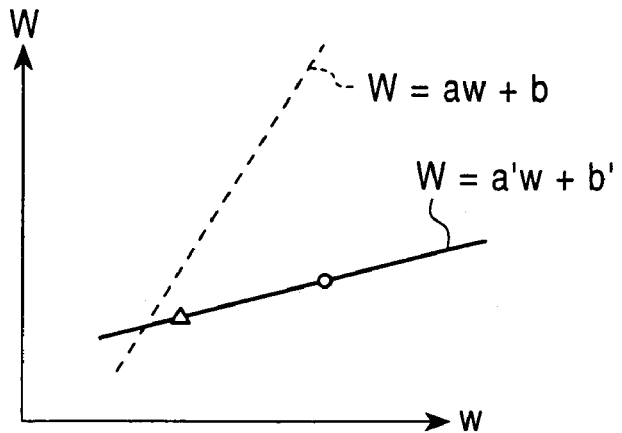

Specifically, as shown in FIG. 9C, for example, the parameter control data calculating unit 54 obtains parameter control data a' and b' defining a line which passes through a point stipulated by the newest tutor data and student data (indicated by a circle in FIG. 9C), and a point stipulated by the tutor data and student data provided one time back (indicated by triangle in FIG. 9C).

As described above, judgment is made regarding whether or not operating signals supplied according to user operations can be used for learning or not, and in the event that the signals are learning operating signals which can be used for learning, parameter control data a and b for correcting the weight for correcting input signals is learned based on the learning operating signals, so the operations of the user can be learned without the user knowing, and as a result, processing which is suitable for the user gradually comes to be performed based on the learned results, ultimately performing processing of which is optimal for the user.

This means that, from the perspective of the user, after normally operating the operating unit 2 for a while, noise reduction results which are optimal for the user can be obtained with regard to various types of input signals even without making operations, and accordingly, the device becomes broken in, so to speak. At this stage of breaking in the device, the user operates the operating unit 2 so as to obtain desired output signals, so the relation between the operations of the operating unit 2 and the weight W used for correcting input signals gradually comes to be clearly recognized by the user, so ultimately, the operations of the operating unit 2 by the user and the weight W used for correcting input signals come to be qualitatively correlated.

Also, at the NR circuit shown in FIG. 4, the weight W used for the correction processing (FIG. 6) performed at the correcting unit 21 following the operations of operating unit 2 by the user is changed so that the desired output signals by the user can be obtained. That is, upon the user operating the operating unit 2, the operating signal processing unit 50 outputs a weight representing the operating signals corresponding to the operations, the selecting unit 41 selects the weight, and supplies this to the correcting unit 21. In this case, at the correcting unit 21, correction processing indicated by Expression (8) is performed using the weight corresponding to the operations made by the user. In the event that the weight w(t) in Expression (8) is to be changed, due to operations made by the user, the contents of the processing (correction processing) represented by Expression (8) are also changed, as a matter of course, so it can be said he that at the NR circuit shown in FIG. 4, the "contents of processing" are being changed following the operations of the user so that output signals desired by the user can be obtained.

Further, at the NR circuit shown in FIG. 4, in the event that the parameter control data a and b cannot be obtained, or in the event that this can be obtained but the linear expression in Expression (13) defined by the parameter control data a and b does not approximate the relation between the student data and tutor data stored in the learning data memory 53 in a precise manner, weighting automatically obtained from the input reliability and output reliability are used for correction processing at the correcting unit 21. On the other hand, in the event that the parameter control data a and b can be obtained, and also, the linear expression in Expression (13) defined by the parameter control data a and b approximates the relation between the student data and tutor data stored in the learning data memory 53 in a precise manner, the weighting obtained from the input reliability and output reliability is corrected following Expression (13) defined by the parameter control data a and b obtained by learning being performed using learning pairs obtained based on operations of operating unit 2 by the user, and corrected weighting obtained by this correcting is used for correction processing by the correcting unit 21.

That is to say, with the NR circuit shown in FIG. 4, in the event that sufficient learning pairs have not been input from the user, or in the event that learning pairs whereby highly precise approximation is possible have not been input, weight automatically obtained from the input reliability and output reliability is used for the correction processing at the correcting unit 21, and in the event that learning pairs whereby highly precise approximation is possible have been input, correction weighting obtained by the parameter control data a and b obtained by learning being performed using the learning pairs is used for correction processing at the correcting unit 21.

Accordingly, the weight w(t) in Expression (8) does, after all, change between cases wherein a sufficient number of learning pairs or learning pairs enabling highly precise approximation are not obtained, and cases wherein learning pairs enabling highly precise approximation are obtained, and consequently, the contents of correction processing represented by the Expression(8) also change, so from this perspective as well with the NR circuit shown in FIG. 4, it can be the that the "contents of processing" are changed so that output signals desired by the user are obtained.

Further, with the NR circuit in FIG. 4, the system for calculating weight used for the correction processing changes depending on the cases wherein a sufficient number of learning pairs or learning pairs enabling highly precise approximation are not obtained, and cases wherein learning pairs enabling highly precise approximation are obtained.

That is to say, in cases wherein a sufficient number of learning pairs or learning pairs enabling highly precise approximation are not obtained, the weight is obtained from the input reliability and output reliability, regardless of operations made by the user. On the other hand, in the event that learning pairs enabling highly precise approximation has been obtained, the weighting is obtained based on the parameter control data obtained by learning using the learning pairs obtained based on the operations of the user.

Accordingly, in this case, it can be said that the processing system for calculating weighting, i.e., the algorithm for how to obtain weighting, is changed such that output signals desired by the user can be obtained, following operations of the user.

Now, representing the processing for obtaining weight with a function F, the above-described change of "contents of processing" is equivalent to the function F being changed. Here, cases of the function F being changed are generally divided into cases wherein the form of the function F itself changes (e.g., cases wherein F=x changes to $F=x^2$, etc.), and cases wherein the form of the function F itself does not change but the coefficients defining the function F change (e.g., F=2x changes to F=3x, etc.).

Now, of the changes in "contents of processing", if we say that cases wherein the form of the function F representing the processing of itself changes are changes of the "structure of processing", changing the processing system for calculating weight, i.e., the algorithm for how to obtain weight, as described above, can be said to be changing the "structure of processing".

Accordingly, with the NR circuit shown in FIG. 4, the "contents of processing", and further, the "structure of processing" is also changed following operations made by the user, whereby output signals desired by the user can be obtained.

Also, as for input signals, image signals and audio signals may be used, of course, and other signals as well. However, in the case that the input signals are image signals, the input reliability is calculated based on dispersion obtained from multiple pixels near a pixel to be processed, either space-wise or time-wise.

Also, with the above-described case, the weight w obtained from input reliability and the like is corrected to the correcting weight W by the linear expression in Expression (13) defined by the parameter control data a and b in the learning unit 22, in order to facilitate description, but actually, correction of the weight w is preferably performed by a higher expression. Also, the degree in the higher expression is preferably set to a suitable value based on applications and the like to which the optimizing device 1 is applied, for example.

Further, an arrangement may be made for the expression for obtaining the correction weight W from the weight w (hereafter may be referred to as correction weight calculating expression) wherein multiple expressions are prepared besides the linear expression W=aw+b in Expression (13), such as, for example, the quadratic expression $W=aw^2+bw+c$, the cubic expression $W=aw^3+bw^2+cw+d$, and so forth (wherein a, b, c, and d, are predetermined coefficients), and wherein that of the multiple correction weight calculating expressions which shields the smallest normalization error is employed. Note that in this case, the correction weight calculating expression wherein the normalization error obtained from the learning pair obtained by operations of the user is smallest, is selected, and the correction weighting is to be obtained using the selected correcting weight calculating expression. That is to say, the algorithm for how to obtain the correction weight is changed following the operations of the user. Accordingly, in this case as well, it can be said that the "structure of processing" is being changed following operations of the user.

Figure 10:
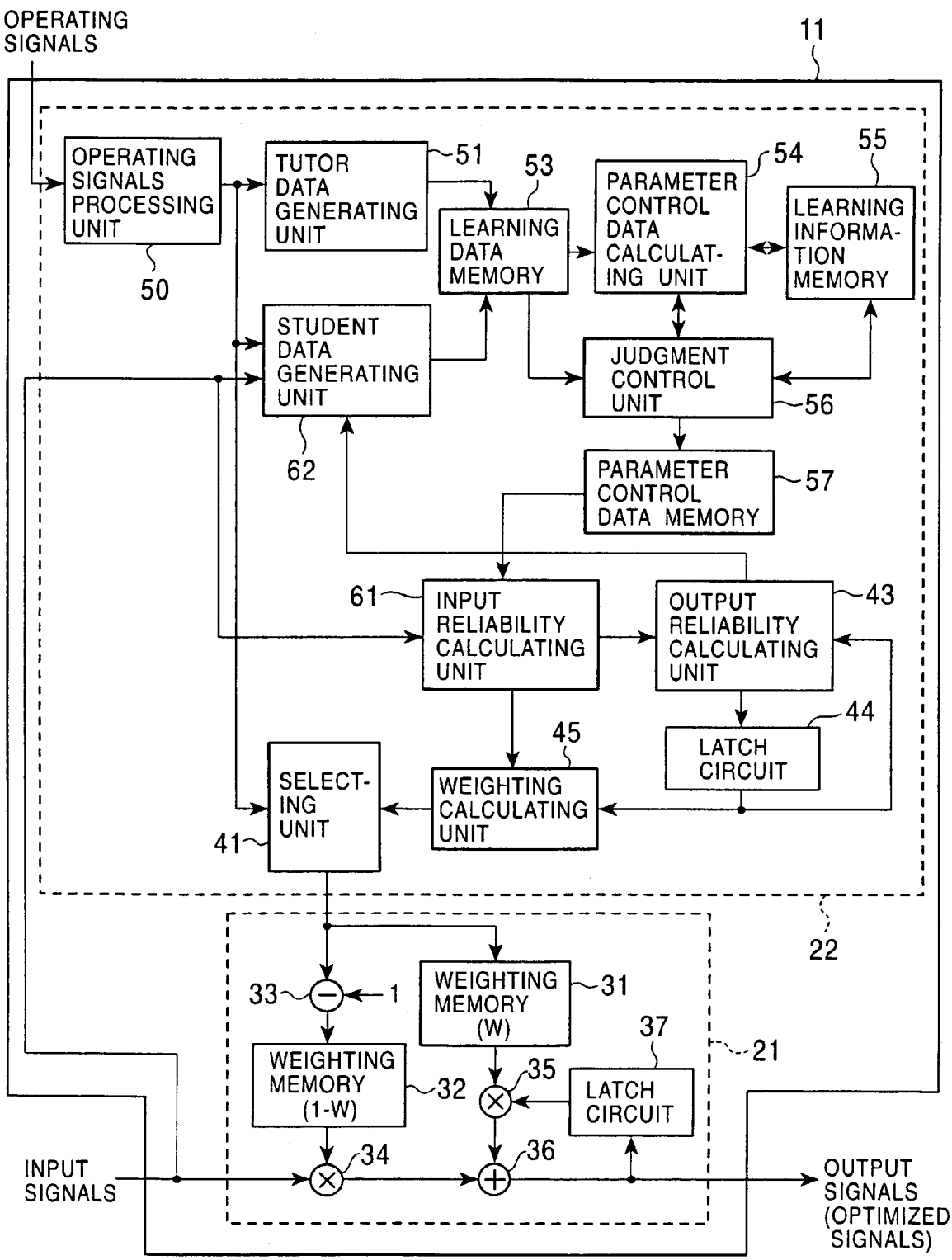
FIG. 10 is a block diagram illustrating a configuration example of another embodiment of an NR circuit using an optimizing device.

Next, FIG. 10 illustrates another detailed configuration example of a case wherein the processing unit 11 of the optimizing device 1 shown in FIG. 4 is applied to an NR circuit. In the figure, the parts corresponding to the case in FIG. 4 are denoted with the same reference numerals, and further description thereof will be omitted as suitable. That is to say, the NR circuit shown in FIG. 10 is basically the same configuration as that shown in FIG. 4, other than not being provided with the weight correcting unit 46, and an input reliability-calculating unit 61 and student data generating unit 62 being provided instead of the input reliability calculating unit 42 and student data generating unit 52, respectively.

The input reliability calculating unit 61 calculates the input reliability of the input signals from multiple samples of input signals and parameter control data stored in the parameter control data memory 57, and supplies this to the output reliability calculating unit 43 and weight calculating unit 45.

The student data generating unit 62 obtains the input signals, and the output reliability output from the output reliability calculating unit 43, as student data, and supplies this to the learning data memory 53.

Note that with the embodiment shown in FIG. 10, there is no weight correcting unit 46 provided, so the weight obtained in the weight calculating unit 45 is applied to the selecting unit 41 with no change, and this selecting unit 41 is arranged so as to select and output one or the other of the weight output by this weight calculating unit 45 and the weight output by the operating signal processing unit 50, in the same way as with that shown in FIG. 4.

Also, with the embodiment shown in FIG. 10, the parameter control data functions as data to control input reliability.

As with the NR circuit shown in FIG. 4, the NR circuit in FIG. 10 also performs correction processing, correction parameter computing processing, and control data learning processing. The correction processing is performed in the same way as the processing described with reference to FIG. 6, so description of the correction processing will be omitted for the NR circuit shown in FIG. 10, and description will be made regarding the correction parameter computing processing and control data learning processing.

That is to say, with the NR circuit in FIG. 10, correction parameter computing processing and control data learning processing is performed with the input reliability $\alpha_{x(t)}$ stipulating the weight shown in Expression (6) which is used in correction processing as being defined by the following expression, for example.

[Expression 22]

$$\alpha_{x(t)} = a_1 x_1 + a_2 x_2 + \ldots + a_N x_N \quad (22)$$

Figure 11:
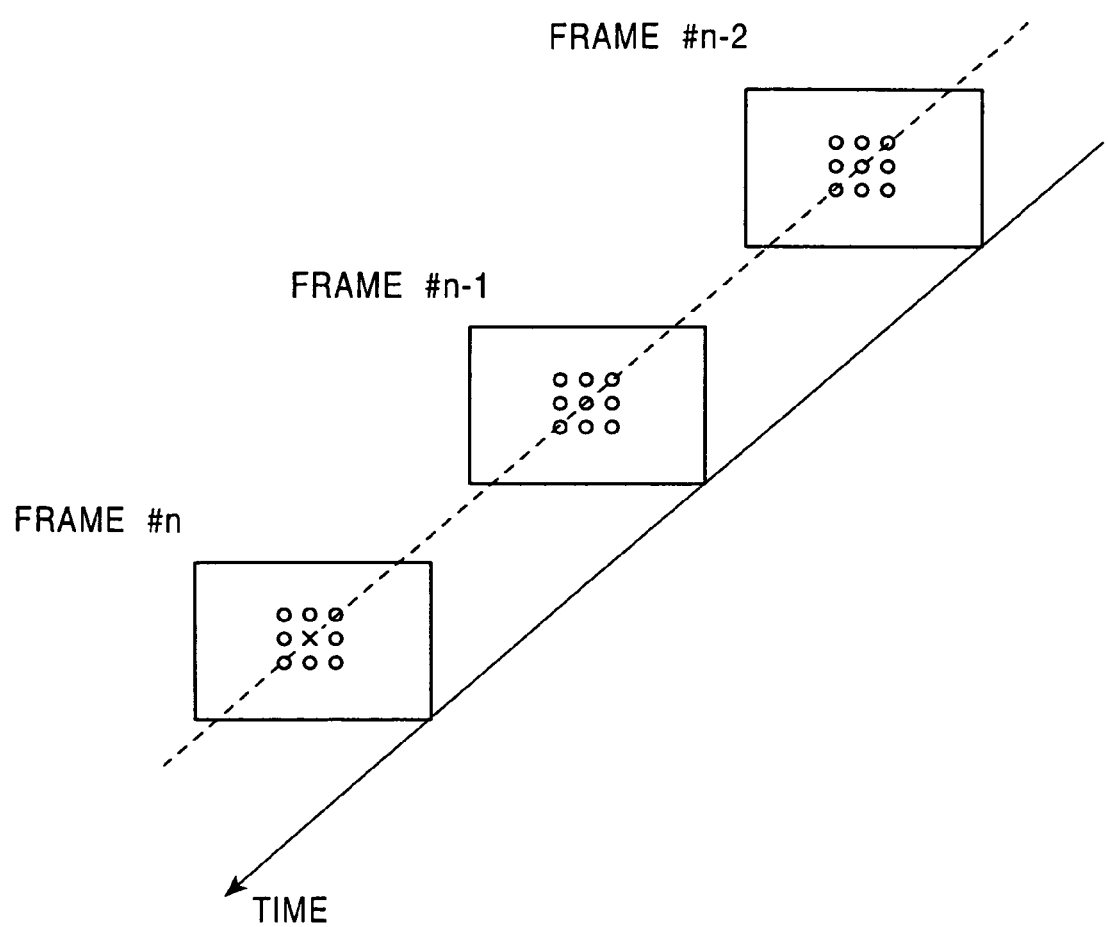
FIG. 11 is a diagram illustrating pixels multiplied with parameter control data.

Note that, however, in Expression (22), $a_1, a_2, \ldots, a_N$ represent parameter control data, and $x_1, x_2, \ldots, x_N$ represent samples of input signals in a predetermined relation with samples of input signals which are to be subjected to processing (samples of interest). Now, in the event that the input signals are image signals for example, a pixel serving as a sample of interest (indicated by an X in FIG. 11) and a pixel at a position near that pixel space-wise or time-wise (indicated by a circle in FIG. 11), can be used for $x_1, x_2, \ldots, x_N$, for example.

From Expression (22), the weight w(t) provided in Expression (6) can be represented as in Expression (23).

[Expression 23] (23)

$$w(t) = \frac{\alpha_{y(t-1)}}{\alpha_{y(t-1)} + \alpha_{x(t)}}$$

$$= \frac{\alpha_{y(t-1)}}{\alpha_{y(t-1)} + (a_1 x_1 + a_2 x_2 + \ldots + a_N x_N)}$$

Accordingly, in the event that the input signals $x_1, x_2, \ldots, x_N$, are input, parameter control data $a_1, a_2, \ldots, a_N$ which satisfies the following Expression should be obtained from Expression (23) in order to obtain the weight W provided from the user.

[Expression 24] (24)

$$W = \frac{\alpha_{y(t-1)}}{\alpha_{y(t-1)} + (a_1 x_1 + a_2 x_2 + \ldots + a_N x_N)}$$

As a variant of the Expression (24), Expression (25) can be obtained.

[Expression 25]

$$(a_1 x_1 + a_2 x_2 + \ldots + a_N x_N)W + (W-1)\alpha_{y(t-1)} = 0 \quad (25)$$

Obtaining the parameter control data $a_1, a_2, \ldots, a_N$ which satisfies Expression (25) at all times is generally difficult, so here, we will consider obtaining parameter control data $a_1, a_2, \ldots, a_N$ wherein, for example, the sum of the square error of the left-hand side and right-hand side of the Expression (25) is smallest, by the least-square method.

Here, making the sum of the square error of the left-hand side and right-hand side-of the Expression (25) to be smallest means making the square error of the weight w(t) provided by the Expression (23) and the weight W provided by the user to be smallest, i.e., with the weight W provided by the user as tutor data, and the input signals $x_1, x_2, \ldots, x_N$, and output reliability $\alpha_{y(t-1)}$ defining the weight w(t) in Expression (23) as student data, equivalent to making the square error of the weight w(t) calculated from the student data by Expression (23) and the weight W serving as tutor data provided by the user to be smallest, and the weight w(t) calculated from such parameter control data $a_1, a_2, \ldots, a_N$ and the student data by Expression (23) has little error with the tutor data W.

The square-error $e^2$ of the left-hand side and right-hand side of Expression (25) is provided by Expression (26).

[Expression 26]

$$e^2 = \{(a_1 x_1 + a_2 x_2 + \ldots + a_N x_N)W + (W-1)\alpha_{y(t-1)}\}^2 \quad (26)$$

The parameter control data $a_1, a_2, \ldots, a_N$ which makes the square-error $e^2$ smallest is provided by the conditions that partial differentiation of the square-error $e^2$ in Expression (26) by each of the parameter control data $a_1, a_2, \ldots, a_N$ yields 0, i.e., by the following Expression.

[Expression 27] (27)

$$\frac{\partial e^2}{\partial a_1} = 0, \frac{\partial e^2}{\partial a_2} = 0, \ldots, \frac{\partial e^2}{\partial a_N} = 0$$

Substituting Expression (26) into Expression (27) yields Expression (28).

[Expression 28] (28)

$$(a_1 x_1 W + a_2 x_2 W + \ldots + a_N x_N W + (W-1)\alpha_{y(t-1)})Wx_1 = 0$$

$$(a_1 x_1 W + a_2 x_2 W + \ldots + a_N x_N W + (W-1)\alpha_{y(t-1)})Wx_2 = 0$$

$$\vdots \qquad \vdots$$

$$(a_1 x_1 W + a_2 x_2 W + \ldots + a_N x_N W + (W-1)\alpha_{y(t-1)})Wx_N = 0$$

Accordingly, defining the matrixes X, A, and Y each as shown in Expression (29), the relation shown in Expression (30) holds for the matrixes X, A, and Y, from the Expression (28).

[Expression 29] (29)

$$X = \begin{bmatrix} \sum W^2 x_1^2 & \sum W^2 x_2 x_1 & \ldots & \sum W^2 x_N x_1 \\ \sum W^2 x_1 x_2 & \sum W^2 x_2^2 & \ldots & \sum W^2 x_N x_2 \\ \vdots & \vdots & \ddots & \vdots \\ \sum W^2 x_1 x_N & \sum W^2 x_2 x_N & & \sum W^2 x_N^2 \end{bmatrix},$$

$$A = \begin{bmatrix} a_1 \\ a_2 \\ \vdots \\ a_N \end{bmatrix},$$

-continued $$Y = \begin{bmatrix} \sum W(1-W)\alpha_{y(t-1)}x_1 \\ \sum W(1-W)\alpha_{y(t-1)}x_2 \\ \vdots \\ \sum W(1-W)\alpha_{y(t-1)}x_N \end{bmatrix}$$

[Expression 30]

$$XA = Y \qquad (30)$$

Note that the summation (Σ) in Expression (29) means the summation with regard to the number of sets, of input signals $x_1$ through $x_N$ and the weight W provided from the user upon the input signals $x_1$ through $x_N$ being input from the user.

Expression (30) can be solved with regard to the matrix (vector) A, i.e., the parameter control data $a_1, a_2, \ldots, a_N$, by the Cholesky method or the like, for example.

The NR circuit in FIG. 10 performs control data learning processing as described above, wherein, with the weight W provided by the user as tutor data, and with the input signals $x_1, x_2, \ldots, x_N$, and output reliability $\alpha_{y(t-1)}$ defining the weight w(t) in Expression (23) as student data, parameter control data $a_1, a_2, \ldots, a_N$, minimizing the square error of the weight w(t) calculated from the student data by Expression (23) and the weight W serving as tutor data provided by the user is learned by the least-square. Further, the NR circuit in FIG. 10 obtains the input reliability $\alpha_{x(t)}$ from the Expression (22) defined by the parameter control data $a_1$ through $a_N$, and further performs correction parameter computing processing for obtaining the weight serving as correction parameters, following Expression (23), from the input reliability $\alpha_{x(t)}$ and output reliability $\alpha_{y(t-1)}$.

Now, the correction parameter computing processing with the NR circuit shown in FIG. 10 will be described with reference to the flowchart in FIG. 12.

In the correction parameter computing processing, first, in step S61, the input reliability calculating unit 61 reads out the parameter control data from the parameter control data memory 57, and the flow proceeds to step S62. In step S62, the input reliability calculating unit 61 judges whether or not the parameter control data read out from the parameter control data memory 57 is auto mode data which represents a mode wherein input reliability is obtained without using parameter control data, i.e., a mode wherein input reliability is obtained automatically, so to speak, from input signals alone (this mode also may hereafter be referred to as auto mode), regardless of operations of operating unit 2 by the user.

In step S62, in the event that judgment is made that the parameter control data is not auto mode data, the flow proceeds to step S63, the input reliability calculating unit 61 obtains using the newest N pieces of input signal samples $x_1$ through $x_N$ supplied thereto, following the linear expression in the Expression (22) defined by the parameter control data $a_1$ through $a_N$ read out from the parameter control data memory 57, supplies this to the output reliability calculating unit 43 and weight calculating unit 45, and proceeds to step S65.

Also, in the event that the parameter control data is judged to be auto mode data in step S62, the flow proceeds to step S64, and the input reliability calculating unit 61 obtains the input reliability $\alpha_{x(t)}$ using the input signals alone, based on dispersion thereof, in the same manner as with step S31 in FIG. 7, for example, and supplies this to the output reliability calculating unit 43 and weight calculating unit 45.

In step S65, the weight calculating unit 45 obtains the weight w(t) following Expression (23), using the input reliability $\alpha_{x(t)}$ from the input reliability calculating unit 61, and the output reliability $\alpha_{y(t-1)}$ output one sample back by the output reliability calculating unit 43, which is latched at the latch circuit 44. This weight w(t) is supplied from the weight calculating unit 45 to the selecting unit 41.

Subsequently, the flow proceeds to step S66, and in the same manner as with step S37 in FIG. 7, the output reliability calculating unit 43 adds the input reliability $\alpha_{x(t)}$ supplied from the input reliability calculating unit 61 and the output reliability $\alpha_{y(t-1)}$ from one sample back, which is latched at the latch circuit 44 according to Expression (5), thereby updating the output reliability $\alpha_{y(t)}$, and storing in the form of overwriting the latch circuit 44.

The flow then proceeds to step S67, where the selecting unit 41 judges whether or not the operating unit 2 is being operated by the user, from the output of operating signal processing unit 50. In the event that judgment is made in step S67 that operating unit 2 is not being operated, the flow proceeds to step S68, the selecting unit 41 selects the weight supplied from the weight calculating unit 45, outputs this to the correcting unit 21, and the flow returns to step S61.

Also, in the event that judgment is made-in step S67 that the operating unit 2 is being operated, the flow proceeds to step S69, where the selecting unit 41 selects the weight output by the output signal processing unit 50 according to operations thereof, outputs this to the correcting unit 21, and the flow returns to step S61.

Figure 12:
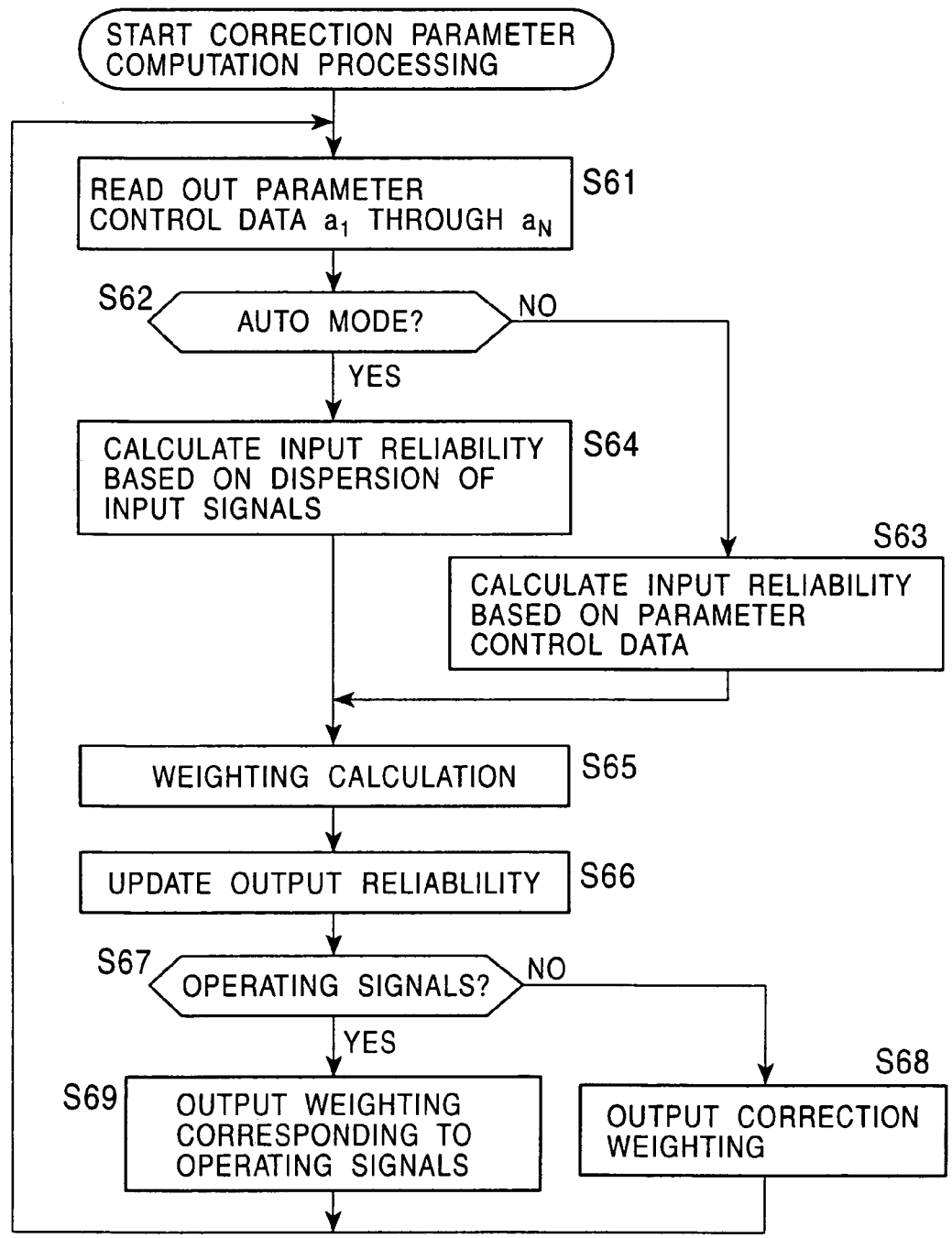
FIG. 12 is a flowchart describing correction parameter computing processing with an NR circuit.

Accordingly, in the correction parameter computing processing in FIG. 12, in the event that the operating unit 2 is not being operated, weight calculated based on input reliability is supplied to the correcting unit 21, and in the event of operating unit 2 is being operated, weight corresponding to the operating signals thereof are supplied to the correcting unit 21. Consequently, at the correcting unit 21, in the event that the operating unit 2 is not being operated, input signals are corrected by weighting based on input reliability, and in the event that operating unit 2 is being operated, input signals are corrected by weighting corresponding to the operating signals thereof.

Figure 13:
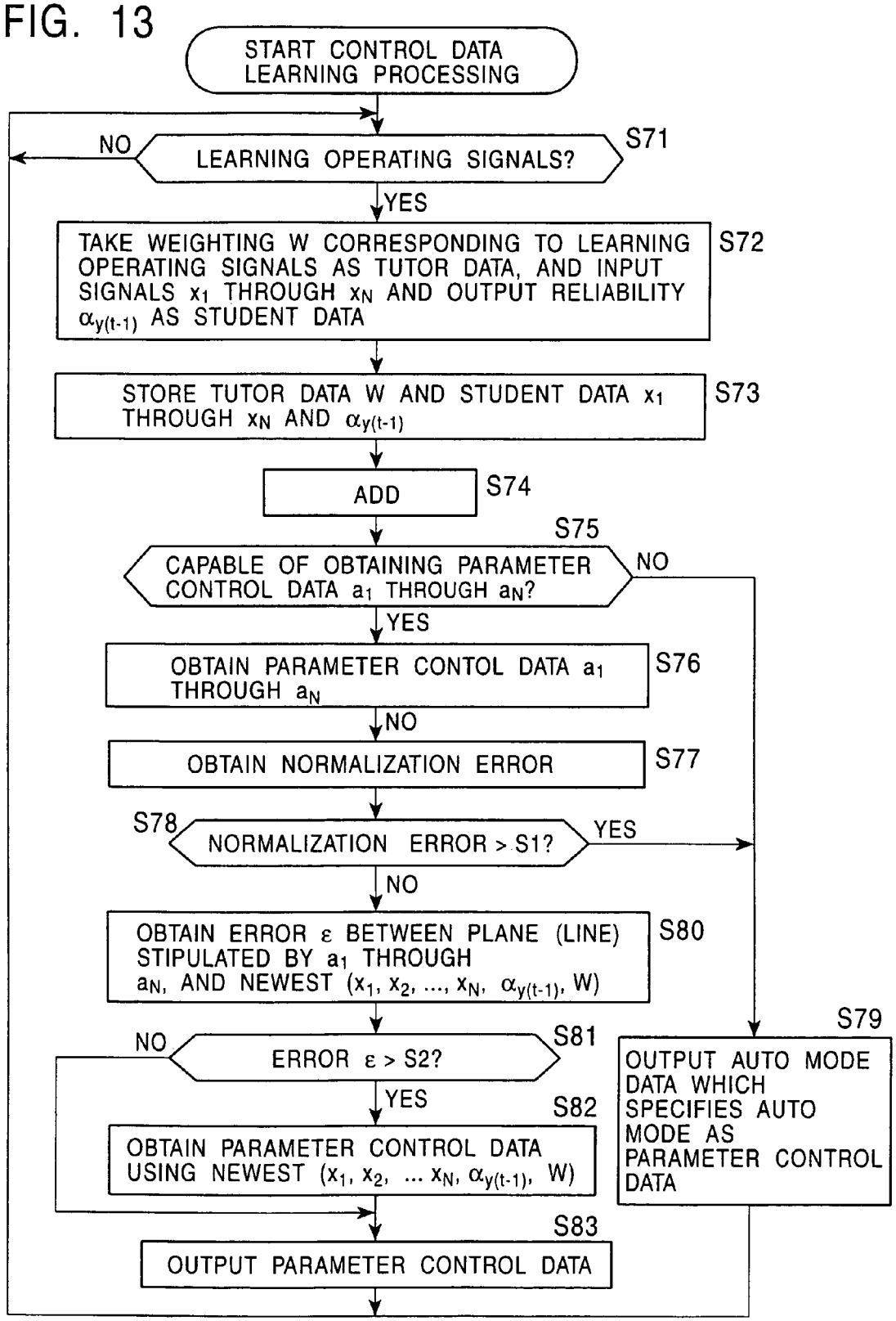
FIG. 13 is a flowchart describing control data learning processing with an NR circuit.

Further, with the correction parameter computing processing in FIG. 12, in the case of the auto mode, the weight to be used for correction processing is obtained from the input reliability based on dispersion of input signals regardless of operations of the operating unit 2, and in the event of not being in the auto mode, the weight used for correction processing is obtained from input reliability obtained using the parameter control data obtained by learning with the control data learning processing shown in FIG. 13 which shall be described later, based on the operations of operating unit 2.

Next, the control data learning processing which the NR circuit shown in FIG. 10 performs will be described with reference to the flowchart in FIG. 13.

With the control data learning processing, first, in step S71, in the same manner as with step S41 in FIG. 8, the operating signal processing unit 50 judges whether or not learning operating signals have been received from the operating unit 2, and in the event that judgment is made that these have not been received, the flow returns to step S71.

Also, in the event that judgment is made in step S71 that learning operating signals have been received from the operating unit 2, i.e., in the event that judgment can be made that the user has operated the operating unit 2 so as to obtain a desired output signal, such as in cases wherein, for example, the operating unit 2 starts to be operated, following which, without elapsing of a first time t1 or longer, operating is performed continuously for a second time t2 or longer, following which the operations thereof are stopped continuously for a third time t3 or longer, or cases wherein following starting the operations of the operating unit 2, operations thereof are stopped continuously for a third time t3 or longer, the flow proceeds to step S72, where the tutor data generating unit 51 generates tutor data, while the student data generating unit 62 generates student data.

That is, in the event of receiving learning operating signals, the operating signal processing unit 50 supplies weight W corresponding to the learning operating signals to the tutor data generating unit 51 and student data generating unit 62, along with a learning flag. Upon receiving a weight W with a learning flag, the data generating unit 51 obtains the weight W as tutor data, and supplies this to the learning data memory 53.

On the other hand, the student data generating unit 62 has a built-in buffer (not shown) for buffering input signals, and constantly stores input signals in the buffer to the storage capacity thereof, and in the event of receiving a weight with the learning flag, samples $x_1$ through $x_N$ of input signals in a predetermined positional relation with samples of the input signals input at that time are read out from the built-in buffer. Further, the student data generating unit 62 reads out the output reliability $\alpha_{y(t-1)}$ from the output reliability calculating unit 43. The student data generating unit 62 then supplies the samples $x_1$ through $x_N$ of input signals and output reliability $\alpha_{y(t-1)}$ to the learning data memory 53 as student data.

Upon receiving the tutor data W from the tutor data generating unit 51 and the student data $x_1$ through $x_N$ and $\alpha_{y(t-1)}$ from the student data generating unit 62, in step S73 the learning data memory 53 stores the set (learning pair) of the newest tutor data W, and student data $x_1$ through $x_N$ and $\alpha_{y(t-1)}$ and the flow proceeds to step S74.

At step S74, the parameter control data calculating unit 54 performs adding-in for least-square, for the tutor data and student data.

That is, the parameter control data calculating unit 54 performs computation of the product between one student data with another which are components of the matrix X and Y in Expression (29), the product of the student data and tutor data, and the summation thereof.

Now, the adding in step S74 is performed in the same manner as that in step S44 in FIG. 8. That is to say, the results of the previous adding-in are stored in the learning information memory 55 as learning information, and the parameter control data calculating unit 54 uses this learning information to perform adding in with regard to the newest tutor data and student data.

Following the adding in step S74, the parameter control data calculating unit 54 stores the results of the adding-in within the learning information memory 55, as learning information, in the form of overwriting, the flow proceeds to step S75, and the parameter control data computing unit 54 judges whether or not Expression (30) can be solved with regard to matrix A from the adding results as learning information stored in the learning information memory 55, i.e., whether or not the parameter control data $a_1$ through $a_N$ can be obtained.

That is to say, Expression (30) cannot be solved with regard to matrix A unless learning information obtained from a predetermined number of learning pairs or more exists, and the parameter control data $a_1$ through $a_N$ serving as the components thereof cannot be obtained. Accordingly, in step S75, whether or not the parameter control data $a_1$ through $a_N$ can be obtained from the learning information is judged.

In step S75, in the event that judgment is made that the parameter control data $a_1$ through $a_N$ cannot be obtained, the parameter control data calculating unit 54 supplies information to that effect to the judgment control unit 56, and the flow proceeds to step S79. In step S79, the judgment control unit 56 supplies auto mode data representing the auto mode to the parameter control data memory 57 as parameter control data, where it is stored. The flow then returns to step S71, and subsequently, the same processing is repeated.

Accordingly, in the event that sufficient learning information for obtaining the parameter control data $a_1$ through $a_N$ does not exist, the weight obtained from the input reliability based on dispersion of input signals is used for correction of the input signals x(t), as described with reference to FIG. 12.

On the other hand, in the event that judgment is made in step S75 that the parameter control data can be obtained, the flow proceeds to step S76, where the parameter control data calculating unit 54 obtains the parameter control data $a_1$ through $a_N$ by solving Expression (30) with regard to matrix A using learning information, supplies this to the judgment control unit 56, and the flow proceeds to step S77.

At step S77, the judgment control-unit 56 follows the Expression (23) defined by the parameter control data $a_1$ through $a_N$ from the parameter control data calculating unit 54 to obtain a prediction value of corresponding tutor data from the student data stored in the learning data memory 53, and obtains the sum of the square-error represented by Expression (26), of the prediction error (the error as to the tutor data stored in the learning data memory 53) of that prediction value. Further, the judgment control unit 56 obtains a normalization error wherein the square-error sum is divided by the number of learning pairs stored in the learning data memory 53, for example, and the flow proceeds to step S78.

In step S78, the judgment control unit 56 judges whether or not the normalization error is greater than (equal to or more than) a predetermined threshold value S1. In the event that judgment is made in step S78 that the normalization error is greater than the predetermined threshold value S1, i.e., in the event that the linear expression in the Expression (23) defined by the parameter control data $a_1$ through $a_N$ does not precisely approximate the relation between the student data and the tutor data stored in the learning data memory 53, the flow proceeds to step S79, and the judgment control unit 56 supplies auto mode data representing the auto mode to the parameter control data memory 57 as parameter control data, where it is stored in the form of overwriting. The flow then returns to step S71, and subsequently, the same processing is repeated.

Accordingly, even in the event that the parameter control data $a_1$ through $a_N$ can be obtained, in the event that the Expression (23) defined by the parameter control data $a_1$ through $a_N$ does not precisely approximate the relation between the student data and the tutor data stored in the learning data memory 53, the weight obtained by input reliability based on dispersion of input signals is used for correcting the input signals x(t), in the same way as cases wherein sufficient learning information for obtaining the parameter control data $a_1$ through $a_N$ does not exist.

On the other hand, in the event that judgment is made in step S78 that the normalization error is not greater than the predetermined threshold value S1, i.e., in the event that the linear expression in the Expression (23) defined by the parameter control data $a_1$ through $a_N$ does precisely approximate the relation between the student data and the tutor data stored in the learning data memory 53, the flow proceeds to step S80, and the judgment control unit 56 obtains the error (distance) ε between the plane (line) of the Expression (23) defined by the parameter control data $a_1$ through $a_N$ obtained at the parameter, control data calculating unit 54 and the point stipulated by the newest tutor data and student data stored in the learning data memory 53.

The flow then proceeds to step S81, where the judgment control unit 56 judges whether or not the magnitude of the error $\epsilon$ is greater than (equal to or more than) a predetermined threshold value S2, and in the event that judgment is made that this is not greater, step S82 is skipped, the flow proceeds to step S83, and the judgment control unit 56 outputs the parameter control data $a_1$ through $a_N$ obtained in step S76 to the parameter control unit data memory 37. The parameter control data memory 57 stores the parameter control data $a_1$ through $a_N$ from the judgment control unit 56 in the form of overwriting, the flow returns to step S71, and subsequently, the same processing is repeated.

On the other hand, in the event that judgment is made in step S81 that the magnitude of the error $\epsilon$ is greater than the predetermined threshold value S2, the flow proceeds to step S82, where the judgment control unit 56 controls the parameter control data calculating unit 54 to re-calculate the parameter control data $a_1$ through $a_N$ using only the newest tutor data and student data stored in the learning data memory 53. The flow then proceeds to step S83, where the judgment control unit 56 outputs the parameter control data $a_1$ through $a_N$ obtained in step S82 to the parameter control data memory 57, where it is stored in the form of overwriting, and the flow returns to step S71.

That is, in the embodiment shown in FIG. 13 as well, the error $\epsilon$ between the plane defined by Expression (23) from the parameter control data $a_1$ through $a_N$ obtained from the tutor data and student data provided so far and the point stipulated by the newest tutor data and student data is obtained in step S82, in the same manner as with the embodiment in FIG. 8.

In the event that the magnitude of the error $\epsilon$ is not greater than the predetermined threshold value S2, the plane defined by Expression (23) from the parameter control data $a_1$ through $a_N$ obtained in step S76 is considered to relatively precisely approximate all of the points stipulated by tutor data and student data provided so far, including the point stipulated by the newest tutor data and student data, so this parameter control data $a_1$ through $a_N$ is stored in the parameter control data memory 57.

On the other hand, in the event that the magnitude of the error $\epsilon$ is greater than the predetermined threshold value S2, the plane of Expression (23) defined by the parameter control data a1 through $a_N$ obtained in step S76 is considered to relatively greatly deviate from the points stipulated by the newest tutor data and student data, so the judgment control unit 56 controls the parameter control data calculating unit 54 so as to re-calculate the parameter control data $a_1$ through $a_N$ in step S82 using only the newest tutor data and student data stored in the learning data memory 53.

With the NR circuit shown in FIG. 10, the input reliability $\alpha_{x(t)}$ is calculated following Expression (22) at the input reliability calculating unit 61, from the parameter control data $a_1$ through $a_N$ obtained as described above.

Accordingly, in this case as well, learning is performed of the parameter control data $a_1$ through $a_N$ stipulating the input reliability $\alpha_{x(t)}$ in Expression (22), based on learning operating signals supplied according to operations of the user, so the operations made by the user can be learned without the user knowing, and further, optimal processing for the user can be performed using the results of learning.

Also, with the NR circuit in FIG. 10, as with the NR circuit in FIG. 4, upon the user operating the operating unit 2, the operating signal processing unit 50 outputs weight representing operating signals corresponding to the operating thereof, and the selecting unit 41 selects the weight and supplies this to the correcting unit 21. In this case, the correction processing represented with the Expression (8) is performed at the correcting unit 21, using the weight corresponding to the user operations. In the event that the weight w(t) in Expression (8) is to be changed by user operations, the contents of the processing (correction processing) represented with Expression (8) is also changed as a matter of course, with the NR circuit in FIG. 10 as well, the "the contents of processing" are changed following operations made by the user so that output signals desired by the user are obtained.

Further, with the NR circuit in FIG. 10, in cases wherein the parameter control data $a_1$ through $a_N$ cannot be obtained, or in cases wherein this can be obtained but the Expression (23) defined by the parameter control data $a_1$ through $a_N$ does not precisely approximate the relation between the student data and tutor data stored in the learning data memory 53, weight obtained from input reliability based on dispersion of input signals is used for correction processing at the correcting unit 21. On the other hand, in the event that the parameter control data $a_1$ through $a_N$ is obtained, and the Expression (23) defined by the parameter control data $a_1$ through $a_N$ precisely approximates the relation between the student data and tutor data stored in the learning data memory 53, the weight obtained from the input signals and the parameter control data $a_1$ through $a_N$ (rather, the input reliability calculated to have therefrom) and output reliability is used for correction processing at the correcting unit 21 following the Expression (23) defined by the parameter control data $a_1$ through $a_N$ obtained by learning being performed using learning pairs obtained based on operations of operating unit 2 by the user.

That is, with the NR circuit in FIG. 10, as with the NR circuit in FIG. 4, algorithms for calculating weight to be used for correction processing change between cases wherein sufficient numbers of learning pairs or learning pairs enabling the highly precise approximation are not obtained, and cases wherein learning pairs enabling the highly precise approximation are obtained.

Accordingly, with the NR circuit in FIG. 10 as well, the "contents of processing", and further, the "structure of processing", is also changed following user operations, whereby output signals desired by the user are output.

Now, in the above case, the parameter control data, through $a_N$ is obtained using the output reliability $\alpha_{y(t-1)}$ as student data, with this output reliability $\alpha_{y(t-1)}$ being obtained from the input reliability $\alpha_{x(t-1)}$, as shown in Expression (5). The input reliability $\alpha_{x(t)}$ is gradually improved toward obtaining of the weight desired by the user, by the control data learning processing shown in FIG. 13 being performed, so the output reliability $\alpha_{y(t-1)}$ is also improved along with this.

Also, with the above-described case, the output reliability is set at a known value, and the input reliability is stipulated by the parameter control data $a_1$ through $a_N$, thereby obtaining parameter control data $a_1$ through $a_N$ which can yield the weight desired by the user, but conversely, an arrangement may be made wherein the input reliability is set at a known value, and the output reliability is stipulated by the parameter control data $a_1$ through $a_N$, hereby obtaining parameter control data $a_1$ through $a_N$ which can yield the weight desired by the user.

Further, an arrangement may be made wherein, for example, the output reliability is set at a known value, the input reliability is stipulated by the parameter control data $a_1$ through $a_N$, whereby parameter control data $a_1$ through $a_N$ yielding weight desired by the user can be obtained, the input reliability obtained by the parameter control data $a_1$ through $a_N$ is further made to be a known value, and the output reliability is stipulated by parameter control data $a_1'$ through $a_N'$, whereby parameter control data $a_1$ through $a_N$ yielding weight desired by the user can be obtained, i.e., two sets of parameter control data $a_1$ through $a_N$ and $a_1'$ through $a_N'$ can be obtained.

Also, in the above-described case, description has been made with the input reliability $\alpha_{x(t)}$ and the output reliability $\alpha_{y(t-1)}$ being defined to obtain the parameter control data $a_1$ through $a_N$, as shown in Expression (6), but besides this, an arrangement can be made such as, for example, shown in Expression (31) wherein the weight is defined using, besides the input reliability $\alpha_{x(t)}$ and the output reliability $\alpha_{y(t-1)}$, a correction term $\Delta\alpha$ of the input reliability $\alpha_{x(t)}$ and the output reliability $\alpha_{y(t-1)}$, so as to enable obtaining the parameter control data $a_1$ through $a_N$ and the correction term $\Delta\alpha$.

[Expression 31] (31)
$$w(t) = \frac{\alpha_{y(t-1)} + \Delta\alpha}{\alpha_{y(t-1)} + \Delta\alpha + \alpha_{x(t)}}$$

Further, the expression for defining the input reliability by the parameter control data is not restricted to the Expression (22).

Figure 14:
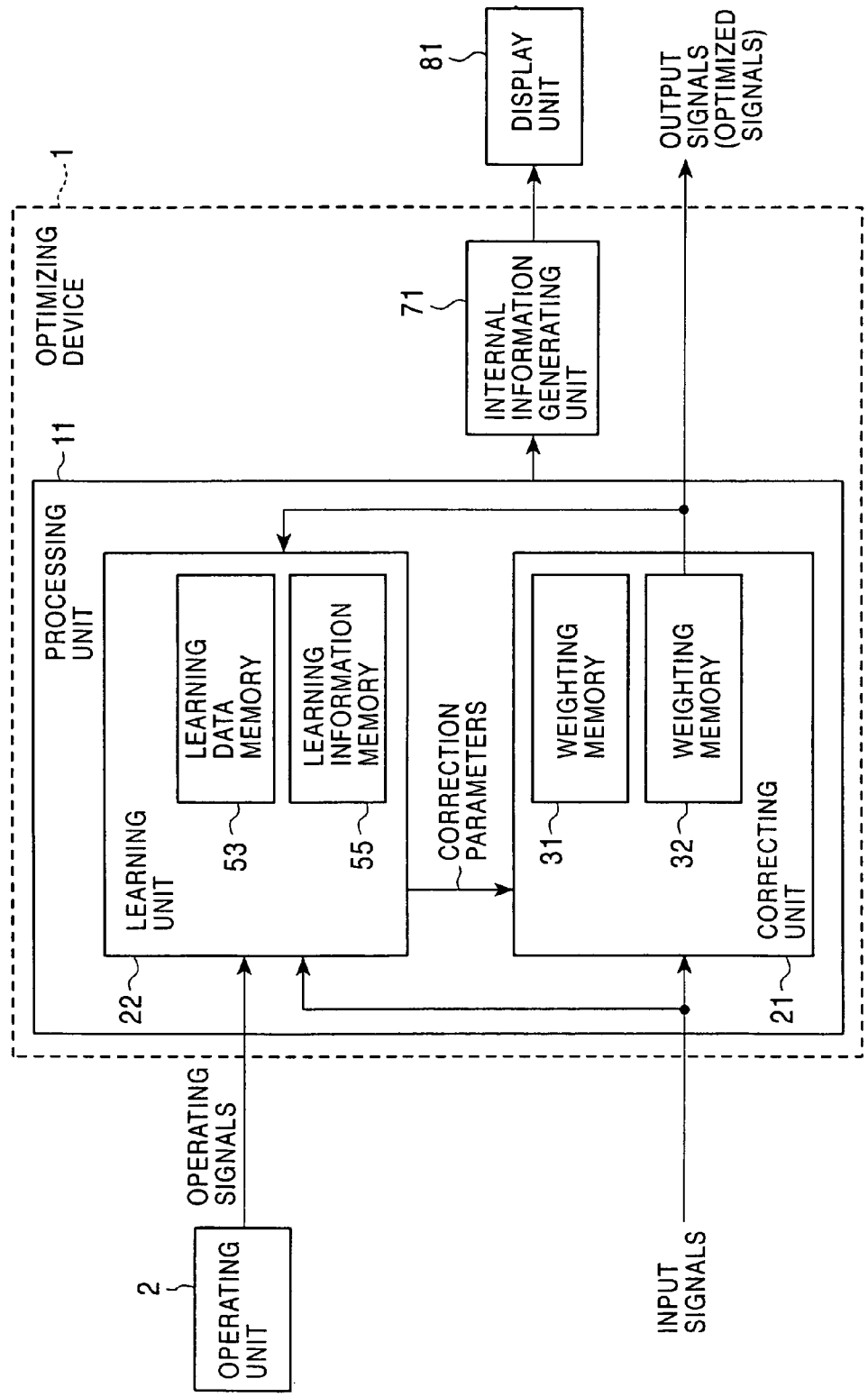
FIG. 14 is a block diagram illustrating a configuration example of another embodiment of an NR circuit using an optimizing device.

Further, FIG. 14 illustrates a second detailed configuration example of the optimizing device shown in FIG. 1. The optimizing device 1 shown in FIG. 14 is configured with an internal information generating unit 71 newly provided therein, while the configuration of the processing unit 11 is the same as that in FIG. 2 and accordingly description thereof will be omitted. Also, a display unit 8 is provided externally to the optimizing device 1 with the embodiment shown in FIG. 14.

The internal information generating unit 71 reads out internal information of the processing unit 11, and converts this into image information, which is then output and displayed (presented) to the display unit 81 made up of an LCD (Liquid Crystal Display) or CRT (Cathode Ray Tube). More specifically, the display unit 81 may be arranged to display the internal information as it is, numerically, or may make a display wherein a level gauge like display screen is set, and the level gauge fluctuates according to values of the internal information. Also, the display unit 81 is not restricted to this, and may be any other display method so long as internal information is displayed (presented) visually. Now, for internal information, the weight stored in the weight memory 31 and 32 of the correcting unit 21, the stored contents of the learning data memory 53 or learning information memory 55 of the learning unit 22, and so forth, can be employed. Also, the internal information may be presented to the user with presenting (providing) methods other than displaying, i.e., by sound or the like.

Figure 15:
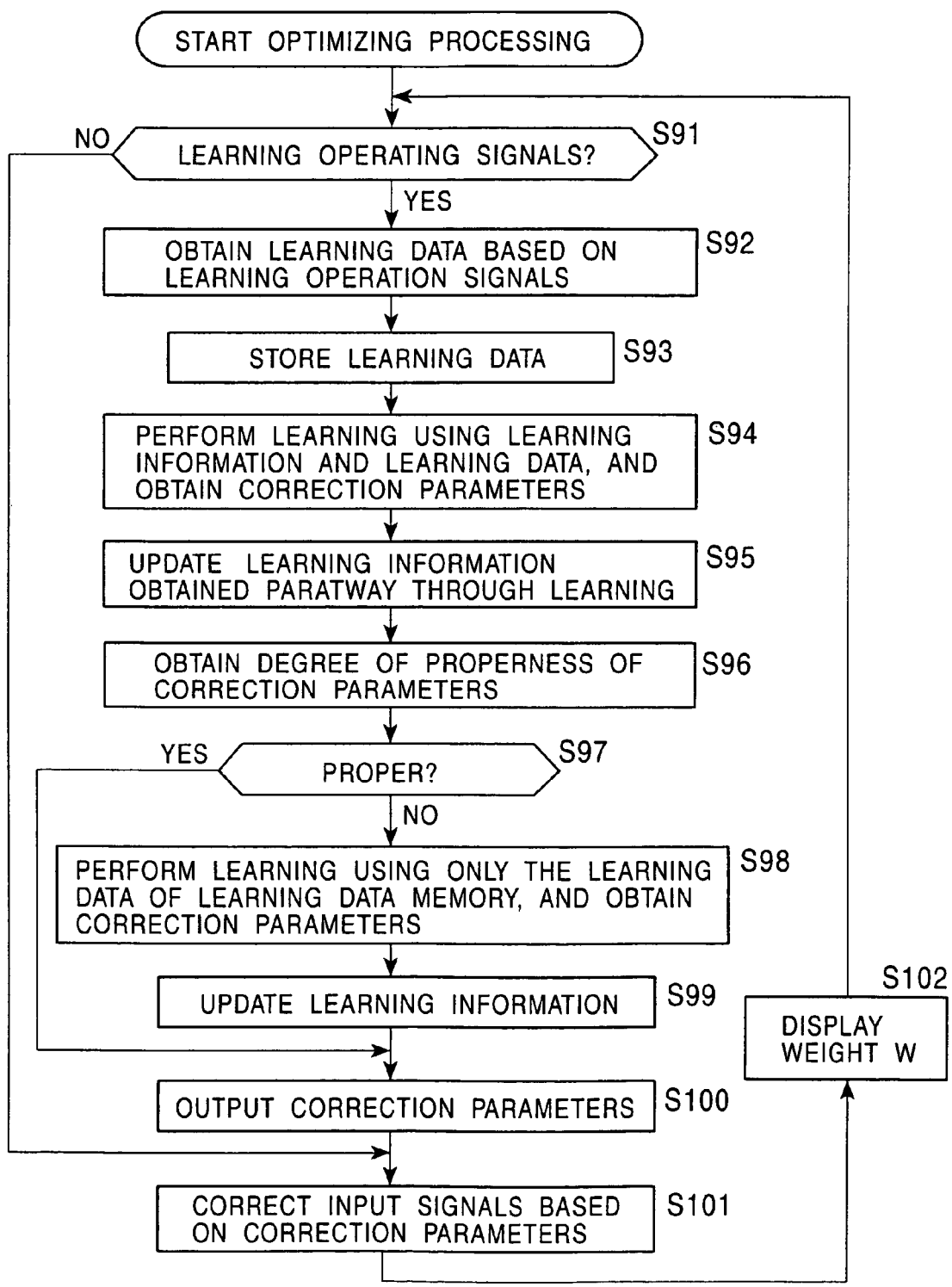
FIG. 15 is a flowchart describing optimizing processing with the optimizing device shown in FIG. 14.

Next, the optimizing processing of the NR circuit shown in FIG. 14 will be described with reference to the flowchart shown in FIG. 15. This processing is basically the same as the optimizing processing described with reference to the flowchart in FIG. 3, and differs in the point that processing for displaying internal information from the internal information generating unit 71 has been added. That is to say, the same processing as that in steps S1 through S11 is performed in steps S91 through S101, and the flow proceeds to step S102.

In step S102, the weight W is displayed on the display unit 81. That is, the internal information generating unit 71 reads out the value of the weight W stored in the weight memory 31, for example, converts this into image signals which can be displayed on the display unit 81 and outputs to the display unit 81, thereby displaying (presenting) the weight W, and the flow returns to step S91.

Due to the processing described with reference to the flowchart shown in FIG. 15, the weight W serving as internal information relating to the processing which is actually being executed in the processing unit 11 is displayed (presented) to the user, and consequently, the user can operate the operating unit 2 so as to obtain optimal output signals while viewing the display of the internal information. Note that, with the internal information generating unit 71, in addition to the above-described internal information such as weight, the parameter control data a and b may be read out from the parameter control data memory 37 (FIG. 4, FIG. 10) in the learning unit 22 and is displayed, for example. Also, an arrangement may be made to generate image information, as internal information, representing the weight selected by the selecting unit 41 (FIG. 4, FIG. 10) is a weight obtained from the parameter control data a and b obtained by learning being performed using learning pairs, or weight obtained from the input reliability and output reliability.

Figure 16:
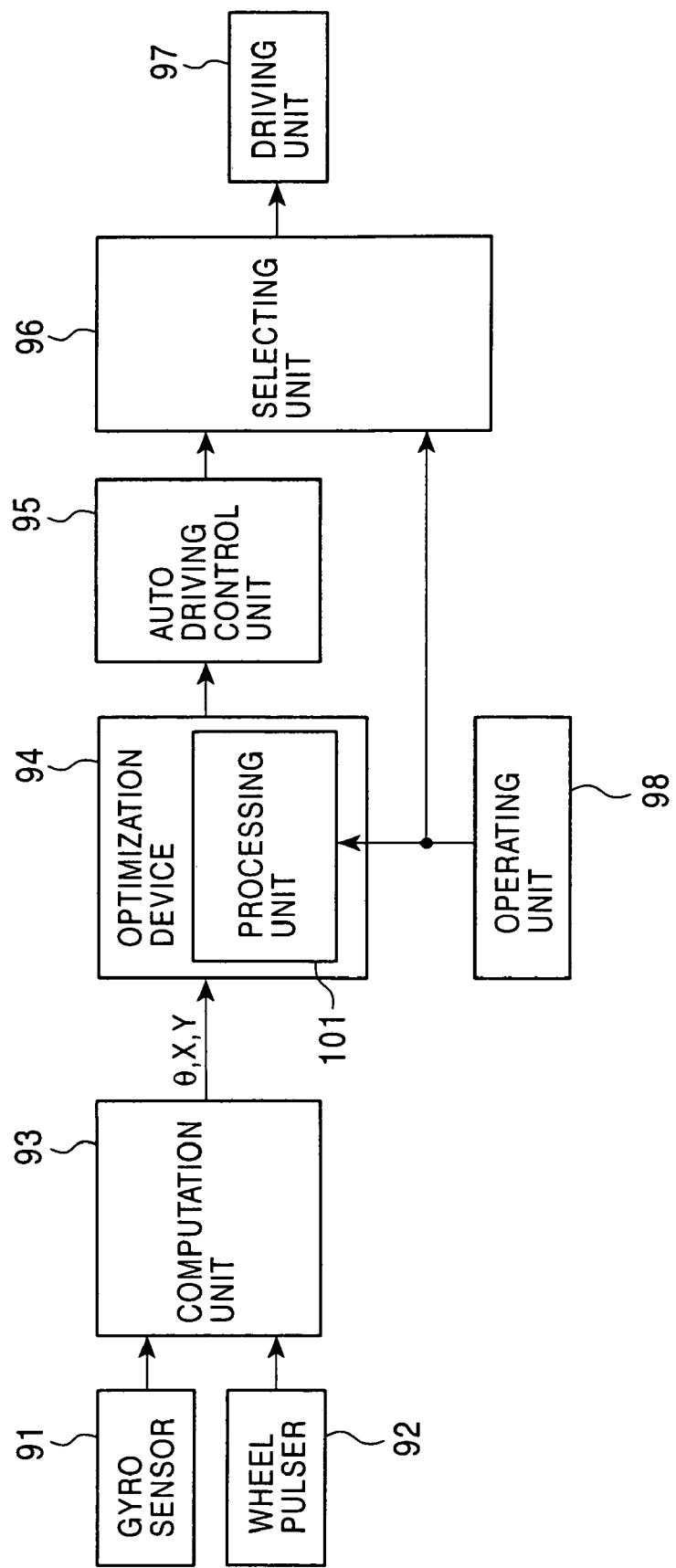
FIG. 16 is a block diagram illustrating a configuration example of an embodiment of an auto-driving device to which the present invention has been applied.

Next, FIG. 16 illustrates the configuration example of an embodiment of an auto-driving device for an automobile, to which the optimizing device 1 shown in FIG. 1 has been applied.

With the auto-driving device, the location coordinates (X, Y) of the automobile and the direction of driving $\theta$ are obtained, and the automobile is driven following a predetermined course. However, errors are often contained in the location coordinates (X, Y) and the direction of driving $\theta$ obtained with the auto-driving device, and in this case, the automobile may run off of the predetermined course. Accordingly, with the auto-driving device shown in FIG. 16, the operations of the user are learned without the user knowing, and the automobile is caused to drive along the predetermined course, based on the results of learning. That is, in the event that the automobile runs off the predetermined course, generally, the user will operate the steering wheel or gas pedal to cause the automobile to run along the predetermined course. Accordingly, the auto-driving device shown in FIG. 16 effects control such that the operations of the user are learned without the user knowing, and the automobile is caused to gradually come to drive along the predetermined course, based on the results of learning.

A gyro sensor 91 detects a yaw rate r of the automobile, and supplies this to a computing unit 93. A wheel pulser 92 supplies electric pulses of a number corresponding to the rotational angle of the wheels of the automobile, to the computing unit 93.

The computing unit 93 computes the location coordinates (X, Y) of the automobile and the direction of driving $\theta$ from the output of the gyro sensor 91 and wheel pulser 92, following the following expression, for example, and supplies this to the optimizing device 94.

[Expression 32] (32)
$$\theta = \theta(0) + \int r\,dt$$
$$X = X(0) + \int V_r \cos(\theta + \beta)\,dt$$
$$Y = Y(0) + \int V_r \sin(\theta + \beta)\,dt$$

Note that in Expression (32), θ(0) represents the direction of the automobile at the time of starting driving, and (X(0), Y(0)) represent the coordinates of the automobile at the time of starting driving. Also, θ(0) and (X(0), Y(0)) may be obtained using an unshown GPS (Global Positioning System) or the like. Further, $V_r$ represents the driving speed of the automobile, and represents the slip angle of the center of gravity of the automobile.

Now, how to obtain the coordinates (X, Y) of the automobile and driving direction θ as described above is disclosed in, for example, Japanese Unexamined Patent Application Publication No. 10-69219.

The optimizing device 94 is configured of a processing unit 101, learns the operations which the user makes with an operating unit 98, i.e., perform's learning based on operating signals supplied by the user operating the operating unit 98, corrects the coordinates (X, Y) and driving direction θ from the computing unit 93 so that driving which the user desires is performed, based on the results of learning, and supplies this to the auto-driving control unit 95.

The auto-driving control unit 95 stores map data and a course which has been set beforehand for auto-driving (hereafter may be referred to as a set course). The auto-driving control unit 95 recognizes the current position and driving direction of the automobile from the coordinates (X, Y) and driving direction θ supplied from the processing unit 101 of the optimizing device 94, and generates control signals for controlling a later-described driving unit 97, so that the automobile follows the set course for driving, and outputs this to the selecting unit 96.

The selecting unit 96 is supplied with control signals from the auto-driving control unit 95, and is also supplied with operating signals from the operating unit 98. Of the control signals from the auto-driving control unit 95 and the operating signals from the operating unit 98. The selecting unit 96 selects the operating signals with higher priority, and outputs these to the driving unit 97, that is, the selecting unit 96 normally selects the control signals from the auto-driving control unit 95 and outputs these to the driving unit 97, but upon receiving operating signals from the operating unit 98, stops output of the control signals from the auto-driving control unit 95 while operating signals are being received, and outputs the operating signals from the operating unit 98 to the driving unit 97.

The driving unit 97 follows control signals or operating signals from the selecting unit 96, and drives the mechanisms of the automobile which are necessary for driving, such as an unshown engine, wheels, brakes, clutch, etc. The operating unit 98 is configured of, for example, the steering wheel, gas pedal, brake pedal, clutch pedal, etc., and supplies operating signals corresponding to operations made by the user, to the optimizing device 94 and selecting unit 96.

With the auto-driving device configured as described above, at the computing unit 93, the current coordinates (X, Y) and driving direction θ of the automobile are computed from the output of the gyro sensor 91 and wheel pulser 92, and supplied to the auto-driving control unit 95 via the processing unit 101 of the optimizing device 94. The auto-driving control unit 95 recognizes the current position and driving direction of the automobile from the coordinates (X, Y) and driving direction θ supplied thereto, generates control signals for controlling the later-described driving unit 97 so that the automobile drives following the set course, and supplies these to the driving unit 97 via the selecting unit 96. Thus, the automobile performs auto-driving following the control signals which the auto-driving control unit 95 outputs.

On the other hand, upon the user operating the operating unit 98, operating signals corresponding to the operation thereof are supplied to the driving unit 97 via the selecting unit 96, whereby the automobile drives following the operations which the user makes at the operating unit 98.

Further, due to the user operating the operating unit 98, operating signals which operating unit 98 outputs are supplied to the processing unit 101 of the optimizing device 94 as well. The optimizing device 94 performs learning based on operating signals supplied by the user operating the operating unit 98. Upon the user stopping the operations of the operating unit 98, the processing unit 101 of optimizing device 94 then makes corrections to the coordinates (X, Y) and driving direction θ supplied from the computing unit 93 so that driving is performed following the set course as the driving which the user desires, based on the results of learning, and supplies this to the auto-driving control unit 95.

Figure 17:
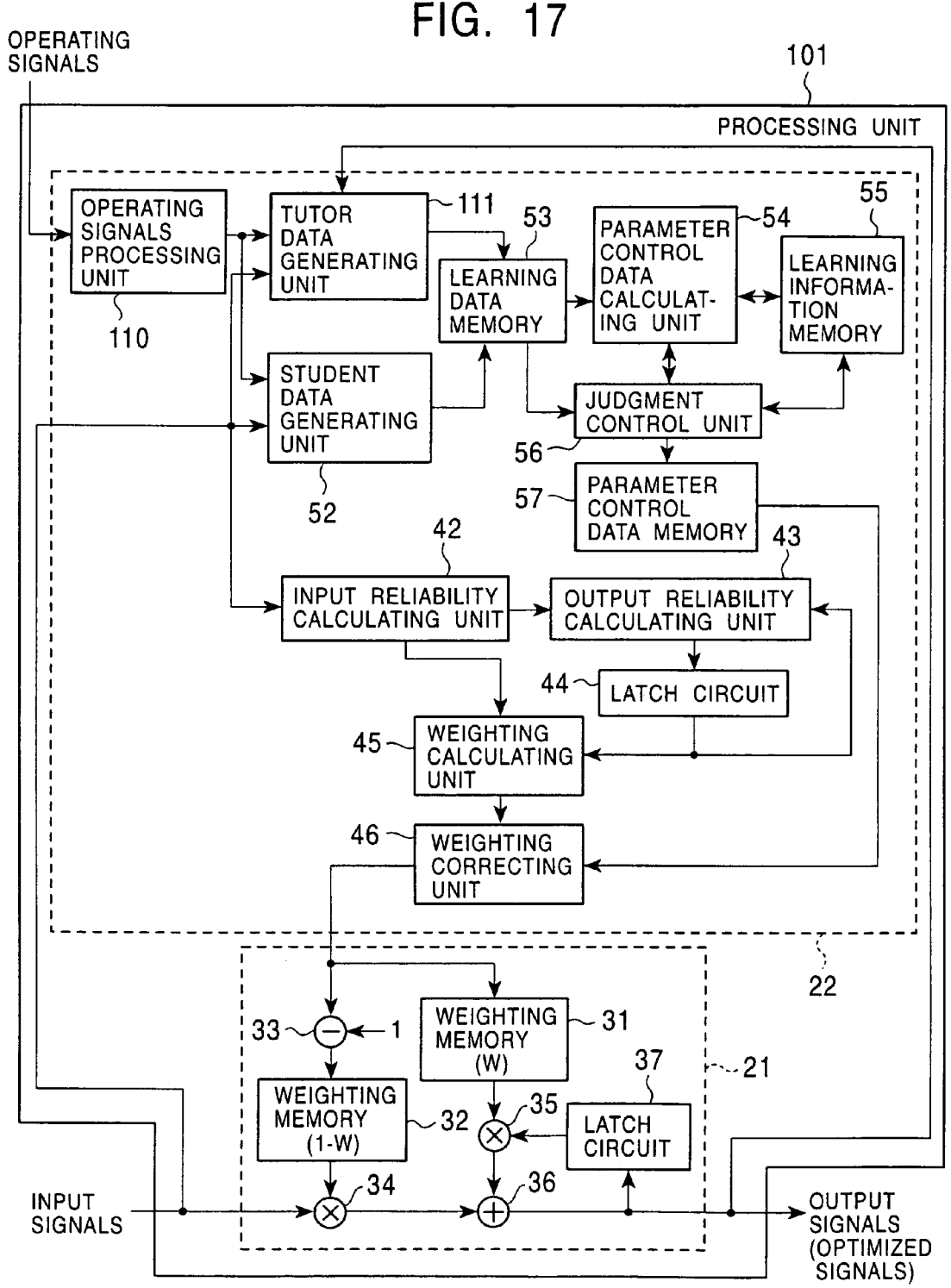
FIG. 17 is a block diagram illustrating a configuration example of the processing unit of the optimizing device shown in FIG. 16.

Next, FIG. 17 illustrates a configuration example of the processing unit 101 of the optimizing device 94 in FIG. 16. In the figure, the parts corresponding to the processing unit 11 shown in FIG. 4 are denoted with the same reference numerals, and description thereof will be omitted where suitable in the following. That is, the processing unit 101 shown in FIG. 17 is configured basically the same as the processing unit 11 shown in FIG. 4 except that no selecting unit 41 is provided, and an operating signal processing unit 110 and tutor data generating unit 111 are provided instead of the operating signal processing unit 50 and tutor data generating unit 51, respectively.

Now, to facilitate description in the following, of the coordinates (X, Y) and driving direction θ supplied from the computing unit 93 to the processing unit 101 of the optimizing device 94, description will be made giving consideration to the driving direction θ alone. However, the coordinates (X, Y) may be subjected to the same processing as the driving direction θ to be described now.

The operating signal processing unit 110 receives operating signals from the operating unit 98, and judges whether or not these are learning operating signals. In the event the operating signals are learning operating signals, the operating signal processing unit 110 then supplies a message to that effect to the student data generating unit 52 and tutor data generating unit 111.

The tutor data generating unit 111 is arranged so as to be supplied with messages from the operating signal processing unit 110 to the effect that the operating signals are learning operating signals (hereafter may be referred to as learning messages), and also so as to be supplied with the driving direction θ from the computing unit 93, serving as input signals. Further, the driving direction θ from the computing unit 93 which has been corrected (hereafter may be referred to as corrected driving direction), is also supplied to the tutor data generating unit 111 as output signals output from the correcting unit 21 (computing device 36). The tutor data generating unit 111 obtains the weight w corresponding to the learning operating signals, from the driving direction θ serving as input signals supplied at the time of receiving the learning message, and the corrected driving direction serving as output signals, which is supplied to the learning data memory 53 as tutor data.

That is, in this case, it is necessary to obtain, as tutor data, the weight W at the point of the automobile heading in a predetermined direction following the user operating the operating unit 98 which is the steering wheel so that the automobile heads in a predetermined direction. That is, it is necessary to employ as tutor data the weight W used for correction of the input signals x(t) indicating the driving direction θ, immediately following the user operating the operating unit 98 serving as the steering wheel and the automobile heading in the predetermined direction. The input signals x(t) immediately following operation of the operating unit 98 are corrected, following Expression (8), into output signals y(t) immediately following operating the operating unit 98 by weighted addition of the input signals x(t) and the output signals y(t−1) output immediately before operating the operating unit 98, so the weight W used for correction of the input signals x(t) immediately following operation of the operating unit 98 can be obtained from Expression (8), from the input signals x(t) immediately following operation of the operating unit 98, and output signals y(t) immediately following operating the operating unit 98 and output signals y(t−1) output immediately before operating the operating unit 98. Accordingly, the tutor data generating unit 111 obtains the weight W from the driving direction θ serving as the input signals x(t) supplied immediately following a reception of the learning message, and the corrected driving direction which is the output signals y(t−1) and y(t) supplied immediately before and immediately following reception of the learning message, respectively, and supplies this to the learning data memory 53.

Also, upon receiving the learning message, the student data generating unit 52 supplies the weight w obtained from the driving direction which is the input signals supplied to immediately before that point, to the learning data memory 53, as student data. That is, as described with reference to FIG. 4, the student data generating unit 52 is configured in the same way as the input reliability calculating unit 42, output reliability calculating unit 43, latch circuit 44, and weight calculating unit 45, and calculates the weight w of the driving direction which is the input signals supplied thereto (the same weight w that is obtained at the weight calculating unit 45), and supplies the weight w calculated immediately before receiving the learning message to the learning data memory 53, as student data.

Accordingly, at the parameter control data calculating unit 54, the weight W at the point that the user operates the operating unit 98 and the driving direction becomes the direction which the user desires is taken as tutor data, and the same weight w as that which the weight calculating unit 45 output immediately before the user operating the operating unit 98 is taken as student data, and the parameter control data a and b shown in the Expressions(20) and (21) is performed.

Then, at the weight correcting unit 46, the weight w obtained at the weight calculating unit 45 is corrected following Expression (13), using the parameter control data a and b, and this is supplied to the correcting unit 21.

As a result, the parameter control data a and b serve to correct the weight w obtained at the weight calculating unit 45 so as to correct the driving direction immediately before the user operating the operating unit 98 to the driving direction immediately following the user operating the operating unit 98, so the automobile performs auto-driving along the set course.

That is, it can be considered that the fact that the user operates the operating unit 98 means that the driving direction θ which the computing unit 93 outputs contains error due to error in the gyro sensor 91 or noise in the output thereof, computation error in the computing unit 93, etc., and accordingly does not represent the true driving direction of the automobile, and accordingly the actual driving direction of the automobile has deviated from the set course. Further, it can be considered that the operations of the operating unit 98 made by the end user in this case are for changing the actual driving direction of the automobile to that following the set course. Accordingly, performing learning wherein the weight W at the point that the user operates operating unit 98 and the actual driving direction of the automobile follows the set course is taken as tutor data, and the weight w obtained at the weight calculating unit 45 immediately before the user operates the operating unit 98, i.e., the weight w which the weight calculating unit 45 outputs in the state of deviating from the set course, as student data, the parameter control data a and b of the Expression (13) for correcting the weight in the Expression (6), so as to correct the driving direction in the state of deviating from the set course to a direction following the set course.

Next, description will be made regarding the processing unit 101 of the optimizing device 94 shown in FIG. 17. Now, as with the processing unit 11 of the NR circuit shown in FIG. 4, the processing unit 101 of the optimizing device 94 shown in FIG. 17 performs control data learning processing for obtaining the parameter control data for controlling (correcting) the weight serving as correction parameters, by correction processing for correcting the driving direction θ which the computing unit 93 outputs as input signals x(t), correction parameter computing processing for obtaining the weight serving as correction parameter is to be used for the correction processing thereof, and operations of the operating unit 98 (FIG. 16) by the user, but the correction processing is the same as the correction processing performed by the NR circuit shown in FIG. 4 that has been described with reference to FIG. 7, so here, the correction parameter computing processing and student data learning processing which the processing unit 101 of the optimizing device 94 shown in FIG. 17 performs, will be described.

First, the correction parameter computing processing which the processing unit 101 of the optimizing device 94 shown in FIG. 17 performs will be described with reference to the flowchart shown in FIG. 18.

In the correction parameter computing processing, first, in step Sill, the input signals calculating unit 22 obtains the input reliability αx(t) based on dispersion of the driving direction θ from the computing unit 93 (FIG. 16) serving as input signals, and supplies this to the output reliability calculating unit 43 and weight calculating unit 45, in the same way as with step S31 in FIG. 7.

Subsequently, the flow proceeds to step S112, where the weight calculating unit 45 uses the input reliability αx(t) from the input reliability calculating unit 42 to obtain the weight w(t) which is supplied to the weight correcting unit 46, following Expression (6), and the flow proceeds to step S113.

In step S113, the weight correcting unit 46 reads out the parameter control data from the parameter control data memory 57, and the flow proceeds to step S114. In step S114, the weight correcting unit 46 judges whether or not the parameter control data read out from the parameter control data memory 57 is auto mode data which represents a mode wherein the weight w(t) is not corrected, i.e., a mode wherein a weight w(t) which is obtained automatically, so as to say, from the input reliability and output reliability at the weight calculating unit 45, as the weight W for correcting the input signals x(t) without any change, regardless of operations of operating unit 98 (FIG. 16) by the user (auto mode).

In the event that judgment is made in step S113 that the parameter control data is not auto mode data, the flow proceeds to step S115, where the weight correcting unit 46 corrects the weight w(t) supplied from the weight calculating unit 45 following the linear expression in the Expression (13) defined by the parameter control data a and b supplied from the parameter control data memory 57, and the flow proceeds to step S116. In step S116, weight correcting unit 46 supplies the post-correction weight to the correcting unit 21 as correction parameters, and the flow proceeds to step S117.

On the other hand, in the event that judgment is made in step S114 that the parameter control data is auto mode data, step S115 is skipped, the flow proceeds to step S116 where the weight correcting unit 46 supplies the weight w(t) from the weight calculating unit 45 without change to the correcting unit 21 as correction parameters, and the flow proceeds to step S117.

At step S117, the output reliability calculating unit 43 updates the output reliability. That is, the output reliability calculating unit 43 adds the input reliability $\alpha_{x(t)}$ calculated by input reliability calculating unit 42 immediately preceding step S31 and the output reliability $\alpha_{y(t-1)}$ from one sample back which the latch circuit 44 has latched, following Expression (5), thereby obtaining the current output reliability $\alpha_{y(t)}$, which is stored in the form of overwriting on the latch circuit 44.

Following the processing in step S117, the flow returns to step S111, and subsequently the same processing is repeated.

Figure 18:
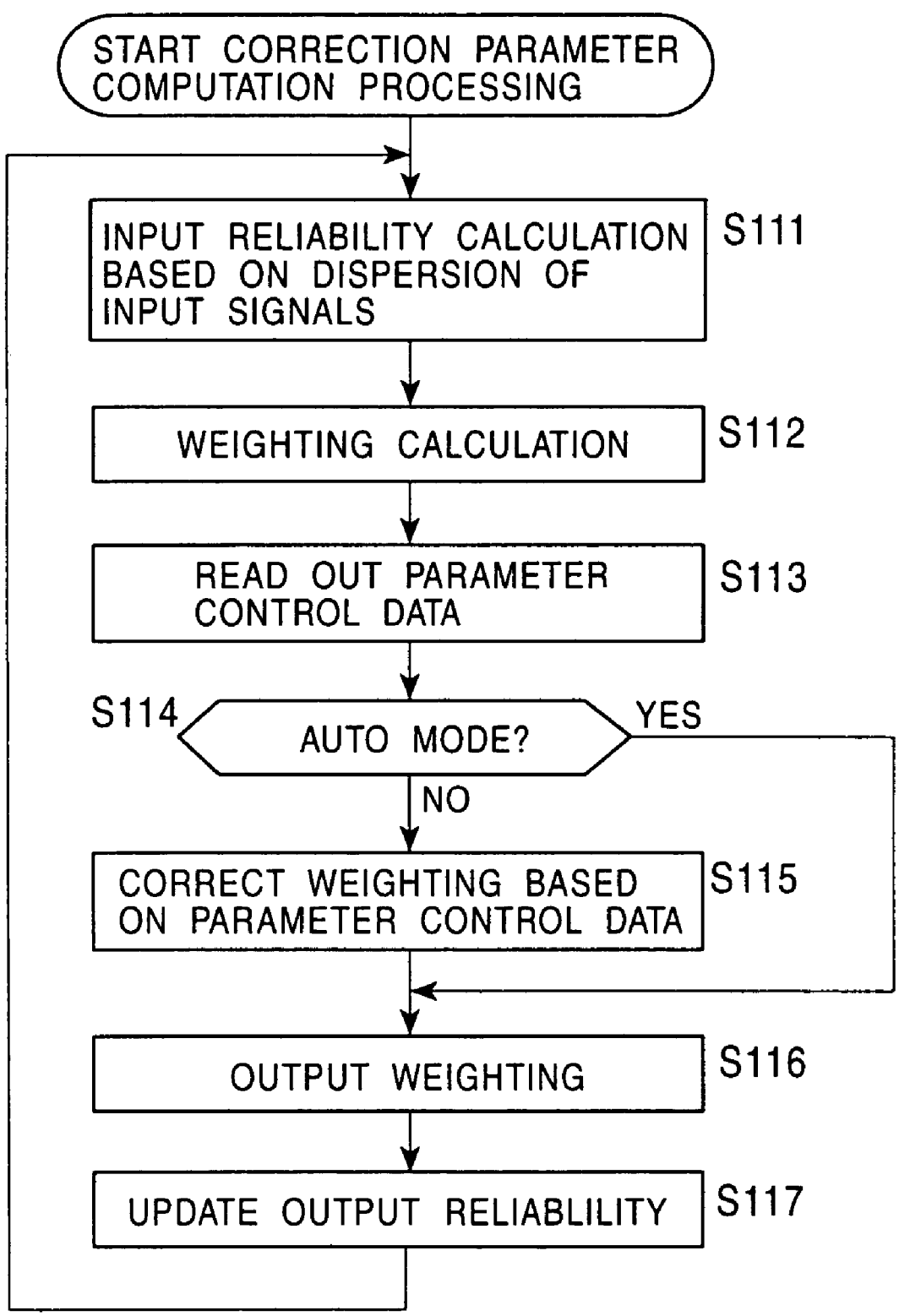
FIG. 18 is a flowchart describing correction parameter computing processing with the optimizing device shown in FIG. 16.
Figure 19:
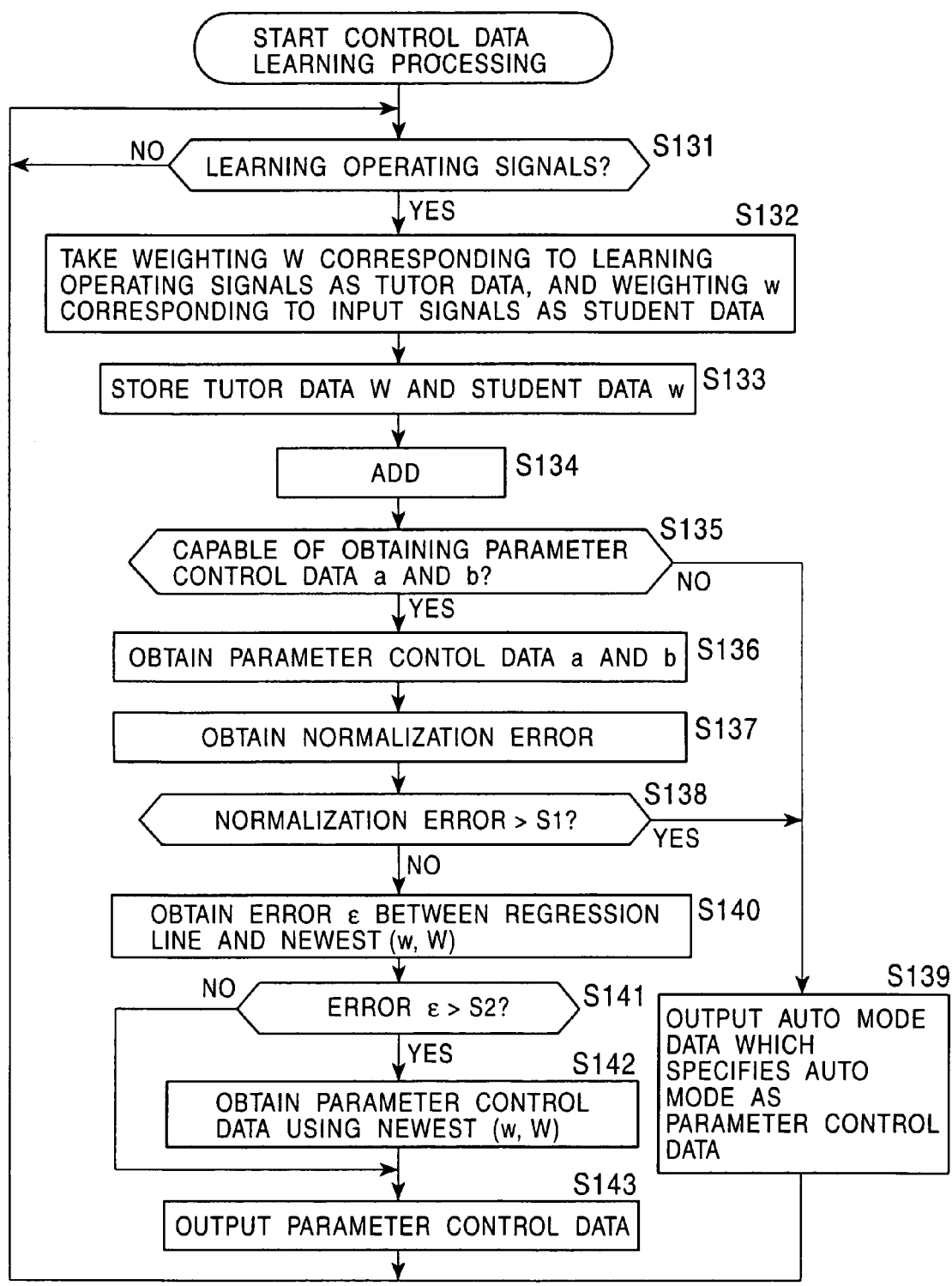
FIG. 19 is a flowchart describing control data learning processing with the optimizing device shown in FIG. 16.

As described above, with the correction parameter computing processing shown in FIG. 18, in the event of being in a auto mode, the weight to be used for correction processing is obtained from the input reliability and output reliability regardless of the operations of the operating unit 98, and in the event of not being in the auto mode, the weight to be used for correction processing is obtained using the parameter control data obtained by the learning in the control data learning processing in FIG. 19 which will be described later, based on the operations of the operating unit 98.

Next, description will be made regarding the control data learning processing which the processing unit 101 of the optimizing device 94 shown in FIG. 17 performs, with reference to the flow chart shown in FIG. 19.

With the control data learning processing, first, in step S131, the operating signal processing unit 110 judges whether or not learning operating signals have been received from the operating unit 98 (FIG. 16), and in the event that judgment is made that the signals have not been received, the flow returns to step S101.

Also, in the event that judgment is made in step S101 that learning operating signals have been received from the operating unit 98, i.e., in the event of that, for example, the steering wheel or the like which is the operating unit 98 starts to be operated, following which, without elapsing of a first time t1 or longer, operating is performed continuously for a second time t2 or longer, following which the operations thereof are stopped continuously for a third time t3 or longer, or cases wherein following starting the operations of the steering wheel which is the operating unit 98, operations thereof are stopped continuously for a third time t3 or longer, such that judgment can be made that the user has operated the steering wheel which is operating unit 98 so as to direct the automobile in the desired direction, the flow proceeds to step S132, where the tutor data generating unit 111 generates tutor data, and the student data generating unit 52 generates student data.

That is to say, upon judging that the learning operating signals have been received, the operating signal processing unit 110 supplies a learning message to the tutor data generating unit 111 and student data generating unit 52. Upon receiving the learning message from the operating signal processing unit 110, in step S132 the tutor data generating unit 111 obtains a weight W corresponding to the learning operating signals, from the driving direction θ which is the input signals supplied from the computing unit 93, and the corrected driving direction θ from the computing unit 93 (corrected driving direction) which is the output signals output by the correcting unit 21 (computing device 36).

Specifically, the tutor data generating unit 111 receives input signals x(t) representing the driving direction θ immediately following the user operating the operating unit 98 serving as the steering wheel and the automobile heading in the desired direction, from the computing unit 93 (FIG. 16). Further, the tutor data generating unit 111 is arranged so as to hold the current output signals y(t) output by the correcting unit 21, and output signals y(t−1) from one timing back, i.e., the output signals y(t−1) immediately before operating the operating unit 98, and obtains the weight W used at the correcting unit 21 at the time that the learning operating signals are provided to (the weight corresponding to the learning operating signals) following Expression (8), using the input signals x(t), and output signals y(t) and y(t−1).

Note that in this case, operations of the steering wheel which is the operating unit 98 made by the user are considered to be instantaneously completed within one timing from t−1 to t, to facilitate description.

The tutor data generating unit 111 obtains the weight W corresponding to the learning operating signals as described above, and then supplies the weight W to the learning data memory 53 as tutor data.

Further, in step S132, the student data generating unit 52 which has received the learning message from the operating signal processing unit 110 supplies the same weight w as that output by the weight calculating unit 45, calculated using the input reliability and output reliability obtained from the driving direction which is input signals supplied from the computer unit 93 (FIG. 16), to the learning data memory 53, as student data.

Accordingly, the learning data memory 33 is supplied with a learning pair, wherein the weight W used at the correcting unit 21 at the point that the actual driving direction of the automobile becomes the direction which the user desires by the user operating the operating unit 98, is taken as tutor data, and the weight w obtained from the input reliability and output reliability immediately before the user operating the operating unit 98, is taken as student data.

Upon receiving the tutor data W from the tutor data generating unit 111 and the student data w from the student data generating unit 52, the learning data memory 53 stores the set of the newest tutor data W and student data w in step S133, and the flow proceeds to step S134.

In step S134, the parameter control data calculating unit 54 performs adding in the least-square, with regard to the newest tutor data and student data stored in the learning data memory 53 and to the learning information stored in the learning information memory 55, in the same way-as with step S44 in FIG. 8. Further, in step S134, the parameter control data calculating unit 54 stores the adding-in results as learning information, in the form of overwriting the learning information memory 55, and the flow proceeds to step S135.

In step S135, the parameter control data calculating unit 54 judges whether or not the parameter control data a and b can be obtained with the Expressions (20) and (21), from the adding-in results serving as the learning information stored in the learning information memory 55, as with the case in step S45 in FIG. 8.

In the event that judgment is made in step S135 that the parameter control data a and b cannot be obtained, the parameter control data calculating unit 54 supplies the judgment control unit 56 with information to that effect, and the flow proceeds to step S139. In step S139, the judgment control unit 56 supplies the auto mode data representing the auto mode to the parameter control data memory 57 as parameter control data, where it is stored. Then, the flow returns to step S131, and subsequently, the same processing is repeated.

Accordingly, in the event that sufficient learning information whereby the parameter control data a and b can be obtained does not exist, the weight w(t) automatically obtained from the input reliability and output reliability at the weight calculating unit 45 (FIG. 17) is used for correction of input signals x(t) without change.

On the other hand, in the event that judgment is made in step S135 that the parameter control data a and b can be obtained, the flow proceeds to step S136, where the parameter control data calculating unit 54 uses learning information to calculate the Expressions (20) and (21), and thereby obtaining the parameter control data a and b, which is supplied to the judgment control unit 56, and the flow proceeds to step S137.

In step S137, the judgment control unit 56 follows the linear expression in Expression (13) defined by the parameter control data a and b from the parameter control data calculating unit 54 to obtain prediction values of a corresponding tutor data from the student data stored in the learning data memory 53, and obtains the sum of the square-error represented by the Expression (15) for the prediction error of that prediction value (error as to the tutor data stored in the learning data memory 53). Further, the judgment control unit 56 obtains a normalization error wherein the square-error sum is divided by the number of the learning pairs stored in the learning data memory 53, for example, and the flow proceeds to step S138.

In step S138, the judgment control unit 56 judges whether or not the normalization error is greater than (equal to or more than) a predetermined threshold value S1. In the event that judgment is made in step S138 that the normalization error is greater than the predetermined threshold value S1, i.e., in the event that the linear expression in the Expression (13) defined by the parameter control data a and b does not precisely approximate the relation between the student data and the tutor data stored in the learning data memory 53, the flow proceeds to step S139 where the judgment control unit 56 supplies auto mode data representing the auto mode to the parameter control data memory 57 as parameter control data, where it is stored, as described above. The flow then returns to step S131, and subsequently, the same processing is repeated.

Accordingly, even in the event that the parameter control data a and b can be obtained, in the event that the linear expression in the Expression (13) defined by the parameter control data a and b does not precisely approximate the relation between the student data and the tutor data stored in the learning data memory 53, the weight w(t) automatically obtained from the input reliability and output reliability is used for correcting the input signals x(t), in the same way as cases wherein sufficient learning information for obtaining the parameter control data a and b does not exist.

On the other hand, in the event that judgment is made in step S138 that the normalization error is not greater than the predetermined threshold value S1, i.e., in the event that the linear expression in the Expression (13) defined by the parameter control data a and b does precisely approximate the relation between the student data and the tutor data stored in the learning data memory 53, the flow proceeds to step S140, wherein the judgment control unit 56 obtains the error (distance) $\epsilon$ between the regression line represented by the linear expression in the Expression (13) defined by the parameter control data a and b from the parameter control data calculating unit 54 and a point stipulated by the newest tutor data and student data stored in the learning data memory 53.

The flow then proceeds to step S141, where the judgment control unit 56 judges whether or not the magnitude of the error $\epsilon$ is greater than (equal to or more than) a predetermined threshold value S2, and in the event that judgment is made that this is not greater, step S142 is skipped, the flow proceeds to step S143, and the judgment control unit 56 outputs the parameter control data a and b obtained in step S136 to the parameter control data memory 37. The parameter data memory 57 stores the parameter control data a and b from the judgment control unit 56 in the form of overwriting, and the flow returns to step S131.

On the other hand, in the event that judgment is made in step S141 that the magnitude of the error $\epsilon$ is greater than the predetermined threshold value S2, the flow proceeds to step S142, where the judgment control unit 56 controls the parameter control data calculating unit 54 to re-calculate the parameter control data a and b using only a predetermined number of the past learning pairs of from the newest learning pairs of newest tutor data and student data stored in the learning data memory 53 (without using the learning information in the learning information memory 55) by controlling the parameter control data calculating unit 54. The flow then proceeds to step S143, where the judgment control unit 56 outputs the parameter control data a and b obtained in step S142 to the parameter control data memory 37, where it is stored in the from of overwriting, and the flow returns to step S131.

Accordingly, in the event that the parameter control data a and b can be obtained, and linear expression of the Expression (13) defined by the parameter control data a and b precisely approximates the relation between the student data and tutor data stored in the learning data memory 53, the weight w(t) obtained from the input reliability and output reliability is corrected following the Expression (13) defined by the parameter control data a and b obtained by the learning being performed using the learning pairs obtained based on the operations of the operating unit 2 by the user, and the corrected weight W obtained by the correction is used for correcting the input signals x(t).

As described above, with the auto-driving device shown in FIG. 16 as well, judgment is made regarding whether or not the operating signals supplied in response to operations of the user can be used for learning, and in the event that these are learning operating signals which can be used for learning, the parameter control data a and b for correcting the weight for correcting the input signals is learned based on the learning operating signals, so the operations of the user can be learned without the user knowing, and consequently, processing suitable for the user gradually comes to be performed based on the results of learning, and ultimately, processing optimal for the user is performed.

That is, as the user performs operations with operating unit 98 so as to correct the driving direction to follow the set course, the automobile gradually comes to perform auto-driving following the set course.

Also, in the same manner as the NR circuit shown in FIG. 4, with the processing unit 101 of the optimizing device 94 shown in FIG. 17 as well, the weight W used for the correction processing (FIG. 6) performed at the correcting unit 21 is changed, following the operations of the user at the operating unit 98, so that the actual driving direction of the automobile follows the set course. That is to say, upon the user operating the operating unit 98 so that the driving direction of the automobile heads in the desired direction, the driving direction $\theta$ which is input signals output by the computing unit 93 (FIG. 16) changes, so the input reliability obtained from the driving direction $\theta$, and further the output reliability obtained from the input reliability, change. The change in this input reliability and output reliability causes the weight obtained at the weight calculating unit 45 to change, and this changed weight is supplied to the correcting unit 21 through the weight correcting unit 46. The correction processing represented by Expression (8) is then performed at the correcting unit 21, using the weight that has been supplied. Accordingly, in the event that the user operates the operating unit 98, the weight of the Expression (8) is changed by the operations of the user, and then the same manner as the case described with the NR circuit in FIG. 4, the contents of the processing (correction processing) represented by Expression (8) also change as a matter of course, so it can be said that the "contents of processing" are being changed so that the driving direction desired by the user can be obtained, following operations of the user, with the processing unit 101 of the optimizing device 94 shown in FIG. 17, as well.

Further, as with the NR circuit in FIG. 4, with the processing unit 101 of the optimizing device 94 shown in FIG. 17 as well, in cases wherein sufficient learning pairs have not been input from the user, or in the event that learning pairs whereby highly precise approximation is possible have not been input, weight automatically obtained from the input reliability and output reliability is used for the correction processing at the correcting unit 21, and in the event that learning pairs whereby highly precise approximation is possible have been input, correction weighting obtained by the parameter control data a and b obtained by learning being performed using the learning pairs is used for correction processing at the correcting unit 21. That is to say, the algorithms for calculating weight used for the correction processing change depending on the cases wherein a sufficient number of learning pairs or learning pairs enabling highly precise approximation are not obtained, and cases wherein learning pairs enabling highly precise approximation are obtained.

Accordingly, as with the NR circuit in FIG. 4, with the processing unit 101 of the optimizing device 94 in FIG. 17 as well, the "contents of processing", and further, the "structure of processing", is also changed following user operations, whereby the automobile performs auto-driving in the driving direction following the set course.

Also, for example, Japanese Unexamined Patent Application Publication No. 7-13625 discloses that driving control device for work vehicles such as rice transplanters and the like, and with the driving control device, the amount of correction of control parameters in the automatic steering state is computed so that the difference between the state of operation by the user and the information based on detection results such as of the gyro sensor and the like, are reduced. Accordingly, the auto driving device shown in FIG. 16 holds in common with the driving control device described in Japanese Unexamined Patent Application Publication No. 7-13625, the point that the amount of correction of parameters for auto driving (automatic steering) changes based on operations made by the user.

However, the auto driving device shown in FIG. 16 greatly differs from the driving control device described in Japanese Unexamined Patent Application Publication No. 7-13625 which computes the amount of correction of control parameters in the auto steering state only in the event that a switch is manually switched over to a manual steering control mode, with regard to the point of judging whether or not operating signals supplied according to operations made by the user can be used for learning, and the point that, in the event that the operating signals are learning operating signals which can be used for learning, parameter control data for correcting the weighting for correcting input signals is learned based on the learning operating signals.

Due to such differences, with the driving control device described in Japanese Unexamined Patent Application Publication No. 7-13625, every time the user feels that suitable automatic steering is not being performed, the user must switch over a switch to a manual steering control mode, and following computation of the amount of correcting the control parameters, switch over the switch again to the auto steering control mode, which may leave the user with an impression of being troublesome.

Conversely, with the auto driving device shown in FIG. 16, the judgment is made regarding whether or not operating signals supplied according to operations made by the user can be used for learning, and further, in the event that these are learning operating signals which can be used for learning, the algorithms are changed such that parameter control data for correcting the weighting for correcting input signals is learned based on the learning operating signals, so suitable auto driving is performed even without the user performing such switching over of the switch, as described above. That is to say, learning of operations by the user is performed without the user knowing, so learning proceeds as the user corrects the driving direction, and the automobile gradually comes to drive following the set course, even without the user making operations.

Further, with the auto driving device shown in FIG. 16, the structure of processing changes corresponding to user operations, thus differing from the driving control device described in Japanese Unexamined Patent Application Publication No. 7-13625 with regard to this point as well.

Figure 20:
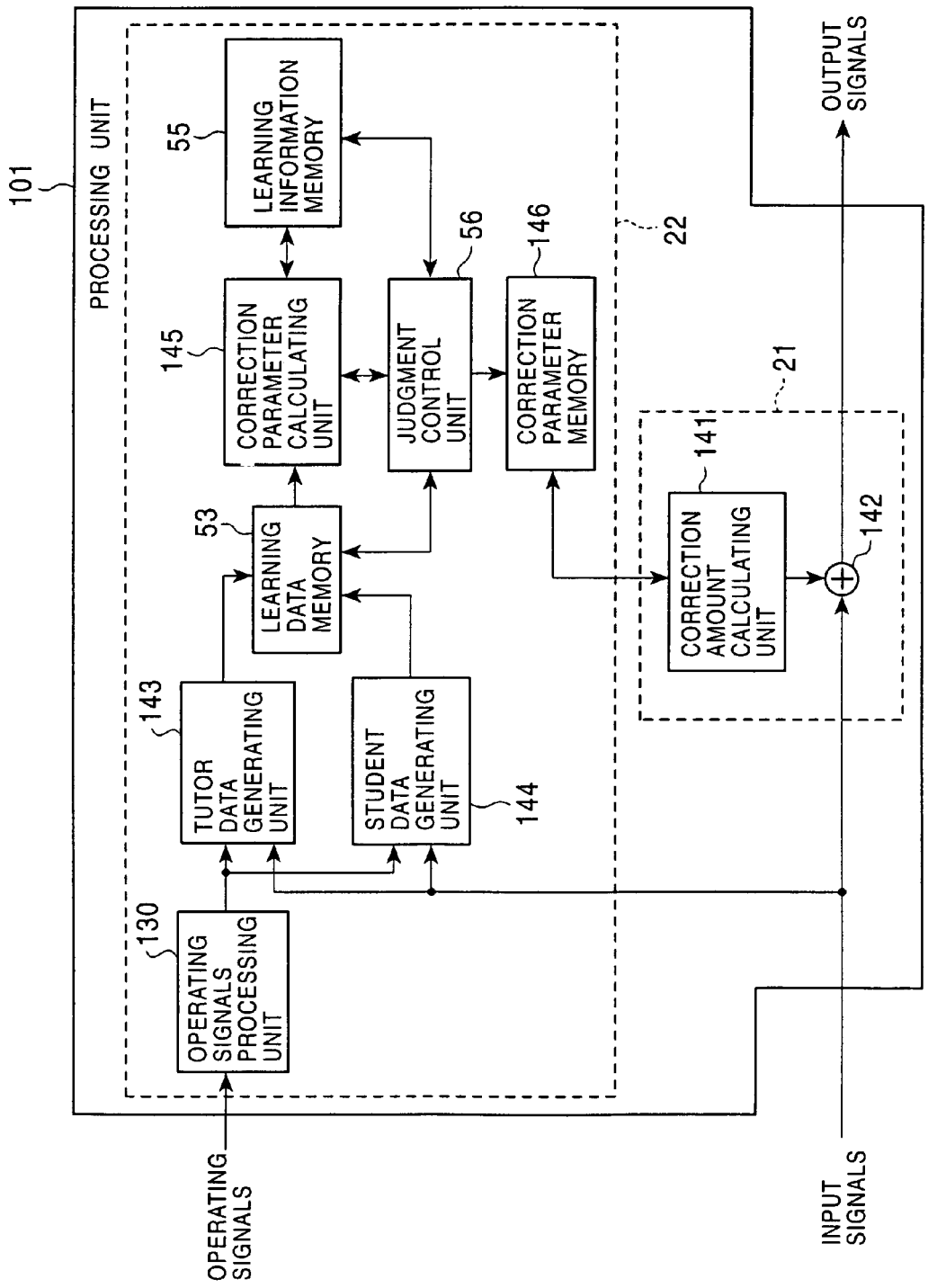
FIG. 20 is a block diagram illustrating another configuration example of the processing unit of the optimizing device shown in FIG. 16.

Next, FIG. 20 illustrates another configuration example of the processing unit 101 of the optimizing device 94 shown in FIG. 16. Note that the parts corresponding with the case shown in FIG. 17 in the figure are denoted with the same reference numerals, and description thereof will be omitted as appropriate in the following.

With the processing unit 11 of the NR circuit shown in FIG. 4 and FIG. 10, and the processing unit 101 of the optimizing device 94 shown in FIG. 17, parameter control data for controlling correction parameters are learned using learning pairs obtained based on operations made by the user, but with the processing unit 101 shown in FIG. 20, correction parameters themselves are learned using the learning pairs obtained based on operations made by the user.

That is, with the embodiment shown in FIG. 20, the correcting unit 21 is configured of a correction amount calculating unit 141 and computing device 142, and the learning unit 22 is configured of learning data memory 53, learning information memory 55, judgment control unit 56, operating signal processing unit 110, tutor data generating unit 143, student data generating unit 144, correction parameter calculating unit 145, and correction parameter memory 146.

The later-described correction parameters are supplied to the correction amount calculating unit 141 from the correction parameter memory 146 in the learning unit 22, with the correction amount calculating unit 141 using the correction parameters to calculate the correction amount for correcting the driving direction θ which is the input signals, and supplying this to the computing device 142.

The computing device 142 is supplied with correction amount from the correction amount calculating unit 141, and is also supplied with the driving direction θ which is the input signals, from the computing unit 93 (FIG. 16), with the computing unit 142 correcting the driving direction θ which is the input signals by adding the correction amount thereto, and outputting the post-correction driving direction (corrected driving direction) to the auto driving control unit 95 (FIG. 16) as output signals.

The tutor data generating unit 143 supplies the driving direction which is the input signals supplied immediately following reception of the learning message from the operating signal processing unit 110, to the learning data memory 53, as tutor data. The student data generating unit 144 supplies the driving direction which is the input signals supplied immediately before reception of the learning message from the operating signal processing unit 130, to the learning data memory 53, as student data.

The correction parameter calculating unit 145 learns correction parameter which minimizes a predetermined statistical error by computing new learning information, using tutor data and student data serving as learning data stored in the learning data memory 53, and further, if necessary, using learning information stored in learning information memory 55, and supplies this to the judgment control unit 56 under control of the judgment control unit 56. The correction parameter calculating unit 145 updates the stored contents of the learning information memory 55, with the new learning information obtained by learning.

The correction parameter memory 146 stores correction parameters which the judgment control unit 56 outputs.

With optimizing device 94 configured as described above, the driving direction θ supplied from the computing unit 93 is corrected as described next.

That is, with the yaw rate output by the gyro sensor 91 (FIG. 16) at a time t as r', the driving direction is calculated at the computing unit 93 from an expression wherein r in Expression (32) is substituted with r'.

Now, with the error contained in the yaw rate r' output by the gyro sensor 91 as $e_r$, and the true yaw rate as r, the yaw rate r' output by the gyro sensor 91 is represented by the following expression.

[Expression 33]

$$r' = r + e_r \quad (33)$$

At the computing unit 93, the driving direction θ' calculated from the yaw rate r' output from the gyro sensor 91 is as follows, from the Expressions (32) and (33).

[Expression 34]

$$\theta' = \theta(0) + \int r' dt$$
$$= \theta(0) + \int (r + e_r) dt$$
$$= \theta(0) + \int r dt + \int e_r dt \quad (34)$$

Accordingly, relation between the driving direction θ' obtained by the computing unit 93 and the true driving direction θ obtained from the true yaw rate r is as shown in the following expression.

[Expression 35]

$$\theta' = \theta + \int e_r dt \quad (35)$$

In the event that the error $e_r$ contained in the yaw rate r' output by the gyro sensor 91 is white, the second term of the right-hand side of Expression (35) is 0 in the long term, as shown in the following expression, so there is no particular problem. In the short term, the second term of the right-hand side of Expression (35) is not 0, but this case can be dealt with, with the processing unit 101 of the optimizing device 94 shown in FIG. 17.

[Expression 36]

$$\int e_r dt = 0 \quad (36)$$

However, in the event that the error $e_r$ is colored, the error $e_r$ accumulates as time t passes, so the driving direction θ' obtained from the computing unit 93 greatly deviates from the true driving direction θ.

Figure 21:
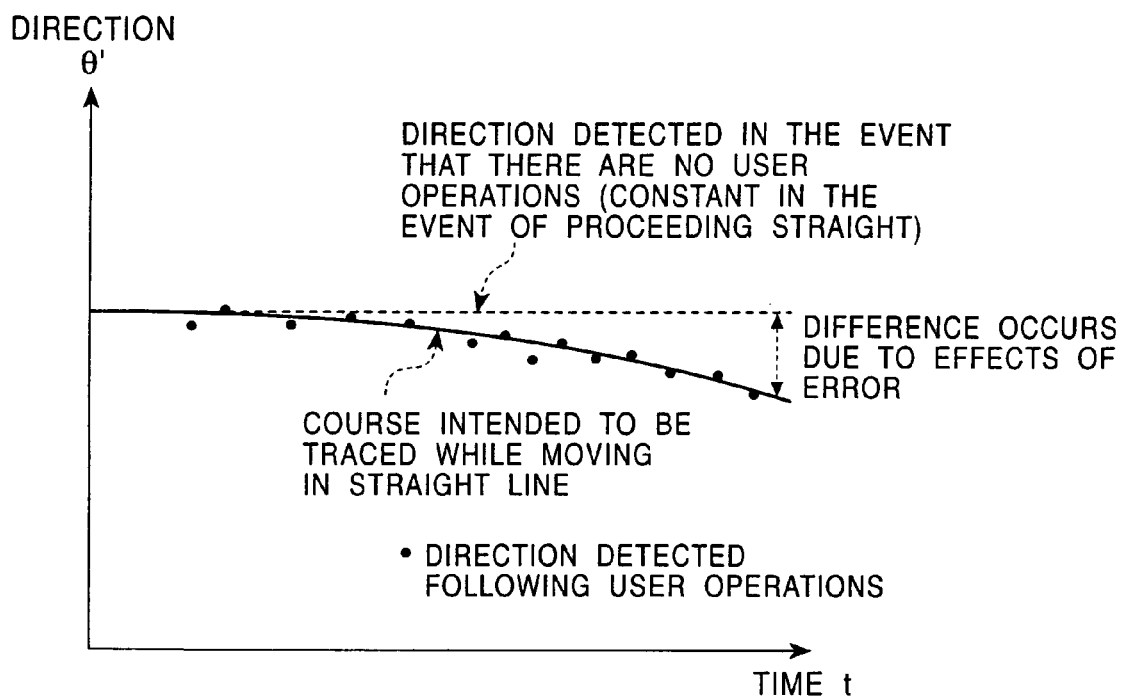
FIG. 21 is a diagram illustrating a driving direction output by the computing unit shown in FIG. 16

That is, considering auto driving directly proceeding in a constant direction in order to simplify description, control signals which make the driving direction θ' obtained from the computing unit 93 to be constant, as indicated by the dotted line in FIG. 21, are generated at the auto driving control unit 95 (FIG. 16).

However, in the event that the error $e_r$ contained in the driving direction θ' obtained from the computing unit 93 is colored, the error $e_r$ accumulates as time t passes, so that the time that the driving direction θ' obtained from the computing unit 93 traces a course curving as indicated by the solid line in FIG. 21, for example, the automobile is proceeding straight ahead.

Accordingly, with the processing unit 101 of the optimizing device 94 in FIG. 20, correction parameters learning processing is performed for learning correction parameters $a_0, a_1, \ldots, a_N$, for correcting the driving direction θ' based on learning operating signals from the user, so that the driving direction θ' obtained from the computing unit 93 supplied as input signals traces the course indicated by the solid line in FIG. 21, and correction processing is performed for correcting the driving direction θ' obtained from the computing unit 93 using the correction parameters $a_0$ through $a_N$.

Figure 22:
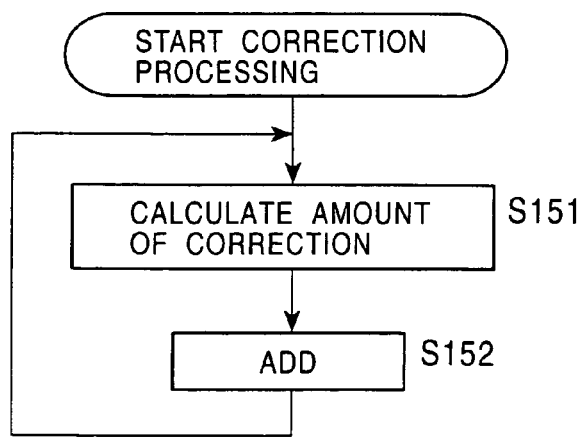
FIG. 22 is a flowchart describing the correction processing by the optimizing device shown in FIG. 16.

Accordingly, the correction processing and correction parameter learning processing which the processing unit 101 of the optimizing device 94 shown in FIG. 20 performs will be described with reference to FIG. 22 and FIG. 23. While the embodiment in FIG. 18 involves auto driving proceeding straight in a constant direction, the processing unit 101 of the optimizing device 94 shown in FIG. 20 can be applied to auto driving following an arbitrary course.

First, the correction processing which the processing unit 101 of the optimizing device 94 shown in FIG. 20 performs will be described with reference to the flow chart in FIG. 22.

With the correction processing, in step S151, the correction amount calculating unit 141 calculates the correction amount using the correction parameters $a_0$ through $a_N$ stored in the correction parameter memory 146.

That is, here, the correction amount is calculated with the true driving direction θ being expressed as shown in Expression (37) using the correction parameters $a_0$ through $a_N$ and the driving direction θ' obtained from the computing unit 93 as input signals, for example.

[Expression 37]

$$\theta = \theta' + a_0 + a_1 t^1 + a_2 t^2 + \ldots + a_N t^N \quad (37)$$

Accordingly, $a_0 + a_1 t^1 + a_2 t^2 + \ldots + a_N t^N$ is calculated at the correction amount calculating unit 141 as the correction amount, from the Expression (37). This correction amount is supplied to the computing unit 142.

In step S152, the driving direction θ' obtained from the computing unit 53 and the correction amount are added at the computing device 142, and the added value thereof (θ in Expression (37)) is output as output signals, the flow waits for a sample of the next input signals to be supplied and returns to step S151, and subsequently, the same processing is repeated.

Next, the correction parameter learning processing which the processing unit 101 of the optimizing device 94 in FIG. 20 performs will be described with reference to the flowchart in FIG. 23.

With the correction parameter learning processing, first, in step S161, the operating signal processing unit 110 judges whether or not learning operating signals had been received from the operating unit 98 (FIG. 16), and in the event that judgment is made that there has been no reception thereof, the flow returns to step S161.

Also, in the event that judgment is made in step S161 that learning operating signals have been received from the operating unit 98, i.e., in the event of that, for example, the operating unit 98 starts to be operated, following which, without elapsing of a first time t1 or longer, operating is performed continuously for a second time t2 or longer, following which the operations thereof are stopped continuously for a third time t3 or longer, or cases wherein following starting of operations of the operating unit 98, operations thereof are stopped continuously for a third time t3 or longer, such that judgment can be made that the user has operated the operating unit 98 so as to direct the automobile in the desired direction, the flow proceeds to step S162, where the tutor data generating unit 143 generates tutor data, and the student data generating unit 144 generates student data.

That is to say, in the event of receiving a learning operating signal, the operating signal processing unit 110 supplies a learning message to that effect to the tutor data generating unit 143 and student data generating unit 144. Upon receiving the learning message, the tutor data generating unit 143 obtains the driving direction as input signals supplied immediately thereafter as tutor data, and supplies this to the learning data memory 53.

That is to say, in this case, for the tutor data, there is the need to use the driving direction following the user operating the operating unit 98 which is the steering wheel so that the automobile heads in the desired direction. Accordingly, the tutor data generating unit 143 supplies the driving direction θ as input signals supplied the following reception of the learning message, as tutor data, to the learning data memory 53.

Also, the student data generating unit 52, upon receiving the learning message, supplies the driving direction as input signals supplied immediately prior to this, i.e., the driving direction immediately before the automobile heads in the desired direction, as student data, to the learning data memory 53.

Following this, the flow proceeds to step S163, where the learning data memory 53 stores the set of tutor data from the tutor data generating unit 51 and the student data, and the flow proceeds to step S164.

In step S164, the same least-square adding as that described with Expressions (22) through (30) is performed by the correction parameter calculating unit 145, with regard to the tutor data and student data.

Note that the adding-in in step S164 is performed using the previous adding results stored in the learning information memory 55 as learning information, in the same manner as that described above. Also, here, adding is performed for obtaining, as θ' in Expression (37), the correction parameters $a_0$ through $a_N$ which minimize the sum of the square-error of the prediction value of the tutor data as θ in Expression (37) calculated using student data and the corresponding tutor data.

Following the adding in step S164, the correction parameter calculating unit 145 stores the adding-in results as learning information, in the form of overwriting of the learning information memory 55, and the flow proceeds to step S165.

In step S165, judgment is made regarding whether or not the correction parameter calculating unit 145 can obtain the correction parameters $a_1$ through $a_N$ from the adding results serving as learning information stored in the learning information memory 55.

In the event that judgment is made in step S165 that the correction parameters $a_1$ through $a_N$ cannot be obtained, the correction parameters calculating unit 145 supplies information to that effect to the judgment control unit 56, and the flow proceeds to step S169. In step S169, the judgment control unit 56 supplies and stores disable data representing forbidding of correction, as correction parameters, to the correction parameter memory 146. The flow then returns to step S161, and subsequently, the same processing is repeated.

Accordingly, in the event that sufficient learning information for obtaining the correction parameters $a_1$ through $a_N$ does not exist, correction of input signals is not performed at the correcting unit 21. That is, the correction amount of input signals is 0.

On the other hand, in the event that in step S165, judgment is made that correction parameters can be obtained, the flow proceeds to step S166, where the correction parameter calculating unit 145 uses the learning information to obtain the correction parameters $a_0$ through $a_N$, supplies these to the judgment control unit 56, and the flow proceeds to step S167.

In step S167, the judgment control unit 56 obtains the prediction value of the corresponding tutor data from each of the student data stored in the learning data memory 53, following the Expression (37) defined by the parameter control data $a_1$ through $a_N$ from the correction parameters calculating unit 145, and obtains the square sum of the prediction error of that prediction value (the error as to the tutor data stored in the learning data memory 53). Further, the judgment control unit 56 obtains a normalization error wherein the square sum of the prediction error thereof is divided by the number of learning pairs stored in the learning data memory 53, for example, and the flow proceeds to step S168.

In step S168, the judgment control unit 56 judges whether or not the normalization error is greater than (equal to or more than) a predetermined threshold value S1. In the event that the judgment is made in step S168 that the normalization error is greater than the predetermined threshold value S1, i.e., in the event that the linear expression of the Expression (37) defined by the correction parameters $a_1$ through $a_N$ does not precisely approximate the relation between student data and tutor data stored in the learning data memory 53, the flow proceeds to step S169, where the judgment control unit 56 supplies and stores disable data to the correction parameter memory 146 as correction parameters, as described above. The flow then returns to step S161, and subsequently, the same processing is repeated.

Accordingly, even in the event that the correction parameters $a_1$ through $a_N$ can be obtained, in the event that the Expression (37) defined by the correction parameters $a_1$ through $a_N$ does not precisely approximate the relation between the student data and tutor data stored in the learning data memory 53, the correction amount of the input signals x(t) is 0, in the same way as cases wherein sufficient learning information for obtaining the correction parameters $a_1$ through $a_N$ does not exist.

On the other hand, in the event that judgment is made in step S168 that the normalization error is not greater than the predetermined threshold value S1, i.e., in the event that the linear expression of the Expression (37) defined by the correction parameters $a_1$ through $a_N$ precisely approximates the relation between student data and tutor data stored in the learning data memory 53, the flow proceeds to step S170, where the judgment control unit 56 obtains the error ϵ between a plane of the Expression (37) defined by the correction parameters $a_1$ through $a_N$ from the correction parameter calculating unit 145, and the point stipulated by the newest tutor data and student data stored in the learning data memory 53.

The flow then proceeds to step S171, where the judgment control unit 56 judges whether or not the magnitude of the error ε is greater than (equal to or more than) a predetermined threshold value S2, and in the event that judgment is made that this is not greater, step S172 is skipped, the flow proceeds to step S173, where the judgment control unit 56 outputs the correction parameters $a_0$ through $a_N$ obtained in step S166 to the correction parameters memory 146. In this case, the correction parameters memory 146 stores the correction parameters $a_1$ through $a_N$ from the judgment control unit 56 in the form of overwriting, and the flow returns to step S161.

On the other hand, in the event that judgment is made in step S171 that the magnitude of the error ε is greater than the predetermined threshold value S2, the flow proceeds to step S172, where the judgment control unit 56 controls the correction parameter calculating unit 145 to re-calculate the correction parameters $a_0$ through $a_N$, using only the newest tutor data and student data stored in the learning data memory 53. The flow then proceeds to step S173, where the judgment control unit 56 outputs the correction parameters $a_0$ through $a_N$ obtained in step S172 to the parameter control unit data memory 37, to store in the form of overwriting, and the flow returns to step S161.

Figure 23:
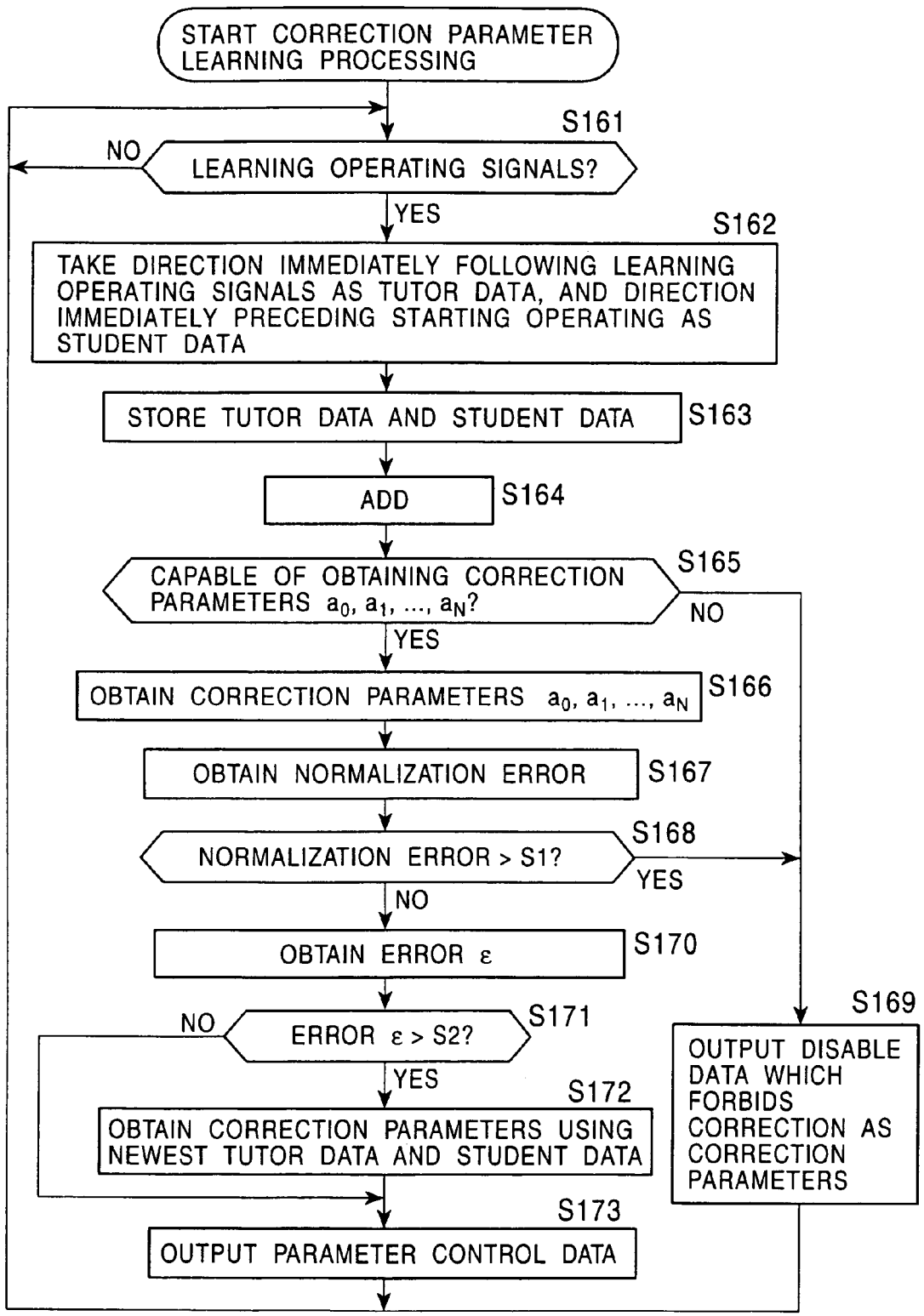
FIG. 23 is a flowchart describing the correction parameter learning processing by the optimizing device shown in FIG. 16.

That is, in the same way as the embodiment in FIG. 8, with the embodiment in FIG. 23 as well, in step S170, the error ε is obtained between a plane defined by the Expression (37) from the correction parameters $a_0$ through $a_N$ obtained from the tutor data and student data provided so far, and the point stipulated by the newest tutor data and student data.

In the event that the magnitude of the error E is not greater than the threshold value S2, the plane of the Expression (37) defined by the correction parameters $a_0$ through $a_N$ obtained in step S166 is considered to relatively precisely approximate the points stipulated by tutor data and student data provided so far, including the point stipulated by the newest tutor data and student data, so the correction parameters $a_0$ through $a_N$ are stored in the correction parameter memory 146.

On the other hand, in the event that the magnitude of the error ε is greater than the threshold value S2, the point stipulated by the newest tutor data and student data is considered to relatively greatly deviate from the plane of the Expression (37) defined by the correction parameters $a_0$ through $a_N$ obtained in step S166, so in step S172, the judgment control unit 56 re-calculates the correction parameters $a_0$ through $a_N$ using only the newest tutor data and student data stored in the learning data memory 53.

Accordingly, in this case as well, learning is performed for the correction parameters $a_0$ through $a_N$ of the Expression (37) based on learning operating signals supplied according to operations made by the user, so operations of the user can be learned without the user knowing, and further, processing which is optimal for the user can be performed using the learning results.

Further, in this case, in the event that the error contained in the running direction output by the computing unit 93 (FIG. 16) is colored, the automobile can be made to perform auto-driving following the predetermined set course.

Also, with the processing unit 101 of the optimizing device 94 in FIG. 20, the correction parameters used in the correction processing (FIG. 6) performed at the correcting unit 21 are changed so that the actual driving direction of the automobile follows the set course, following the operations of the user made at the operating unit 98. That is, upon the user operating the operating unit 98 so that the driving direction of the automobile heads in the desired direction, learning is performed of correction parameters, with each of the driving directions θ immediately before and immediately after operating of the operating unit 98 output by the computing unit 43 (FIG. 16) as input signals, as student data and tutor data, respectively, thereby changing the correction parameters. The changed correction parameters are supplied to the correcting unit 21, the correction amount is calculated at the correcting unit 21 using the correction parameters, and correction processing (FIG. 22) is performed for the input signals depending on the correction amount. Accordingly, in the event that the user operates the operating unit 98, the correction parameters of the Expression (37) are changed by the operations of the user, so that the contents of the processing (correction processing) represented by Expression (37) also change as a matter of course, so it can be said that the "contents of processing" are being changed so that the driving direction desired by the user can be obtained, following operations of the user, with the processing unit 101 of the optimizing device 94 shown in FIG. 20, as well.

Further, with the optimizing device 94 in FIG. 20, in the event that sufficient learning pairs are not input from the user, or in the event that learning pairs capable of highly precise approximation are not input, the correction amount of input signals at the correcting unit 21 is made to be 0, and in the event that learning pairs capable of highly precise approximation are input from the user, correction of the input signals is performed by a correction amount obtained from correction parameters obtained by learning being performed using the learning pairs. That is, the algorithms for calculating weighting used for correction processing by the correcting unit 21 change between cases wherein sufficient numbers of learning pairs or learning pairs capable of precise approximation are not obtained, and cases wherein learning pairs capable of highly precise approximation are obtained.

Accordingly, with the processing unit 101 of the optimizing device 94 in FIG. 20, as well, the "contents of processing", and further, the "structure of processing", is also changed following user operations, whereby the automobile performs auto-driving in the driving direction following the set course.

Now, with the embodiment in FIG. 23 (as with the embodiments in FIG. 8 and FIG. 13), in step S170, the error E between the plane of the Expression (37) defined by the correction parameters $a_0$ through $a_N$ from the correction parameters calculating unit 145, and the point stipulated by the newest tutor data and student data, is obtained, and subsequent processing is performed, but an arrangement may be made wherein, in step S170, the error ε between the plane of the Expression (37) defined by the correction parameters $a_0$ through $a_N$ obtained in step S166 before multiple sets of recent tutor data and student data are supplied, and each of points stipulated by multiple sets of recent tutor data and student data, is obtained, and subsequent processing is performed based on the multiple errors ε.

Note that the processing unit 101 of the optimizing device 94 in FIG. 16 may be configured to use the processing unit 11 of the optimizing device 1 shown in FIG. 10, for example, besides those shown in FIG. 17 and FIG. 20.

Figure 24:
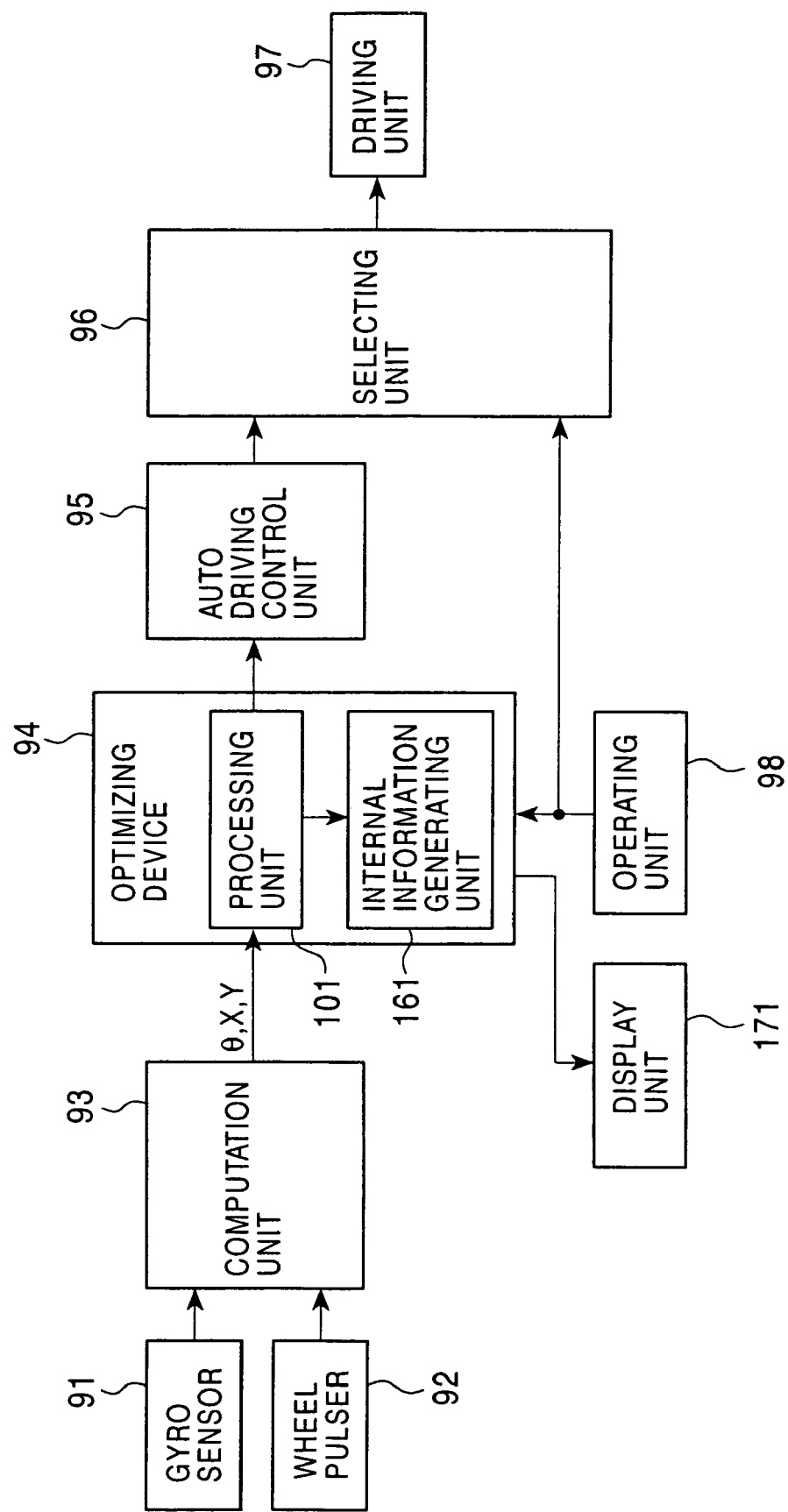
FIG. 24 is a block diagram illustrating another configuration example of an auto-driving device to which the present invention has been applied.

Next, FIG. 24 illustrates a configuration example of another embodiment of an auto-driving device to which he optimizing device shown in FIG. 1 has been applied. Note that in the figure, the parts corresponding to those in FIG. 16 are denoted by the same reference numerals, and description thereof will be omitted where appropriate in the following. That is to say, the auto-driving device shown in FIG. 24 is configured in the same way as that shown in FIG. 16, other than having an internal information generating unit 161 newly provided to in the optimizing device 94, and further having a display device 171 newly provided.

In the same way as the interval information generating unit 171 in FIG. 14, the internal information generating unit 161 reads out the internal information from the processing unit 1, converts this into image information, and outputs to the display unit 171. The display unit 171 displays the interval information supplied from the internal information generating unit 161 in a predetermined display format.

In the embodiment shown in FIG. 24, the processing unit 101 can be configured as shown in FIG. 17 are FIG. 20. In the event that the processing unit 101 shown in FIG. 24 is configured in the same way as that shown in FIG. 17, the same processing as that in FIG. 17 is performed except for the correction parameter computing processing. Now, the correction parameter computing processing which the processing unit 101 shown in FIG. 24 performs when configured as shown in FIG. 17, will be described with reference to the flowchart in FIG. 25.

With steps S191 through S197, the same processing as that in each of steps Sill through S117 in FIG. 18 is performed.

Following the processing in step S197, the flow proceeds to step S198, and interval information is displayed to the display unit 171. That is, more specifically, for example, the internal information generating unit 161 reads out the weight W stored in the weighting memory 31 (FIG. 17) as internal information, converts this into image signals which can be displayed on the display unit 171, and outputs and displays (presents) on the display unit 171. Following the processing step S198, the flow returns to step Sill, and subsequently, the same processing is repeated.

Figure 25:
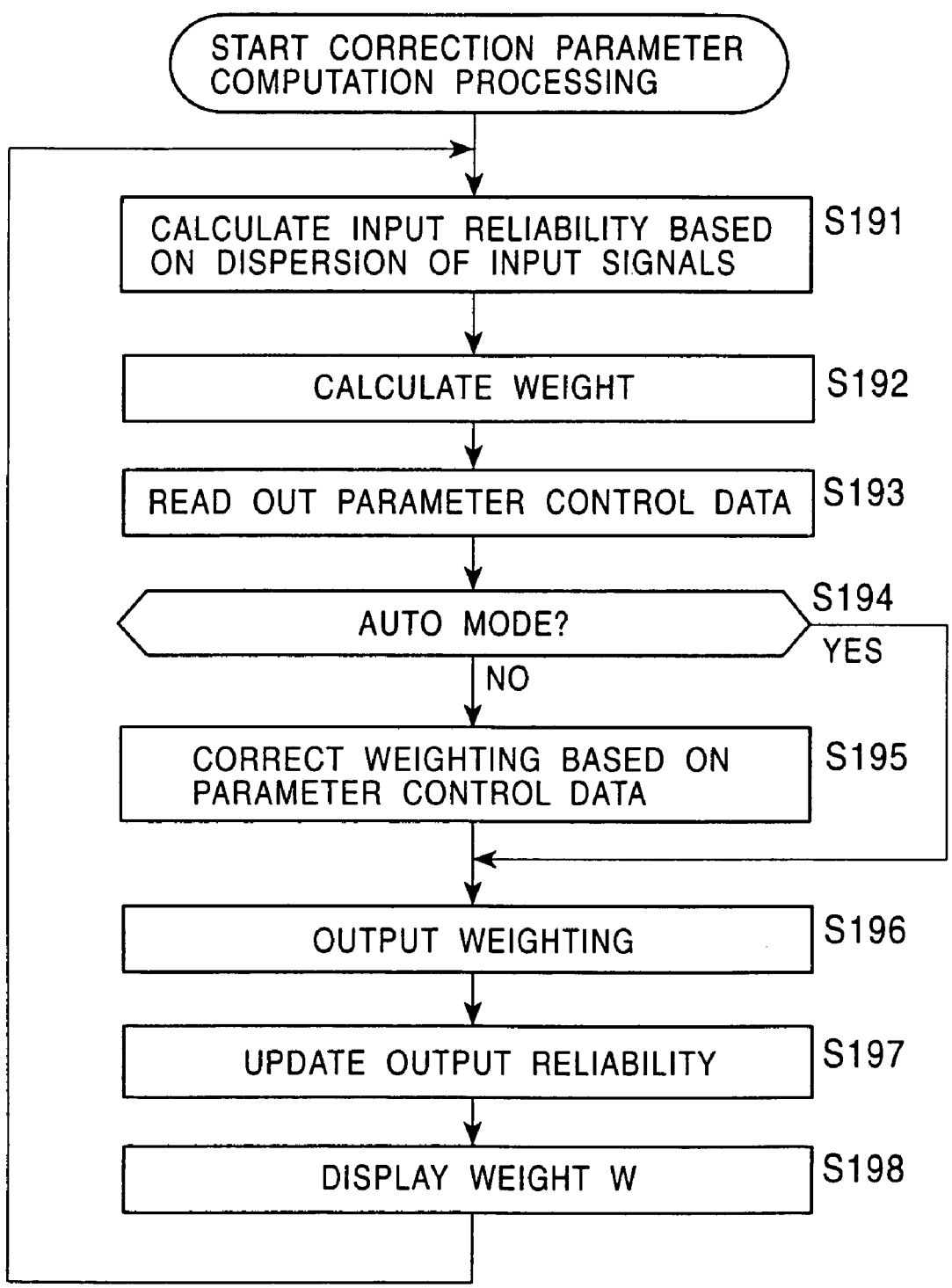
FIG. 25 is a flowchart describing correction parameter computing processing by the optimizing device shown in FIG. 24.

Due to the processing described with the flowchart in FIG. 25, the weight W which is internal information regarding the processing of the processing unit 101 is displayed (presented) on the display unit 171, and consequently, the user can operate the operating unit 98 while watching the display, so that optimal auto-driving is performed.

Also, in the above-described case, the weight W is displayed, but other internal information may be displayed (presented) on the display device 171 with this internal information generating unit 161, for example, parameter control data a and b can be read out from the parameter control data memory 37 and displayed. Also, an arrangement may be made wherein the weight selected by the selecting unit 41 is weight obtained from the parameter control data a and b obtained by learning being performed using learning pairs, or weight obtained from the input reliability or output reliability.

Next, in the event that the processing unit 101 of FIG. 24 is configured as shown in FIG. 20, processing the same as that performed in FIG. 20 is performed except for the correction parameter learning processing. Now, correction parameter learning processing in the case that the processing unit 101 shown in FIG. 24 is configured as shown in FIG. 20, will be described, with reference to the flowchart shown in FIG. 26.

In steps S211 to S223, processing the same as that in each of steps S161 through S172 in FIG. 23 is performed.

Figure 27:
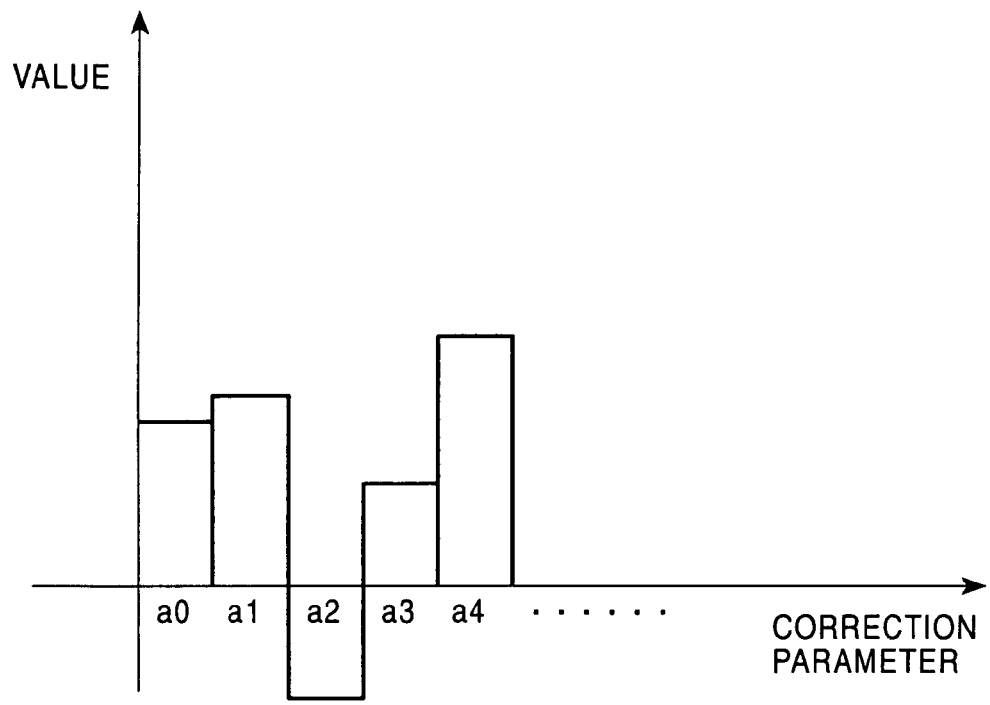
FIG. 27 is a diagram illustrating an example of internal information generated by the internal information generating unit shown in FIG. 24.
Figure 28:
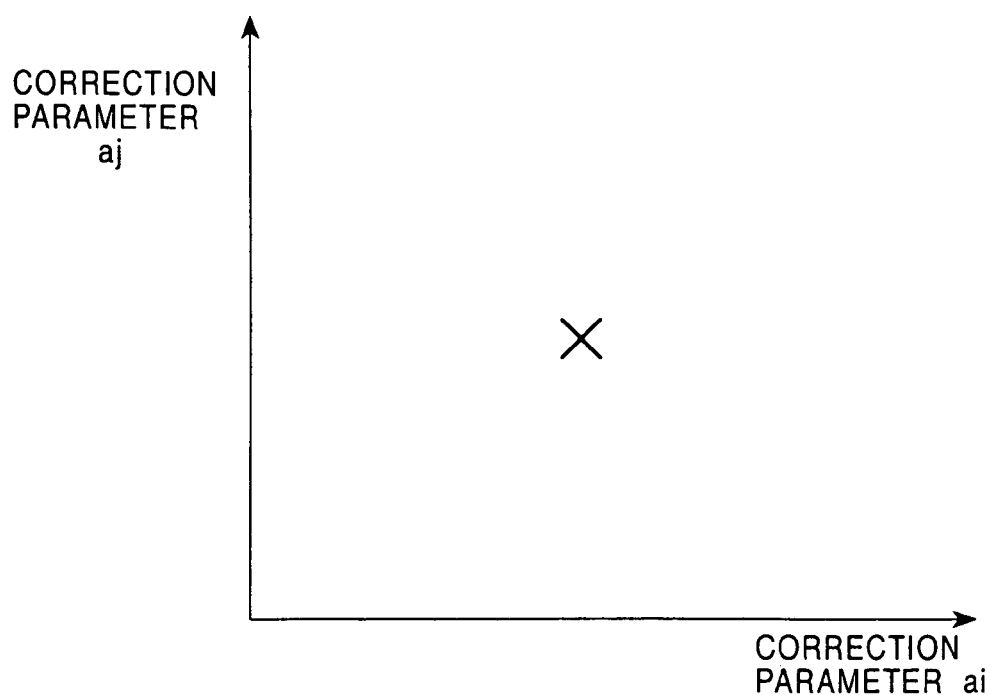
FIG. 28 is a diagram illustrating an example of internal information generated by the internal information generating unit shown in FIG. 24.

Following the processing in step S219 and step S223, the flow proceeds to step S224, where, for example, the internal information generating unit 161 reads out the correction parameters $a_0$ through $a_N$ stored in the correction parameter memory as internal information, converts this into image signals that can be displayed on the display unit 171, and displays on the display unit 171. At this time, the correction parameters $a_0$ through $a_N$ configured of multiple parameters, another arrangement may be made wherein a display is-made in the form of a bar graph, for example, with parameters as the horizontal axis and the values as the vertical axis, as shown in FIG. 27. Also, as shown in FIG. 28, for example, the correction parameters $a_0$ through $a_N$ may be displayed with two arbitrary correction parameters $a_i$ and $a_j$ as the horizontal axis and vertical axis, respectively. Further, the arrangement may be made wherein the correction parameters to use as the horizontal axis and vertical axis may be selected by the user.

Subsequently, the flow returns to step S211, and subsequently, the same processing is repeated.

As described above, due to the correction parameter processing described with reference to the flowchart in FIG. 26, the correction parameters $a_0$ through $a_N$ are displayed, whereby the correction parameters $a_0$ through $a_N$ are displayed as internal information with the processing unit 101 of the optimizing device 94 shown in FIG. 24, so consequently, the user can operate the operating unit 98 while watching the display, so that optimal auto-driving is performed.

Further, with the internal information generating device 161, internal information other than the correction parameters $a_0$ through $a_N$ may be displayed.

Figure 26:
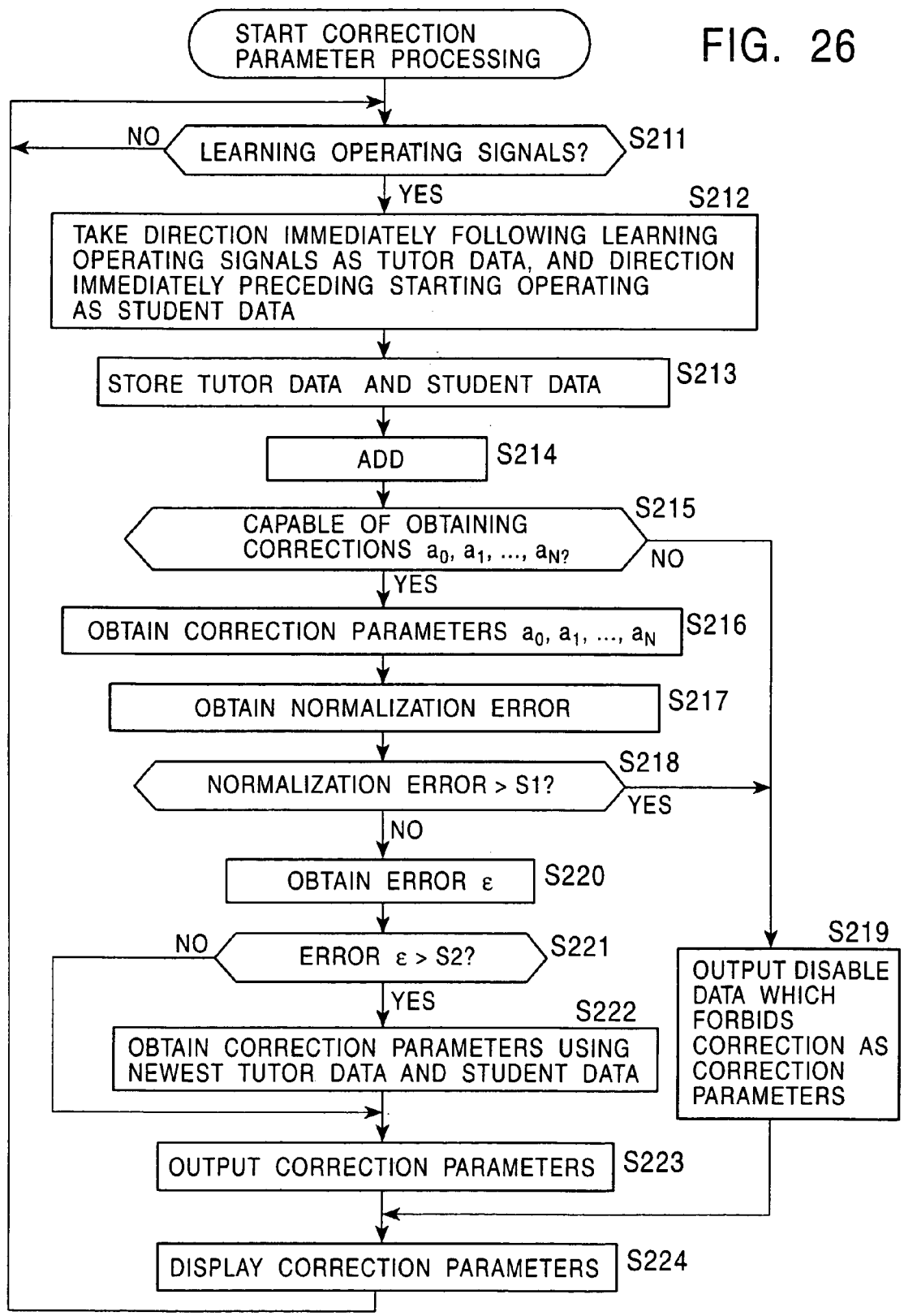
FIG. 26G is a flowchart describing correction parameter learning processing by the optimizing device shown in FIG. 24.

Also, in the embodiment shown in FIG. 26, in the event that the flow proceeds to step S224 following the processing in step S219, the correction parameters $a_0$ through $a_N$ serving as the internal information are displayed as being 0.

Figure 29:
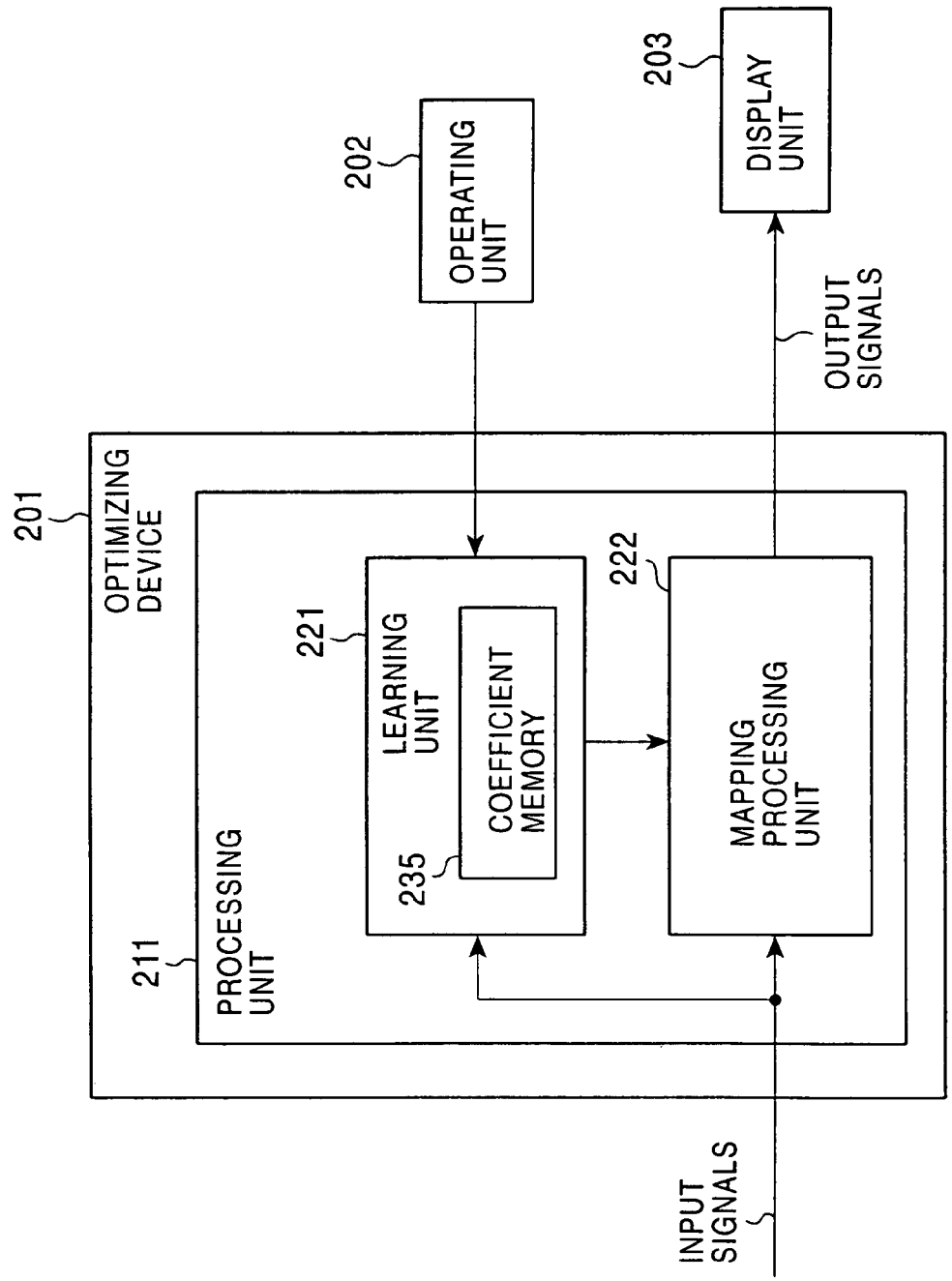
FIG. 29 is a block diagram illustrating a configuration example of another embodiment of an optimizing device to which the present invention has been applied.

Next, an optimizing device 201 as another embodiment of the optimizing device shown in FIG. 1 will be described with reference to FIG. 29. The optimizing device 201 is configured of a processing unit 211, and is for removing noise from image signals and the like, for example serving as input signals, and optimizing displayed image signals. Now, in this example, image signals will be described as an example of as primary input signals, the signals are not restricted to image signals, and may be other signals as well.

The processing unit 211 is configured of a learning unit 221 and a mapping processing unit 222. Operating signals are supplied to the learning unit 221 of the processing unit 211 from the operating unit 202, and the learning unit 221 learns coefficient sets necessary for the processing with the mapping processing unit 222 based on the operating signals, and stores these in the coefficient memory 235. As for the norm of learning of learning unit 211 (learning norm), for example, the least-N'th-power error method (least-N'th-power method) may be used. The least-N'th-power error method will be described later.

The mapping processing unit 222 performs mapping processing for mapping (converting) the input signals to predetermined output signals. That is, the mapping processing unit 222 takes, of the image signals serving as output signals, a pixel yet to be obtained as a pixel of interest, extracts that tap (at least one or more pixel necessary for processing, also referred to as a sample) corresponding to the pixel of interest from the image signals which are input signals, and executes the sum of products computing processing of coefficient sets stored in the coefficient memory 235, thereby obtaining the pixel of interest. The mapping processing unit 222 performs processing (mapping) the same as with pixels making up the image signals serving as output signals, generates image signals serving as output signals thereby which are output to the display unit 203, and displayed.

The operating unit 202 is operated by the user, and supplies operating signals corresponding to the operations, to the learning unit 221. The display unit 203 displays pixel signals as output signals output by the mapping processing unit 202.

Next, a detailed configuration of the learning unit 221 shown in FIG. 29 will be described, with reference to FIG. 30. The tutor data generating unit 231 generates tutor data serving as a tutor for learning, from input signals, and outputs this to a least-N'th-power error coefficient computing unit 234. The student data generating unit 232 generates student data serving as a student for learning from the input signals, and outputs this to a prediction tap extracting unit 233. This tutor data and student data is generated, for example, by the tutor data 231 performing no processing with the input signals, or by the student data generating unit 232 causing deterioration of input data by a predetermined thinning-out processing or LPF (Low Pass Filter) or the like, etc., and is not restricted to the above-described configuration as long as student data is generated as that which is deteriorated with regard to the tutor data. Accordingly, besides that described above, for example, in the event that the tutor data generating unit 231 subjects the input signals to predetermined thinning-out or LPF processing, it is sufficient for the student data generating unit 232 to perform thinning-out or LPF processing to a degree greater than that performed by the tutor data generating unit 231. Also, an arrangement may be made wherein the input signals are used without change as tutor data, and input signals with noise superimposed thereupon is used as student data.

The prediction tap extracting unit 233 then sequentially takes pixels configuring the image signals serving as tutor data as pixels of interest, extracts at least one or more pixels (taps) in a predetermined positional relation with pixel of interest as a prediction tap from image signals serving as student data, and outputs this to the least-N'th-power error coefficient computing unit 234.

The least-N'th-power error coefficient computing unit 234 computes coefficient sets from the prediction tap and tutor data by least-N'th-power error, based on the operating signals representing information specifying the value of the exponent N necessary for the least-N'th-power error coefficient computing processing input from the operating unit 202, outputs this to the coefficient memory 235, and stores (performs overwriting storing as suitable).

The coefficient memory 235 stores the coefficient sets supplied from the least-N'th-power error coefficient computing unit 234, and outputs this to the mapping processing unit 222 where appropriate.

Next, the configuration of the mapping processing unit 222 in FIG. 29 will be described with reference to FIG. 31. The tap extracting unit 251 of the mapping processing unit 222 configures a prediction tap with the same tap configuration as that configured by the prediction tap extracting unit 233 shown in FIG. 30 by sequentially extracting pixels configuring image signals serving as output signals as pixels of interest from image signals serving as input signals, as prediction taps of (the pixel value of) pixels in a predetermined positional relation with pixels of interest, and outputs this to the sum of products computing unit 252. The sum of products computing unit 252 generates pixels of interest by performing the sum of products computation between the values of extracted prediction taps (pixels) input from the tap extracting unit 251, and coefficient sets stored in the coefficient memory 235 of the learning unit 221, and outputs this to the display unit 203 (FIG. 29).

Figure 32:
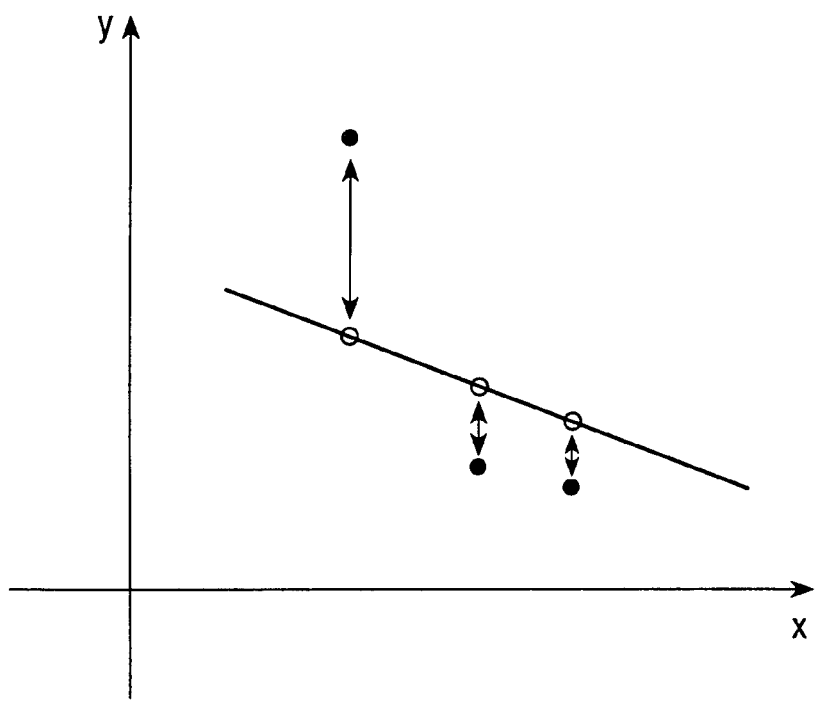
FIG. 32 is a diagram describing error between a true value and a prediction value.

Now, coefficient computation by least-N'th-power error performed by the least-N'th-power error coefficient computing unit 234 shown in FIG. 30 will be described. A case wherein the exponent N=2 in the least-N'th-power error method is commonly referred to as the least-square error method (least-square-power error method). That is to say, in a case wherein tutor data serving as a pixel of interest is represented by y, an M number of pieces of student data configuring a prediction tap by xi (i=1, 2, . . . , M), and a predetermined M number of coefficients as $w_i$, respectively, and the prediction value y' of the tutor data y is a linear combination (sum of products computation) $w_1 x_1 + w_2 x_2 + \ldots + w_M x_M$ of a prediction tap $x_i$ and a predetermined coefficient $w_i$, a coefficient set $w_1, w_2, \ldots, w_M$ which minimizes, as shown in FIG. 32, the sum of the square of the error between the tutor data y indicated by black dots and the prediction values y' indicated by white dots (in the absolute value of difference between the true value y serving as tutor data, and the prediction error y' thereof, indicated by arrows in the figure), is obtained.

In the event of changing the value of the exponent N in least-N'th-power error, the error of a prediction value y' with great error greatly affects the sum of the N'th-power error in the event that the exponent N is great, for example, so consequently, with the least-N'th-power error method, coefficients in the direction of whereby a such a prediction value y' with a great error is saved (coefficients whereby the error of the prediction value y' with a great error is reduced) is obtained. However, the error of a prediction value y' with little error has little effect on the sum of the N'th-power, and is not given much consideration, and consequently tends to be ignored. Conversely, in the event that the exponent N is small, the error of a prediction value y' with great error affects the sum of the N'th-power less than cases wherein the exponent N is great, and the error of a prediction value y' with little error affects the sum of the N'th-power even less. Consequently, according to the least-N'th-power error method, coefficients in the direction of reducing the error of the prediction value with small error is obtained in comparison with cases wherein the exponent N is great.

Note that the change in effect which the error of the prediction value y' has on the sum of the N'th-power error is due to the error of the prediction value y' to the N'th power, which may hereafter be referred to as the nature of N'th-power error.

As described above, there is a qualitative tendency of coefficient sets obtained with least-N'th-power from the exponent N, so coefficient sets for executing mapping processing suiting the preferences of the user can be obtained by changing the exponent N to obtain coefficient sets with the least-N'th-power method (coefficient sets which makes the output signals mapped with regard to the input signals, to be those preferred by the user). However, in reality, it is extremely difficult to compute coefficient sets which minimize the sum of the N'th-power error of a prediction value y', with the method other than least-N'th-power error, i.e., a method wherein the exponent is other than N=2.

Now, the reason why computing coefficient sets which minimize the sum of the N'th-power error of the prediction value y' with methods other than least-square-power error will be described.

The sum of the error of the prediction value y' to the N'th-power (the sum of the N'th-power error) can be represented by Expression (38).

[Expression 38] (38)

$$E = \sum_{sample} e^N$$

Here, E indicates the sum of the number of samples of the N'th power of the error e between the true value y serving as tutor data and the prediction value y'.

On the other hand, with the present embodiment, as described above, the prediction value y' of the true value y is defined by a linear combination of the prediction tap $x_i$ and a predetermined coefficient wi, i.e., as with the following Expression (39).

[Expression 39] (39)

$$Y' = w_1 x_1 + w_2 x_2 + \ldots + w_M x_M = \sum_{i=1}^{M} w_i x_i$$

Now, the coefficients $w_1, w_2, w_3, \ldots, w_M$, may hereafter be referred to as prediction coefficients. A set of the prediction coefficients is the coefficients set stored in the coefficient memory 235 shown in FIG. 30. Also, for the prediction taps $x_1, x_2, x_3, \ldots, x_M$, pixels close space-wise or time-wise to the position of the image serving as student data corresponding to the pixel (true value) y of the image serving as tutor data, can be employed.

In this case, the error e in Expression (38) can be represented by the following Expression (40).

[Expression 40] (40)

$$e = |y - y'| = \left| y - \sum_{i=1}^{M} w_i x_i \right|$$

With the least-N'th-power error method, there is the need to obtain the prediction coefficients $w_1, w_2/w_3, \ldots, w_M$ which minimize the sum E of the N'th-power error indicated in the following Expression (41) and Expression (42) yielded from Expression (40). Note that Expression (41) is an expression indicating the sum E in the event that the exponent N is an odd number, and Expression (42) is an expression indicating the sum E in the event that the exponent N is an even number.

[Expression 41] (41)

$$E = \sum_{sample} e^N = \sum_{sample} \left| y - \sum_{i=1}^{M} w_i x_i \right|^N$$

[Expression 42] (42)

$$E = \sum_{sample} e^N = \sum_{sample} \left| y - \sum_{i=1}^{M} w_i x_i \right|^N = \sum_{sample} \left( y - \sum_{i=1}^{M} w_i x_i \right)^N$$

Figure 33:
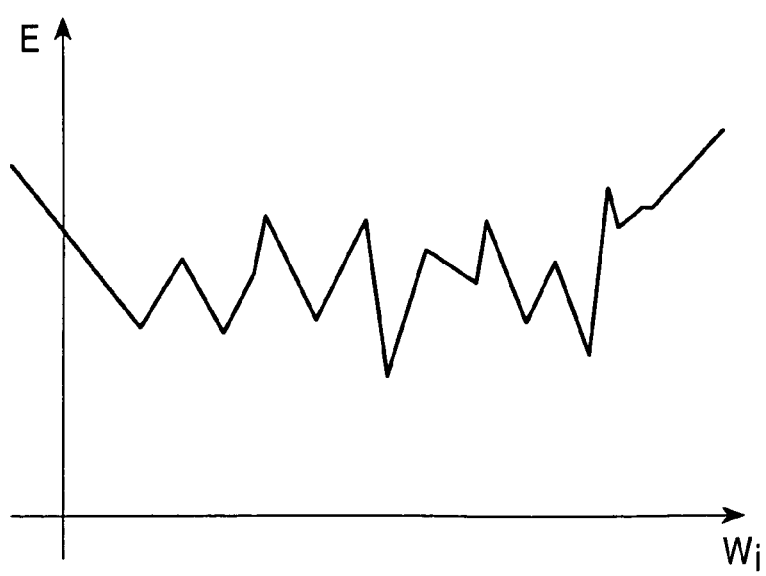
FIG. 33 is a diagram describing the least-N'th-power error method.

Now, in the case of Expression (41), that is, in the event that the exponent N is an odd number, the sum E is the same value regardless of the notation of the difference y–y' if the sum of the magnitude of the difference y–y' between the true value y and the prediction value y' is the same value, and consequently, the prediction coefficients $w_1, w_2, w_3, \ldots, w_M$ which minimize the sum E cannot be obtained. That is to say, the sum E is a function containing absolute values, and is, for example a function such as shown in FIG. 33. Accordingly, the prediction coefficients $w_1, w_2, w_3, \ldots, w_M$ which minimize the sum E cannot be obtained except by a full search. FIG. 33 represents the change of a prediction coefficient $w_i$ and the sum E in the event that the exponent N=1.

On the other hand, in the case of Expression (42), i.e., in the event that the exponent N is an even number, the sum E always satisfies $E \geq 0$, so as indicated in the following Expression (43), the minimal value can be obtained by setting an expression wherein the sum E in Expression (42) subjected to partial differentiation by the prediction coefficients $w_i$ is 0.

[Expression 43] (43)

$$\frac{\partial E}{\partial w_i} = \sum_{sample} N \left( y - \sum_{j=1}^{M} w_j x_j \right)^{N-1} \cdot (-x_i)$$

$$= -N \sum_{sample} x_i \left( y - \sum_{j=1}^{M} w_j x_j \right)^{N-1}$$

$$= 0$$

Accordingly, from Expression (43), the solution, i.e., the prediction coefficients $w_1, w_2, w_3, \ldots, w_M$ which minimize the sum E of the N'th-power error, can be obtained by solving the expression indicated in the following Expression (44).

[Expression 44] (44)

$$\sum_{sample} x_i \left( y - \sum_{j=1}^{M} w_j x_j \right)^{N-1} = 0, (i = 1, 2, \ldots, M)$$

With regard to this Expression (44), in the event that the exponent N=2 for example, i.e., in the event of obtaining the solution with the so-called least-square error method, substituting 2 for the exponent N in Expression (44) and solving the following Expression (45) is sufficient.

[Expression 45] (45)

$$\sum_{j=1}^{M} \sum_{sample} x_i x_j w_j = \sum_{sample} x_i y, (i = 1, 2, \ldots, M)$$

As shown in the following. Expression (46), the expression in Expression (45) can be represented in the form of a matrix expression, and is called a normal equation. Also, in the event that the exponent N=2, the minimal value of the sum E is uniquely determined, and the smallest value thereof is the minimal value of the sum E. If a system of linear equations of a number equal to the number of the prediction coefficients $w_1, w_2, w_3, \ldots, w_M$ (M in this case) is configured from the normal expression in Expression (45), the system of linear equations can be solved by the Cholesky method or the like, for example, and the prediction coefficients $w_1, w_2, w_3, \ldots, w_M$ can be obtained.

[Expression 46] (46)

$$\begin{pmatrix} \sum_{sample} x_1 x_1 & \sum_{sample} x_1 x_2 & \cdots & \sum_{sample} x_1 x_M \\ \sum_{sample} x_2 x_1 & \sum_{sample} x_2 x_2 & \cdots & \sum_{sample} x_2 x_M \\ \vdots & \vdots & \vdots & \vdots \\ \sum_{sample} x_M x_1 & \sum_{sample} x_M x_2 & \cdots & \sum_{sample} x_M x_M \end{pmatrix} \begin{pmatrix} w_1 \\ w_2 \\ \vdots \\ w_M \end{pmatrix} = \begin{pmatrix} \sum_{sample} y x_1 \\ \sum_{sample} y x_2 \\ \vdots \\ \sum_{sample} y x_M \end{pmatrix}$$

Also, in order to solve the normal equation in Expression (46), it is necessary that the matrix having the sum of the product of prediction taps $x_i x_j$ (E$x_i x_j$) at the left-hand side of the Expression (46) as a component is regular.

In the event that the exponent N is an even number and also is 4 or more, the Expression (42) can be expressed as shown in the following Expression (47).

[Expression 47] (47)

$$\sum_{r=0}^{N-1} \sum_{example} x_i \cdot (-1)^r \cdot {}_{N-1}C_r \cdot y^{N-1-r} \cdot \left(\sum_{j=1}^{N} w_j x_j\right)^r = 0,$$

$(i = 1, 2, \ldots, M)$

With the expression shown in Expression (47), this forms a system of equations of a high order, so the prediction coefficients $w_1, w_2, w_3, \ldots, w_M$ cannot be obtained by solving a system of linear expressions as with the case wherein the exponent N is N=2.

As described above, in the event that the exponent N is other than N=2, the prediction coefficients $w_1, w_2, w_3, \ldots, w_M$ which minimize the sum of N'th-power error indicated in Expression (38) generally cannot be readily obtained.

Accordingly, the least-N'th-power error coefficient computing unit 234 of the learning unit 221 computes the prediction coefficients by the following two least-N'th-power error methods. Which of the two least-N'th-power error methods to employ can be specified by, for example, the user operating the operating unit 202 (FIG. 29).

First, a first method (hereafter also referred to as the direct technique) will be described. As indicated in the following Expression (48), the sum E wherein the item of the error $e^2$ has been multiplied by the weight $\alpha_s$ is defined as the sum of the N'th-power error instead of the Expression (38).

[Expression 48] (48)

$$E = \sum_{example} e^N = \sum_{sample} \alpha_s e^2$$

That is, the $e^N$ which is error to the N'th power is defined by the product of the weight $\alpha_s$ and the error squared $e^2$.

In this case, the prediction coefficients $w_1$, through $w_M$ which minimize the sum E of N'th-power error in Expression (48) can be obtained by making the weight $\alpha_s$ in Expression (48) to be a function of the prediction value y' obtained by the linear expression in Expression (39), from the prediction coefficients $w_1, w_2, w_3, \ldots, w_M$ obtained in the event that the exponent N is N=2 as shown in the following Expression (49), for example.

[Expression 49]

$\alpha_s = f(y')$ (49)

While various function can be conceived for the weight $\alpha_s$, there is the need to employ a function wherein the error to the N'th power $e^N = \alpha_s e^2$ defined in Expression (48) satisfies the above-described nature of the N'th-power error, and the function shown in the following Expression (50), for example, can be employed.

[Expression 50]

$\alpha_s = a x_s^c + b$ (50)

Figure 34:
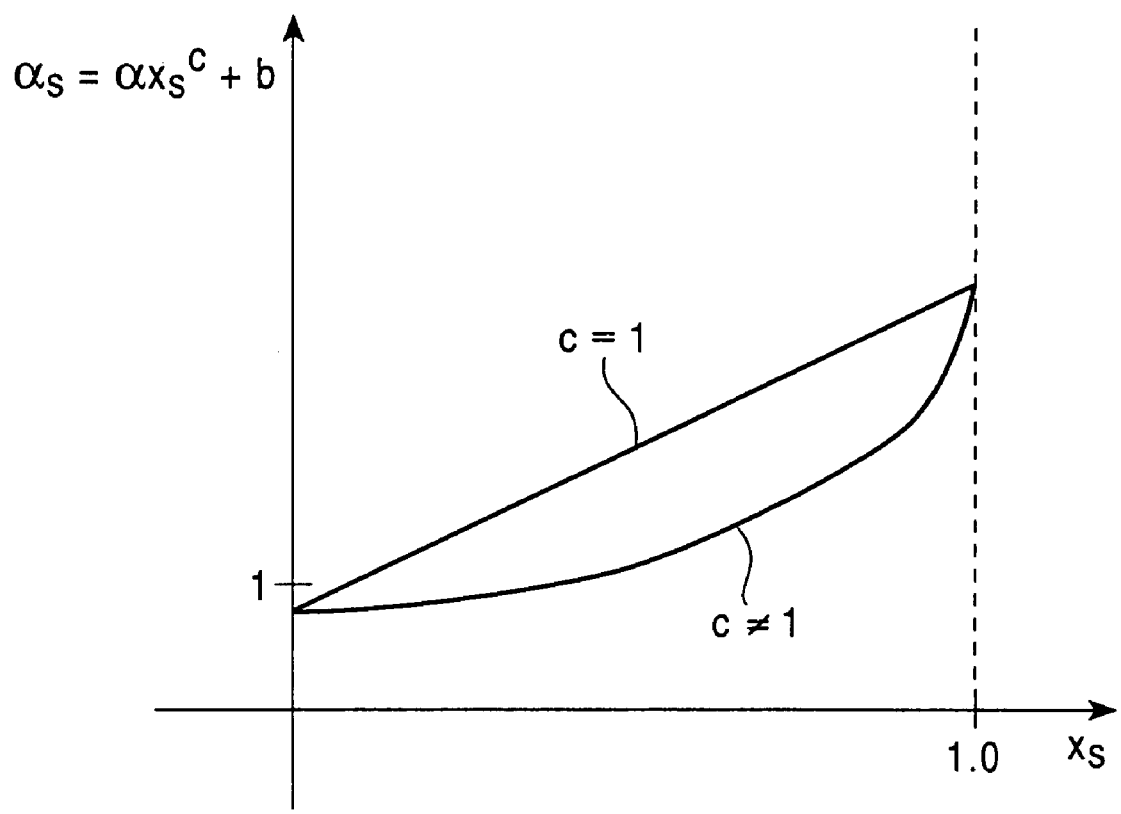
FIG. 34 is a diagram describing weight $\alpha_s$.

Now, $x_s$ represents a value wherein the error of the prediction value y' computed by Expression (39) from the prediction coefficients $w_1$, through $w_M$ obtained by least-square error (hereafter may be referred to as error from least-square norm) is normalized to a range of 0 through 1.0, and the weight $\alpha_s$ in the Expression (50) defined with the error $x_s$ of the prediction value y' is as shown in FIG. 34.

The coefficient a is an item for controlling the effect which the error $x_s$ from the least-square norm has on the N'th-power error $e^N$, and in the event that the coefficient a is a=0, the weight $\alpha_s$ is a horizontal line with an inclination of 0 in FIG. 34. In this case, the effect which the error $x_s$ from the least-square norm has on the N'th-power error $e^N$ is constant regardless of how large or how small the error $x_s$ from the least-square norm is, and the prediction coefficient $w_i$ which minimizes the sum E in Expression (48) logically is the same as that obtained by least-square error. Accordingly, making a=0 essentially realizes the least-square error method. Also, in the event that coefficient a >0 holds, the effect which the error $x_s$ from the least-square norm has on the N'th-power error $e^N$ in Expression (48) is greater the greater the error $x_s$ is, and is smaller the smaller the error $x_s$ is. On the other hand, in the event that coefficient a<0 holds, the effect which the error $x_s$ from the least-square norm has on the N'th-power error $e^N$ in Expression (48) is smaller the greater the error $x_s$ is, and is greater the smaller the error $x_s$ is.

That is to say, in the event that the coefficient a is positive, the N'th-power error $e^N$ in Expression (48) has the same nature as making the exponent N to be large, and in the event that the coefficient a is negative, this has the same nature as making the exponent N to be small. Accordingly, the N'th-power error $e^N$ in Expression (48) has the same nature as the N'th-power error $e^N$ in Expression (38), so prediction coefficients which minimize the sum E of the N'th power error in Expression (48) essentially is the prediction coefficients which minimize the sum E of the N'th power error in Expression (38).

Also, in the event that the coefficient a is 0, the least-square error is realized, as described above. That is, the exponent N is 2, but with cases wherein the coefficient a is positive, this makes for cases wherein the exponent N is N>2, and with cases wherein the coefficient a is negative, this makes for cases wherein the exponent N is N<2. This coefficient a greatly affects the exponent N in least-N'th-power error, as with the later-described coefficient c.

The coefficient b is a correction item, and the overall function value (weight $\alpha_s$) in FIG. 34 changes in the vertical direction according to the value of the coefficient b. Also, the coefficient b does not have that much of an effect on the exponent N with least-N'th-power error.

The coefficient c is an item which converts the scaling of the axes, i.e., an item which changes the way the weight $\alpha_s$ is appropriated to the error $x_s$ from the least-square norm, wherein the greater the value of the coefficient c is the more precipitous the change in the weight $\alpha_s$ is, and the smaller the value of the coefficient c is the gentler the change in the weight $\alpha_s$ is. Accordingly, the effect which the error $x_s$ from the least-square norm has on the N'th-power error $e^N$ in Expression (48) due to the coefficient c changing is the same as that of the coefficient a changing, so the N'th-power error $e^N$ in Expression (48) can be provided with the same nature as the N'th-power error $e^N$ in Expression (38) with the coefficient c, as well. That is to say, the exponent N of the least-N'th-power error can be affected by the coefficient c.

Note that the line in FIG. 34 indicates a case wherein c=1 and a>0 (b is arbitrary), and the curve in FIG. 34 indicates a case wherein c≠1 and a>0 (b is arbitrary).

The coefficients a, b, and c, which stipulate the weight as in Expression (50) may be changed by the user operating (setting) the operating unit 202, and the weight $\alpha_s$ in Expression (50) changes by changing the coefficients a, b, and c. This change in the weight $\alpha_s$ causes the $\alpha_s e^2$ in Expression (48) to essentially (equivalently) function as the error to the N'th power $e^N$ with regard to a predetermined exponent N, and consequently, the prediction coefficients which minimize the sum E of N'th-power error in Expression (50), i.e., the prediction coefficient $w_i$ of the norm by least-N'th-power error, to be obtained.

Also, with the above-described first method, variously changing the coefficients a, b, and c, which determine the weight $\alpha_s$ essentially changes the exponent N so as to obtain the prediction coefficients by least-N'th-power error, so the exponent N is not restricted to integers, and the prediction coefficients can be obtained in the event that the exponent N is another real number such as a decimal, e.g., wherein the exponent N=2.2.

Next, a second method for computing prediction coefficients by least-N'th-power error (hereafter also referred to as the recursive method) will be described. With the first method, the squared error $e^2$ multiplied by the weight $\alpha_s$ is employed as the N'th-power error as shown in Expression (48), but with the second method, a solution obtained with lower order least-N'th-power error is used, and a solution by higher order least-N'th-power error can be obtained with a recursive technique.

That is, the prediction coefficient wi which minimizes the sum E of square-error in the following Expression (51) can be obtained with the least-square error method as described above, with the prediction value y' computed by the Expression (39) using the prediction coefficient $w_i$ obtained by this least-square error being represented by $y_1$ (hereafter may be referred to as prediction value from least-square norm).

[Expression 51]

$$E=\Sigma e^2 \qquad (51)$$

Next, let us consider a sum E of a cubic error expressed in the following Expression (52), for example.

[Expression 52]

$$E=\Sigma|e|^3=\Sigma(|y-y_1|)e^2 \qquad (52)$$

Obtaining the prediction coefficient $w_i$ which minimizes the sum E of the cubic-error in Expression (52) means obtaining a solution by least-cubic error, wherein the cubic-error $|e^3|$ is expressed in the form of the product of the square-error $e^2$ and the error $|y-y_1|$ between the prediction value $y_1$ from the least-square norm and the true value y, as shown in Expression (52). The $|y-y_1|$ in Expression (52) can be obtained as a constant, so the prediction coefficient $w_i$ which minimizes the sum E of the cubic-error in Expression (52) can actually be obtained by least-square error.

In the same way, let us consider a sum E of a biquadrate error expressed in Expression (53).

[Expression 53]

$$E=\Sigma e^4=\Sigma(|y-y_2|)^2 e^2 \qquad (53)$$

Obtaining the prediction coefficient $w_i$ which minimizes the sum E of the biquadrate-error in Expression (53) means obtaining a solution by least-biquadrate error, wherein, with the prediction value y' computed by Expression (39) using the prediction coefficient $w_i$ which minimizes the sum E of the cubic-error in Expression (529) being represented by $y_2$ (hereafter may be referred to as prediction value from least-cubic norm), the biquadrate-error $e^4$ can be expressed in the form of the product of the square-error $e^2$ and the squared error $|y-y_2|^2$ between the prediction value $y_2$ from the least-cubic norm and the true value y (hereafter may be referred to as square-error from least-cubic norm), as shown in Expression (53). The squared error $|y-y_2|^2$ from the least-cubic norm in Expression (53) can be obtained as a constant, so the prediction coefficient $w_i$ which minimizes the sum E of the biquadrate-error in Expression (53) can actually be obtained by least-square error.

This is also true for the following Expression (54).

[Expression 54]

$$E=\Sigma|e|^5=\Sigma(|y-y_3|)^3 e^2 \qquad (54)$$

Obtaining the prediction coefficient $w_i$ which minimizes the sum E of the fifth-power-error in Expression (54) means obtaining a solution by least-fifth-power error. With the prediction value y' computed by Expression (39) using the prediction value $w_i$ which minimizes the sum E of the biquadrate-error in Expression (53) being represented by $y_3$ (hereafter may be referred to as prediction value from least-biquadrate norm), the fifth-power-error $e^5$ can be expressed in the form of the product of the square-error $e^2$ and the cubed error $|y-y_3|^3$ between the prediction value $y_3$ from the least-biquadrate norm and the true value y (hereafter may be referred to as cubic-error from least-biquadrate norm), as shown in Expression (54). The cubed error of the least-biquadrate norm in Expression (54) can be obtained as a constant, so the prediction coefficient $w_i$ which minimizes the sum E of the fifth-power-error in Expression (54) also can actually be obtained by least-square error.

The solution (prediction coefficient $w_i$) can also be obtained in the same manner with cases of least-N'th power error wherein the exponent N is 6 or a higher order.

As described above, with the second method, a prediction value computed using a prediction coefficient obtained with lower order least-N'th-power error is used to obtain a solution of higher order least-N'th-power error, and this is recursively repeated, thereby obtaining a solution with higher order least-N'th-power error. Note that with the above-described case, the solution from least-N'th-power error is obtained using a prediction value computed using a prediction coefficient obtained by N-1'th-power error which is lower thereby by just the order of 1, but the solution by least-N'th-power error may be obtained using a prediction value computed using a prediction coefficient obtained by least-N'th-power error of an arbitrary order lower than that. That is, in the case of Expression (53), $|y-y_1|$ may be used instead of $|y-y_2|$, and in the case of Expression (54), $|y-y_2|$ or $|y-y_1|$ may be used instead of $|y-y_3|$.

Also, in the second method, the N'th-power-error $e^N$ can be expressed in the form of the product of the square-error $e^2$ and the N-2'th-power error $|y-y'|^{N-2}$, so as with the first method, a solution can be obtained by least-N'th error with an arbitrary exponent N, e.g., wherein the exponent N=2.2.

Next, the image optimizing processing with the optimizing device 201 in FIG. 29 will be described with reference to the flowchart in FIG. 35. This image optimizing processing is made up of learning processing and mapping.

In the learning processing, in Step S230, the judgment is made regarding whether or not the user has operated the operating unit 202, and in the event that judgment is made that this has not been operated, the flow returns to Step S230. Also, in Step S230, in the event that judgment is made the operating unit 202 has been operated, the flow proceeds to Step S231.

In Step S231, the tutor data generating unit 231 of learning unit 221 generates tutor data from the input signals and outputs this to the least-N'th-power error coefficient computing unit 234, while the student data generating unit 232 generates student data from the input signals and outputs this to the prediction tap extracting unit 233, and the flow proceeds to Step S232.

Now, as for data used for generating the student data and tutor data (hereafter may be referred to as learning data), input signals input to a point back in time from the current time by a predetermined amount of time may be employed, for example. Also, for the learning data, an arrangement may be made wherein dedicated data is stored beforehand, instead of using input signals.

In Step S232, with each piece of tutor data as pixel of interest, the prediction tap extracting-unit 233 generates prediction tap from the student data input by the student data generating unit 232 with regard to each pixel of interest, and outputs this to the least-N'th-power error coefficient computing unit 234, and the flow proceeds to Step S233.

In Step S233, the least-N'th-power error coefficient computing unit 234 judges whether or not operating signals specifying computation of a coefficient set by least-N'th-power error with the recursive method (second method) has been input by the operating unit 202, and in the event that, for example, the operating unit 202 has been operated by the user and a method which is not the recursive method has been specified, i.e., the direct method (first method), the flow proceeds to Step S234, where the judgment is made regarding whether or not coefficients a, b, and c, which specify the weight $\alpha_s$ in Expression (50) (specify the exponent N), the processing is repeated until there is input thereof, and in the event that judgment is made that, for example, the operating unit 202 has been operated by the user and the values specifying the coefficients a, b, and c, have been input, the processing proceeds to Step S235.

In Step S235, the least-N'th-power error coefficient computing unit 234 essentially solves the problem of minimizing the above-described Expression (48) in the state of the coefficients a, b, and c with the weight $\alpha_s$ input by the least-square error method, thereby obtaining the prediction coefficients $w_1, w_2, w_3, \ldots, w_M$, has a solution with least-N'th-power error for the exponent N corresponding to the weight $\alpha_s$, i.e., a coefficient set, and stores this in the coefficient memory 235, and the flow returns to Step S230.

On the other hand, in Step S213, in the event that judgment is made that the recursive method has been selected, the processing proceeds to Step S236.

In Step S236, the least-N'th-power error coefficient computing unit 234 judges whether or not information specifying the exponent N has been input, repeats the processing until the exponent N is input, and in the event that judgment is made that information specifying the exponent N has been input by the user operating the operating unit 202, for example, the processing proceeds to Step S237.

In Step S237, the least-N'th-power error coefficient computing unit 234 obtains the coefficient set by an algebraic approach using the basic least-square error method. In Step S238, the least-N'th-power error coefficient computing unit 234 uses a prediction value obtained by the coefficient set obtained by least-square-error, obtains the coefficient set by a least-N'th-power error input from the operating unit 202 corresponding to the exponent N recursively, as described with reference to Expression (51) through Expression (54), which is stored in the coefficient memory 235, and the flow returns to Step S231.

Next, with the mapping processing, in Step S241, with a frame of an image serving as output signals corresponding to an image frames serving as current input signals, as a frame of interest, the tap extracting unit 251 of the mapping processing unit 222 takes, of pixels of the frame of interest, those which have not yet been the pixel of interest, in raster scan order, for example, extracts a prediction tap from the input signals for that pixel of interest, and outputs this to the sum of products computing unit 252.

Then, in Step S242, the sum of products computing unit 252 reads out prediction coefficients of the coefficient memory 235 of the learning unit 221, and executes sum of products computing processing between the prediction tap input from the tap extracting unit 251 and the prediction coefficient read out from the coefficient memory 235, following the Expression (39). Thus, the sum of products computing unit 252 obtains the pixel value (prediction value) for the pixel of interest. Subsequently, the flow proceeds to Step S243, where the tap extracting unit 251 judges whether or not all pixels have been made the pixel of interest in the frame of interest, and in the event that judgment is made that there are some that have not, the flow returns to Step S241, and the same processing is repeated with pixels in the frame of interest which have not yet been made the pixel of interest, being made the new pixel of interest, in raster scan order.

Also, in Step S243, in the event that judgment is made that all pixels in the frame of interest have been made to be the pixel of interest, the flow proceeds to Step S244, where the display unit 203 displays the frame of interest made up of the pixels obtained by the sum of products computing unit 252.

The flow returns to Step S241, where the tap extracting unit 251 takes the next frame as a new frame of interest, and subsequently, the same processing is repeated.

Figure 35:
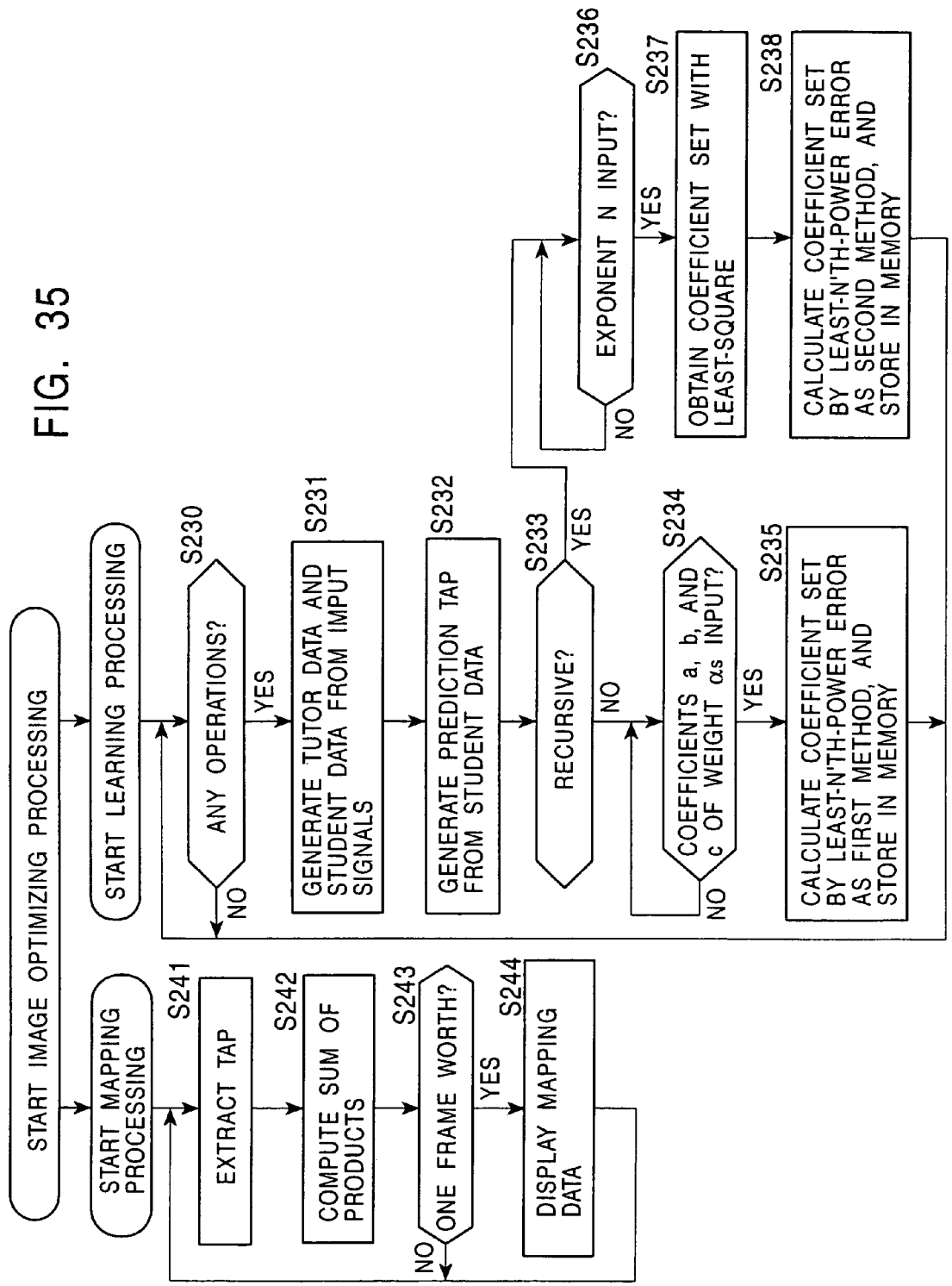
FIG. 35 is a flowchart describing image optimizing processing with the optimizing device shown in FIG. 29.

According to the image optimizing processing in FIG. 35, in the mapping processing, the user views the image displayed on the display unit 203 and in the event this does not match the preferences of the user, operates the operating unit 202 to specify direct method or recursive method, and further specify the exponent N for least-N'th-power error, and accordingly in the learning processing, the prediction coefficients obtained by least-N'th-error are changed, and the image which is the output signals obtained by the mapping processing can be made to be that which suits the preferences of the user him/herself.

Now, FIG. 36 illustrates the sum of error of prediction values computed using a coefficient set of the least-N'th-power norm obtained with least-N'th-power error, and the sum of error of prediction values computed using a coefficient set of a least-square norm obtained by a general least-square error method, with the direct method wherein the values of the coefficients a, b, and c, of the weight $\alpha_s$ in Expression (50) are changed, by setting the coefficients a, b, and c to, for example, a=40, b=0.1, and c=1. Here, the sum of the square error and cubic error is indicated for the sum of error. Also, in the event that the coefficients a, b, and c, are the above-described values, this is equivalent to a case wherein the exponent N of the N'th-power error $e^N$ in Expression (48) is greater than 2. In FIG. 36, the sum of square error is 10160281 in the case of coming from the least-square norm coefficient set, and is 10828594 in the case of coming from a least N'th-power norm coefficient set, so the case of the least-square norm coefficient set is smaller than the case of the least N'th-power norm coefficient set. On the other hand, the sum of cubic error is 165988823 in the case of coming from the least-square norm coefficient set, and is 161283660 in the case of coming from a least N'th-power norm coefficient set, so the case of the least N'th-power norm coefficient set is smaller than the case of the least-square norm coefficient set.

Accordingly, an image which is output signals wherein the sum of the squared norm is even smaller can be obtained by performing the mapping processing (the sum of products computation in Expression (39)) using the coefficient set of the least squared norm, and also, an image which is output signals wherein the sum of the cubic norm is even smaller can be obtained by performing the mapping processing using the coefficient set of the least-N'th-power norm obtained using the coefficients a, b, and c, of the above-described values.

Now, in the image optimizing processing in FIG. 35, the exponent N is changed by the user operating the operating unit 202 (in the direct method, the coefficients a, b, and c, specifying the exponent N are changed, and in the recursive method, the exponent N itself is changed) thus setting what sort of least-N'th-power error method for the exponent N is to be employed as the learning norm (learning system) for prediction coefficients (coefficient set). That is, the learning algorithms for obtaining prediction coefficients themselves are changed. Accordingly, it can be said that the "structure of processing" is being changed so that an image suiting the preferences of the user can be obtained.

Figure 37:
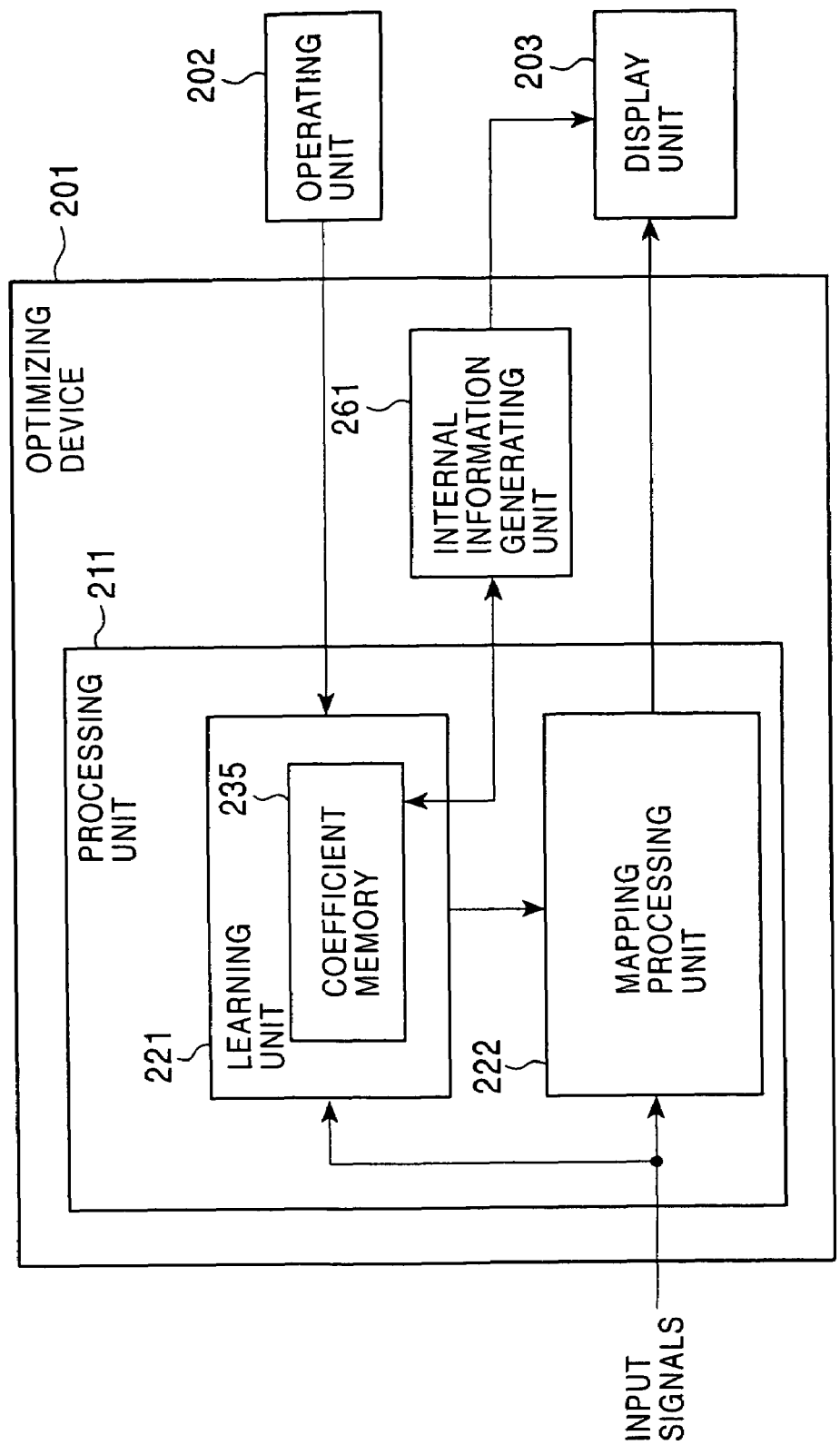
FIG. 37 is a block diagram illustrating a configuration example of another embodiment of an optimizing device to which the present invention has been applied.

Next, FIG. 37 illustrates another configuration example of the optimizing device shown in FIG. 1. With the optimizing device 201 shown in FIG. 37, configurations other than an internal information generating unit 261 being provided are the same as those of the optimizing device 201 shown in FIG. 29, so description thereof will be omitted.

The internal information generating unit 261 reads out, for example, prediction coefficients stored in the coefficient memory 235 as internal information of the processing unit 211, converts the information of the prediction coefficients into image signals and outputs this to the display unit 203, where it is displayed.

Figure 38:
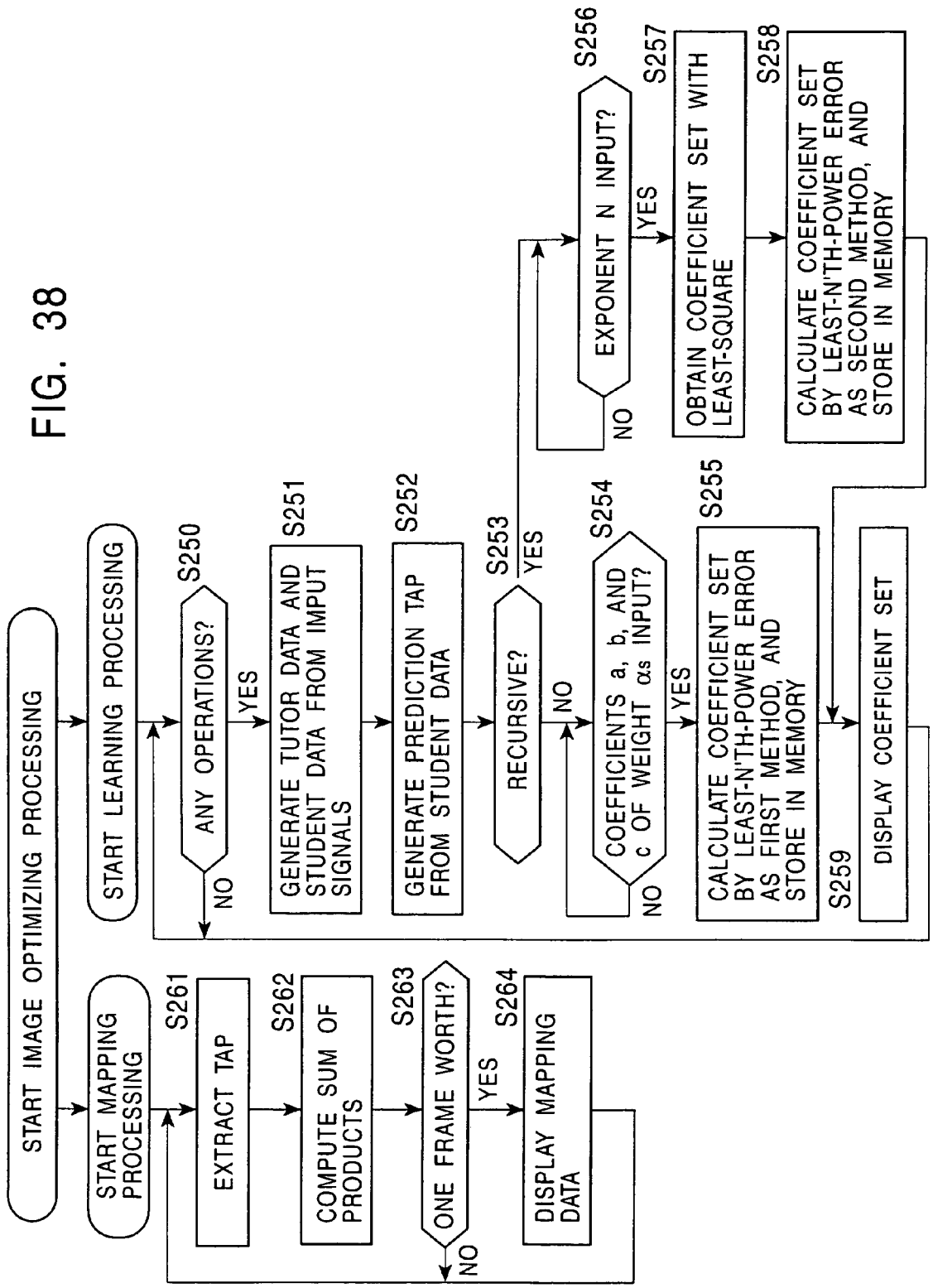
FIG. 38 is a flowchart describing image optimizing processing with the optimizing device shown in FIG. 37.

Next, the image optimizing processing with optimizing device 201 shown in FIG. 37 will be described with reference to the flowchart shown in FIG. 38. The image optimizing device shown in FIG. 38 is also made up of learning processing and mapping processing, as with the case shown in FIG. 35. With the learning processing, processing the same of that in steps S230 through S238 is performed in steps S250 through S258, respectively.

Further, with the learning processing, following the processing in steps S255 and S258, the flow proceeds to step S259, for the internal information generating unit 261 reads the coefficient set stored in the coefficient memory 235 as internal information, generates image signals which can be displayed based on the values contained in the coefficient set and outputs this to the display unit 203 where it is displayed.

Figure 39:
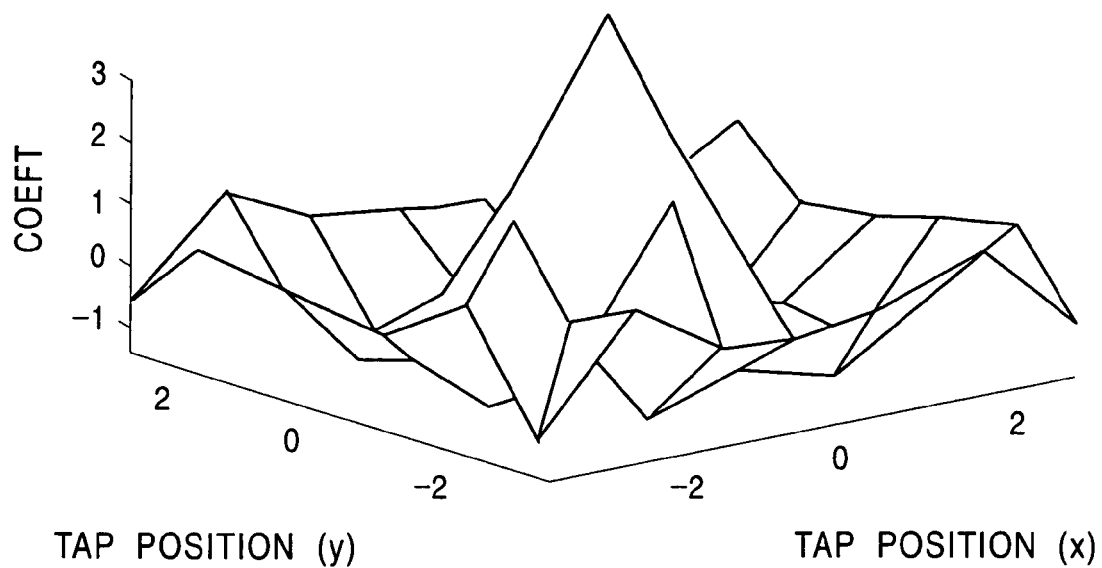
FIG. 39 is a diagram illustrating an example of internal information generated by the internal information generating unit shown in FIG. 37.
Figure 40:
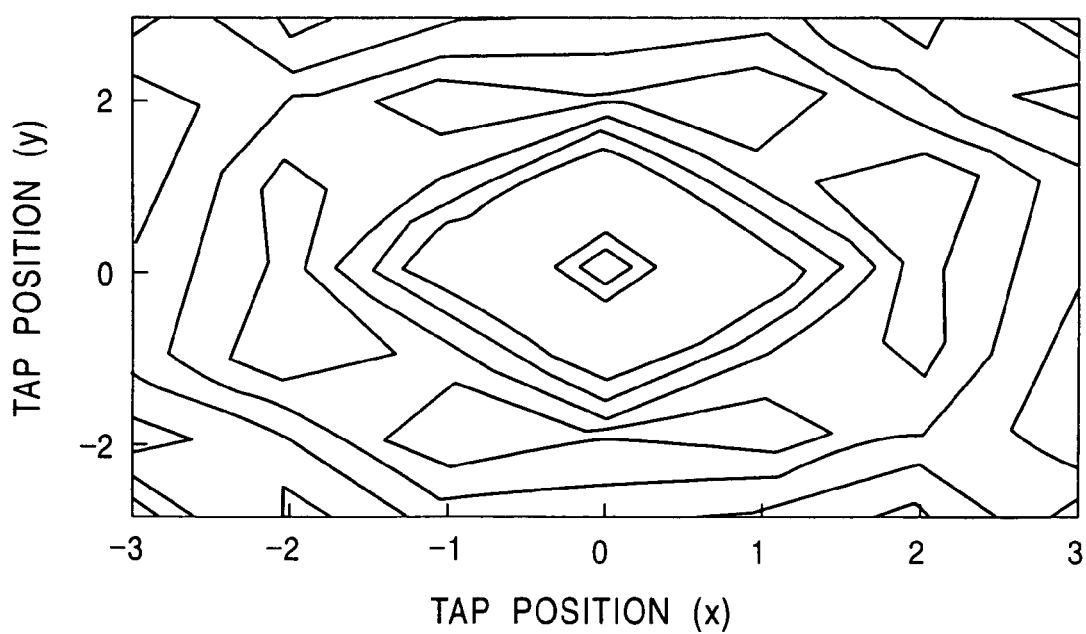
FIG. 40 is a diagram illustrating an example of internal information generated by the internal information generating unit shown in FIG. 37.

At this time, the image generated by the internal information generating unit 261 and displayed on the display unit 203 may have a form such as a 3-dimensional distribution diagram such as shown in FIG. 39, or a 2-dimensional distribution diagram such as shown in FIG. 40, for example. That is, in FIG. 39, coordinates equivalent to the prediction tap position extracted from the input signals are indicated as positions on an x y plane, as Tap Position (x) and Tap Position (y), with prediction coefficients (Coeff) taking the product of pixel values serving as the prediction tap thereof shown at the coordinates corresponding to each of the prediction tap positions. Also, in FIG. 40, FIG. 39 is represented in the form of contour lines.

Now, let us return to the description of the flowchart in FIG. 38.

Following the processing in Step S259, the flow returns to step S250, and subsequently, the same processing is repeated.

On the other hand, with the mapping processing, processing the same of that in steps S241 through S244 in FIG. 35 is performed in steps S261 through S264, respectively.

Due to the above processing, the values of the coefficient sets (the coefficient values) stored in the coefficient memory 235 of the processing unit 211 is displayed (present) as internal information relating to the processing, so the user operates the operating unit 202 while viewing the distribution of the coefficient sets and the processing results of the processing unit 211 as output signals so that an image as output signals suiting the preferences thereof can be obtained, thereby changing the exponent N (in the direct method, the coefficients a, b, and c, specifying the exponent N are changed, and in the recursive method, the exponent N itself is changed) thus setting what sort of least-N'th-power error method for the exponent N is-to be employed as the learning norm (learning system) for prediction coefficients (coefficient set). That is, the learning algorithms for obtaining prediction coefficients themselves are changed, so it can be said that the "structure of processing" is being changed. Also, in the above-described example, the coefficient sets are displayed, but arrangement may be made wherein internal information relating to processing is displayed such as, for example, whether the current least-N'th-power error method is direct or recursive.

Figure 41:
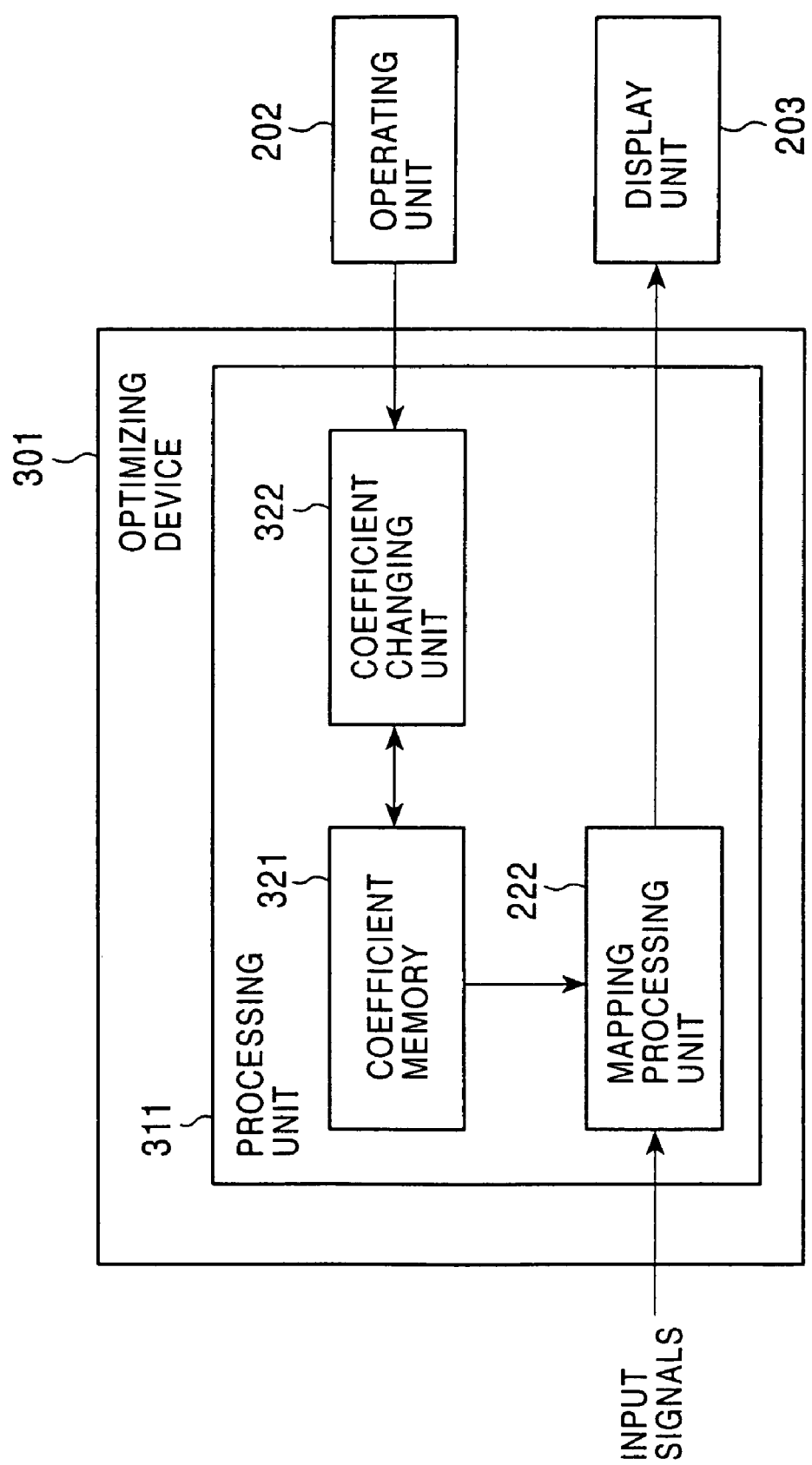
FIG. 41 is a block diagram illustrating a configuration example of another embodiment of an optimizing device to which the present invention has been applied.

FIG. 41 illustrates another configuration example of the optimizing device. The optimizing device 301 shown in FIG. 41 is configured of the processing unit 311, and optimizes input signals and displays these on a display unit 202 based on operating signals input from the operating unit 202. In the figure, parts corresponding to the above-described embodiments are denoted with the same reference numerals, and description thereof will be omitted in the following, wherever appropriate.

Figure 30:
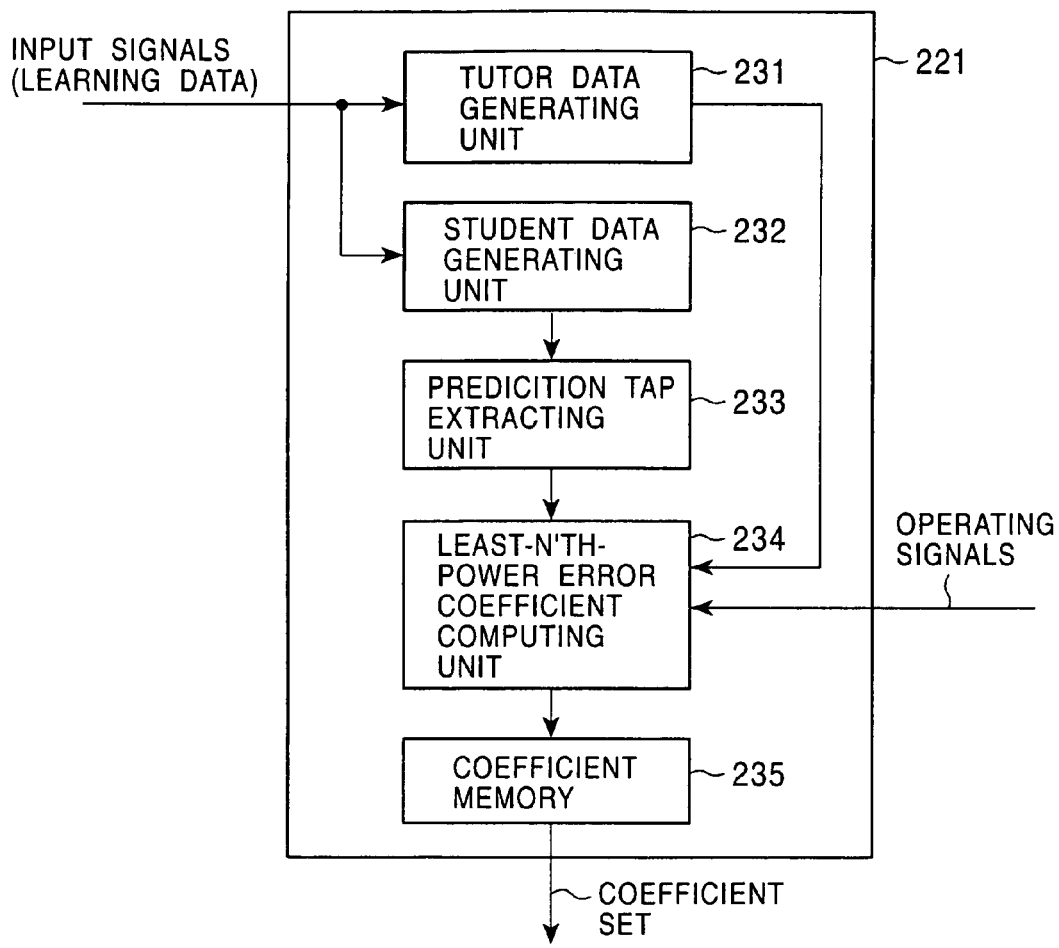
FIG. 30 is a block diagram illustrating a configuration example of the learning unit of the optimizing device shown in FIG. 29.
Figure 31:
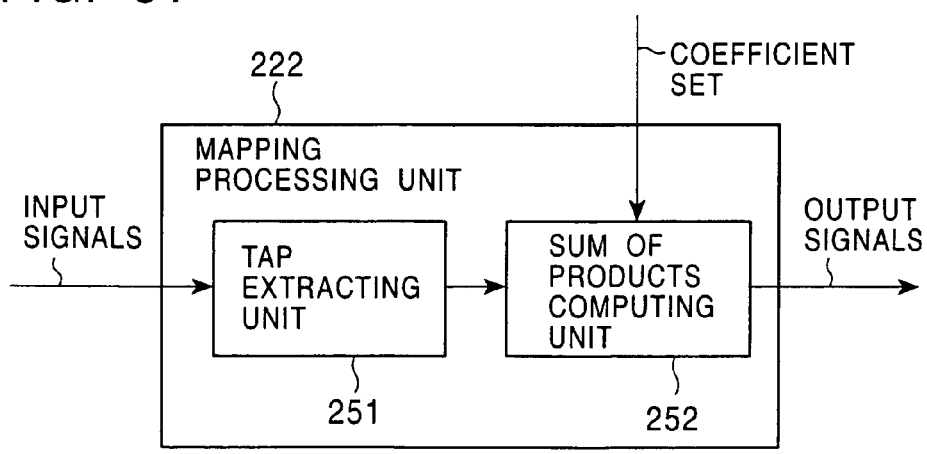
FIG. 31 is a block diagram illustrating a configuration example of the mapping processing unit of the optimizing device shown in FIG. 29.

The coefficient memory 321 of the processing unit 311 shown in FIG. 41 is basically the same as the coefficient memory 235 shown in FIG. 30, and stores coefficient sets necessary for executing the mapping processing by the mapping processing unit 222. The coefficient sets are basically coefficient sets generated by the learning device 341 shown in FIG. 43 which will be described later (coefficient set serving as initial values), which are changed by the coefficient changing unit 322 as appropriate, and overwritten and stored. Accordingly, as overwriting is repeated, the coefficient sets come to be something different to that generated by the learning device 341. Also, an arrangement may be made wherein the coefficient sets serving as the initial value are stored in unshown memory, so that the storage contents of the coefficient memory 321 can be reverted to the initial value coefficient set, corresponding to operations made by the operating unit 202.

The coefficient changing unit 322 reads out coefficient set stored in the coefficient memory 321 (prediction coefficient), based on operating signals input from the operating unit 202, changes the values of the prediction coefficients (prediction coefficient multiplied by the prediction taps) corresponding to the prediction taps, and overwrites on the coefficient memory 321 again and stores.

Figure 42:
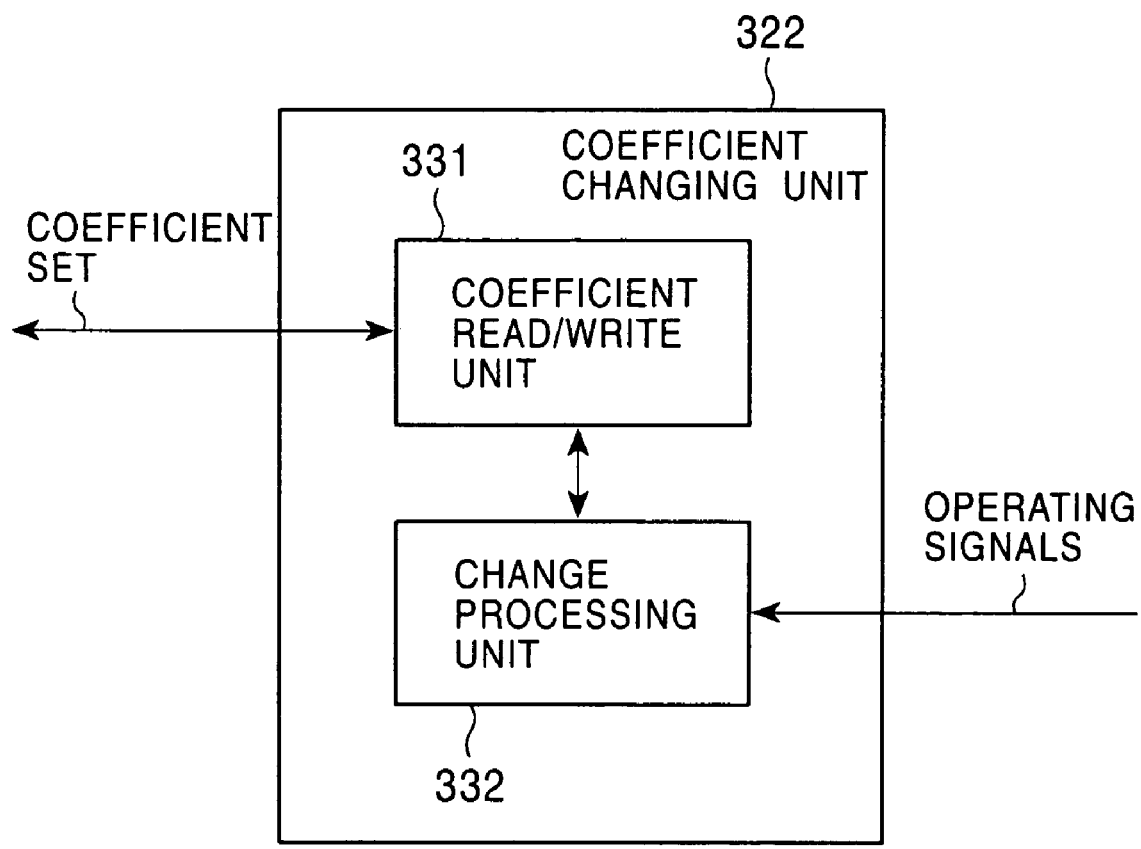
FIG. 42 is a block diagram illustrating a configuration example of the coefficient converting unit of the optimizing device shown in FIG. 41.

Next, the configuration of the coefficient changing unit 322 will be described with reference to FIG. 42. The coefficient read/write unit 331 of the coefficient changing unit 322 is controlled by the change processing unit 332, so as to read out the coefficient sets stored in the coefficient memory 321, and output to the changing processing unit 332, while writing the prediction coefficients, of which the values have been changed by the changing processing units 332, on the coefficient memory 321 for storage. The changing processing unit 332 changes the prediction values read out from the coefficient memory 321 by the coefficient read/write unit 331, based on the operating signals.

Here, a learning device 341 for generating coefficient sets to be stored in the coefficient memory 321 by the learning processing, will be described with reference to FIG. 43. The tutor data generating unit 351 of the learning device 341 is the same as the data generating unit 231 of the learning device 221 shown in FIG. 30, and generates tutor data from image signals which is learning data provided beforehand, and outputs tutor data to the normal equation generating unit 354. The student data generating unit 352 is the same as the student data generating unit 321 shown in FIG. 30, and generates student data from the learning data and outputs this to the prediction tap extracting unit 353.

The prediction tap extracting unit 353 is the same as the prediction tap extracting unit 233 shown in FIG. 30, wherein, with that the tutor data which is to be processed now as the pixel of interest, extracts a prediction tap of the same tap structure as that generated by the tap extracting unit 251 (FIG. 31) making up the mapping processing unit 222 shown in FIG. 41 from the student data with regard to that pixel of interest, and outputs this to the normal equation generating unit 354.

The normal equation generating unit 354 generates a normal equation of the Expression (46) from the tutor data y which is the pixel of interest input from the tutor data generating unit 351 and prediction taps $x_1, x_2, \ldots, X_M$. The normal equation generating unit 354 then obtains the normal equation in Expression (46) with all tutor data as pixel of interest, and outputs the normal equation to the coefficient deciding unit 355. The coefficient deciding 355 solves the input normal equation (the above-described Expression (46)) by the Cholesky method, or the like, thereby obtaining coefficient sets.

Next, coefficient deciding processing (learning processing) with the learning device 341 shown in FIG. 43 will be described, with reference to the flowchart in FIG. 44. In step S271, the tutor data generating unit 351 generates tutor data from the learning data, and outputs this to the normal equation generating unit 354, while the student data generating unit 352 generates student data from the learning data, outputs this to the prediction tap extracting unit 353, and the flow proceeds to step S272.

In step S272, the prediction tap extracting unit 352 sequentially takes tutor data as pixels of interest, extracts prediction taps from the student data with regard to the data of interest, outputs this to the normal equation generating unit 354, and the flow proceeds to step S273.

In step S273, the normal equation generating unit 354 uses the tutor data and prediction tap sets to compute the summation ($\Sigma$) of the components of the matrix at the left-hand side of the Expression (46) and the summation ($\Sigma$) of the components of the vector of the right-hand side thereof, thereby generating a normal equation, which is output to the coefficient deciding unit 355.

The flow then proceeds to step S274, for the coefficient deciding unit 355 solves the normal equation input from the normal equation generating unit 354 and obtains a coefficient set by so-called least-square error, which is stored in the coefficient memory 321 in step S275.

Due to the above processing, a basic coefficient set (coefficient set serving as an initial value) is stored in the coefficient memory 321. Now, while the above description gives the coefficient set being obtained by least-square error, this may be a coefficient set obtained by a another method, and may be a coefficient set obtained by the above-described least-N'th-power method.

Next, description will be made regarding a changing of the coefficient set by the changing processing unit 332 of the coefficient changing unit 322 shown in FIG. 41. Coefficient sets are stored in the coefficient memory 321 beforehand by the processing of the flowchart in the above-described FIG. 44, and the coefficient changing unit 322 changes the prediction coefficients of the coefficient set that is set by computation beforehand, based on operating signals input from the operating unit 202.

Figure 46:
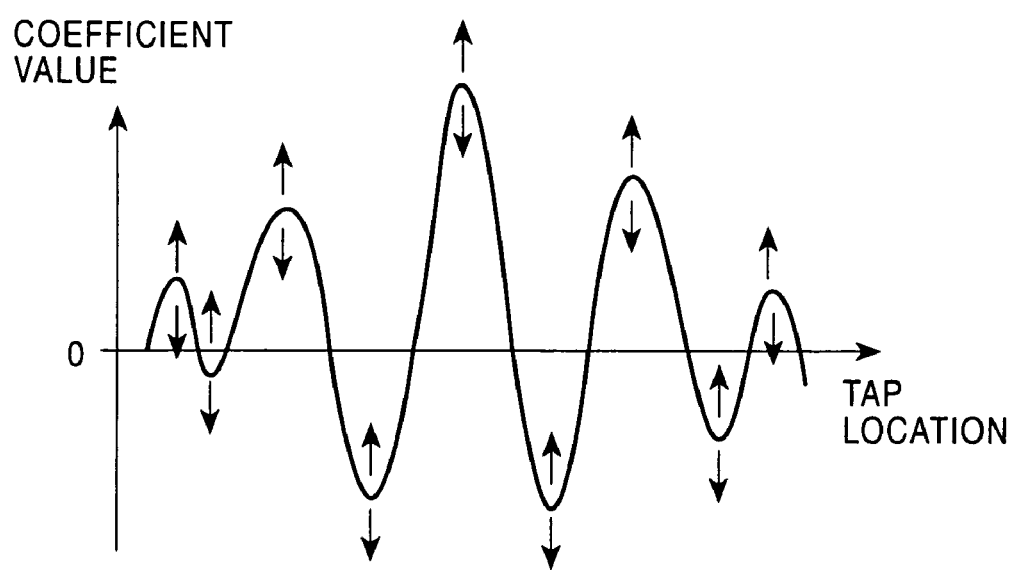
FIG. 46 is a diagram illustrating an example of the distribution of coefficient values corresponding to the tap locations of the prediction tap.

For example, in the event that the prediction taps extracted from the student data are 7 taps×7 taps (7×7 pixels for horizontal×vertical), a total of 49 taps, the same number of prediction coefficient corresponding to the prediction taps exist. That is, in this case, a coefficient set stored in the coefficient memory 321 is a coefficient set made up of 49 prediction coefficients. At this time, with the position of each of the prediction taps (tap position) as the horizontal axis (e.g., providing numbers to each of the prediction taps and using the value of the number as a horizontal axis), let us say that the distribution, wherein the coefficient value of the prediction coefficient multiplied by the prediction tap of the tap positions is taken as the vertical axis, is as shown in FIG. 46. Now, in the event that all of the coefficient values of the coefficient set are to be changed, this requires operations for each of the 49 coefficient values. It is necessary that the values of the coefficient be normalized (wherein each of the coefficients are divided by the total of the values of all coefficient) so that gain of the input signals and the output signals obtained by processing the input signals with prediction coefficient is the same, i.e., that the total value of the coefficient be 1, but it is difficult to operate each of the individual coefficient so that the total is 1.

Figure 47:
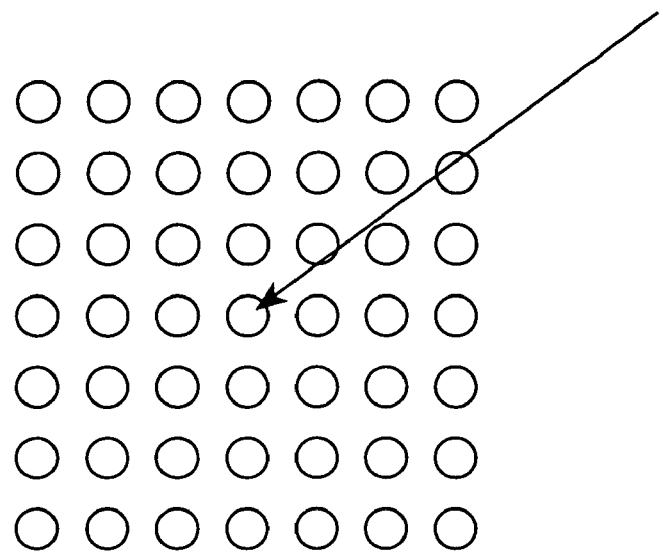
FIG. 47 is a diagram illustrating the configuration of a prediction tap.
Figure 48:
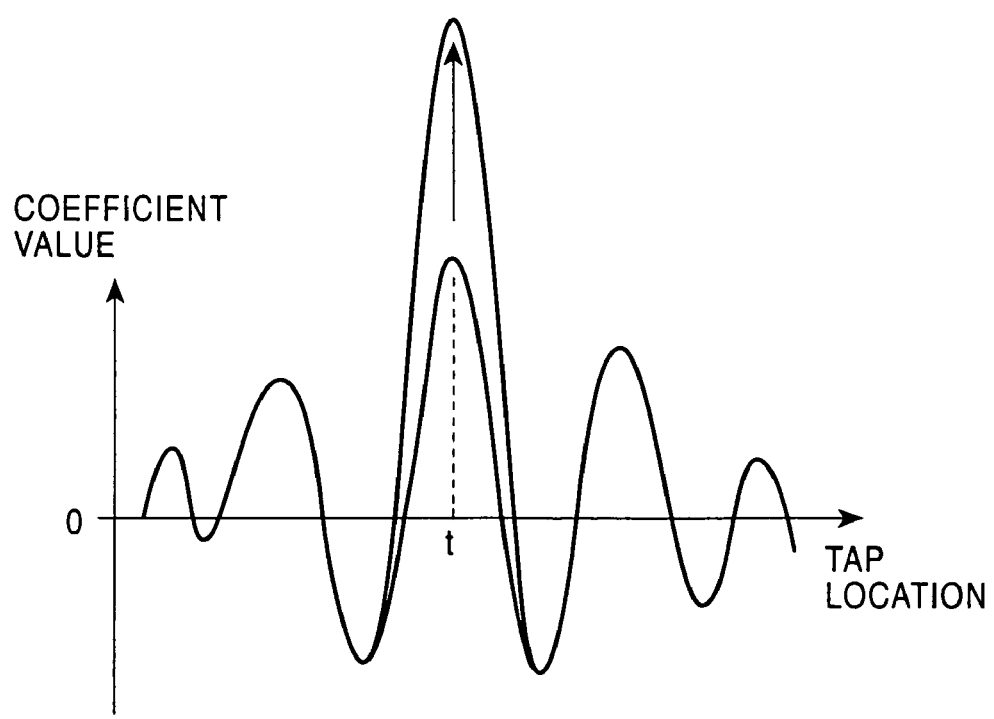
FIG. 48 is a diagram illustrating an example of the distribution of coefficient values corresponding to the tap locations of the prediction tap.

That is to say, for example, considering raising only the coefficient value of the coefficient corresponding to the prediction tap indicated by the arrow in FIG. 47, the distribution of tap positions and coefficient values is as shown in FIG. 48. Note that the tap position t shown in FIG. 48 is the tap position indicated by the arrow in FIG. 47.

In this way, raising (increasing) only the coefficient value of the coefficient corresponding to a particular prediction tap requires operations so that the coefficient values of coefficient corresponding to other tap positions are reduced or the like such that the total is 1, but the operations are difficult. Further, operations for making the total 1 is similarly difficult in cases of changing the coefficient value of coefficient corresponding to a greater number of prediction taps, as well.

Figure 49:
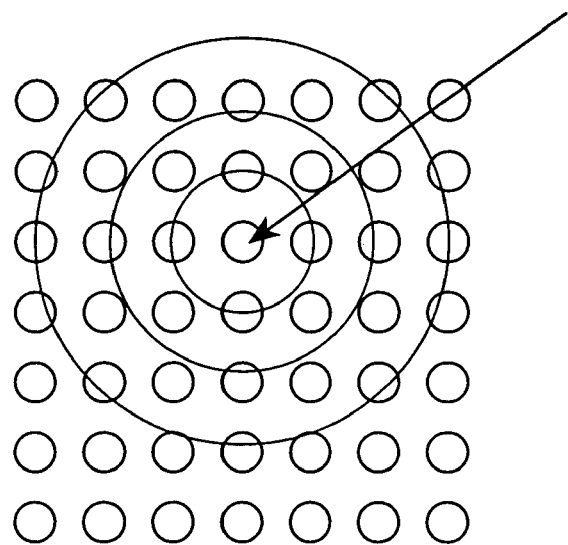
FIG. 49 is a diagram illustrating the configuration of a prediction tap.
Figure 50:
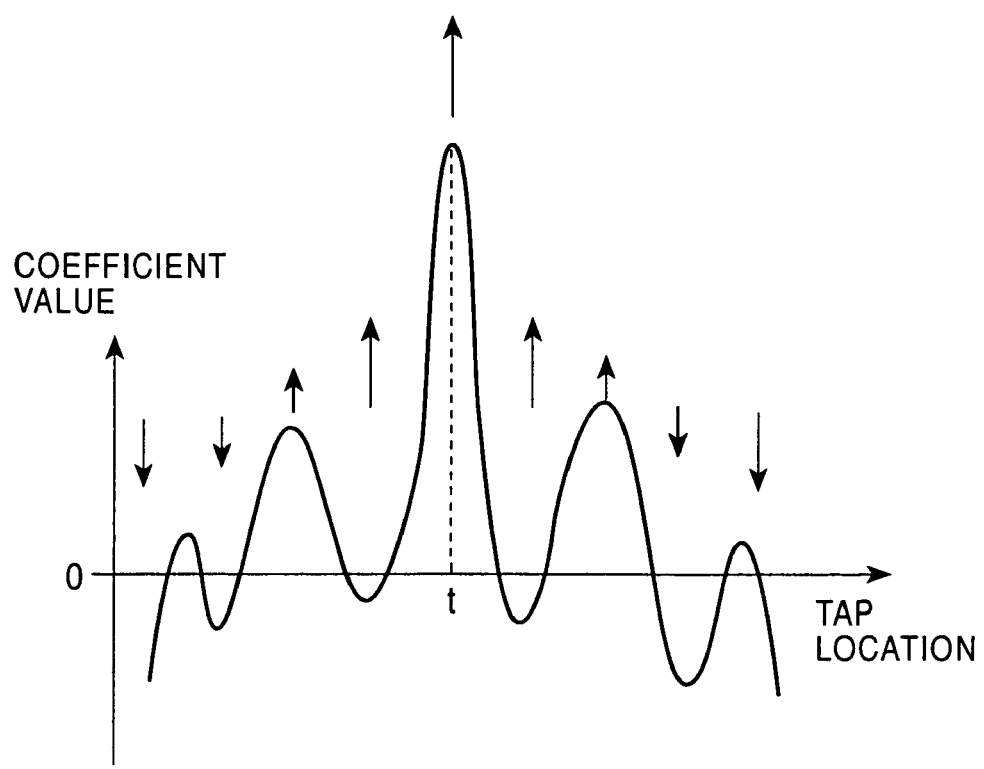
FIG. 50 is a diagram illustrating a spring model.

Accordingly, in the event that the operating signals are such that the coefficient value of a coefficient corresponding to one tap position indicated by the arrow shown in FIG. 49 is to be changed beyond a predetermined threshold value S11 (the amount of change changes greater than a threshold value S11), the change processing unit 332 changes the coefficient value of other coefficient from the distribution such as shown in FIG. 46 to a distribution such as shown in FIG. 50. That is to say, the change processing unit 332 changes the coefficient values of coefficient corresponding to each of the tap positions, such that the distribution of coefficient values changes according to a model such as like a spring, according to the distance from the tap position corresponding to the coefficient regarding which the value thereof has been changed. That is, in the event that the distribution of the coefficient set obtained by learning is a distribution such as shown in FIG. 46, upon operations being made at the operating unit 202 so as to raise the value corresponding to the tap position t as shown in FIG. 50, the change processing unit 332 increases the coefficient value for other values at positions close to the tap position t such that the closer the position is, the greater the changes, and conversely, the coefficient values of coefficients corresponding to taps at positions distant from the tap position t are changed so that the farther the position, the greater the decrease is, and further, where the total of coefficient values is 1. Here, in the following, the model wherein the distribution changes in the form of a spring such as, shown in FIG. 50 will be called a spring model. Further, according to the spring model, in the event that operating unit 202 is operated so as to lower the coefficient of a certain tap position t, the coefficient values of positions close to the tap position t are lowered corresponding to the closeness to that position, and the coefficient values of positions distant from the position t are conversely raised according to the distance from that position.

Figure 51:
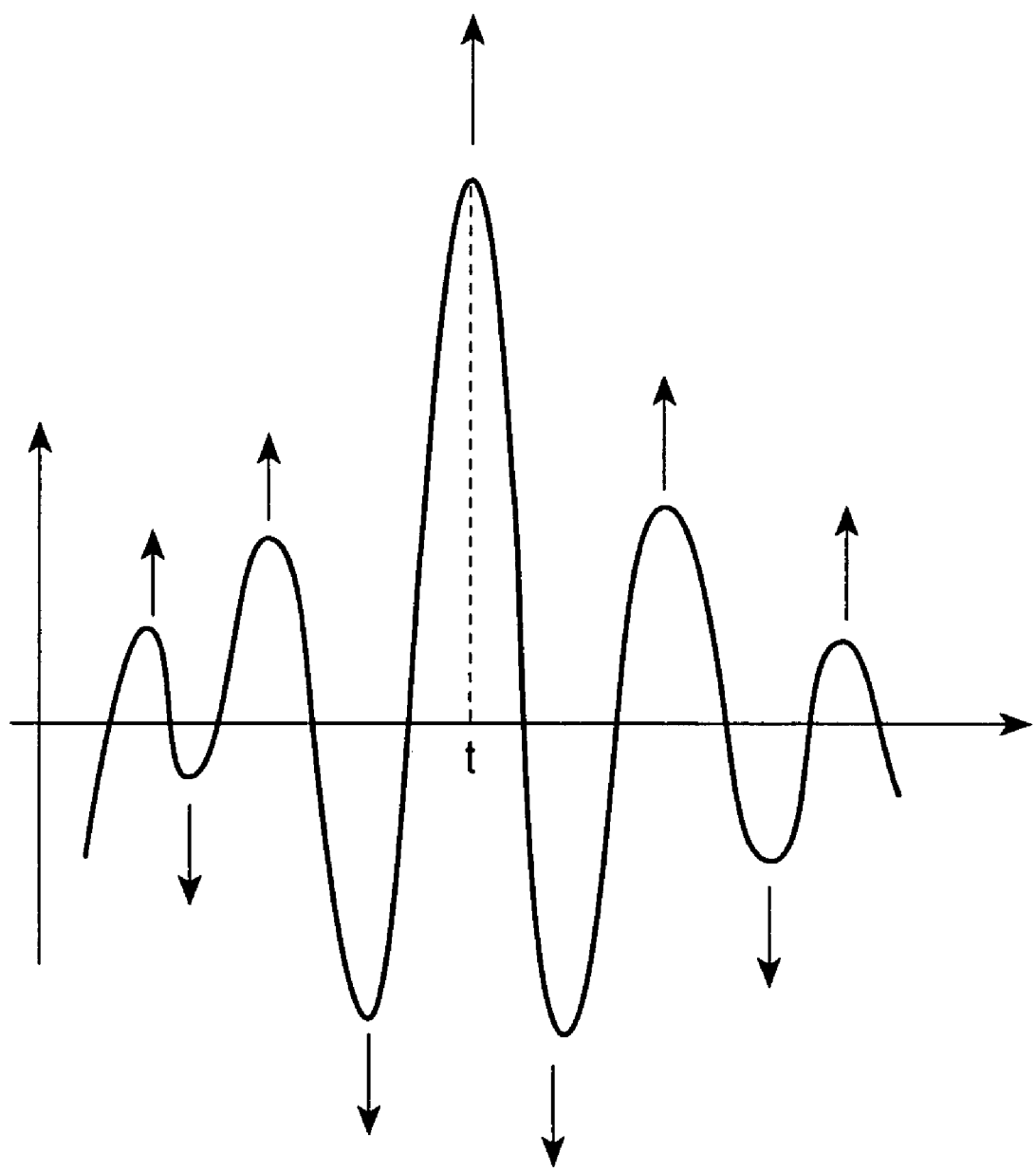
FIG. 51 is a diagram illustrating a equilibrium model.

Also, in the event that the amount of change of the coefficient value of the coefficient is smaller than the predetermined threshold value S11, the change processing unit 332 changes coefficient values having a extreme value the same as the polarity of the coefficient of the tap position t in the same direction as the coefficient of the tap position t, and changes coefficient values having a extreme value different to the polarity of the coefficient of the tap position t in the opposite direction as the coefficient of the tap position t (shifts coefficients with the same extreme value as the direction of the extreme value which the coefficient that has been operated has, in the same direction as the coefficient which has been operated, and shifts coefficients with a different extreme value as the direction of the extreme value which the coefficient that has been operated has, in the opposite direction as the coefficient which has been operated), so as to affect change such that the total of coefficient values is 1, maintained the equilibrium of the overall distribution balance. In the following, the model wherein coefficient values are changed while maintaining the equilibrium of the overall balance as shown in FIG. 51 will be called the equilibrium model. Due to effecting such changes, the equilibrium model functionally approximates (is equivalent to) a HPF (High Pass Filter) or LPF (Low Pass Filter).

Now, a case has been described above wherein the coefficient value with a positive value has been raised in an equilibrium model, but in the event that the coefficient value with a positive value is lowered, for example, i.e., change in the negative direction, positive values are changed in the negative direction, and coefficient values with negative values are changed in the positive direction. Further, in the event that coefficient values with negative values are raised, coefficient values with positive values are changed in the negative direction, and negative coefficients are changed to a positive direction while in the event that coefficient values with negative values are lowered, positive coefficient values are changed in a positive direction, and negative coefficient values are changed in the negative direction. With equilibrium model, in all cases, the values of coefficients are changed in the direction whereby the equilibrium of the overall balance is maintained.

As described above, in the event that the amount of change of the changed coefficient value is greater than the threshold value S11, the change processing unit 332 changes coefficient values corresponding to other taps by the spring model shown in FIG. 50, and in the event that the amount of change of the coefficient value is smaller than the threshold value S11, changes the coefficient value of coefficients corresponding to other taps by the equilibrium model shown in FIG. 51. This is since in the event that the amount of change of one coefficient is great, changes to maintain the overall balance are unnatural from the perspective of overall balance of each of the coefficient values, so this spring model is employed, and in the event that the amount changes are small, the effect that the change in coefficients has on the overall balance is small, so change is made so as to maintain overall balance.

Now, models for changing the coefficients other than the changed coefficient values by operating unit 202 being operated are not restricted to these, and any is sufficient as long as the total of coefficient values is 1 as a whole. Also, in the above-described case, models for changing other coefficient are switched over according to the magnitude of amount of change of a coefficient which is changed by the operating unit 202 being operated, but the model for changing other coefficients may be fixed.

Next, the image optimizing processing of the optimizing device 301 shown in FIG. 41 will be described with reference to the flowchart shown in FIG. 52. Now, this image optimizing processing is made up of coefficient changing processing and mapping processing. The mapping processing is the same as the mapping processing described with FIG. 35 and FIG. 38, so only the coefficient changing processing will be described here.

In step S291, the changing processing unit 332 of the coefficient changing unit 322 (FIG. 42) judges whether or not operating signals for operating coefficient values have been input from operating unit 202. That is, in the event that the user deems the image displayed on the display unit 203 to be something matching his/her preferences, mapping processing is executed with a coefficient set stored in the coefficient memory 321 (FIG. 41) here, but in the event that judgment is made that this does not match preferences, operations are performed to change the coefficient set stored in the coefficient memory 321 to be used for mapping processing.

For example, in step S291, in the event that judgment is made that operating signals for operating coefficients have been input, i.e., in the event that operating unit 202 has been operated so as to change the coefficient value of one of the coefficient stored in-the coefficient memory 321, the flow proceeds to step S292.

In step S292, the change processing unit 332 controls the coefficient read/write unit 331 to read out coefficient sets stored in the coefficient memory 321, and the flow proceeds to step S293. In step S293, the change processing unit 332 judges whether or not the coefficient value input as operating signals is a change equal to or greater than a predetermined threshold value S11 in comparison to the value contained beforehand in the coefficient set. For example, in the event that judgment is made in step S293 that the change between the value input as operating signals and the value in the coefficient set stored in the coefficient memory 321 is equal to or greater than the threshold value S11, the processing then proceeds to step S294.

In step S294, the change processing unit 332 changes the values of the coefficient contained in the coefficient set with the spring model as shown in FIG. 50, and the processing then proceeds to step S295.

On the other hand, in the event that judgment is made in step S293 that the change between the value input as operating signals and the value in the coefficient set stored in the coefficient memory 321 is not equal to or greater than the threshold value S11, the processing then proceeds to step S296.

In step S296, the change processing unit 332 changes the value of the coefficients contained in the coefficient set with the equilibrium model as shown in FIG. 51, and the processing then proceeds to step S295.

In step S295, the change processing unit 332 controls the coefficient read/write unit 331 so as to overwrite and store the changed coefficient set values to the coefficient memory 321, the processing returns to step S291, and subsequently, the same process is repeated.

In the event that judgment is made in step S291 that the operating values have not been operated, i.e., in the event that the user has judged that the image displayed on the display unit 203 matches his/her preferences, the flow returns to step S291, and subsequently, the same processing is repeated.

Due to the above coefficient changing processing, the user can change coefficient sets used for mapping processing, thereby executing optimal processing for the user. Now, changing the values of the coefficients of the coefficient set means that the "contents of processing" of the mapping processing by the mapping processing unit 311 are changed.

Figure 52:
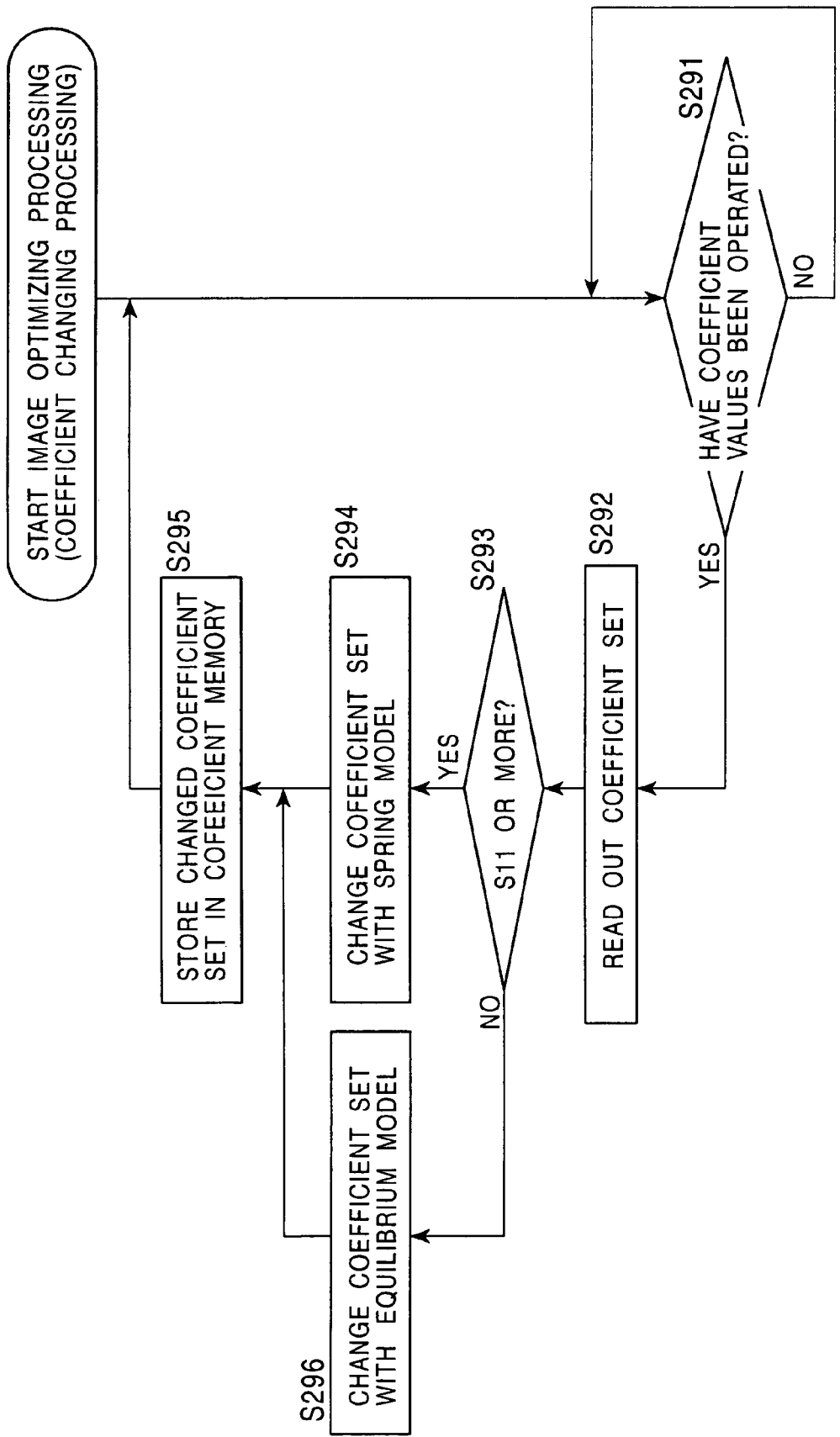
FIG. 52 is a flowchart describing image optimizing processing with the optimizing device shown in FIG. 41.

Also, with the coefficient changing processing in FIG. 52, in the event that the magnitude of change of the coefficient is equal to or greater than a predetermined threshold value S11, all coefficient values in the coefficient set are changed with the spring model according to the value of the coefficient that has been operated, and in the event that this is smaller than the threshold value S11, all coefficient values in the coefficient set are changed with the equilibrium model, so that algorithm for changing the coefficient set changes. Accordingly, at the processing unit 311 of optimizing device 301 shown in FIG. 41 as well, the "contents of processing", and further, the "structure of processing" is also changed following user operations, with optimal signal processing for the user being performed thereby.

Also, as described above, in the event that the coefficients set stored in the coefficient memory 321 is obtained by least-N'th-power error, an arrangement may be made wherein, for example, coefficients sets corresponding to multiple exponents N are stored in the coefficient memory 321 beforehand, with the coefficient changing unit 322 changing the coefficient set corresponding to the specified exponent N, following operating signals from the operating unit 202 based on user operations. In this case, the coefficient sets stored in the coefficient memory 321 are changed into those which are generated by the least-N'th-power error method corresponding to the exponent N input from the operating unit 202 based on user operations i.e., changed to the coefficient set generated by a different coefficient set generating algorithm, so it can be said that the "structure of processing" has been changed.

Figure 53:
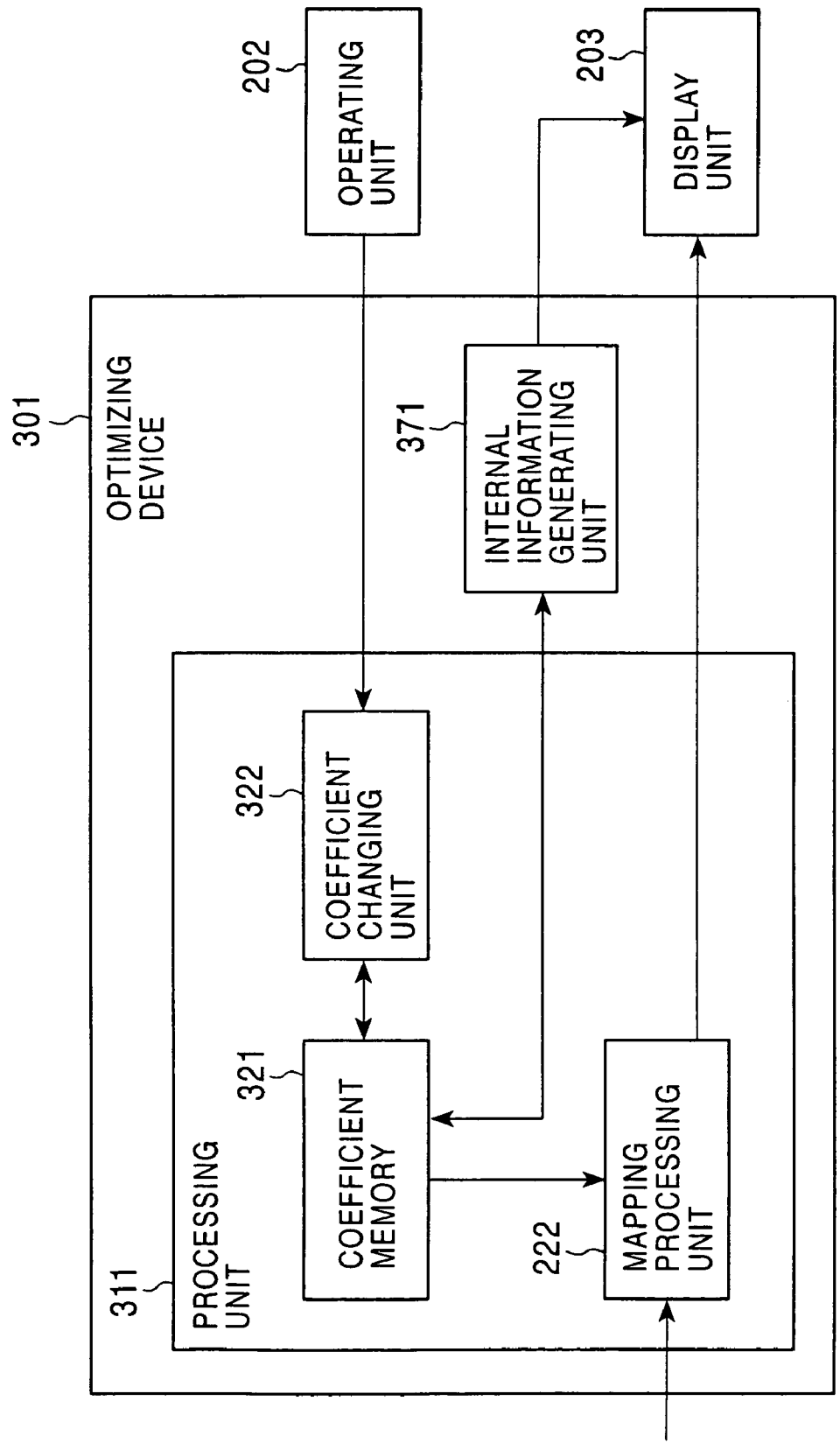
FIG. 53 is a block diagram illustrating a configuration of another embodiment of an optimizing device to which the present invention has been applied.

Next, an embodiment wherein an internal information generating unit 371 is provided to optimizing device 301 shown in FIG. 41 will be described with reference to FIG. 53. Note that in FIG. 53, this is the same as to optimizing device 301 shown in FIG. 41 except for the point that the internal information generating unit 371 has been provided.

The internal information generating unit 371 reads out coefficient set stored in the coefficient memory 321 for example, as internal information of the processing unit 311, converts the set to image signals which can be displayed on the display unit 203, then outputs to the display unit 203, and displays.

Next, the image optimizing processing of optimizing device 301 shown in FIG. 53 will be described with reference to the flowchart in FIG. 54. This image optimizing processing is also made up of coefficient changing processing and mapping processing in the same way as the image optimizing processing which the optimizing processing 301 shown in FIG. 41 performs, but the mapping processing is the same as the mapping processing described with FIG. 35 and FIG. 38, so only the coefficient changing processing will be described here.

With the coefficient changing processing, processing the same of that in steps S291 through S295 in FIG. 52 is performed in steps S311 through S315, respectively.

In step S315, as with the case in step S295 in FIG. 52, following the post-conversion coefficient set being stored in the coefficient memory 321, flow proceeds to step S317, where the internal information generating unit 371 reads out the coefficient values of the coefficient set stored in the coefficient memory 321, converts these to image signals which can be displayed on the display unit 203, outputs to the display unit 203, and displays. At this time, the display unit 203 may display the coefficient values of coefficient sets with a form such as a 3-dimensional distribution diagram such as shown in FIG. 39, or a 2-dimensional distribution diagram such as shown in FIG. 40, for example.

Following the processing step is 317, the flow returns to step S311, and subsequently, the same processing is repeated.

Figure 54:
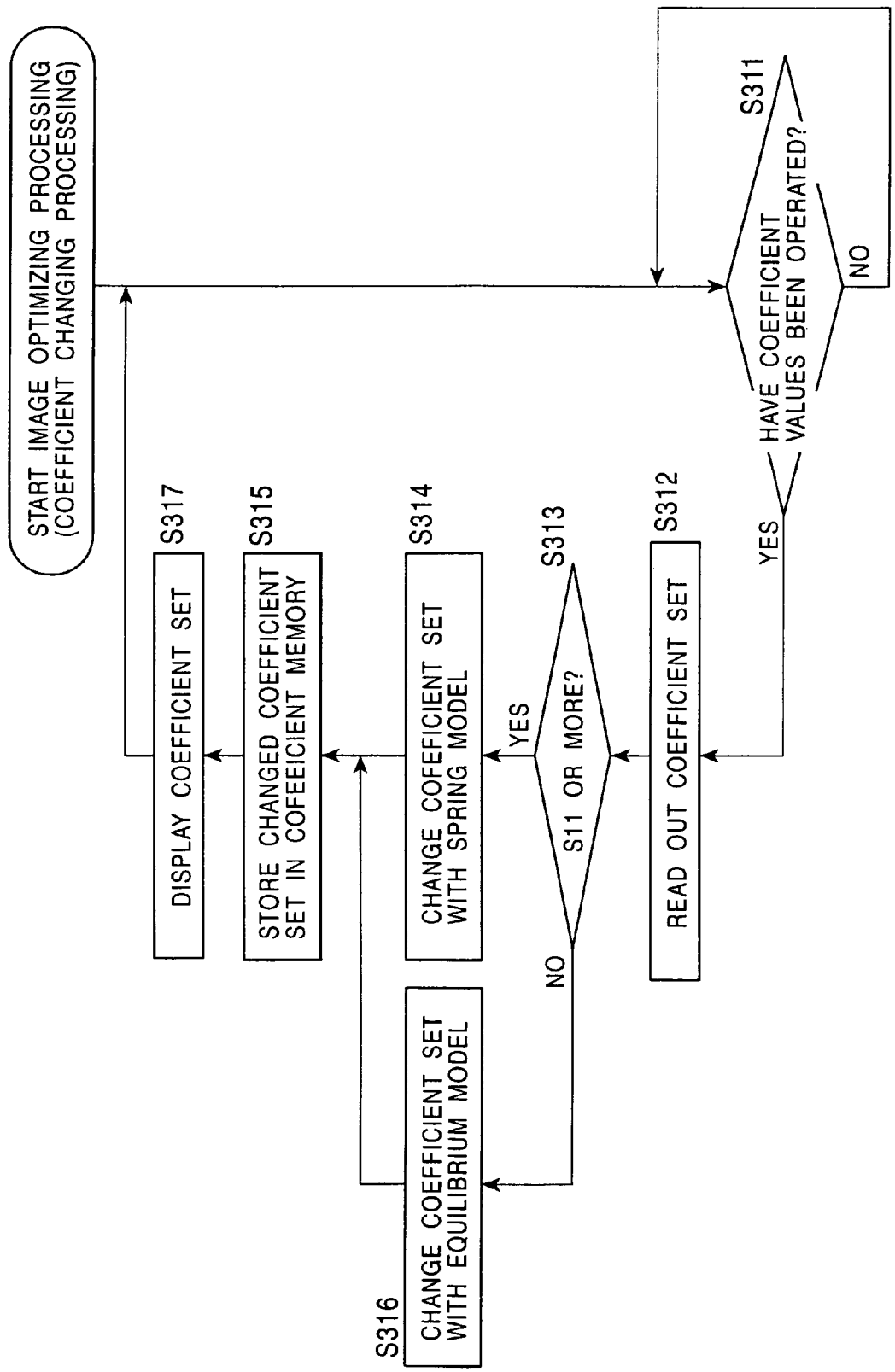
FIG. 54 is a flowchart describing image optimizing processing with the optimizing device shown in FIG. 53.

According to the coefficient changing processing in FIG. 54, the values of the coefficient set stored in the coefficient memory 321 are displayed as internal information, so the user can operate the operating unit 202, while viewing the coefficient set, so as to obtain a coefficient set which executes processing that is optimal for the user.

Also, with the sum of products computing unit 252 of the mapping processing unit 222 (FIG. 31), output signals can be obtained by a computing a higher order expression of an order of two or higher, instead of the linear expression in Expression (39).

Next, a configuration example of an optimizing device 401 which extracts telop portions from image signals as input signals will be described with reference to FIG. 55.

The features detecting unit 411 of optimizing device 401 detects two types of features that have been specified with regard to each of the pixels of the image signals serving as input signals, based on operating signals input from an operating unit 402, and outputs be detected features information to a processing deciding unit 412. Also, the features detecting unit 411 stores the image signals serving as input signals in an internal buffer 421 until the telop is extracted from the input image signals, and outputs the image signals to the processing unit 413. The operating unit 402 is the same as the operating unit 202 shown in FIG. 41 and FIG. 53. Note that the features detecting unit 411 is not restricted to only detecting two types of features that have been specified with regard to each of the pixels of the image signals serving as input signals, and may, for example, simultaneously detect multiple types of features, and output two types of specified features from these, or simultaneously detect two or more types of features and simultaneously output these.

The processing deciding unit 412 decides processing which a later processing unit 413 will perform on the image signals, in increments of pixels, for example, based on the features input from the features detecting unit 411, and outputs the decided processing contents to the processing unit 413.

The processing unit 413 subjects the image signals serving as input signals read out from the buffer 421 to the processing of the processing contents input from the processing deciding unit 412 in increments of pixels, outputs this to the display unit 403, and displays.

Next, the configuration of the features detecting unit 411 will be described with reference to FIG. 56. The buffer 421 of the features detecting unit 411 temporarily stores the image signals which are the input signals, and supplies these to the processing unit 413. The features extracting and 422 extracts the two types of features selected by the features selecting unit 423 from the image signals serving as the input signals, and outputs these to the processing deciding unit 412. The feature selecting unit 423 supplies information for specifying the features to be extracted from the input signals, to the features extracting unit 422, based on operating signals input from operating unit 402. Features which can be selected are, for example, luminance values for each of the pixels of the image signals, Laplacian, Sobel, inter-frame of indifference, inter-field difference, the background difference, and values obtained from the features within a predetermined range (sum, average, dynamic range, maximum value, minimum value, central value, or dispersion, etc.), and so forth, but may be other features as well.

Figure 57:
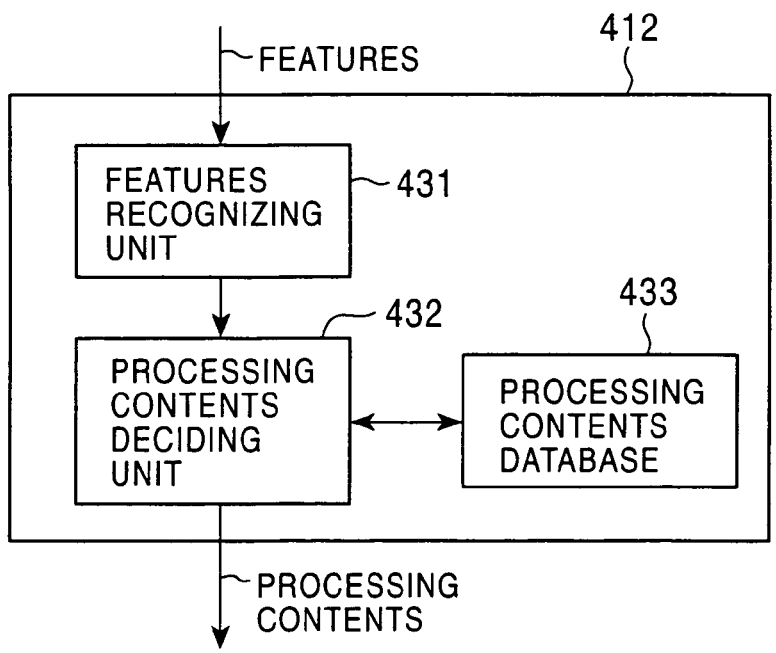
FIG. 57 is a block diagram illustrating a configuration example of the processing deciding unit shown in FIG. 55.

Next, the configuration of the processing deciding unit 412 will be described with reference to FIG. 57. The features recognizing unit 431 of the processing deciding unit 412 recognizes the multiple types of features input from the features detecting unit 421, and outputs, along with information indicating the type of features recognized, the features themselves, to the processing contents deciding unit 432. The processing contents deciding unit 432 decides the contents of processing set for each of the features beforehand stored in the processing contents database 433, based on the information indicating the type of features input from the features recognizing unit 431, and the features themselves, and outputs decided processing contents to the processing unit 413.

Figure 58:
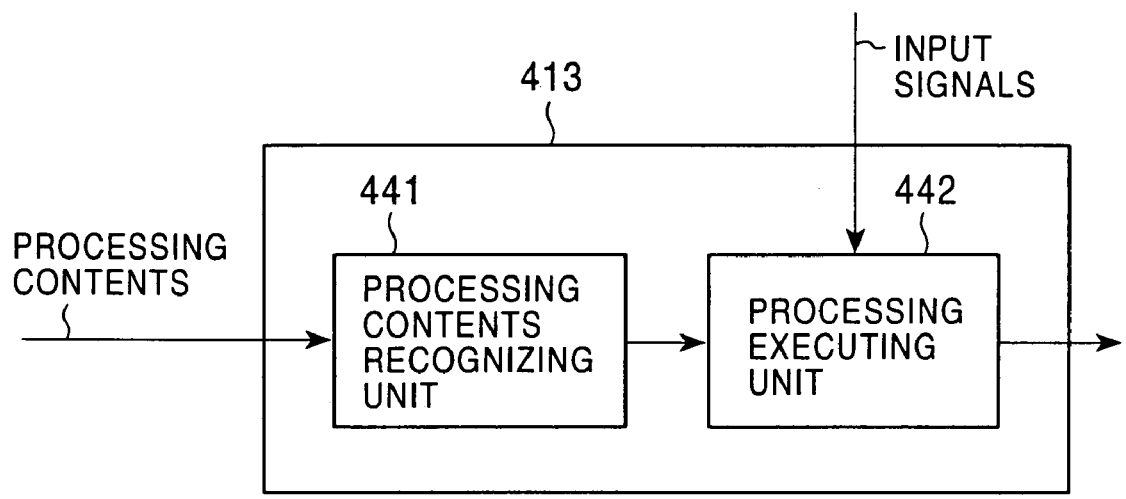
FIG. 58 is a block diagram illustrating a configuration example of the processing unit shown in FIG. 55.

Next, the configuration of the processing unit 413 will be described with reference to FIG. 58. The processing content recognizing unit 441 of the processing unit 413 recognizes the processing contents input from the processing deciding unit 412, and instructs the processing executing unit 442 to execute processing that has been recognized. The processing executing unit 442 subjects the input signals input via the buffer 421 to the specified processing, based on the instructions for each pixel from the processing contents recognizing unit 441, converts these into image signals which can be displayed on the display unit 202 and outputs to the display unit 403, and displays.

Figure 55:
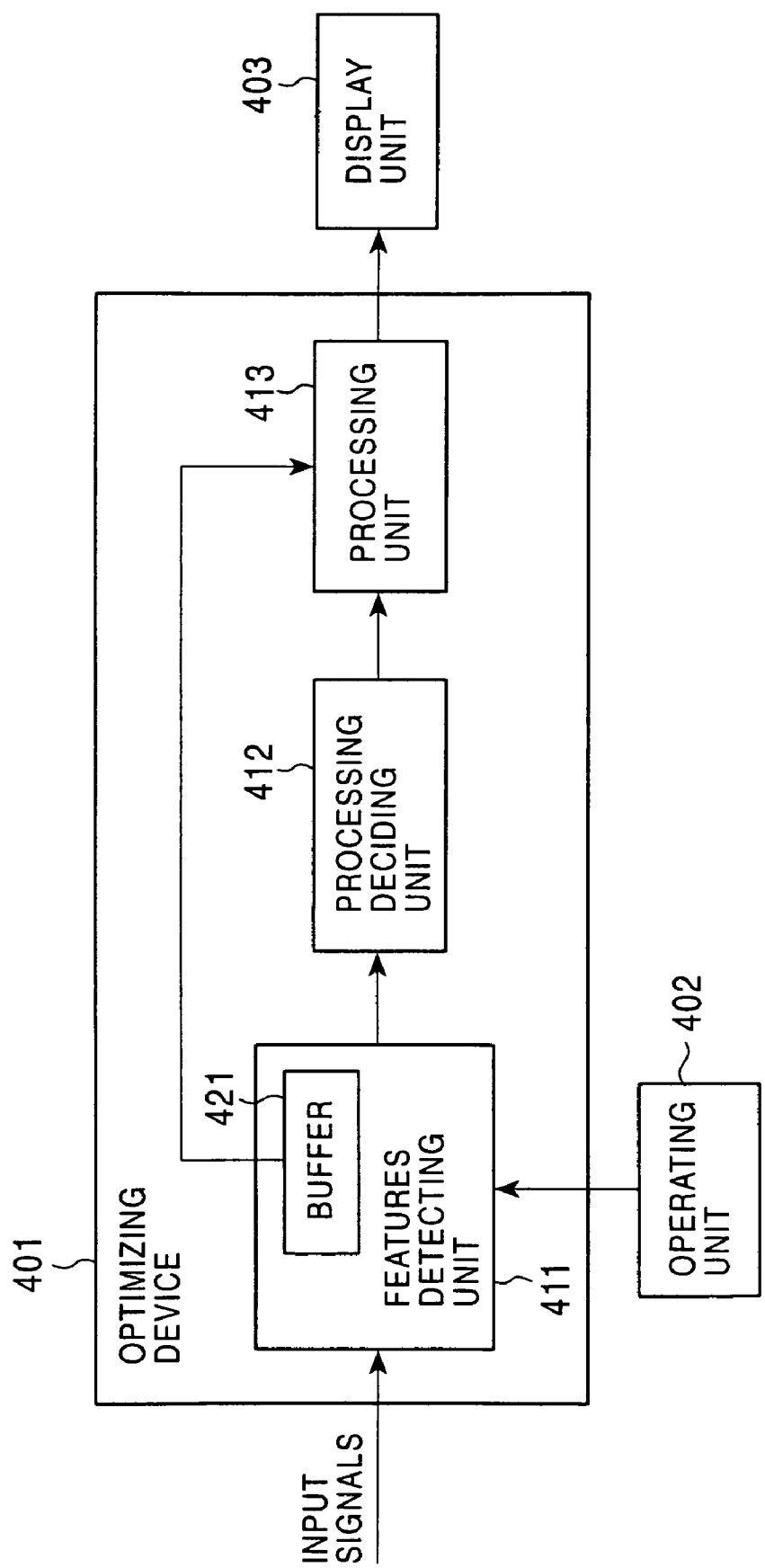
FIG. 55 is a block diagram illustrating a configuration example of another embodiment of an optimizing device to which the present invention has been applied.

Note that the optimizing device 401 shown in FIG. 55 is for extracting a telop from image signals, so the processing contents are processing whether or not to extract each pixel as a telop portion (to display or not), but may be made to subject the image signals to other processing as well, and this may be processing wherein input signals are output without change with regard to pixels recognized as being a telop portion, while pixels recognized as being other than telop portions are not output. Also, the image input as input signals will be described as a single frame still image, to facilitate description. However, the optimizing device 401 in FIG. 55 is also applicable to moving images.

Figure 59:
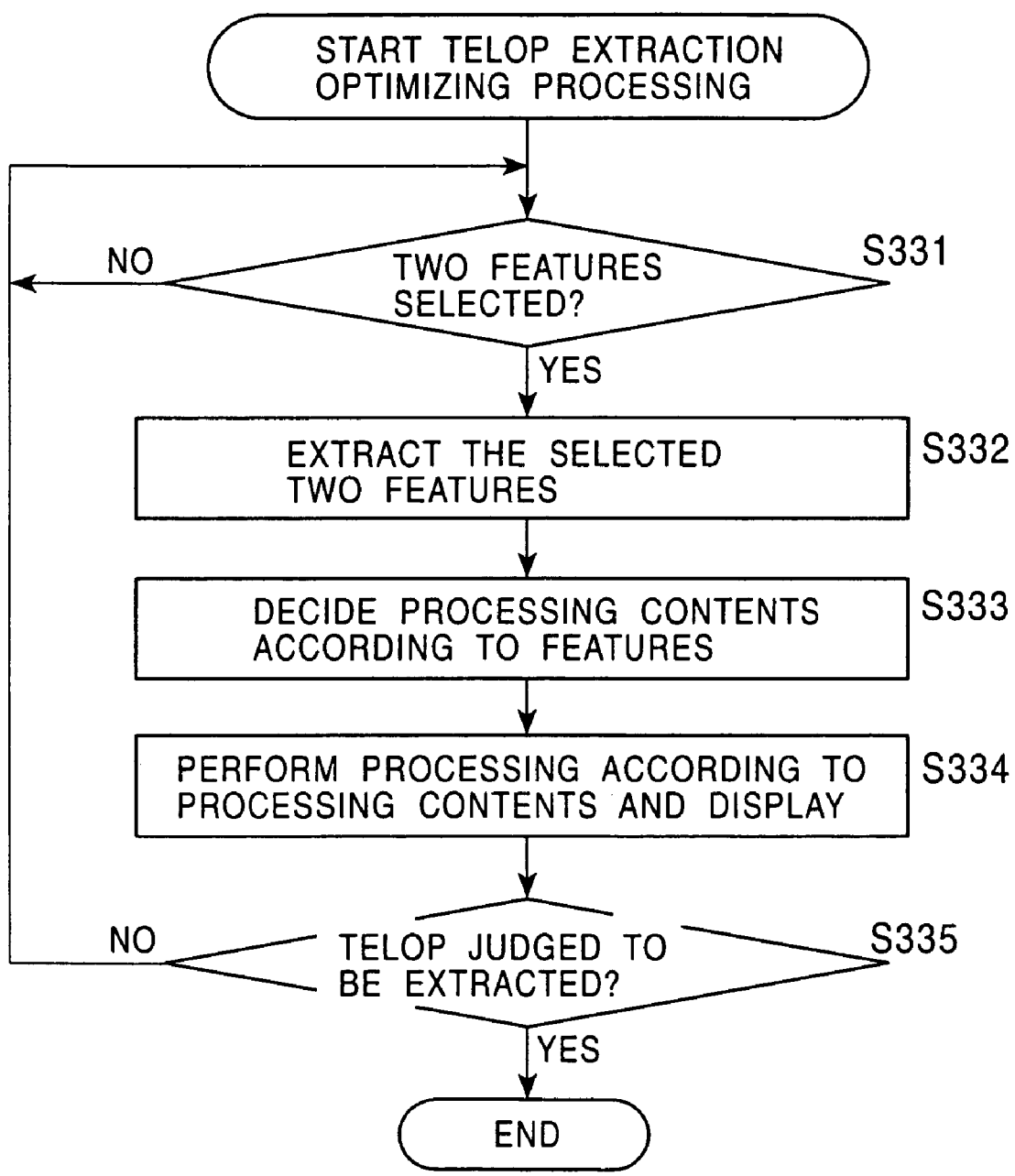
FIG. 59 is a flowchart describing telop extraction optimizing processing by the optimizing device shown in FIG. 55.

Next, the telop extracting optimizing processing with the optimizing device shown in FIG. 55 will be described, with reference to the flowchart in FIG. 59.

In step S331, the features extracting unit 422 of the features detecting unit 411 judges whether or not two types of features have been selected by the features selecting unit 423, and repeats the processing until these are selected. That is, the processing in step S331 is repeated until information indicating the features selected by the features selecting unit 423 is input to the features extracting unit 422 based on operating signals corresponding to the type of features input by the user operating the operating unit 402. For example, in the event that judgment is made that information for selecting the features has been input from the features selecting unit 423, i.e., in the event that judgment is made that the user has operated operating unit 402 and selected two types of features, the processing proceeds to step S332.

In step S332, the features extracting unit 422 extracts the two types of selected features from the image signals which are the input signals, for each pixel, and outputs these to the processing deciding unit 412. At this time, the image signals which are the input signals are stored in the buffer 421.

In step S333, the processing deciding unit 412 decides the processing contents based on the two types of input features, for each of the pixels, and outputs these to the processing unit 413. In more detail, the features recognizing unit 431 identifies the two types of input features, and outputs the identified types of features and the features themselves, to the processing deciding unit 412. Further, the processing deciding unit 412 decides the processing contents from the two types of features input for each of the pixels. More specifically, a table called an LUT (Look Up Table) correlating, for each of a combination of two arbitrary types which are a feature A and feature B (feature A, feature B), each value of feature A and feature B with processing contents regarding pixels having the features A and B (in this case, information whether or not this is a telop), is stored in the processing contents database 433, with the processing contents deciding unit 432 making reference to the LUT based on the combination of the (feature A, feature B) of the pixel of interest which is to be now processed, and decides the corresponding processing, i.e., whether or not to process as a telop, and outputs this to the processing unit 413. Also, this LUT is generated by extracting multiple features from telop-only images beforehand, for example, and correlating with information that the combination is a telop. Details of the LUT will be described later.

In step S334, the processing unit 413 processes the image signals serving as input signals input via the buffer 421, following the processing contents input from the processing deciding unit 412, converts these into image signals which can be displayed on the display unit 403, outputs to the display unit 403, and displays. In further detail, the processing contents recognize unit 441 of the processing unit 413 recognizes the processing contents input from the processing deciding unit 412, and instructs the processing executing unit 442 to execute processing that has been decided with regard to the corresponding pixels. The processing executing unit 442 reads out the image signals serving as a input signals that are stored in the buffer 421, executes processing corresponding to each of the pixels, converts these into image signals which can be displayed on the display unit 403, outputs to the display unit 403, and displays.

In step S335, the features detecting unit 411 judges whether or not a telop is deemed to be extracted. That is to say, in the event that the user views the image displayed on the display unit 403 and does not judge that a telop is being extracted, the operating unit 402 is operated so that the combination of features is changed again and telop extraction processing is attempted. Upon operating signals from the operating unit 402 corresponding to this operation being input, the processing returns to step S331, and the subsequent processing is repeated.

On the other hand, in the event that judgment is made according to the subjectivity of the user that a telop is being extracted, operating signals indicating completion of the processing are input to the-features detecting unit 421 by the user operating the operating unit 402, and the processing ends at this time.

That is to say, the processing of steps S331 through S335 is repeated until the user can judge that a telop is being extracted by viewing the image displayed on the display unit 403, due to the above-described processing, whereby a combinations of features optimal for the user can be set, and telops can be extracted from image signals serving as input signals. Now, in the above described, two types of features are used to decide the processing contents, but an arrangement may be made wherein the processing contents are decided by features of the number of types other than that number. Also, an arrangement may be made wherein, in the processing in step S331, combinations of multiple features are sequentially switched over in a predetermined order by operating signals corresponding to a predetermined operations made by the user at the operating unit 402 (e.g., button operations instructing up or down, etc.) thereby allowing the user to switch over and input the features without particularly giving consideration to the type of features.

In the above processing, the type of features detected by the features detecting unit 411 is changed at the processing unit 413 according to operations of the operating unit 402 by a user, so that the telop is detected. The changing of type of features detected at the features detecting unit 411 indicates change in the processing contents deciding algorithm at the processing deciding unit, so it can be said that at the features detecting unit 411 as well, the "structure of processing" is changed.

Also, as described above, detection of various types of features can be made at the features detecting unit 411, but some of the features require setting of parameters such as filter coefficients and the like in order to detect, such as Laplacian, for example. Parameters for detecting features can be made changeable corresponding to operations of operating unit 402, but according to this parameter changing, the types of features themselves being detected at the features detecting unit 411 do not change, but the values of the features being detected do change. Accordingly, it can be said that the change of parameters for detecting these features is a change of the "contents of processing" of the features detecting unit 411.

Figure 60:
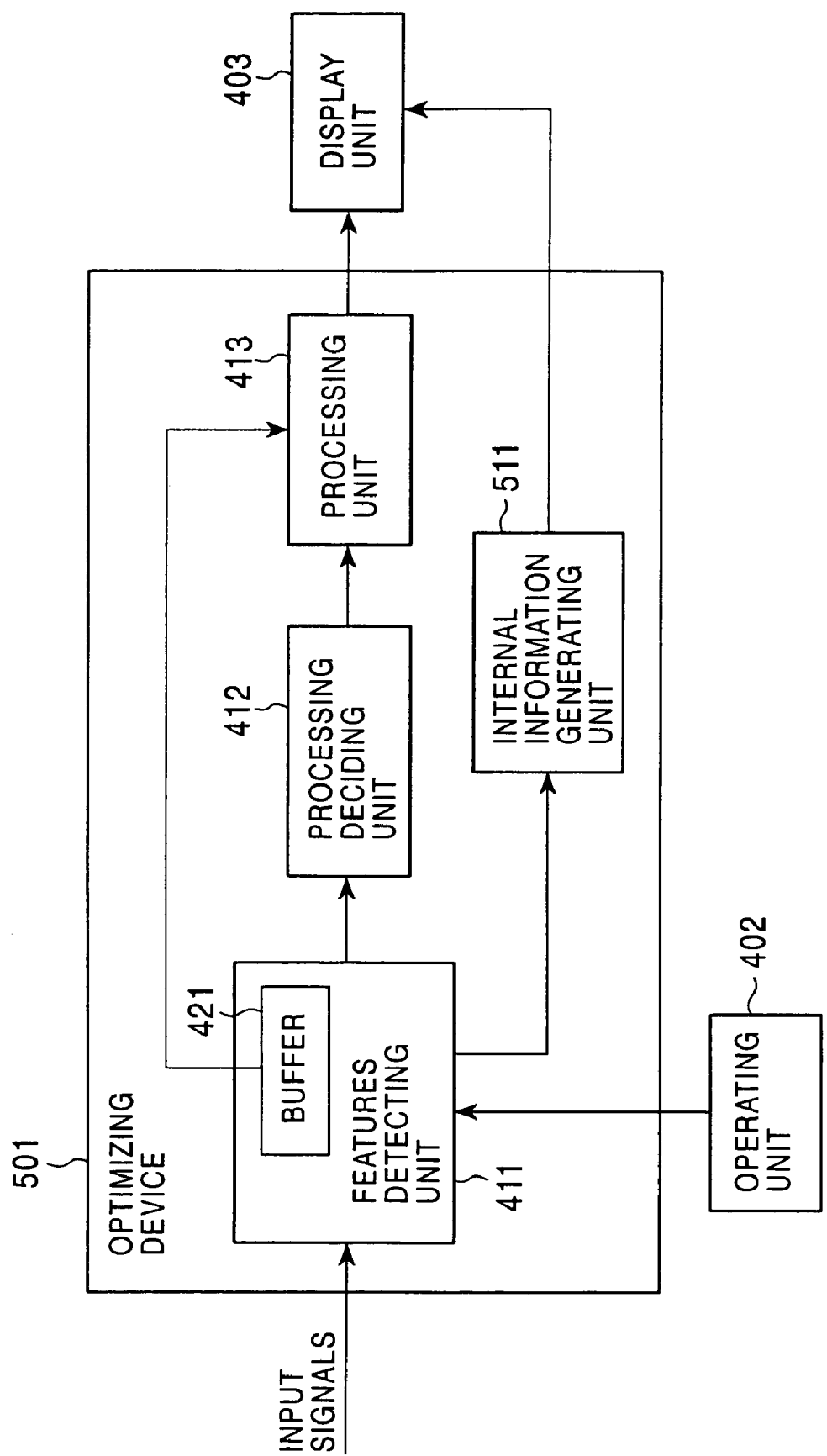
FIG. 60 is a block diagram illustrating a configuration example of another embodiment of an optimizing device to which the present invention has been applied.

Next, the configuration of an optimizing device 501 wherein the optimizing device 401 shown in FIG. 55 is provided with an internal information generating unit 511, with reference to FIG. 60. The optimizing device 501 shown in FIG. 60 is basically the same in configuration as the optimizing device 401 shown in FIG. 55, other than the internal information generating-unit 511 being provided.

The internal information generating unit 511 of the optimizing device 501 extracts, as internal information, features collecting information output from the features selecting unit 423 of the features detecting unit 411, for example, and displays the type of features currently selected on the display unit 403.

Now, the telop extracting optimizing processing performed by the optimizing device 501 will be described with reference to flowchart in FIG. 61.

Note that this processing is basically the same processing as the telop extraction optimizing processing by the optimizing device 401 shown in FIG. 56, described with reference to the flowchart in FIG. 59, and differs in the point that processing for displaying the information indicating the type of features that has been selected, has been added.

That is to say, in step S341, the features extracting unit 422 of the features detecting unit 411 judges whether or not two types of features had been selected by the features selecting unit 423, and repeats the processing until they are selected. For example, in the event that judgment is made that information for selecting features has been input from the features selecting unit 423, i.e., in the event that judgment is made that the user has operated the operating unit 402 and selected two types of features, the processing proceeds to step S342.

In step S342, the internal information generating unit 511 extracts information indicating the two types of features that have been selected from the features selecting unit 423, and displays the name of the types of the two features that have been selected, on the display unit 403.

Subsequently, processing that is the same as that in steps S332 through S335 is performed in steps S343 through S346, respectively.

Figure 61:
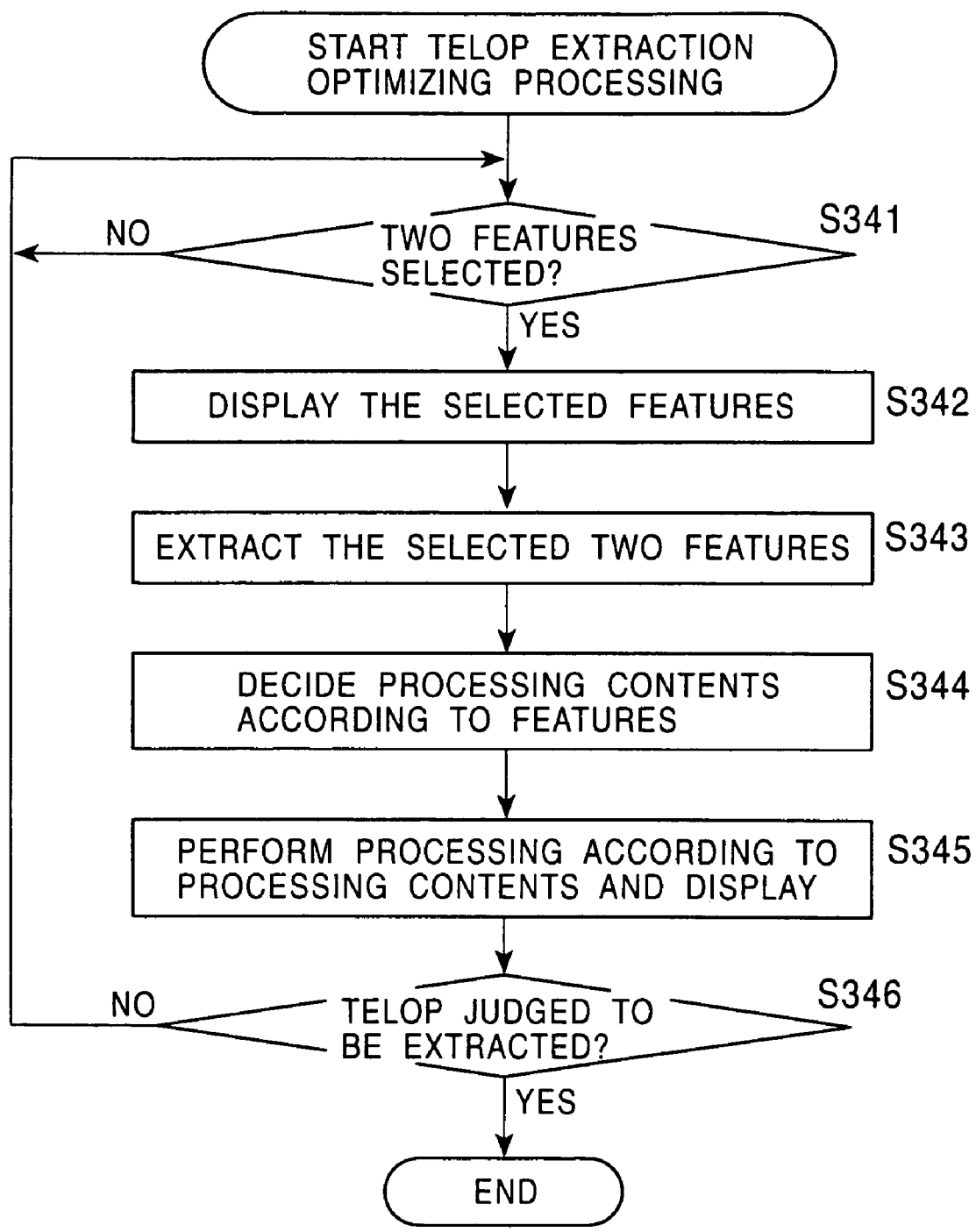
FIG. 61 is a flowchart describing telop extraction optimizing processing with the optimizing device shown in FIG. 60.

According to the processing in FIG. 61, the types of features currently selected, which is internal information relating to the processing of the features detecting unit 411, is displayed (presented), so the user can set a combination of features optimal for precisely extracting telop from the image signals serving as input signals, while understanding the types of features currently being selected.

Figure 67:
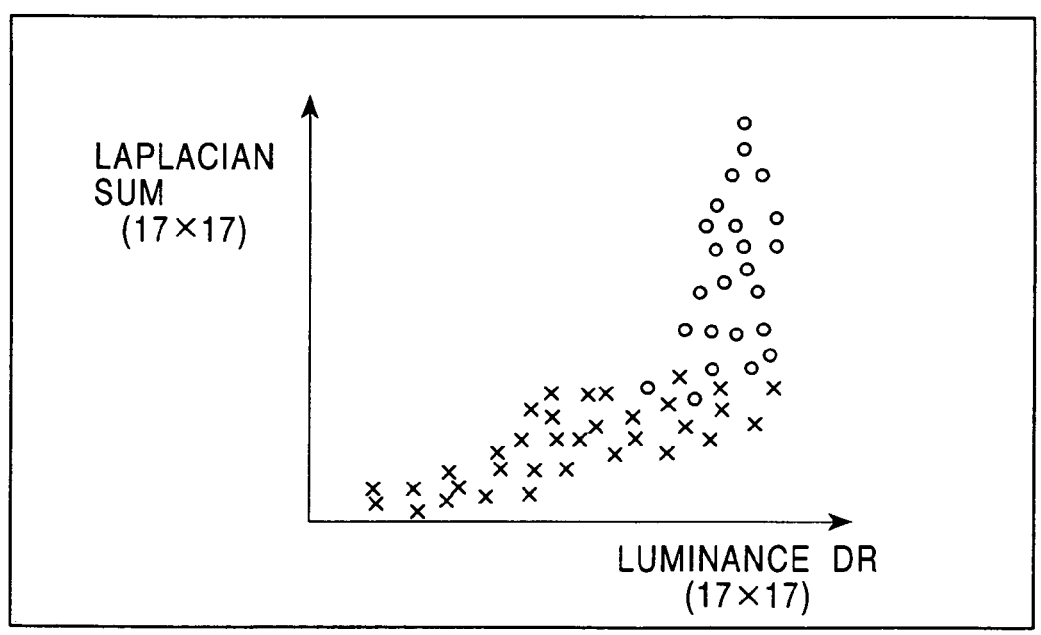
FIG. 67 is a diagram describing telop extraction optimizing processing with the optimizing device shown in FIG. 62.

Now, the internal information generating unit 511 is capable of, for example, generating a distribution of values of two types of features detected by the features detecting unit 411 with regard to each of the pixels, as internal information, and displaying this on the display unit 403, as indicated in the later-described FIG. 65 and FIG. 67.

Also, as described above, in the event of changing the parameters for detecting features according to operations of operating unit 402, the internal information generating unit 511 can display (present) the parameters on the display unit 403, as internal information.

Next, a configuration example of an optimizing device 601 arranged so as to be provided with an internal information generating unit 611 which generates internal information from the processing deciding unit 412, instead of the internal information generating unit 511 shown in FIG. 60, will be described with reference to FIG. 62.

Figure 62:
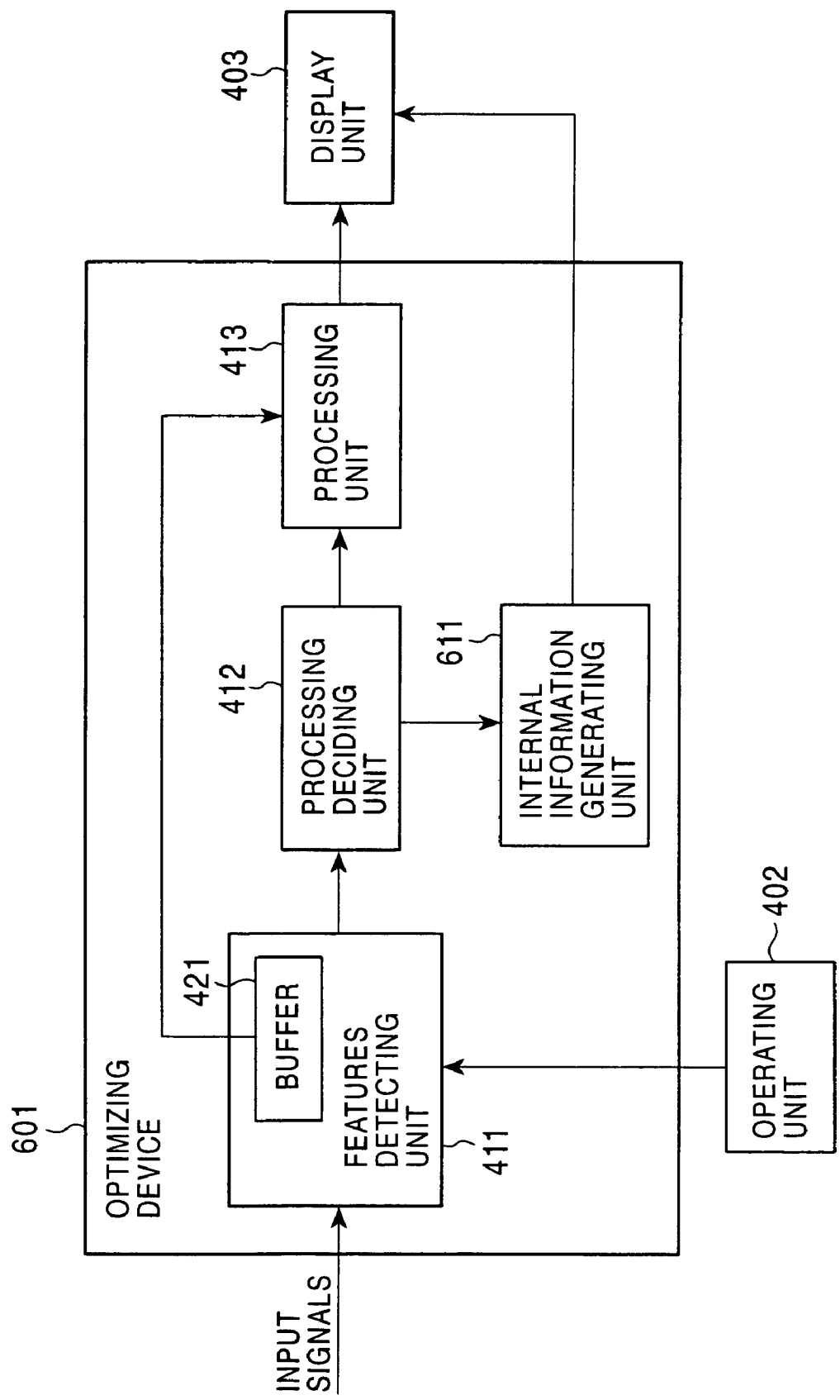
FIG. 62 is a block diagram illustrating a configuration example of another embodiment of an optimizing device to which the present invention has been applied.

The optimizing device 601 shown in FIG. 62 is configured in the same way as the optimizing device 501 in FIG. 60 other than the internal information generating unit 611 has been provided instead of the internal information generating unit 511 shown in FIG. 60.

The internal information generating unit 611 generates, as internal information, a distribution diagram (e.g., FIG. 65, FIG. 67) of pixels subjected to a telop extraction at the time of two types of features serving as axes, and pixels not subjected to telop extraction, based on the processing contents decided by the processing contents deciding unit 432 of the processing deciding unit 412, and the two types of features actually extracted, which is displayed on the display unit 403.

Figure 63:
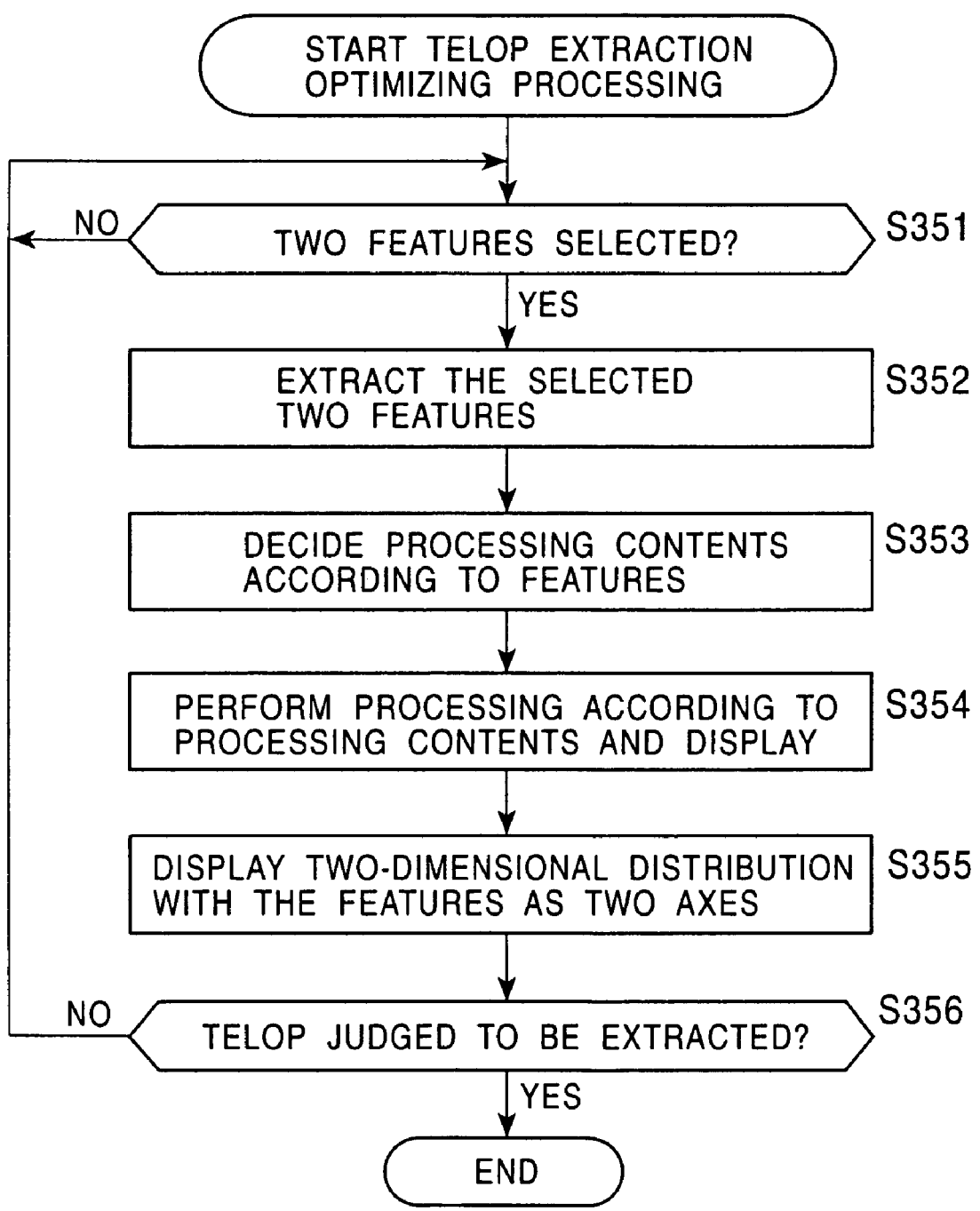
FIG. 63 is a flowchart describing telop extraction optimizing processing with the optimizing device shown in FIG. 62.

Next, the telop extraction optimizing processing by the optimizing device 601 shown in FIG. 62 will be described with reference to the flowchart in FIG. 63.

Note that this processing is basically the same processing as a telop extraction optimizing processing performed by the optimizing device 501 shown in FIG. 60, which has been described with reference to the flowchart in FIG. 61, except for the point that processing wherein a distribution regarding whether or not pixels have been subjected to telop extraction with the two types of selected features as axes, is displayed.

That is to say, in step S351, the features extracting unit 422 of the features detecting unit 411 judges whether or not two types of features have been selected by the features selecting unit 423, and the processing is repeated until these are selected. For example, in the event that judgment is made that information has been input from the features selecting unit 423 for selecting features, i.e., in the event that judgment is made that the user has operated the operating unit 402 and selected two types of features, the processing proceeds to step S352.

In step S352, the features extracting unit 422 extracts two types of selected features from the image signals serving as input signals for each of the pixels, and outputs these to the features deciding unit 412. At this time, the image signals which are the input signals are stored in the buffer 421.

In step S353, the processing deciding unit 412 decides processing contents for each of the pixels based on input two types of features, and outputs this to the processing unit 413.

In step S354, the processing unit 413 processes the image signals which are the input signals read out from the buffer 421 following the processing contents input from the processing deciding unit 412, converts these to image signals that can be displayed on the display unit 403, outputs to the display unit 403, and displays.

In step S355, the internal information generating units 611 generates, as internal information, a distribution diagram plotting the processing contents decided by the processing contents deciding unit of the processing deciding unit 412, with the two types of features as axes, and displays this on the display unit 403.

In step S356, the features detecting unit 411 judges whether or not a telop is being extracted. In step S356, in the event that operating signals corresponding to user operations are being input from the operating unit 202, and it is deemed that there is no telop extraction, the processing returns to step S351, and the subsequent processing is repeated.

On the other hand, in the event that in step S356, operating signals indicating ending of the processing are input to the features detecting unit 421 by the user operating the operating unit 402, the processing ends.

Figure 64:
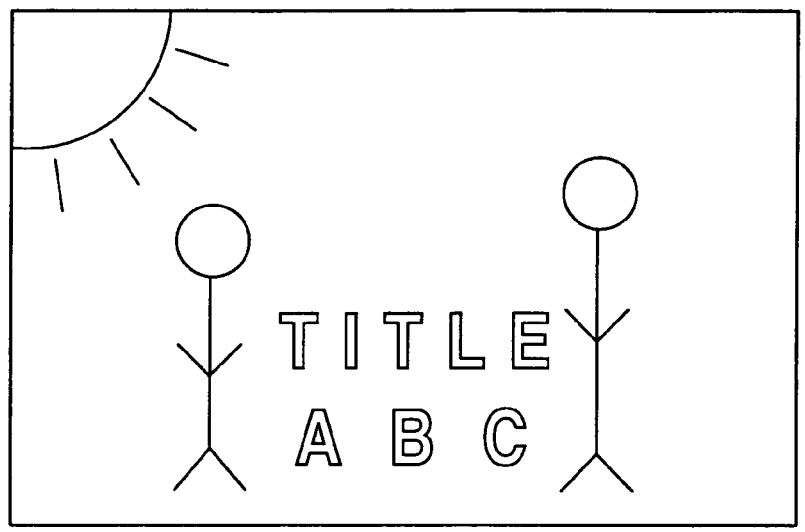
FIG. 64 is a diagram describing telop extraction optimizing processing with the optimizing device shown in FIG. 62.

That is, let us say that image signals which are input signals such as shown in FIG. 64, are input, for example. In FIG. 64, "TITLE ABC" is displayed as a telop in the center of the diagram, as to the background image (here, the portion which is not a telop).

Figure 65:
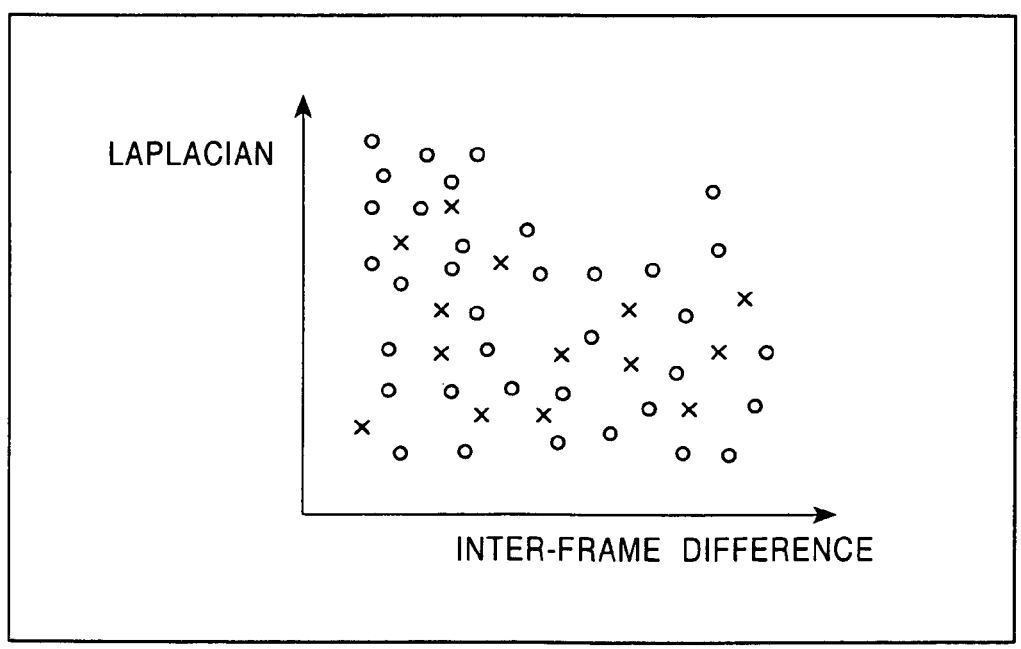
FIG. 65 is a diagram describing telop extraction optimizing processing with the optimizing device shown in FIG. 62.

In step S355, the internal information generating unit 611 displays the distribution indicating whether or not there has been extraction as a telop, with the two types of features detected from the image signals such as shown in FIG. 64 as respective axes, as a 2-dimensional distribution diagram such as shown in FIG. 65, for example.

Figure 66:
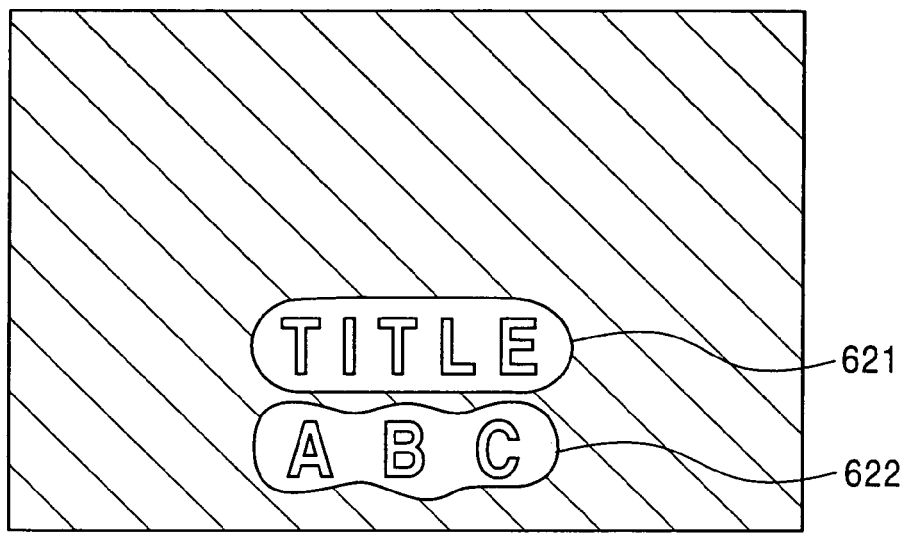
FIG. 66 is a diagram describing telop extraction optimizing processing with the optimizing device shown in FIG. 62.

In the example in FIG. 65, Laplacian and into-frame of difference are the two types of features that have been selected, with the circles in the figure indicating pixels that have been extracted as a telop, and the X's indicating pixels regarding which there has been no telop extraction. With the example in FIG. 65, pixels with telop extraction and pixels with no telop extraction are borderless in the distribution (the distribution between telop pixels and non-telop pixels is not divided). In the case of such a distribution, the telop is often not being extracted from the background image, and as shown in FIG. 66 for example, is in a state with borders 621 and 622 being formed around the telop portions, instead of the telop portions themselves being borders.

Figure 68:
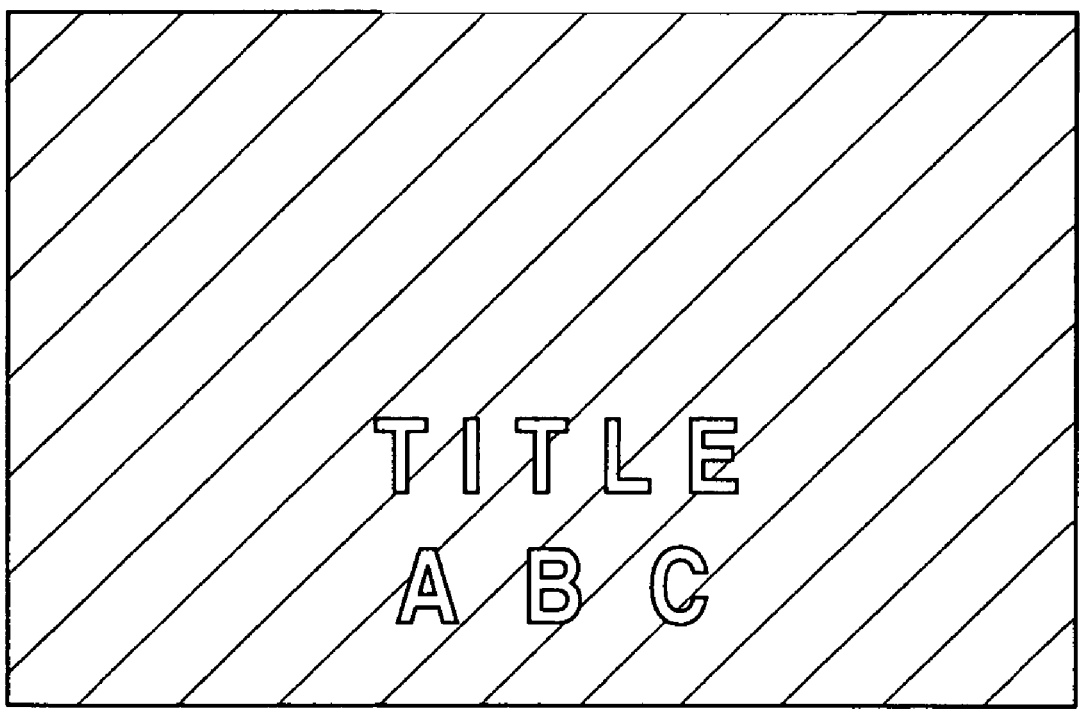
FIG. 68 is a diagram describing telop extraction optimizing processing with the optimizing device shown in FIG. 62.

In such cases, the user will judge that the telop is not being extracted, and the processing in steps S351 through S356 is repeated. In the event that the selected features due to repetition of this processing are Laplacian sum (17 pixels×17 pixels) (the sum of each Laplacian of the pixels within the 17 pixel×17 pixel range centered on the pixel of interest) and luminance DR (the dynamic range of pixels within the 17 pixel×17 pixel range centered on the pixel of interest, for the luminance value of each pixel), distribution diagram is generated such as shown in FIG. 67. In this case, in FIG. 67, the distribution of pixels extracted as telop and the distribution of pixels not extracted as telop are visually separated. This indicates that the telop in the input image and other parts are divided into distribution in the event that the combination of the Laplacian sum and luminance DR is selected as features. Upon such a distribution being obtained, the Laplacian sum and luminance DR which are the features detected from each of the pixels are subjected to a threshold processing and the like, thereby allowing the telop portion to be precisely extracted, as shown in FIG. 68.

Thus, due to the above-described processing, the processing in steps S351 through S356 is repeated until the user can judge by viewing the image displayed on the display unit 403 and the 2-dimensional distribution with the two selected types of features as axes that the telop is being extracted, so that the distribution of pixels detected to be telop from the features serving as internal information relating to the processing of the processing deciding unit 412, and background pixels, is displayed, whereby the user can operate the operating units 402 so as to precisely extract the telop from the image signal which are the input signals, while understanding the distribution of pixels detected to be a telop from the features, and background pixels, thereby setting a combination of features optimal for the user.

Next, a description will be made regarding the configuration of an optimizing device 701 provided with a processing deciding unit 711 instead of the processing deciding unit 412 of optimizing device 601 shown in FIG. 62, with reference to FIG. 69. With optimizing device 701, configurations are the same as those of optimizing device 601 shown in FIG. 62, except that the processing deciding unit 711 is provided in step of the processing deciding unit 412.

The processing deciding unit 711 changes the contents of the LUT in the processing contents database 433 based on operating signals from the operating unit 702 (the same as the operating unit 402), and also decides processing for the later processing unit 413 to perform on image signals based on features input from the features detecting unit 411, and outputs the processing contents to the processing unit 413.

Figure 70:
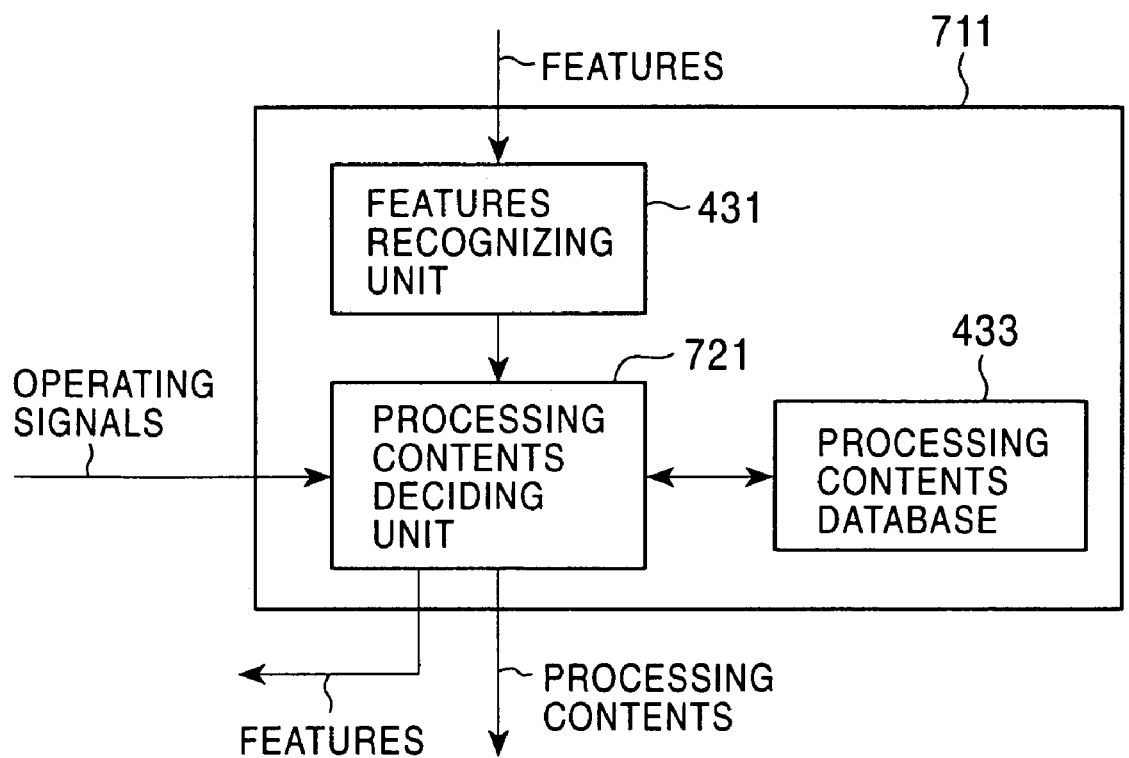
FIG. 70 is a block diagram illustrating a configuration example of the processing deciding unit shown in FIG. 69.

The processing deciding unit 711 will next be described with reference to FIG. 70. The basic configuration is the same as the processing deciding unit 412 shown in FIG. 50, but processing contents deciding unit 721 is provided instead of the processing contents deciding unit 432. The processing contents deciding unit 721 changes the LUT wherein is decided the processing contents for each of the combinations of two types of features stored in the processing contents database 433, based on operating signals input from the operating unit 702. In more detail, the LUT is set such that the features of pixels in an area specified as a telop by the operating unit 202 what is deemed to be a telop in the state of the image signals which are the input signals being displayed without change, and other areas are processed as being other than the telop.

Following the LUT been changed, the processing contents deciding unit 721 decides the processing contents set beforehand for each of the features that are stored in the processing contents database 433, based on the information for identifying the features input from the features recognizing unit 431, and the features themselves, and outputs the decided processing contents to the processing unit 413.

Figure 71:
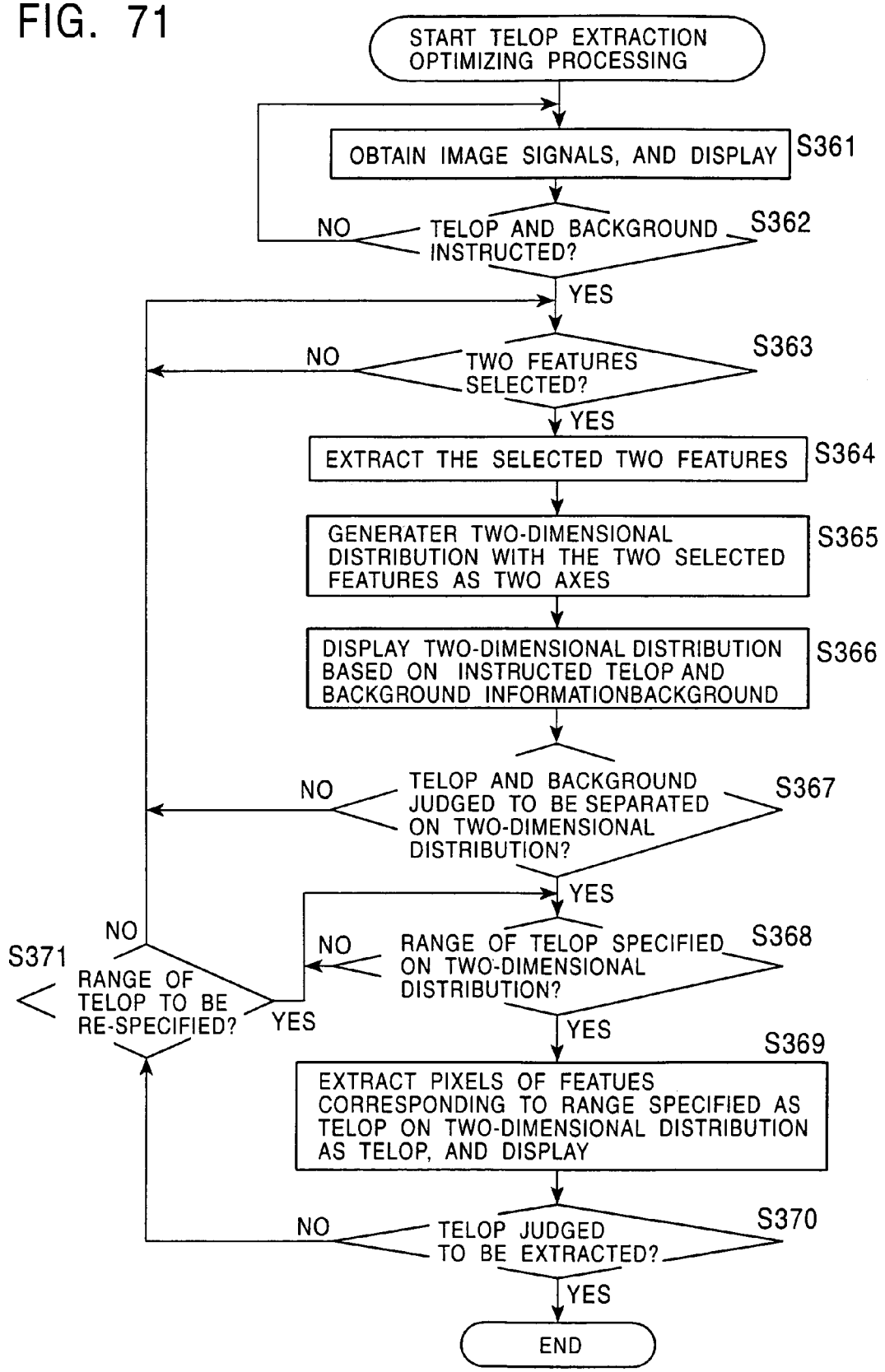
FIG. 71 is a flowchart describing telop extraction optimizing processing with the optimizing device shown in FIG. 69.

Next, the telop extraction optimizing processing by the optimizing device 701 shown in FIG. 69 will be described with reference to the flowchart in FIG. 71.

In step S361, image signals which are the input signals are displayed on the display unit 403 without change. More specifically, the buffer 421 of the features detecting unit 411 receive the image signals serving as input signals and store these, and the processing unit 413 reads out the image signals which are the input signal stored in the buffer 421 without change, and outputs these to the display unit 403 without any processing, where they are displayed.

Figure 72:
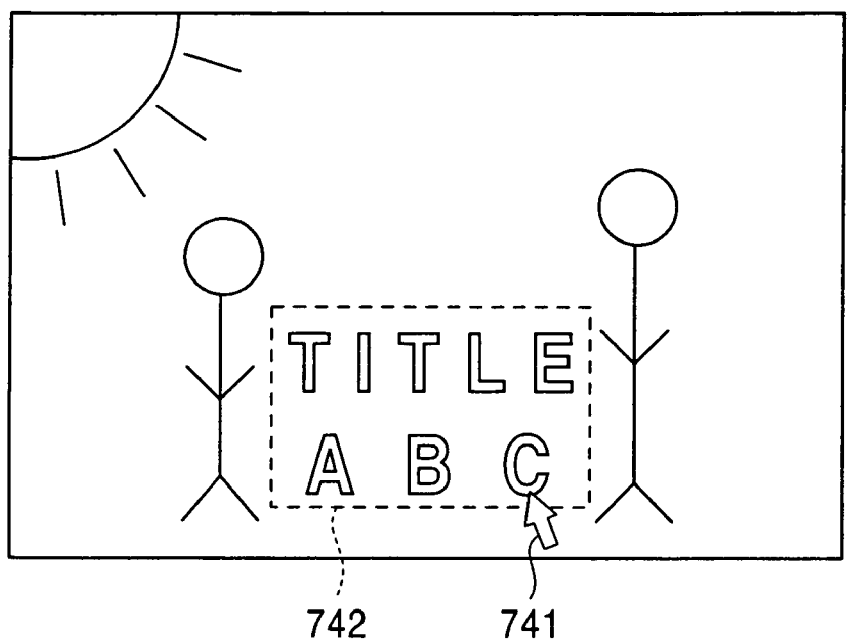
FIG. 72 is a diagram describing telop extraction optimizing processing with the optimizing device shown in FIG. 69.
Figure 73:
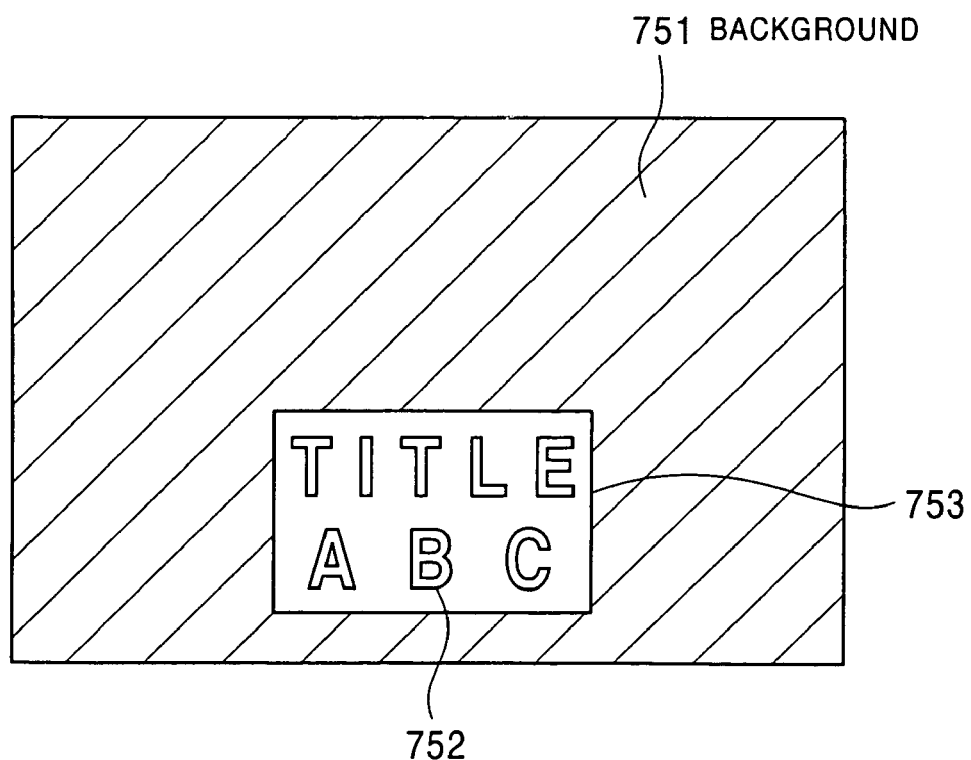
FIG. 73 is a diagram describing telop extraction optimizing processing with the optimizing device shown in FIG. 69.

In step S362, the processing contents deciding unit 721 of the processing deciding unit 711 judges whether or not the telop and background have been instructed from the operating unit 702. That is, let us say that, for example, unprocessed image signals such as shown in FIG. 72 are displayed in the processing in step S361. At this time, the user operates a pointer 741 via the operating unit 702 (by dragging, clicking, etc.), to specify a general telop portion by a range 742 or the like, and as shown in FIG. 73, repeats the processing until the telop portions 752 and the background portion 751 outside the range 742 in FIG. 72 are specified, and that the point that the telop and the background portion of specified, the specified perspective corresponding pixel positions are stored in built-in memory (not shown), and the processing proceeds to step S363.

In step S363, the features selecting unit 423 of the features detecting unit 421 judges whether or not operating signals for selecting the predetermined two types of features have been input from the operating unit 202, the processing is repeated until the predetermined two types of features are specified, and upon the predetermined two types of features being selected, the processing proceeds to step S364.

In step S364, the features extracting unit 422 extracts the two types of features selected from the input signals, based on information for selecting the types of features a input to the features selecting unit 423, and outputs these to the processing deciding unit 711.

Figure 74:
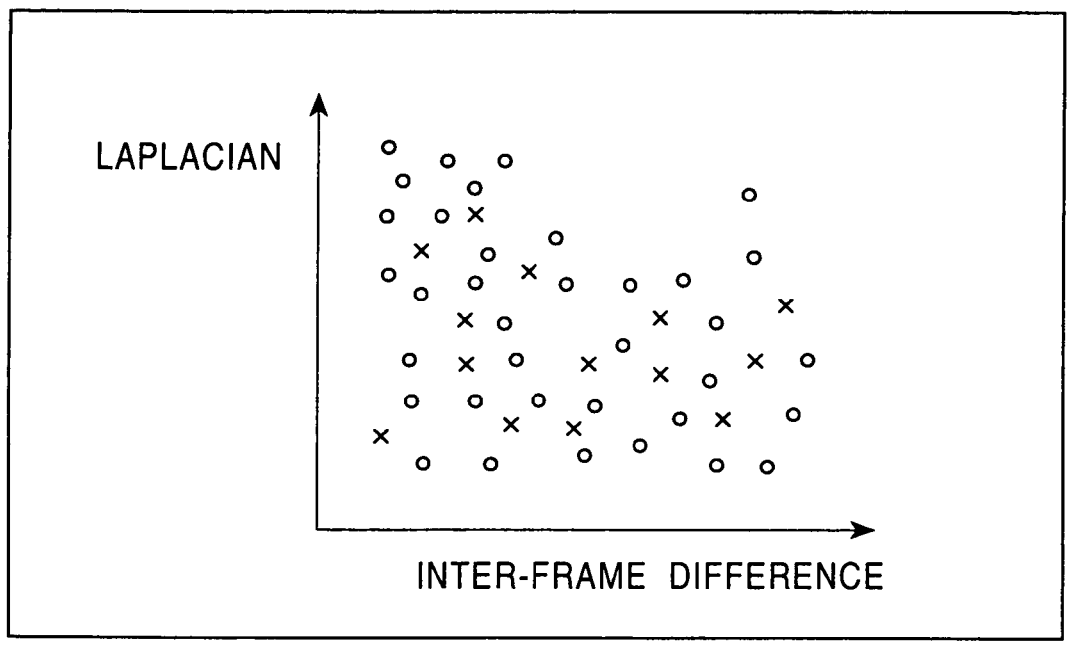
FIG. 74 is a diagram describing telop extraction optimizing processing with the optimizing device shown in FIG. 69.

In step S365, the internal information generating units 611 generates a 2-dimensional distribution diagram with the two types of features as axes thereof, based on the two types of features input to the processing deciding unit 711 and the information of pixel position specified for the telop and the background, and in step S366, displays the 2-dimensional distribution diagram on the display unit 403. In further detail, the features recognizing unit 431 of the processing deciding unit 711 recognizes the type of features, outputs information indicating the type, and the features themselves, to the processing contents deciding unit 721, and the processing contents deciding unit 721 outputs information indicating the pixel positions specified for the telop and background to the internal information generating 611, in addition to the information indicating features and the types thereof, so that the internal information generating unit 611 generates 2-dimensional distribution diagram of the features such as shown in FIG. 74, for example, based on the information indicating the pixel positions specified for the telop and background. That is to say, with the example in FIG. 74, an example is illustrated wherein Laplacian and inter-framed difference are selected as features, with the circles in the figure indicating telop pixels, and the X's in the figure indicating pixel specified as being the background. With the 2-dimensional distribution diagram in FIG. 74, for example, with regard to a particular pixel, the Laplacian is detected at a value of X, the inter-frame difference is detected at a value of Y and in the event that that pixel has been specified as telop, a circle is displayed at the position of (X, Y) on the 2-dimensional distribution, while in the event that background has been specified, an X is displayed at that same position.

In step S367, the processing contents deciding unit 721 judges whether or not operating signals indicating that judgment has been made that the telop and background have been separated have been input. That is, for example, in the case of a 2-dimensional distribution such as shown in FIG. 74, the distribution of circles indicating the telop and the distribution of X's indicating the background cannot be said to be completely separated, so as a matter of course, the telop cannot be expected to be extracted on the display screen, and in many cases the background and telop are in the state of not being separated such as, as shown in FIG. 73 for example, a border 753 is generated separate to the background portion 751 and the telop portions 752. In such cases wherein the user judges that the telop is not extracted, at the point of the user attempting to change the features again, the operating unit 702 outputs operating signals indicating that separation has not been achieved to the processing contents deciding unit 721 of the processing deciding unit 711, in accordance with operations made by the user. In this case, in step S367, judgment is made that there have not been operating signals indicating judgment that the telop and background have been separated, so the processing returns to step S363, and the subsequent processing is repeated. This processing means that two types of features are selected again.

Figure 75:
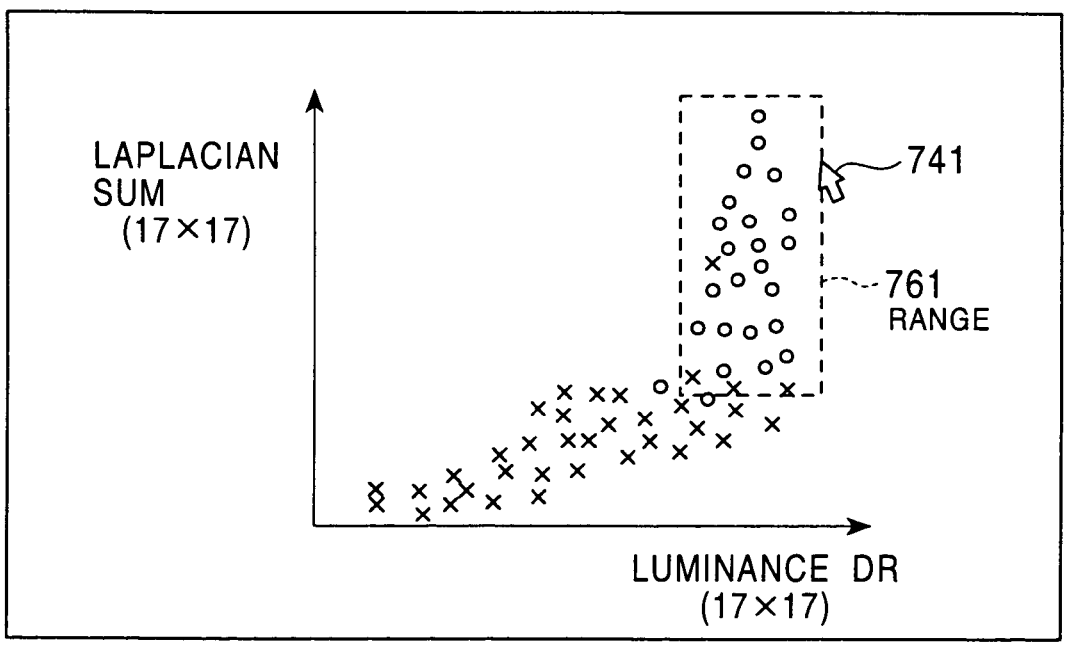
FIG. 75 is a diagram describing telop extraction optimizing processing with the optimizing device shown in FIG. 69.

Also, in the event that as shown in FIG. 75, for example, the circles indicating the telop portion and the X's indicating the background are separated to a certain extent by the processing in step S366, the operating unit 702 is operated by the user to output operating signals indicating that separation has been achieved, to the processing contents deciding unit 721 of the processing deciding unit 711. In this case, judgment is made that operating signals indicating a judgment that the telop and background have been divided has been input in step S367, and the processing proceeds to step S368.

In step S368, the processing contents deciding unit 721 judges whether or not the telop portion has been instructed on the 2-dimensional distribution. That is, as shown in FIG. 75, judgment is made whether or not operating signals specifying the range 761, for example, by the operating unit 702, has been input as the range where a great number of circles indicating the telop are distributed on the displayed distribution, with the pointer 741, the processing is repeated until the range specified, and upon judgment being made that this has been specified, the processing proceeds to step S369.

In step S369, the processing contents deciding unit 721 changes the processing contents: the LUT indicating whether or not there has been telop extraction corresponding to combinations of the features, based on operating signal specified in the range 761 shown in FIG. 75 that has been input by the operating unit 702, and decides the processing context according to the changed LUT which are output to the processing unit for 13, while the processing unit 413 follows the input processing contents to extract the telop from the image signals serving as the input signal that had been input via the buffer 421, and to display these owned the display unit 403. In further detail, the processing contents deciding unit 721 updates the LUT in the processing contents database 433 so as to extract the combination of two types of features corresponding to the pixels distributed in a specified range as telop, based on information indicating a range on the 2-dimensional distribution such as shown in FIG. 75, that has been input from the operating unit 702, and further decides the processing contents for each pixel following the updated LUT, which are output to the processing unit 413.

Figure 76:
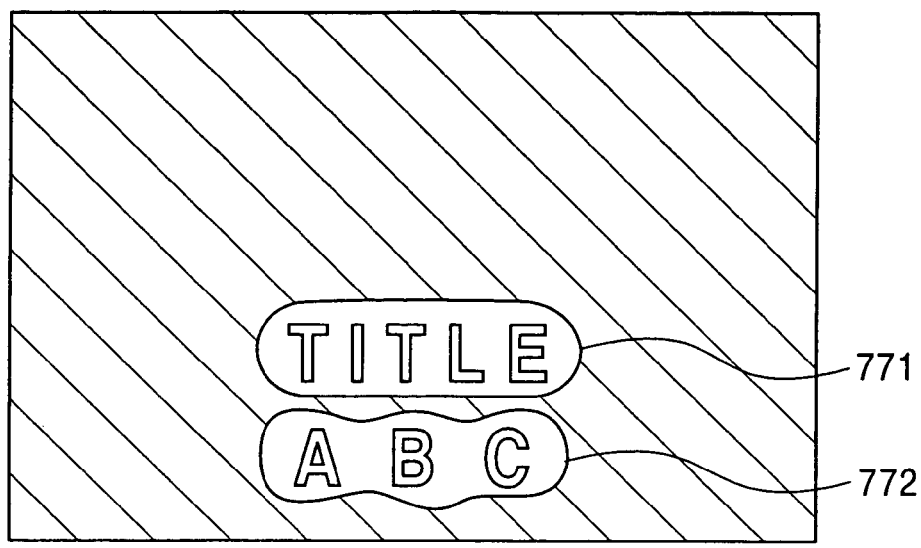
FIG. 76 is a diagram describing telop extraction optimizing processing with the optimizing device shown in FIG. 69.

In step S370, the processing contents deciding unit 721 judges whether or not judgment has been made that the telop has been extracted. That is, judgment is made whether the user judges the telop to be extracted or judges the telop to not be extracted. For example, as shown in FIG. 76, in the state that the output images displayed on the display unit 403 by the processing in step S369, the boundaries 771 and 772 between the telop portion and background portion are not the telop itself, so it cannot be said that the telop is completely extracted. Accordingly, in the event that the telop is judged to be not extracted from the perspective of the user, the user operates the operating unit 702 to input operating signals indicate that the telop has not been extracted. Upon receiving these operating signals, the processing contents deciding unit

721 of the processing deciding unit 711 makes judgment in step S730 that the telop is not extracted, and the processing proceeds to step S731.

In step S371, judgment is made regarding whether or not to re-specify the range for the telop on the 2-dimensional distribution, and in the event that judgment is made to that not re-specifying the range for the telop on the 2-dimensional distribution has been selected, the processing returns to step S368, and the subsequent processing is repeated.

Figure 77:
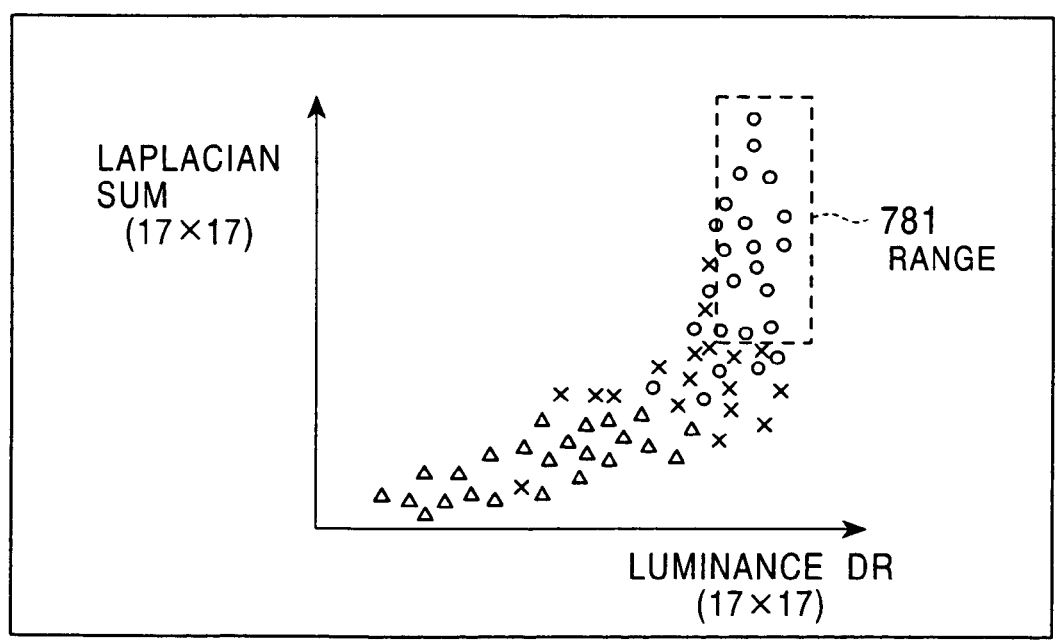
FIG. 77 is a diagram describing telop extraction optimizing-processing with the optimizing device shown in FIG. 69.

On the other hand, in step S370, in the event that re-specifying the range for the telop has been selected by the processing in step S371, for example, a range 781 wherein the portion where the distribution of circles indicating the telop exists has been narrowed down as compared to the range 761 in FIG. 75 (a range narrowing down the portion containing a great number of circles extracted more as telop), as shown in FIG. 77, is set in step S368. That is, in FIG. 75, even in the event of setting the range 761 on the features distribution as a telop portion, consequently, the boundaries 771 and 772 between the telop portion and background portion are not the telop itself, as shown in FIG. 76, so the telop is not completely extracted.

Accordingly, the user operates the operating unit 702 to set a range 781 which is narrower than the range 761, as a range over the features distribution (as a range of a portion to specify as a telop portion). Setting the range thus narrows down the range on the features distribution to be extracted as a telop, that is to say, the background portion is more readily eliminated. However, ignoring the range to be extracted as telop too much causes the telop itself to not be readily extracted, so the user searches for an optimal telop extractions state by repeating such operations while viewing the extracted telop.

Figure 78:
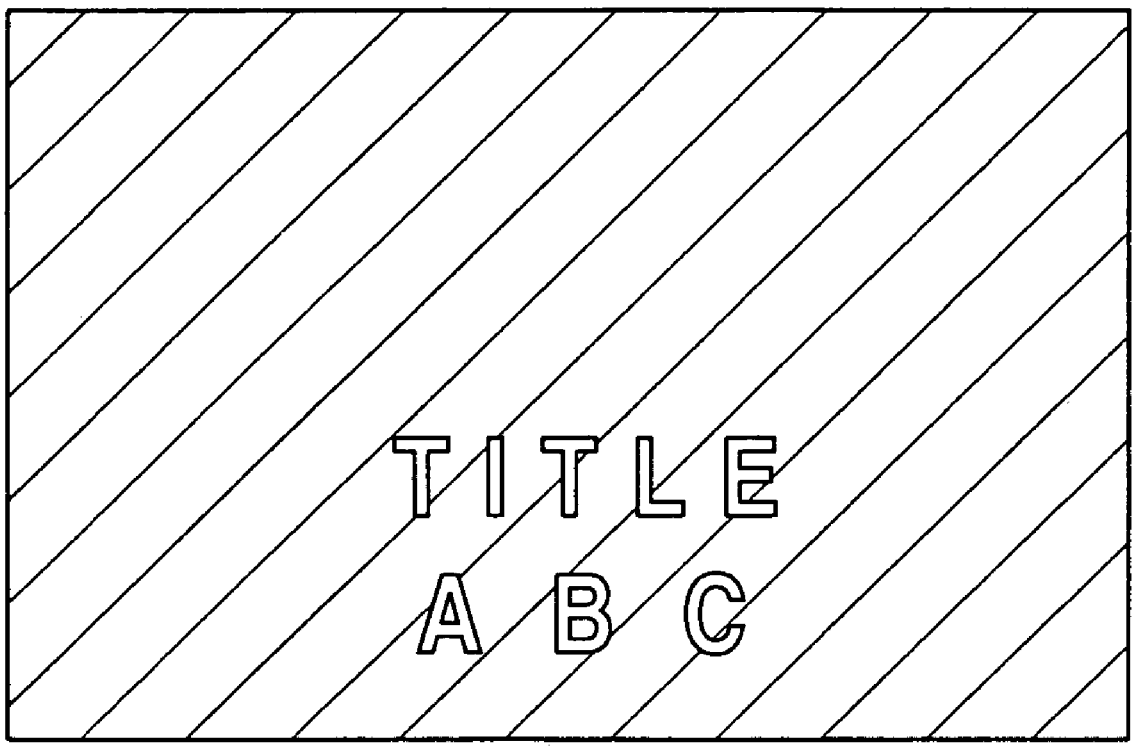
FIG. 78 is a diagram describing telop extraction optimizing processing with the optimizing device shown in FIG. 69.

Upon the state being that such as shown in FIG. 78, for example, wherein the telop is extracted, and in the event that the user judges that the telop is extracted in step S370, the user operates the operating unit 702, and operating signals indicating that jet and has been made that the telop has been extracted are input to the processing contents deciding unit 721 of the processing deciding unit 711, so judgment is made that the telop is extracted, and the processing ends.

Also, in the event that judgment is made in step S371 that this does not specified the range of the telop, the processing returns to step S363, and subsequent processing is repeated.

Due to such processing, first, the user selects two types of features of the telop and background on the image signals which are the input signals, and, viewing how the selected telop and background form a 2-dimensional distribution with the selected features as the two axes thereof, changes (narrows down) the range of the telop on the 2-dimensional distribution, or changes the two selected features, and further views that extracted telop, and repeats this processing until the state is that preferred by the user, thereby a realizing telop extraction processing matching the preferences of the user. In the event that judgment is made in the processing in step S362 that the telop and background have been instructed, it is sufficient that instructions of the range of telop and background serves to subsequently select two types of features or generate information serving as a template for narrowing down the telop on the 2-dimensional distribution, so the range can be very general.

In the above processing, division is made into telop or background processing, according to combinations of two types of features selected by the user, so this means that the "contents of processing" have been changed by user operations.

Figure 79:
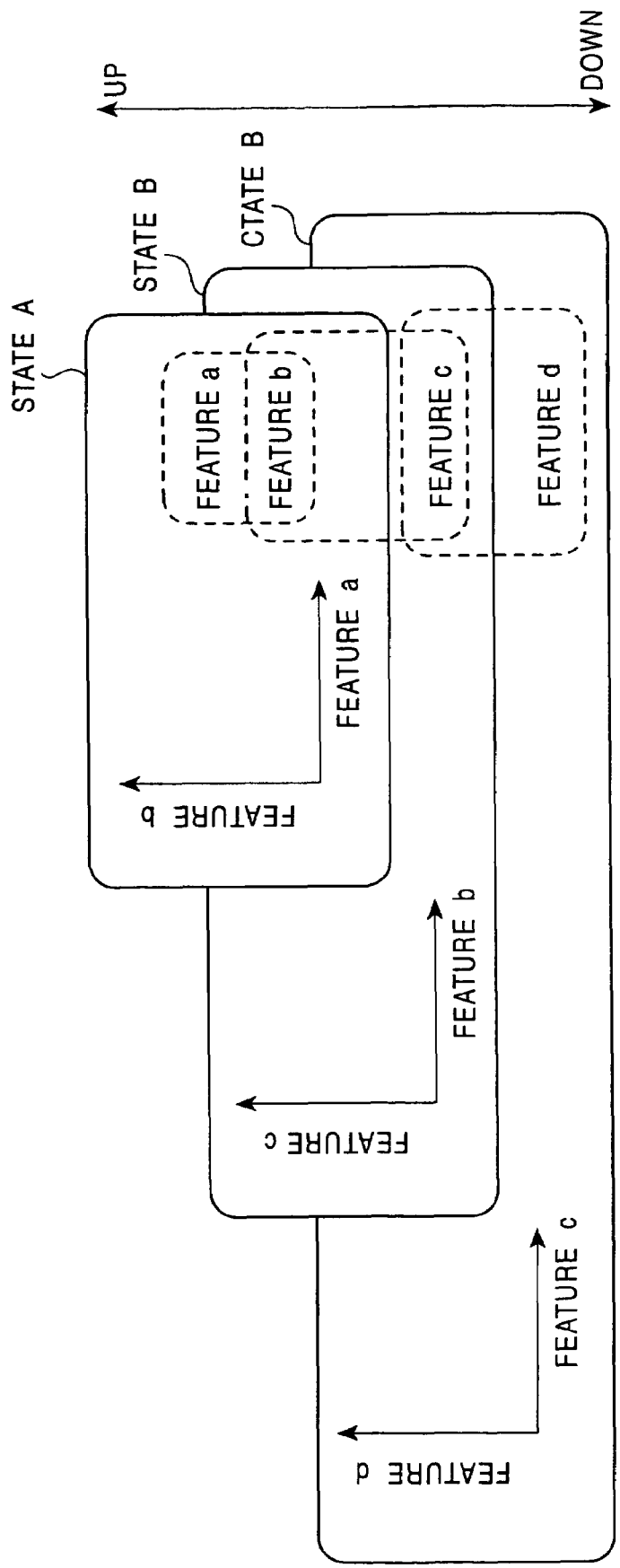
FIG. 79 a diagram describing switching over of features with the optimizing device shown in FIG. 69.

Also, with the above processing, the type of features are determined by a two types of features being specified by the operating unit 402, but an arrangement may be made such as shown in FIG. 79, for example, wherein the combination of the two types of features can be changed by a sending instructions of up or down as operating signals by a predetermined operating button on the operating unit 702. That is, an arrangement may be made wherein, as an initial state, processing is executed by a combination of features a and b indicated in state A, then next, instructing down executes processing by the combination of features b and c indicated in the state B, and further instructing down executes processing with a combination of the features c and d indicated in the state C, wherein, in the event of specifying up in the state C, this returns to the state B, and in the event of specifying up in the state B, this returns to the state A. Due to such an arrangement, the user can change the features one after another without giving no particular consideration to the type of features, so the combination of features for extracting telop can be effectively narrowed down.

Figure 80:
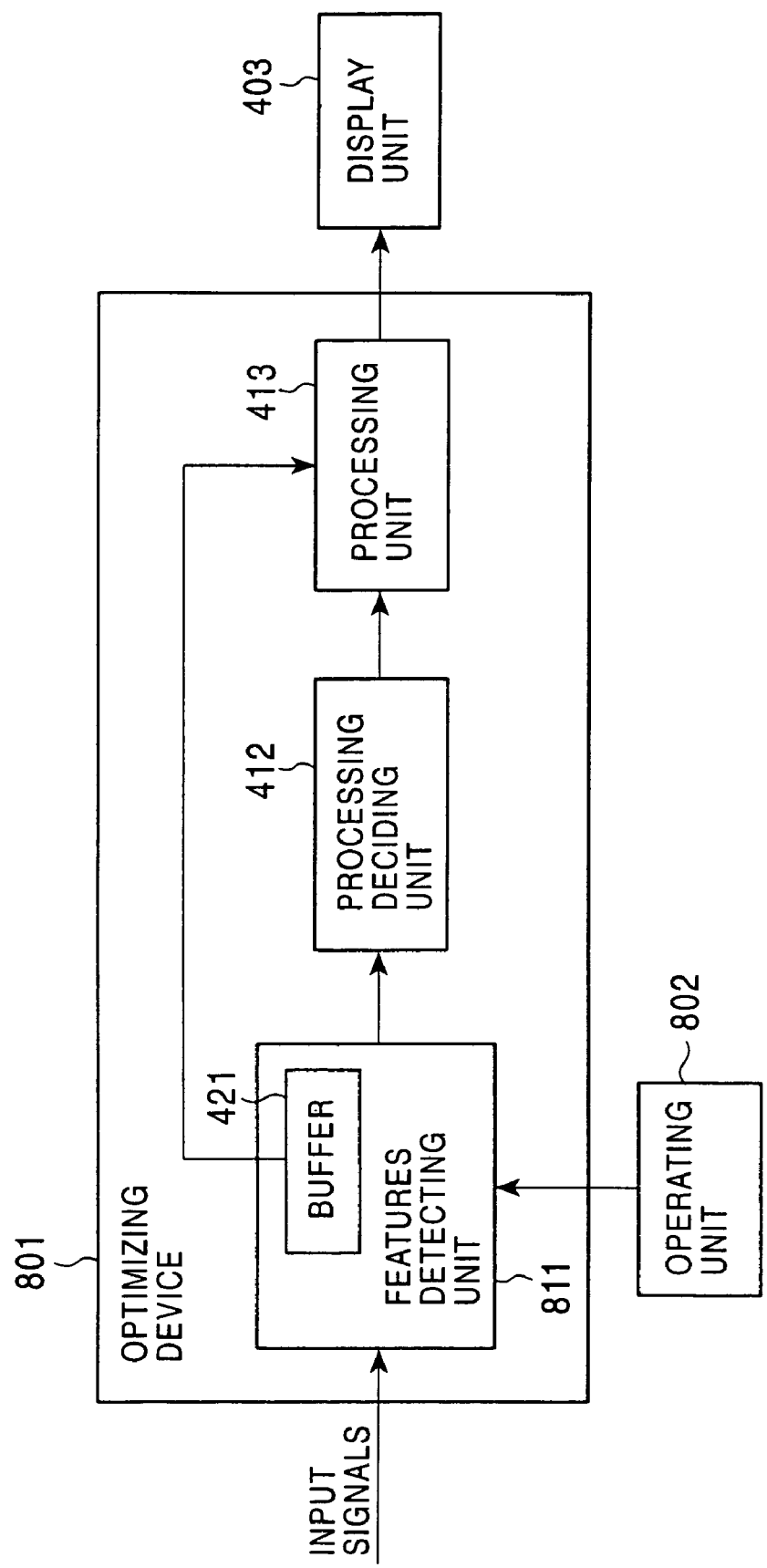
FIG. 80 is a block diagram illustrating a configuration example of another embodiment of an optimizing device to which the present invention has been applied.

Next, description will be made regarding a configuration of an optimizing device 801 provided with the features detecting unit 811 capable of generating new features from already-existing features, instead of the features detecting unit 411 of the optimizing device 401 in FIG. 55, with reference to FIG. 80. In FIG. 80, the configuration is the same except for providing the features detecting unit 811 instead of the features detecting unit 411 of the optimizing device 401 in FIG. 55.

Further, the operating unit 802 is the same as the operating unit 402.

Figure 81:
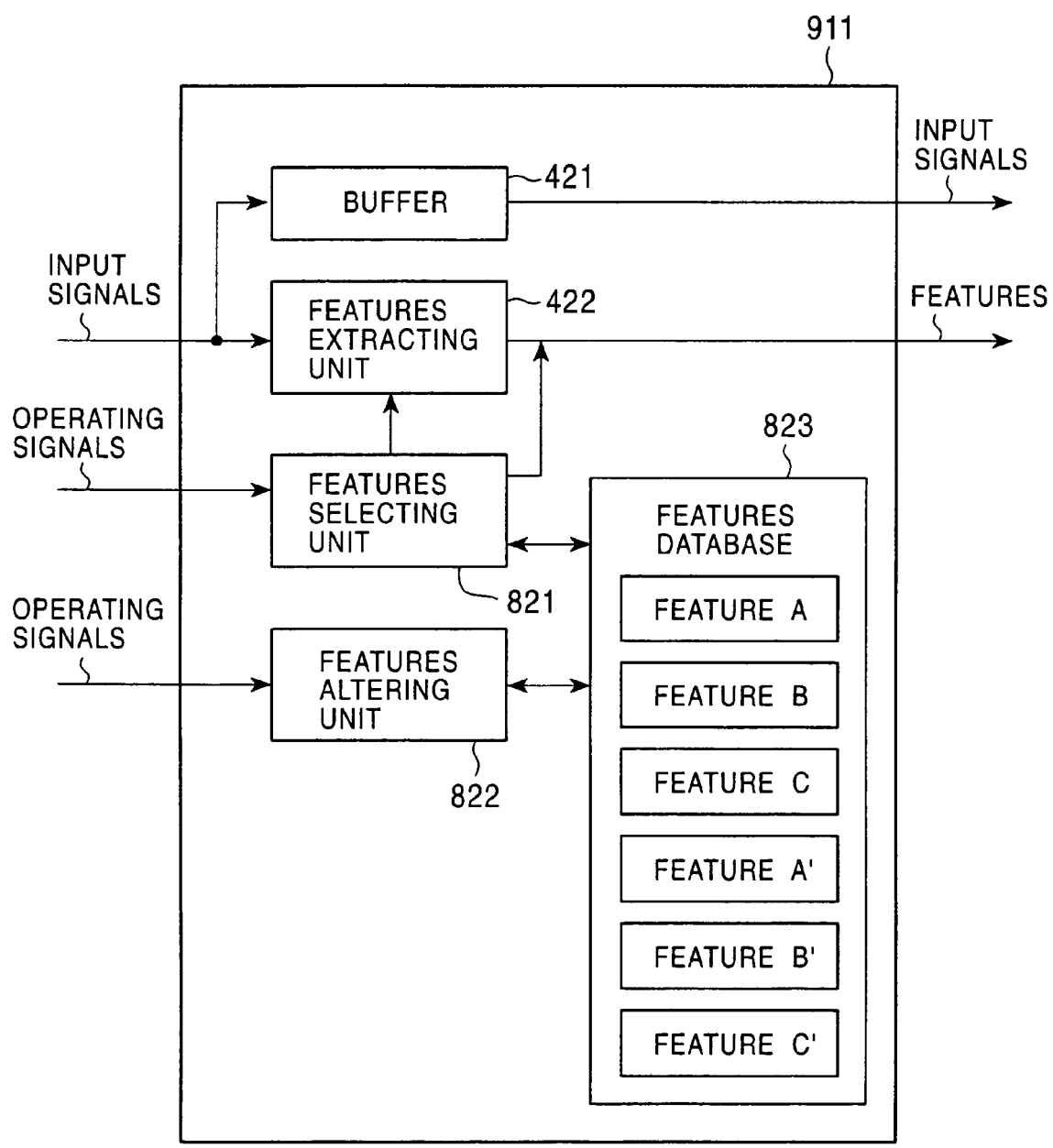
FIG. 81 is a block diagram illustrating a configuration example of the features detecting unit shown in FIG. 80.

The configuration of the features detecting unit 811 shown in FIG. 80 will be described with reference to FIG. 81. With the features detecting unit 811, the buffer 421, and the features extracting unit 422 are the same as the features detecting unit 411 shown in FIG. 56. This feature selecting unit 821 controls the features extracting unit 422 based on operating information specifying the features input from the operating unit 802, to extract two types of features that have been specified out of the features provided beforehand, and output these to the processing deciding unit 413, or output features stored in the features database 823 beforehand, to the processing deciding unit 413. In more detail, the features database 823 stores features information regarding the types of features and the detection methods for the features. The features extracting unit 422 reads out features information corresponding to the types of features selected by the features selecting unit 821 from the features database 823, and detects the selected features from the input signals, following the features detecting method recorded in the features information.

Features information provided beforehand are luminance values for each of the pixels of the image signals, Laplacian, Sobel, inter-frame difference (e.g., inter-frame difference of a pixel of interest (x, y) is represented by $f_s(x, y) = f_0(x, y) - f_1(x, y)$, wherein $f_0(x, y)$ indicates the current pixel of interest, while $f_1(x, y)$ represents a pixel from one frame back on the same spatial position), inter-field difference, background difference, derivative values (e.g., the derivative value $f_b(x, y)$ of a pixel of interest (x, y) is represented by $f_b(x, y) = 4 \times f_0(x, y) - f_0(x-1, y) - f_0(x+1, y) - f_0(x, y+1) - f_0(x, y-1)$, wherein $f_0(x, y)$ represents the current pixel of interest, and $f_0(x-1, y)$, $f_0(x+, y)$, $f_0(x, y+1)$, and $f_0(x, y-1)$ represent pixels removed by one pixel each in the x and y directions on the space), and values obtained from the features within a predetermined range (sum, average, dynamic range, maximum value, minimum value, central value, or dispersion, etc.), and so forth, but may be others as well.

The features altering unit 822 generates new features from the features stored in the features database 823, based on operating signals input from the user. In further detail, the features altering unit 822 will generates new features information from features information stored in the features database 823, based on operating signals input from the user, and the features extracting unit 422 extracts new features based on of this features information.

Also, saying that there is features information for features A, B, and C, as types of features, stored in the features database 823, an arrangement may be made wherein the DR (dynamic range: of value generated by reading out the value for the feature A for multiple pixels that exist at a predetermined position as to the pixel of interest, and obtaining of value which is the difference between the minimum value and maximum value, for each pixel) of the feature A may be made to be feature information corresponding to a new feature A', or may be made to be new features information by similarly obtaining sum, average, dynamic range, maximum value, minimum value, central value, dispersion, the number of pixels having a value equal to or greater than a threshold value (the threshold value may also be set), or a linear combination between multiple features. Note that a linear combination between multiple features is, for example, in the event that the Laplacian for a predetermined number of pixels is $X_a$, Sobel is $X_b$, and inter-frame difference is $X_c$ with a linear combination of these three types of features being taken, the coefficients of these three types of features multiplied and summed, i.e., $A \times x_a + B \times x_b + C \times x_c$ is the new feature of this pixel. Here, A, B, and C are coefficients, and in the case of telop extraction for example, these coefficients can be obtained by the learning processing when the pixels in the range that has been generally specified to for the telop portion by the operating unit 802 as the tutor data, and the multiple features as student data, as described with FIG. 43 and FIG. 44. In FIG. 81, with regard to the features stored in the features database 823, features A through C indicate the types of features extracted by the features extracting unit 422, and features A' through C' the types of features altered from the features A through C by the features altering unit 822 (what is actually stored is and the features information of each (the type of features, and information indicating the detection method thereof)).

The features information stored in the features database 823 may be those specified that the timing of being extracted by the features extracting unit 422 being stored, maybe those wherein features information stored in the features database 823 beforehand is altered and by the features altering unit 822, or may be stored with other methods.

Figure 82:
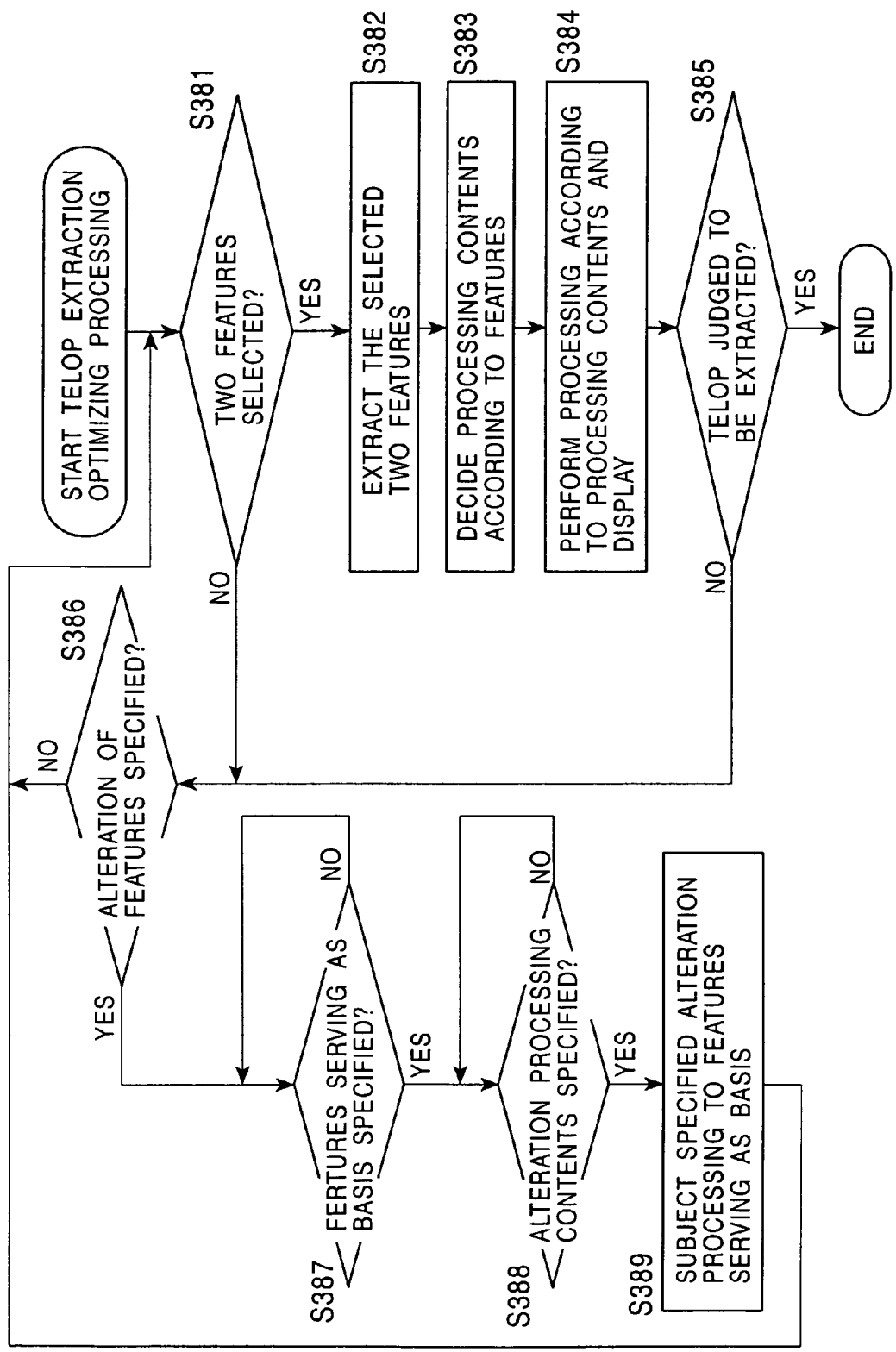
FIG. 82 is a flowchart describing telop extraction optimizing processing with the optimizing device shown in FIG. 80.

Next, the telop extraction optimizing processing by the optimizing device 801 in FIG. 80 will be described with reference to the flowchart in FIG. 82. In step S381, the features extracting unit 422 of the features detecting unit 411 judges whether or not two types of features have been selected by the features selecting unit 821, and in the event that these are not selected, the processing proceeds to step S386. Also, in the event that, for example, judgment is made that information for selecting features has been input from the features selecting unit 423, i.e., in the event that judgment is made that the user has operated operating unit 802 and selected two types of features, the processing proceeds to step S382.

In step S382, the features extracting unit 22 extracts the two types of selected features from the image signals input signals for each pixel, and outputs to the processing deciding unit 412. At this time, signals serving as the input signals are stored in the buffer 421.

In step S383, the processing deciding unit 412 decides the processing contents for each pixel based on the input two types of features, and outputs to the processing unit 413.

In step S384, the processing unit 413 processes the image signals which are input signals input via the buffer 421 following the processing contents input from the processing deciding unit 412, converts these into image signals that can be displayed on the display unit 403, and outputs to the display unit 403 and displays.

In step S385, the features detecting unit 411 judges whether or not the telop is deemed to be extracted. That is, the user views the image displayed on the display unit 403, and in the event of not judging that the telop has been extracted, operates operating unit 802 so as to change the combinations of features again and attempt telop extraction processing. In the event that operating signals corresponding to this operation are input from operating unit 802, the processing proceeds to step S386.

In step S386, the features altering unit 822 of the features detecting unit 811 judge whether or not altering of the features has been specified, and in the event there is no instruction for alteration of the features, the processing returns to step S381. On the other hand, in the event that the features altering unit 822 judges in step S386 that there has been operating signals input from the operating unit 802 which instruct alteration of the features, the processing proceeds to step S387.

In step S387, the features altering unit 822 judges whether or not basic features have been specified, and the processing is repeated until information specifying the basic features is input. For example, in the event that the operating unit 802 is operated and operating signal instructing the feature A is input, judgment is made that a feature based on the feature A in the image signals which is the input signals has been input, and the processing proceeds to step S388.

In step S388, the features altering unit 822 judges whether or not alteration processing contents have been instructed, and repeats the processing until alteration processing contents are instructed. For example, in the event that the operating unit 802 is operated and operating signals instructing DR are input, judgment is made that the alteration processing contents have been specified, and the processing proceeds to step S389.

In step S389, the features altering unit 822 alters the specified features with the specified alteration processing contents to obtain new features, which is stored in the features database 823, and the processing returns to step S381. That is to say, in this case, the features altering unit 822 reads the features A out of the features database 823 and obtains DR, which is the specified alteration processing contents thereof, thereby generating the new features A', which is stored in the features database 823, and the processing returns to step S381.

On the other hand, in the event that judgment is made in step S385 according to the subjectivity of the user that a telop is being extracted, operating signals indicating completion of the processing are input to the features detecting unit 421 by the user operating the operating unit 802, and the processing ends at this time.

That is to say, the processing of steps S381 through S389 is repeated until the user can judge that a telop is being extracted by viewing the image displayed on the display unit 403, due to the above-described processing, whereby a combinations of features optimal for the user can be set, and telops can be extracted from image signals which are input signals, and further, even more combinations of features can be set by increasing the types of features for the user to select, thereby executing processing that is optimal for the user.

In the above processing, processing contents are decided according to the two types of features which the user has specified, and telop is extracted from the image signals which are input signals, so it can be said that the "contents of processing" are changed such that output signals desired by the user are obtained, following operations of the user. Also, the two axes of features (the two types of features being selected) are switched over, while new features are also set (the types of features increase), and that algorithm for deciding the processing contents (e.g., whether or not to process as a telop) is changed by the combination of the features, so it can be said that, of "contents of processing", the "structure of processing" is also changed.

Also, telop extraction is obtained by switching over the types of features to be extracted by trial and error, but with methods using features in a fixed manner, there has been the need to rewrite the program or remake the system itself in order to change the features anticipated, so the system has to be remake many times to obtain the algorithms optimal for telop extraction by discovery, and has been quite difficult in reality. Conversely, with the optimizing device according to the present invention, new features can be extracted in real-time, and the features distribution thereof can be shown, so the trial and error performed by the user becomes easier, and the possibility of finding features optimal for telop extraction is improved.

Figure 83:
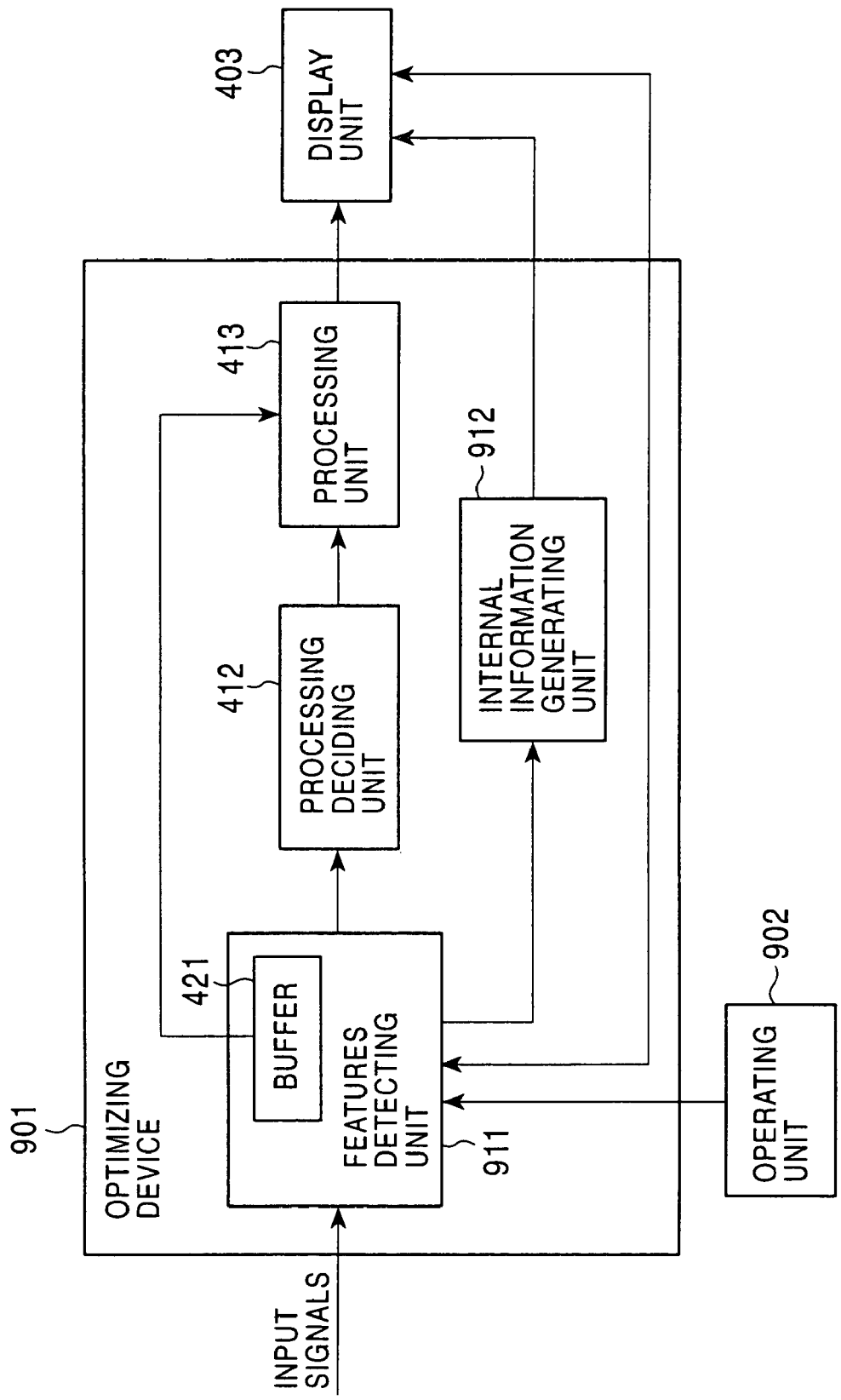
FIG. 83 is a block diagram illustrating a configuration example of another embodiment of an optimizing device to which the present invention has been applied.

Next, the configuration of an optimizing device 901 arranged by providing the optimizing device 801 shown in FIG. 80 with the features detecting unit 911 and internal information generating unit 912 provided, will be described with reference to FIG. 83. The optimizing device 901 shown in FIG. 83 is basically the same as the optimizing device 801 shown at FIG. 80 and configuration, except that the features detecting unit 911 is provided instead of the features detecting unit 811, and further, an internal information generating unit 912 has been newly provided.

Figure 84:
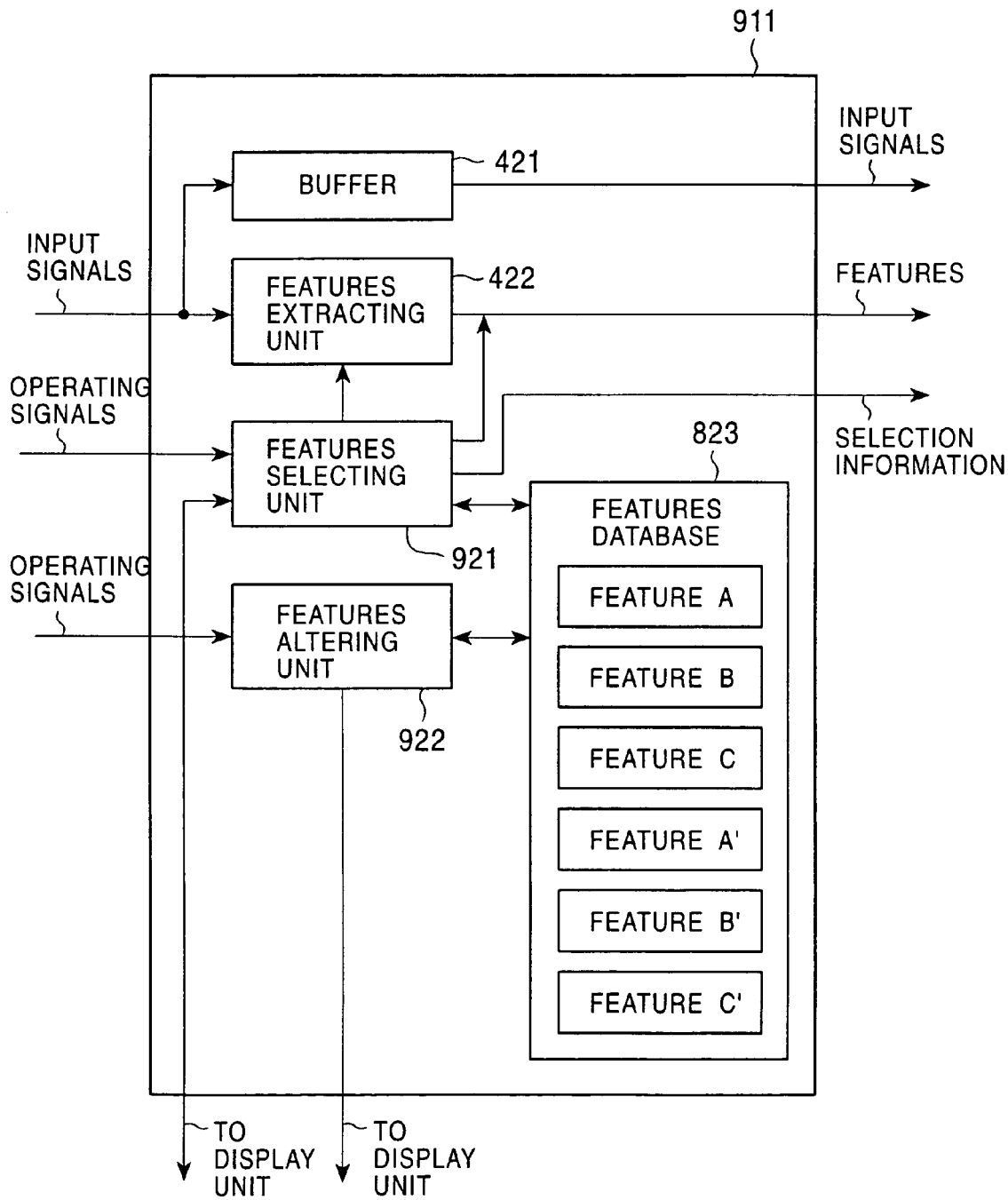
FIG. 84 is a block diagram illustrating a configuration example of the features detecting unit shown in FIG. 80.

Next, the configuration of the features detecting unit 911 will be described with reference to FIG. 84. The features detecting unit 911 is basically the same configuration as the features detecting unit 811 in FIG. 81, but is provided with the features selecting unit 921 instead of the features selecting unit 821, and a features altering unit 922 instead of the features altering unit 822. The basic functions are the same for each, but the features selecting unit 911 differs in that information of that type of selected features is supplied to the of internal information generating unit 912. Also, features altering unit 922 differs in that image information relating to instructions of alteration contents are output to the display unit 403.

The internal information generating unit 912 is the same as the internal information generating unit 511 shown in FIG. 60. Also, the operating unit 902 is the same as the operating unit 402.

Figure 85:
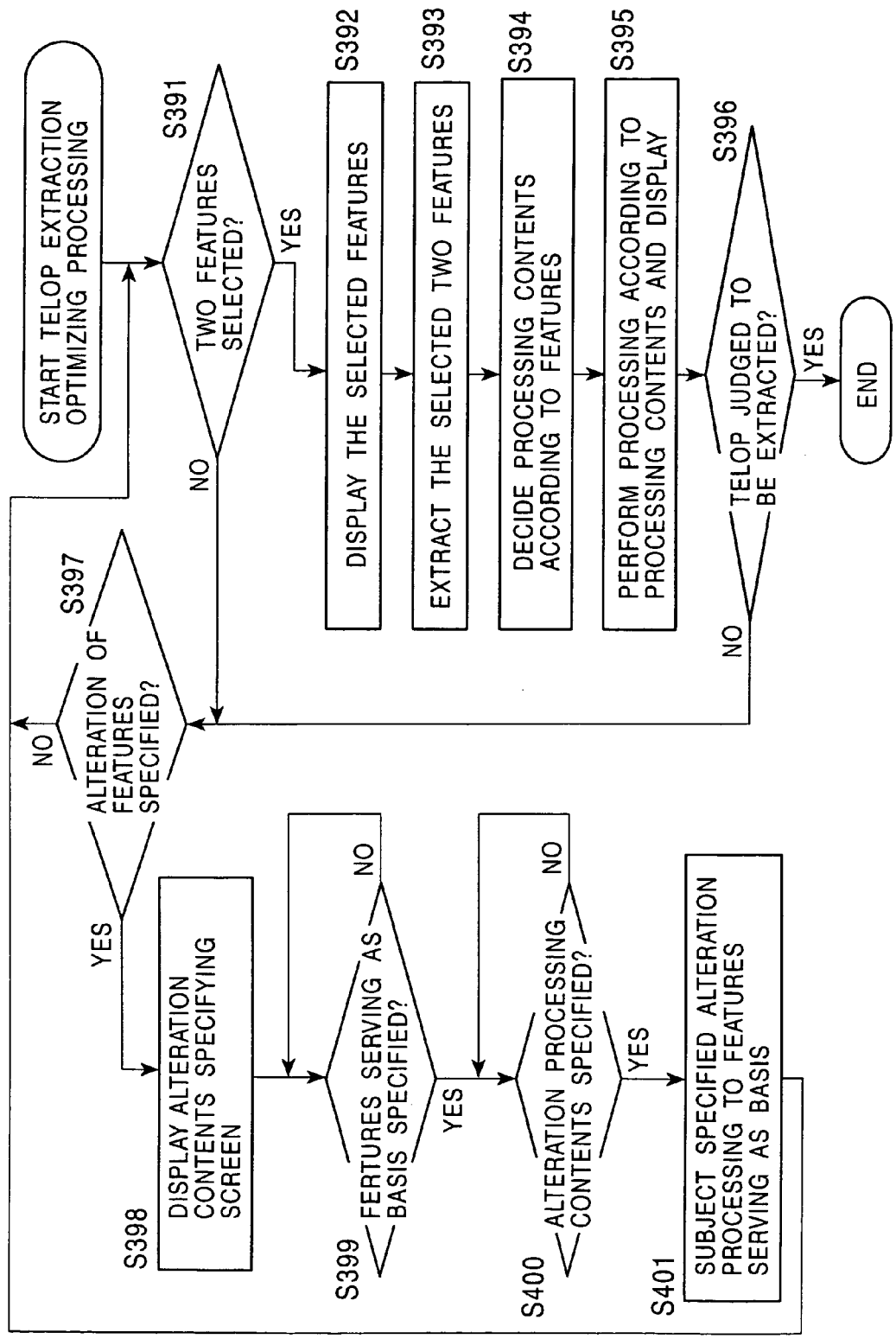
FIG. 85 is a flowchart describing telop extraction optimizing processing with the optimizing device shown in FIG. 84.

Next, the telop extraction optimizing processing with the optimizing device 901 shown in FIG. 83 will be described, with reference to the flowchart in FIG. 85. Now, this processing is basically the same as the processing described with reference to the flowchart in FIG. 82, but differs in that the features selected by the internal information generating unit 912 are displayed.

That is to say, in step S391, the features extracting unit 422 of the features detecting unit 911 judges whether or not two types of features have been selected by the features selecting unit 921, and in the event that these have not been selected, the processing proceeds to step S397. Also, in the event that judgment has been made to that information for selecting the features have been input from the features selecting unit 921, for example, the processing proceeds to step S392.

In step S392, the internal information generating unit 912 extracts the information indicating that types of the two selected types of features from the features selecting unit 921, and displays the names of the types of the two selected features on the display unit 403.

In step S393, the features extracting unit 422 extracts the two types of selected features from that image signals which are the input signals, for each pixel, and outputs these to the processing deciding unit 412. At this time, the image signals which are the input signals are stored in the buffer 421.

In step S394, the processing deciding unit 412 decides the processing contents for each pixel based on the two types of features that had been input, and outputs to the processing unit 413.

In step S395, the processing unit 413 processes the image signals which are input signals input via the buffer 421 following the processing contents input from the processing deciding unit 412, converts these into image signals that can be displayed on the display unit 403, outputs to the display unit 403, and displays.

In step S396, the features detecting unit 411 judges whether or not the telop is deemed to have been extracted. That is, the user views the image displayed on the display unit 403, and in the event of not judging that the telop has been extracted, operates the operating unit 902 so as to change the combinations of features again and attempt telop extraction processing. In the event that operating signals corresponding to this operation are input from operating unit 902, the processing proceeds to step S397.

In step S397, the features altering unit 922 of the features detecting unit 911 judges whether or not altering of the features has been specified, and in the event there is no instruction for alteration of the features, the processing returns to step S391. On the other hand, in step S397, in the event that the features altering unit 922 judges that there have been operating signals input from the operating unit 902 which instruct alteration of the features, the processing proceeds to step S398.

Figure 86:
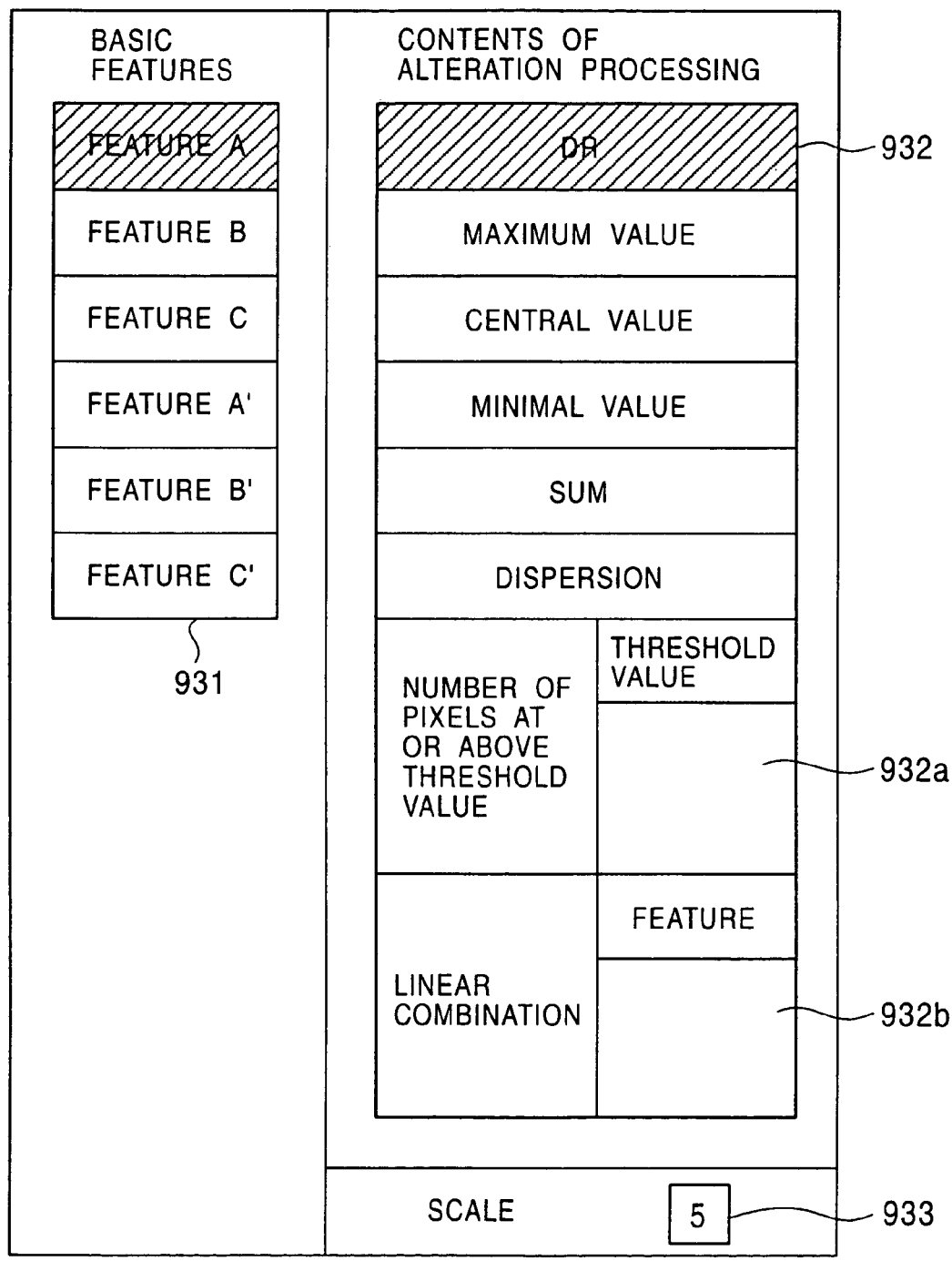
FIG. 86 is a diagram describing an alteration contents instructing screen for features, with the optimizing device shown in FIG. 84.

In step S398, the features altering unit 922 displays an instruction screen for alteration contents, such as shown in FIG. 86, for example. In FIG. 86, the basic features display unit 931 is provided to the left side in the figure, where features serving as a basis, which are features currently stored in the features database 823, are displayed. In this case, features A through C and A' through C' are displayed. Also displayed to the right side thereof is an alteration processing content selection space 932. In this case, DR, maximum value, minimum value, central value, sum, dispersion, the number of pixels having a value equal to or greater than a threshold value, and linear combination are displayed, with the space 932a for setting the threshold value provided with regard to the number of pixels having a value equal to or greater than a threshold value, and further, the space 932b for selecting features in the event of selecting the linear combination. Further, a scale settings space 933 is a displayed for settings scales of the values. A scale value indicates the range centered on the pixel of interest, and is of value indicating the range of pixels such as, for example, in the case of detecting DR, setting the necessary pixels to 3 pixels×3 pixels or 5 pixels×5 pixels, and so forth.

In step S399, the features altering unit 922 judges whether or not features serving as a basis have been specified, and repeats the processing until information for specifying the features as a basis is input. For example, in the event that the operating unit 902 is operated and operating signals instructing the feature A are input, judgment is made that the feature A has been input as a feature serving as a basis for the image signals which are input signals, and the processing proceeds to step S400.

In step S400, the features altering unit 922 judges whether or not alteration processing contents have been instructed, and the processing is repeated until the alteration processing contents are instructed. For example, in the event that the operating unit 902 is operated and operating signals instructing DR are input, judgment is made that the alteration processing contents have been instructed, and the processing proceeds to step S401.

In step S401, the features processing unit 922 alters the specified features with the specified alteration processing contents, stores this in the features database 823, and the processing returns to step S391.

On the other hand, in the event that judgment is made according to the subjectivity of the user that a telop is being extracted, operating signals indicating completion of the processing are input to the features detecting unit 421 by the user operating the operating unit 902, and the processing ends at this time.

That is, due to the above-described processing, the user performs operation while viewing the features serving as a basis and the alteration processing contents, and accordingly can recognize the features whereby optimal processing can be performed. Further, subsequently, features capable of realizing optimal processing for the user can be immediately specified. Also, the type of features which the user specifies can be increased by inputting input information necessary for generating new features, following the display screen, so combinations of many features can be efficiently set.

In the above processing, the processing contents are decided according to two types of features that have been specified by the user, the telop is extracted from the image signals which are the input signals, so it can be said that the "contents of processing" are being changed so that output signals desired by the user can be obtained, following operations made by the user. Also, the two axes of the features (the two types of features that are selected) are switched over, while new features are also set (the types of features increase), and the algorithm for deciding the contents of processing (e.g., whether or not to process as a telop) is changed by the combination of these features, so of the "contents of processing", the "structure of processing" is also changed.

Figure 87:
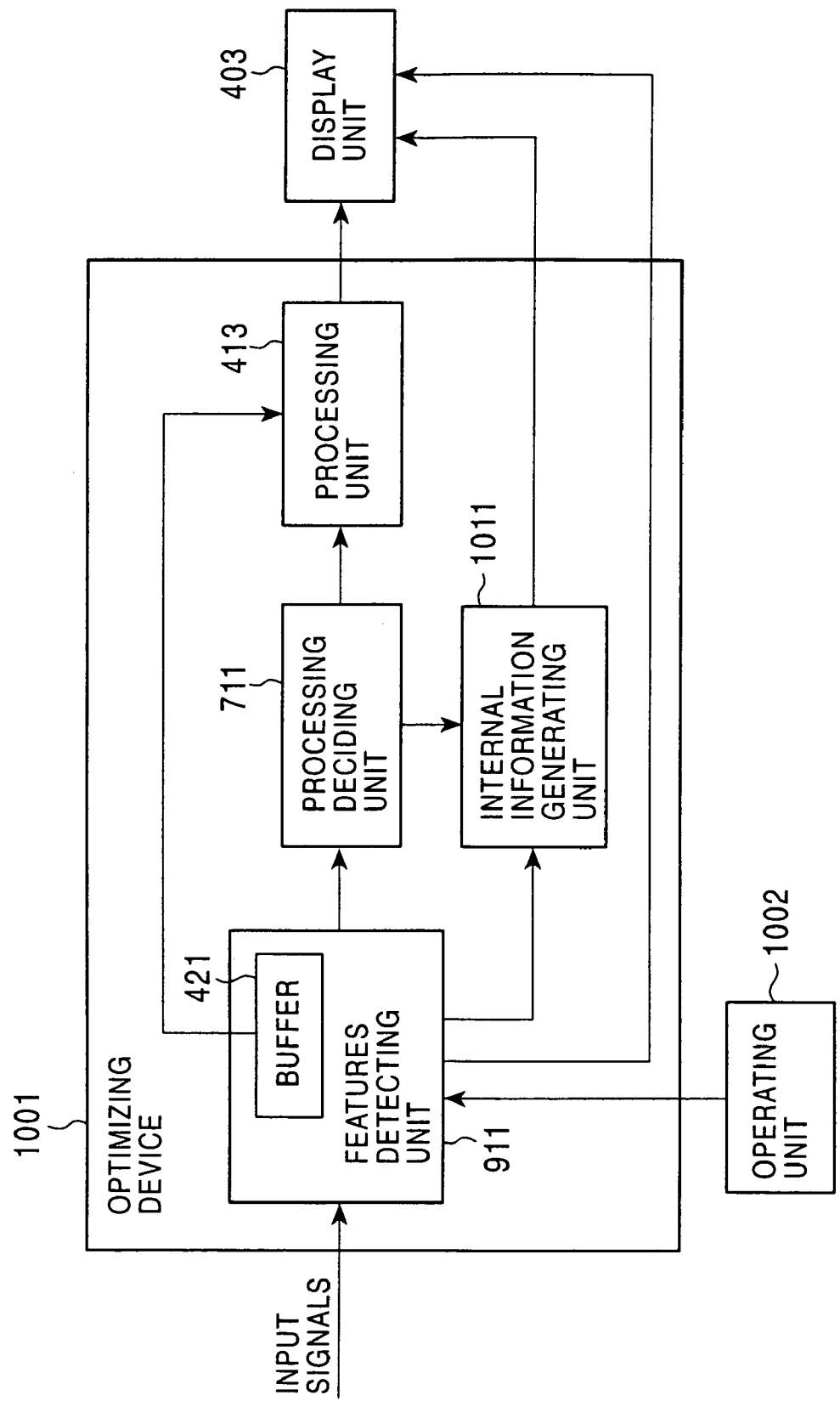
FIG. 87 is a block diagram illustrating a configuration example of another embodiment of an optimizing device to which the present invention has-been applied.

Next, the configuration of an optimizing device 1001 which is provided with an internal information generating unit 1011 instead of the internal information generating unit 912 of the optimizing device 901 shown in FIG. 83, will be described with reference to FIG. 87. In FIG. 87, the structure is the same as that of the optimizing device 901 shown in FIG. 83, other than the internal information generating unit 912 being replaced with the internal information generating unit 1011, and further, the processing deciding unit 412 being replaced with the processing deciding unit 711 shown in FIG. 69.

Figure 69:
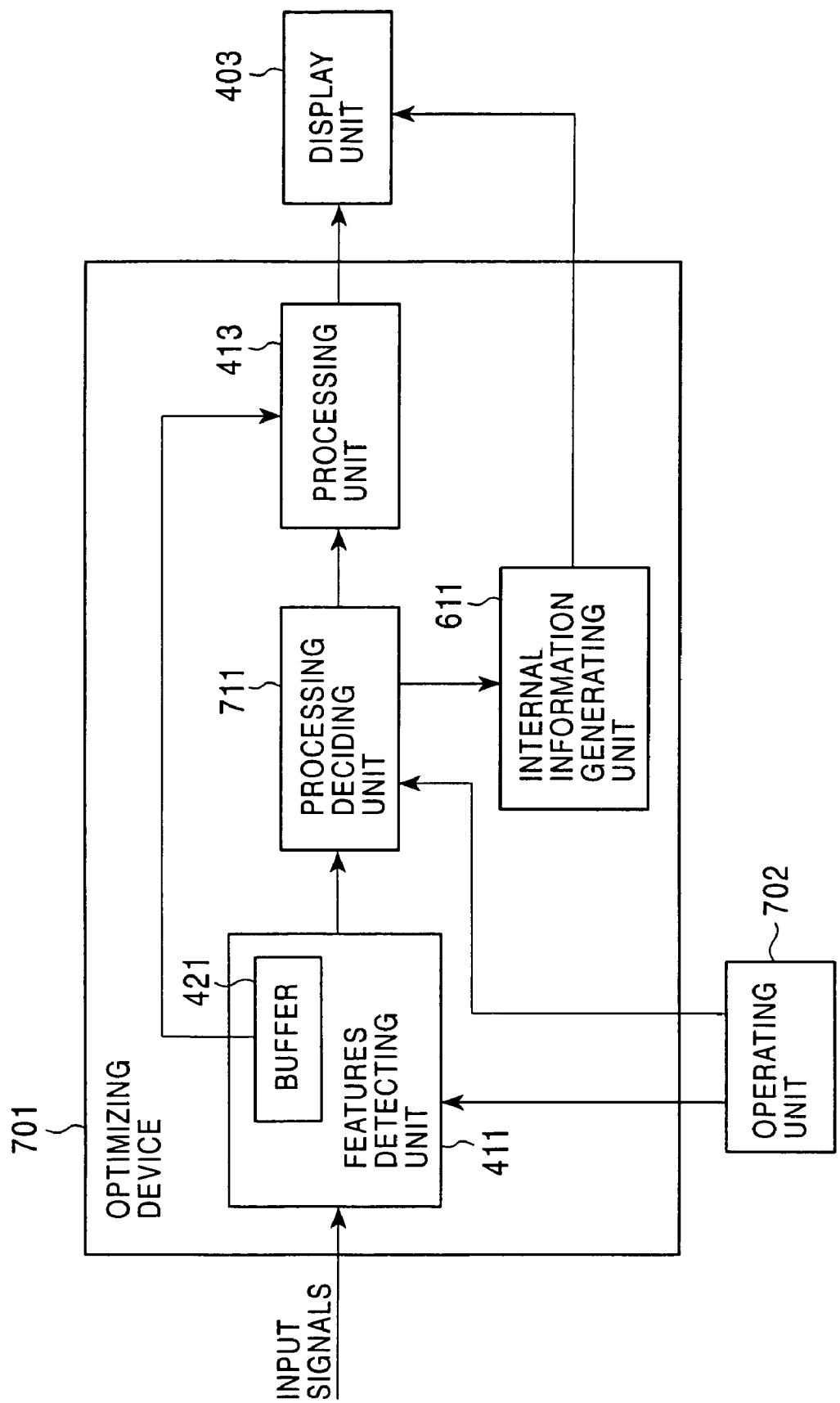
FIG. 69 is a block diagram illustrating a configuration example of another embodiment of an optimizing device to which the present invention has been applied.

The internal information generating unit 1011 is basically the same as that internal information generating unit 912, but further reads out information of processing contents decided for each pixel, decided by the processing contents deciding unit 432 of the processing deciding unit 412, and displays this on the display unit 403 (the functions of the internal information generating unit 611 shown in FIG. 69 have been added).

Also, the operating unit 1002 is the same as the operating unit 402.

Figure 88:
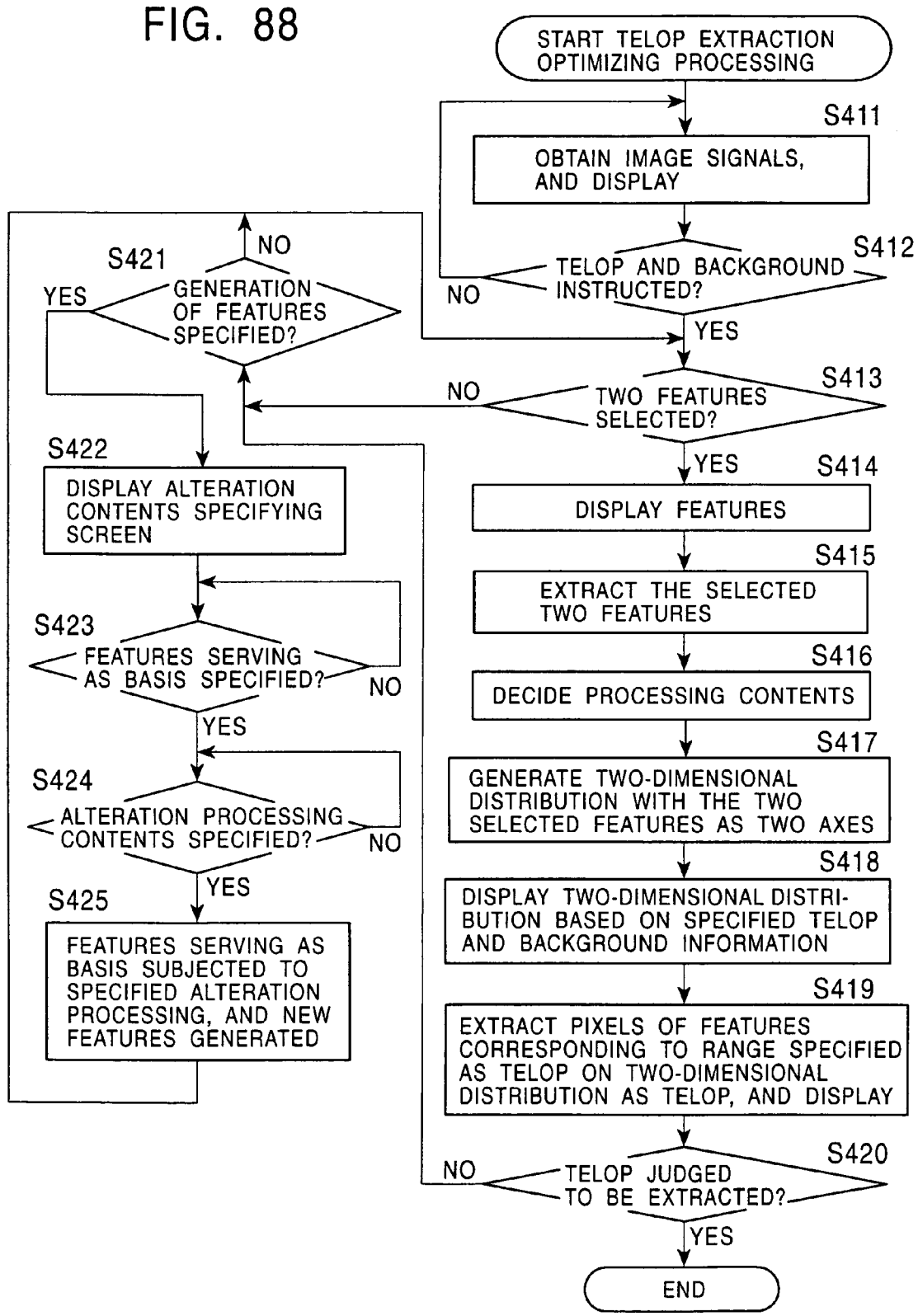
FIG. 88 is a flowchart describing telop extraction optimizing processing with the optimizing device shown in FIG. 87.

Next, the telop extraction optimizing processing with the optimizing device 1001 shown in FIG. 87 will be described with reference to the flowchart in FIG. 88.

In step S411, the buffer 421 of the features detecting unit 911 receives image signals which are input signals and stores these, and the processing unit 413 reads out the image signals which are input signals stored in the buffer 421 without change, and output these to the display unit 403 without any processing, where they are displayed.

In step S412, the processing contents deciding in its 721 of the processing deciding unit 711 judges whether are not the telop and background have been instructed by the operating unit 1002, the processing is repeated until the telop and background are instructed, and upon the telop and background being instructed, the processing proceeds to step S413.

In step S413, the features extracting unit 422 of the features detecting unit 911 judges whether or not two types of features have been selected by the features selecting unit 921, and if not selected, the processing proceeds to step S421. Also, in the event that judgment is made that information selecting the features has been input from the feature selecting unit 921, for example, the processing proceeds to step S414.

In step S414, the internal information generating unit 912 extracts information indicating the types of the two types of features that have been selected from the features selecting unit 921, and displays (presents) names of the types of the two types of features that have been selected, on the display unit 403.

In step S415, the features extracting unit 422 extracts the selected two types of features for each of the pixels from the image signals which are input signals, and outputs these to the processing deciding unit 412. At this time, the buffer 421 stores the image signals which are input signals.

In step S416, the processing deciding unit 711 decides the processing contents for each of the pixels based on the two types of features that have been input, and output these to the processing unit 413.

In step S417, the internal information generating unit 1011 generates a 2-dimensional distribution based on the two types of features input to the processing deciding unit 711 and information of the pixel position specified for the telop and background, with the two types of features as the axes thereof, and in step S418, displays the 2-dimensional distribution on the display unit 403. In further detail, the features recognizing unit 431 of the processing deciding unit 711 recognizes the types of features, and outputs the information indicating that the type thereof, and the features themselves to the processing contents deciding unit 721, the processing contents deciding unit 721 outputs this information indicating the pixel positions specified for the telop in the background, in addition to the information indicating the features and the types thereof, to the internal information generating unit 1011, whereby the internal information generating unit 1011 generates a 2-dimensional distribution diagram of the features such as shown in FIG. 74, for example, based on the information indicating the pixel positions specified for the telop and background.

In step S419, the processing unit 413 processes the image signals which are input signals, input via the buffer 421, following the processing contents input from the processing deciding unit 711, converts these into image signals which can be displayed on the display unit 403, outputs to the display unit 403, and displays.

In step S420, the features detecting unit 911 judges whether or not the telop is deemed to have been extracted. That is, the user views the image displayed on the display unit 403, and in the event of not judging that the telop has been extracted, operates the operating unit 1002 so as to change the combinations of features again and attempt telop extraction processing. In the event that operating signals corresponding to this operation are input from operating unit 1002, the processing proceeds to step S421.

In step S421, the features altering unit 922 of the features detecting unit 911 judges whether or not altering of the features has been specified, and in the event there is no instruction for alteration of the features, the processing returns to step S413. On the other hand, in step S421, in the event that the features altering unit 922 judges that there have been operating signals input from the operating unit 1002 which instruct alteration of the features, the processing proceeds to step S422.

In step S422, the features altering unit 922 displays an instruction screen for alteration contents(FIG. 86).

In step S423, the features altering unit 922 judges whether or not features serving as a basis have been specified, and the processing is repeated until the features serving as a basis have been input. In the event that judgment is made that features serving as a basis have been input, the processing proceeds to step S424.

In step S424, the features altering unit 922 judges whether or not alteration processing contents have been instructed, and the processing is repeated until the alteration processing contents are instructed. In the event that judgment is made that the alteration processing contents have been input, the processing proceeds to step S425.

In step S425, the features altering unit 922 alters the specified features serving as a basis with the specified alteration processing contents, stores this in the features database 823, and the processing returns to step S413.

On the other hand, in the event that judgment is made in step S420 according to the subjectivity of the user that a telop is being extracted, operating signals indicating completion of the processing are input to the features detecting unit 421 by the user operating the operating unit 1102, and the processing ends at this time.

That is, due to the above-described processing, the processing in steps S411 through S425 is repeated until the user can judge from viewing that image displayed on the display unit 403 that the telop is extracted, thereby enabling a combination of features optimal for the user to be set and the telop to be extracted from the image signals which are input signals, and increasing the types of features which can be selected by the user enables a great number of combinations of features to be set, so as to execute processing that is optimal for the user. Also, an alteration instruction screen necessary for altering already-existing features and generating new features is displayed, so the user can efficiently execute the alteration processing following the display. Also, at this time, the telop extraction processing can be repeatedly executed while changing the features while viewing the state of separation between telop and background with regard to the features of the pixels, so features capable of highly precise telop extraction can be easily selected.

Figure 89:
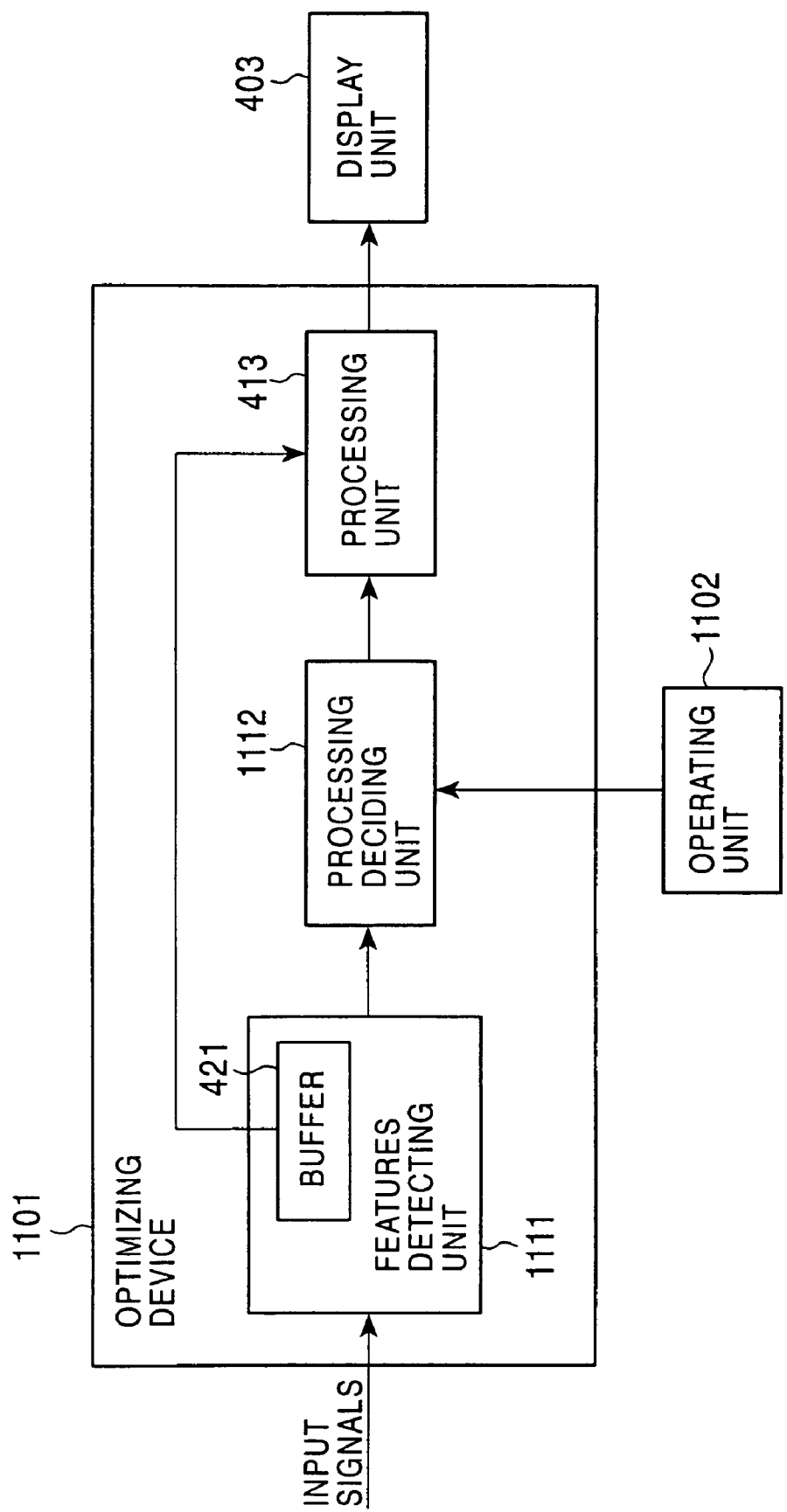
FIG. 89 is a block diagram illustrating a configuration example of another embodiment of an optimizing device to which the present invention has been applied.

Next, the configuration of an optimizing device 1101 provided with a features detecting unit 1111, processing deciding unit 1112, and operating unit 1102, instead of the features detecting unit 411, processing deciding unit 412, and operating unit 402, of the optimizing device 401 shown in FIG. 55, will be described with reference to FIG. 89. In FIG. 89, the configuration is the same as that of the optimizing device 401 shown in FIG. 55, other than the features detecting unit 1111, processing deciding unit 1112, and operating unit 1102 being newly provided.

Figure 56:
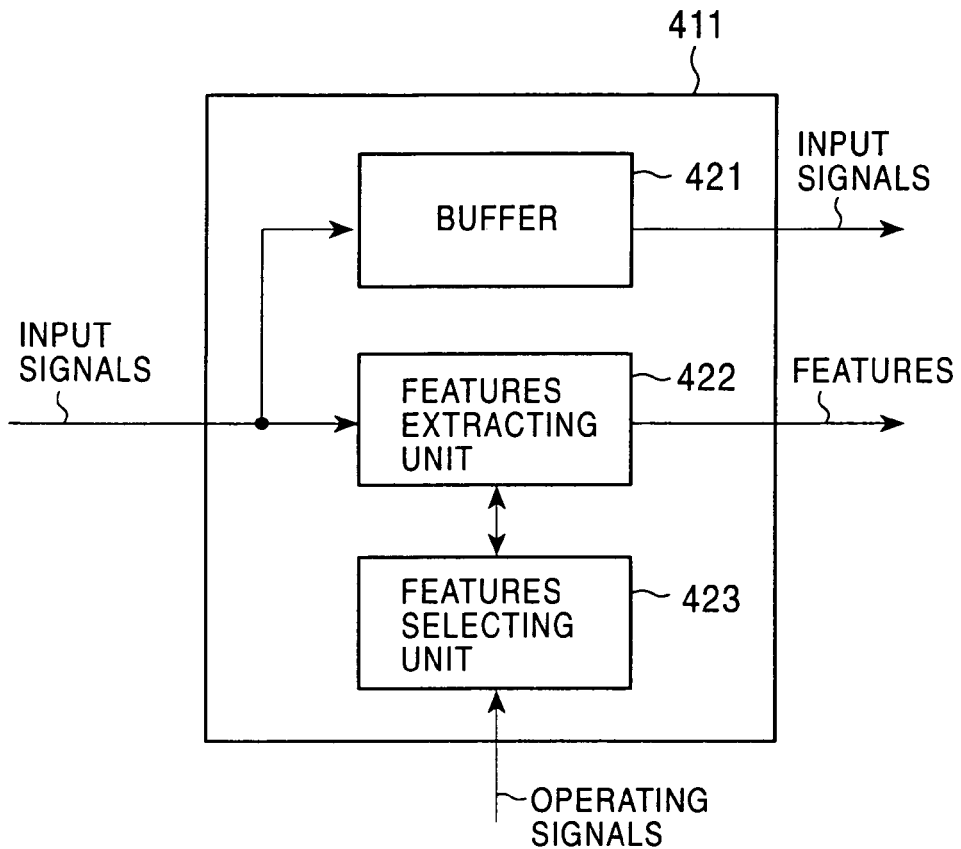
FIG. 56 is a block diagram illustrating a configuration example of the features detecting unit shown in FIG. 55.

Of the configurations of the features detecting unit 411 in FIG. 56, features detecting unit 1111 is not provided with the features selecting unit 423, with the features extracting unit 422 extracts two types of features that have been set beforehand, but otherwise is of the same configuration.

The processing deciding unit 1112 stores history information whereby the LUT stored in the processing contents database 433 is updated, and updates the LUT corresponding to the history information. The configuration of the processing deciding unit 1112 will be described later with reference to FIG. 90.

Also, the operating unit 1102 is the same as the operating unit 402.

Figure 90:
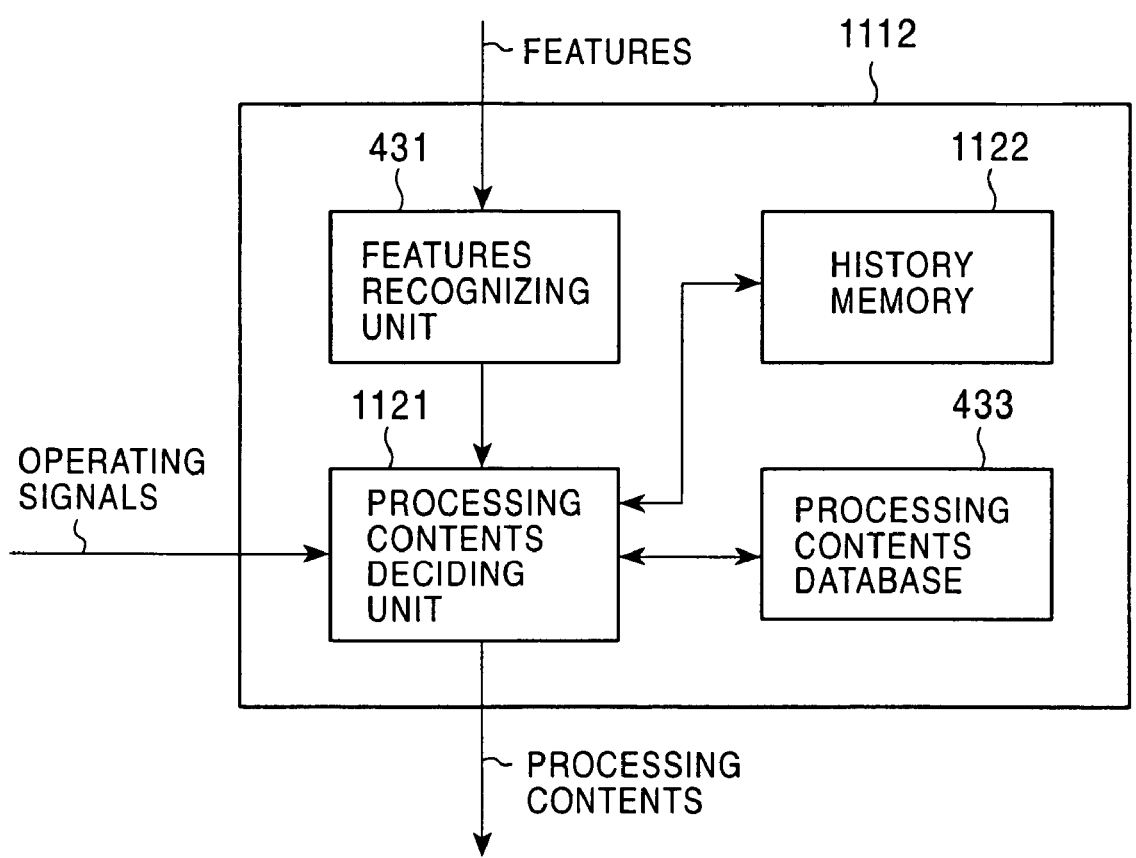
FIG. 90 is a block diagram illustrating a configuration example of the processing deciding unit shown in FIG. 89.

Now, the configuration of the processing deciding unit 1112 will be described with reference to FIG. 90. The processing deciding unit 1112 in FIG. 90 is of the same configuration of the processing deciding unit 412 other than being provided with the processing contents deciding unit 1121 instead of the processing contents deciding unit 432 of the processing deciding unit 412 shown at FIG. 57, and further, having history memory 1122 added thereto.

The processing contents deciding unit 1121 stores history information of the operations for changing the LUT stored in the processing contents database 433, in the history memory 1122, and changes the LUT based on the history information. Other functions are also the same as those of the processing contents deciding unit 432 of the processing deciding unit 412 shown in FIG. 57, as well.

Next, the telop extraction optimizing processing by the optimizing device 1101 shown in FIG. 89 will be described with reference to the flowchart shown in FIG. 91.

In step S431, the features extracting unit 411 of the features detecting unit 1111 extracts two predetermined types of features from the image signals which are input signals, and outputs these to the processing deciding unit 1112. At this time, the buffer 421 stores the image signals which are input signals.

In step S432, the processing contents deciding unit 1121 of the processing deciding unit 1112 decides the processing contents for each pixel making reference to the LUT stored in the processing contents database 433, based on the types of features and the features input from the features recognizing unit 431, and outputs these to the processing unit 413.

In step S433, the processing unit 413 processes the pixels following the processing contents input from the processing deciding unit 1112, outputs to the display unit 403, and displays.

In step S434, the processing contents deciding unit 1121 of the processing deciding unit 1112 to this whether or not operating signals for changing the LUT have been input from the operating unit 1102. That is, the user views the image displayed on the display unit 403 and subjectively judges whether processing which is according to the preferences of the user is being performed, the user operates the operating unit 1102 based on the judgement results, so that corresponding operating signals are input. For example, in the event that processing matching the preferences of the user is not being performed (in the event that a screen according to the preferences of the user is not being displayed on the display unit 403), a request for changing the LUT is input for changing the LUT in the processing contents database 433 of the processing deciding unit 1121.

In step S434, in the event that operating signals requesting change of the LUT have been input, i.e., processing according to the preferences of the user is not being performed, the processing proceeds to step S435.

In step S435, judgment is made regarding whether or not the changing processing of the LUT can be executed by auto LUT changing processing. Here, manual LUT changing processing and auto LUT changing processing exist for changing processing for the LUT. The details of that judgment regarding whether or not auto LUT changing processing is capable will be described later.

For example, in the event that due to and is made in step S435 that auto LUT changing processing is not possible, the processing proceeds to step S436, where manual LUT changing processing is executed.

Figures 92, 93:
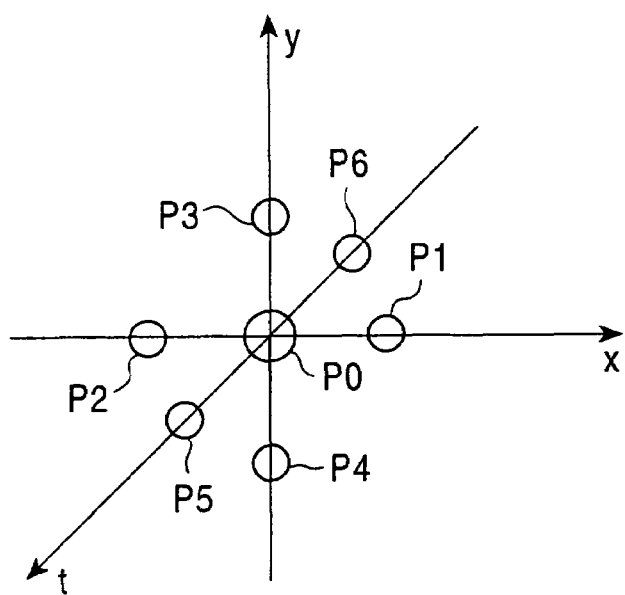
FIG. 92 is a diagram illustrating an LUT.
FIG. 93 is a diagram describing the processing contents specified for each of the features on the LUT.
Figure 94:
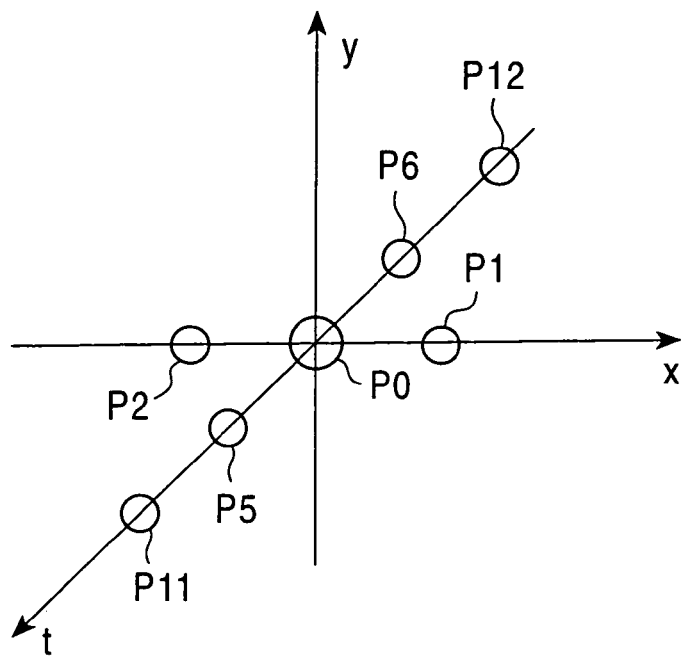
FIG. 94 is a diagram describing the processing contents specified for each of the features on the LUT.

Now, along with a description of the LUT changing processing, the details of the LUT will be described. The LUT is a table indicating processing contents which are decided for each of the combinations of two features, as shown in FIG. 92. In FIG. 92, a case of features A and B as the two types of features is illustrated, and in this example, an example is shown wherein the features are classified into 8 steps (a total of 64 classes). Also, in FIG. 92, the features are normalized to values of 0 through 1.0, and are divided into the ranges of, with regard to the values $V_a$ of the feature A, from the left, $0 \leq V_a < 1/8$, $1/8 \leq V_a < 2/8$, $2/8 \leq V_a < 3/8$, $3/8 \leq V_a < 4/8$, $4/8 \leq V_a < 5/8$, $5/8 \leq V_a < 6/8$, $6/8 \leq V_a < 7/8$, $7/8 \leq V_a \leq 8/8$, and, with regard to the values $V_b$ of the feature B, from the top, $0 \leq V_b < 1/8$, $1/8 \leq V_b < 2/8$, $2/8 \leq V_b < 3/8$, $3/8 \leq V_b < 4/8$, $4/8 \leq V_b < 5/8$, $5/8 \leq V_b < 6/8$, $6/8 \leq V_b < 7/8$, $7/8 \leq V_b \leq 8/8$. In the figure, the processing contents are classified into the three types of X, Y, and Z, according to the combinations of features of the ranges, and in the case shown in FIG. 92, in the range of $0 \leq V_a \leq 3/8$ and $0 \leq V_b \leq 3/8$, the processing contents are X, in the range of $4/8 \leq V_a < 6/8$ or $4/8 \leq V_b < 6/8$, the processing contents are Y, and in other ranges, the processing contents are Z. Also, various specifications can be made for the processing contents. For example, as shown in FIG. 93 through FIG. 95, prediction taps used for processing in the processing unit 413 can be specified with regard to pixels of interest.

That is, with FIG. 93, the processing contents X are illustrated, with the pixel of interest as P0, wherein filter taps P1 and P2 are set with the pixel of interest P0 in the center in the x direction spatially, and in the same manner filter taps P3 and P4 are set with the pixel of interest P0 in the center in the y direction, and further, filter taps P5 and P6 are set before and after with the pixel of interest P0 in the center time-wise (e.g., tap P6 at the same pixel positions and in one frame previous and P5 in one frame later). That is to say, the processing contents X are at a so-called space-time filtering processing.

Also, in FIG. 94, the processing contents Y are illustrated, wherein, instead of the taps P3 and P4 in the time-space filtering in FIG. 93, a tap P12 of the timing further previous in the time-wise direction than the tap P6, and a tap P11 of the timing further later than the tap P5, are set here, that is, processing contents Y are so-called time filtering processing.

Figure 95:
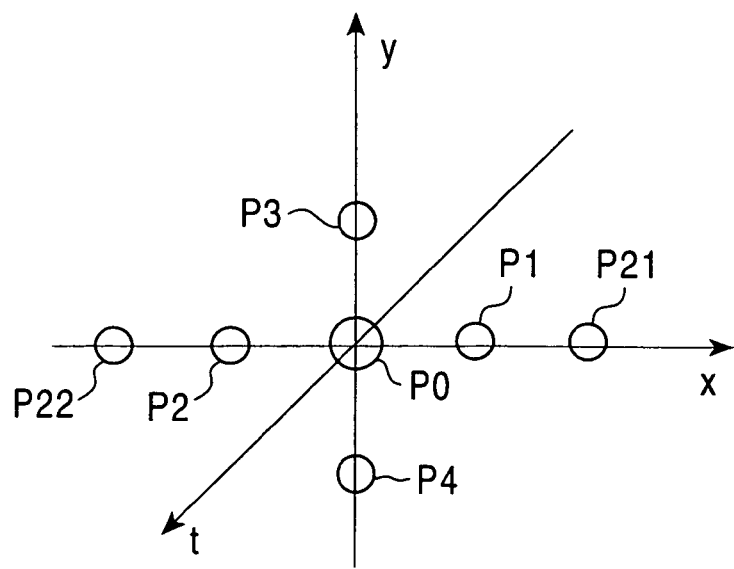
FIG. 95 is a diagram describing the processing contents specified for each of the features on the LUT.

Further, in FIG. 95, the processing contents Z are illustrated, wherein, instead of the taps P5 and P6 in the time-space filtering in FIG. 93, a tap P21 distanced from the pixel of interest farther than the tap P1 in the x direction, and a tap P22 distanced from the pixel of interest farther than the tap P2, are set. That is, the processing contents Z are so-called space filtering processing.

Note that the processing contents are not restricted to the three types as with a an example shown in FIG. 92 with regard to the types thereof, and as a matter of course may be divided into a number of types other than this number, for example, an arrangement may be made wherein all pixels are subjected to binarization processing for dividing into white or black. Also, this binarization processing may be, as described in the example above, for example, that which specifies binarization processing for whether or not a pixel is to be extracted as a telop portion. Conversely, there may be three types or more for the types of processing contents.

Next, the manual LUT changing processing in step S436 in FIG. 91 will be described with reference to the flowchart in FIG. 96.

Figures 97, 98:
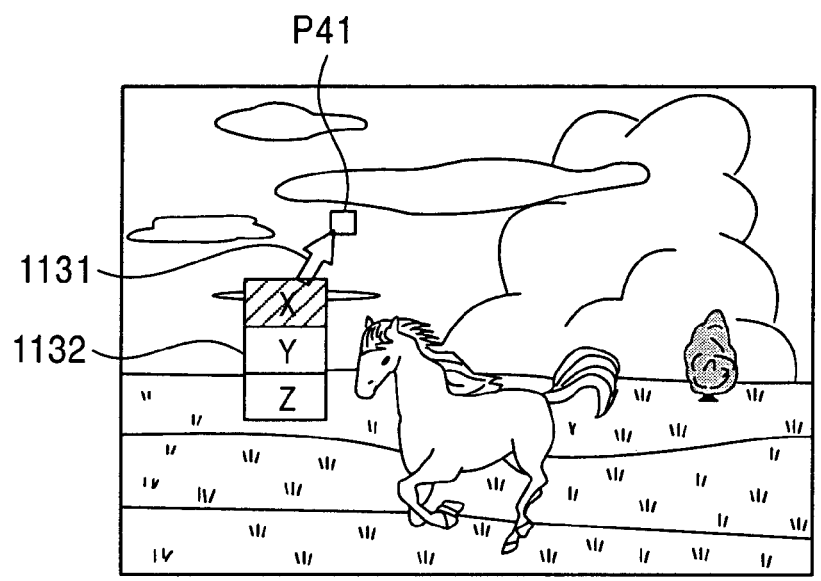
FIG. 97 is a diagram describing manual LUT changing processing in image optimizing processing with the optimizing device shown in FIG. 91.
FIG. 98 is a diagram describing manual LUT changing processing in image optimizing processing with the optimizing device shown in FIG. 91.

In step S441, processing contents deciding unit 1121 judges whether or not a pixel position is specified in processing contents are specified as operating signals from the operating unit 1102, and the processing is repeated until a pixel position is specified and processing contents are specified as operating signals from the operating unit 1102. That is to say, for example, in the event that the screen shown in FIG. 97 is displayed on the display unit 403, the user can operate the pointer 1131 on the image displayed on the display unit 403 to execute predetermined processing at the pixel position to which the users desires to add a change in processing, displaying a drop-down list 1132 as shown in FIG. 97, for example, and further specifying one of the processing contents X, Y, and Z displayed in the drop-down list 1132. In step S441, upon this specification being made, judgment is made that the pixel position is specified and the processing contents are specified, and the processing proceeds to step S442. In this case, as shown in FIG. 97, the pixel position P41 is selected, and processing contents X are selected.

In step S442, the processing contents deciding unit 1121 reads out the corresponding combination of two types of features from the specified pixel position. In further detail, of the features detected by the features detecting unit 1111, the processing contents deciding unit 1121 reads out the combination of the two types of features corresponding to the specified pixel.

In step S443, the processing contents deciding unit 1121 updates the processing contents matching the corresponding combination of features, to the processing contents specified in step S441.

In step S444, the processing contents deciding unit 1121 stores the changed pixel position and the processing contents in the history memory 1122.

In step S445, the processing contents deciding unit 1121 judges whether or not there are other changes to the LUT, and in the event that judgment is made that there are yet changes to be processed for the LUT, i.e., in the event that operations signals instructing other changes to the LUT are input from the operating unit 1102, the processing returns to step S441, and in the event that judgment is made there is no processing to continue changing the LUT, i.e., in the event that operating signals indicating ending of the changing of the LUT are input from the operating unit 1102, the processing ends.

Figures 99, 100:
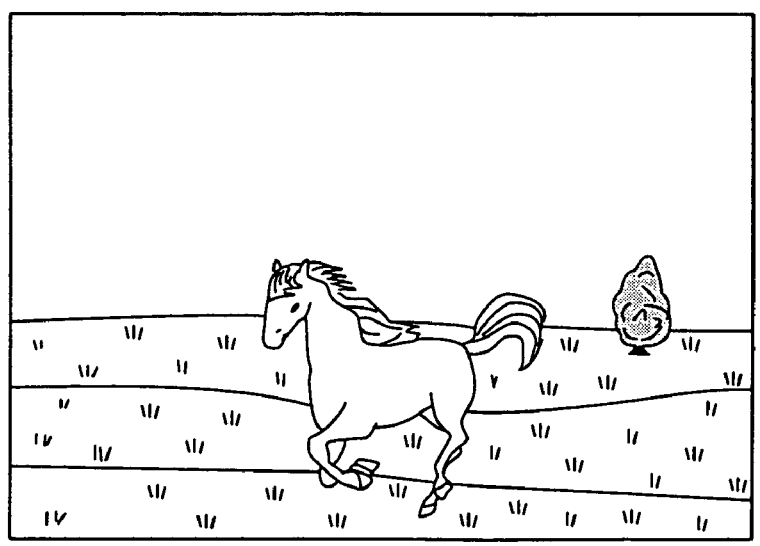
FIG. 99 is a diagram describing manual LUT changing processing in image optimizing processing with the optimizing device shown in FIG. 91.
FIG. 100 is a diagram describing manual LUT changing processing in image optimizing processing with the optimizing device shown in FIG. 91.

With the above manual LUT changing processing, changing of the LUT is performed as follows. That is, in step S442, in the event that, for example, $(V_a, V_b) = (0.52, 0.27)$, for the features of the pixel at the obtained pixel position P41, the processing contents Y are set in FIG. 98 for the position (position from the left, position from the top)=(5, 3) on the LUT in FIG. 98 (positions on the LUT will be indicated in the same manner hereafter, as well). In the event that the processing contents are changed to X in step S443 as shown in FIG. 97, the processing at the position (5, 3) on the LUT is changed from the processing contents Y to the processing context X in step S443, as shown in FIG. 99.

Figure 91:
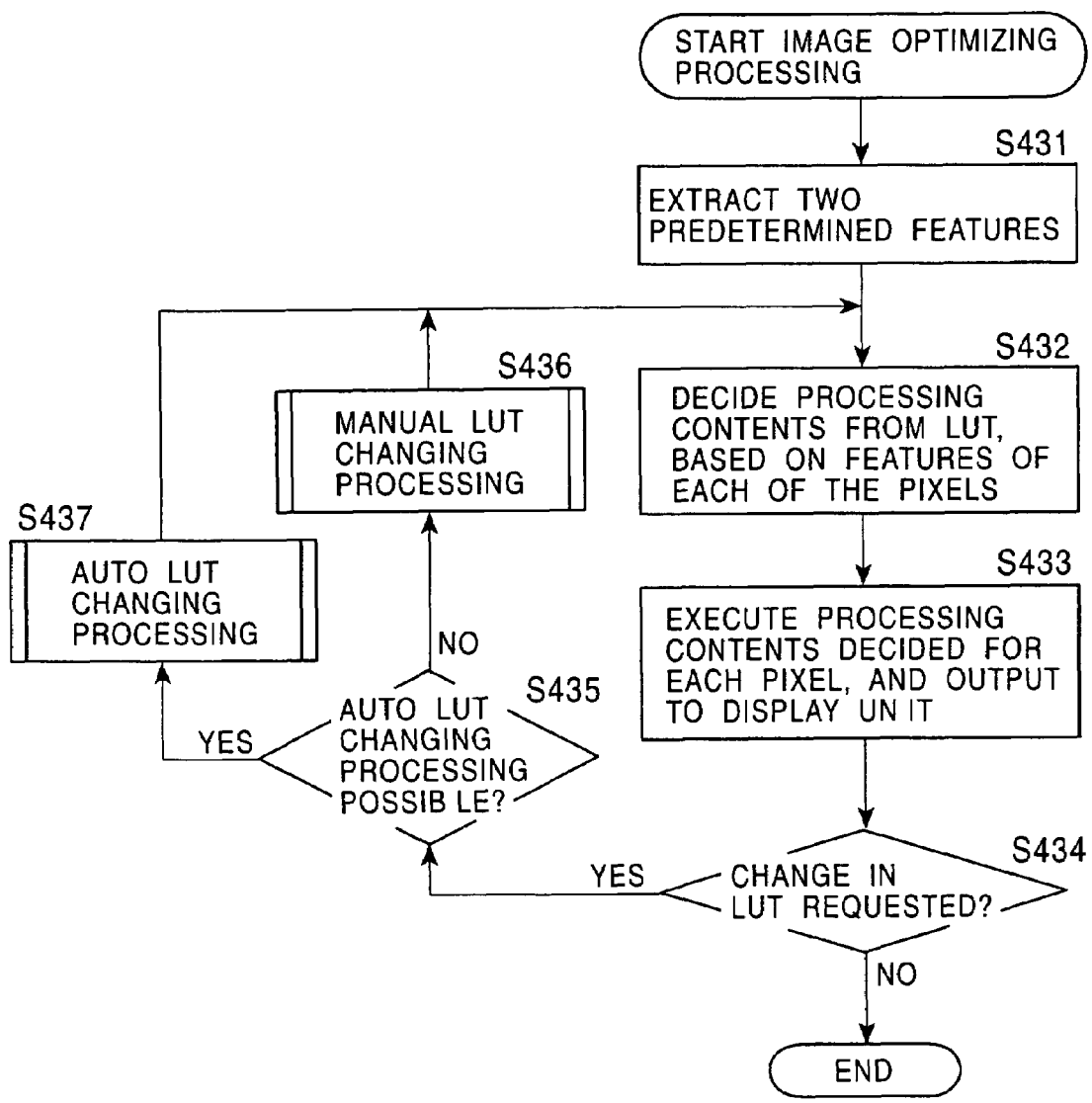
FIG. 91 is a flowchart describing image optimizing processing with the optimizing device shown in FIG. 84.
Figure 96:
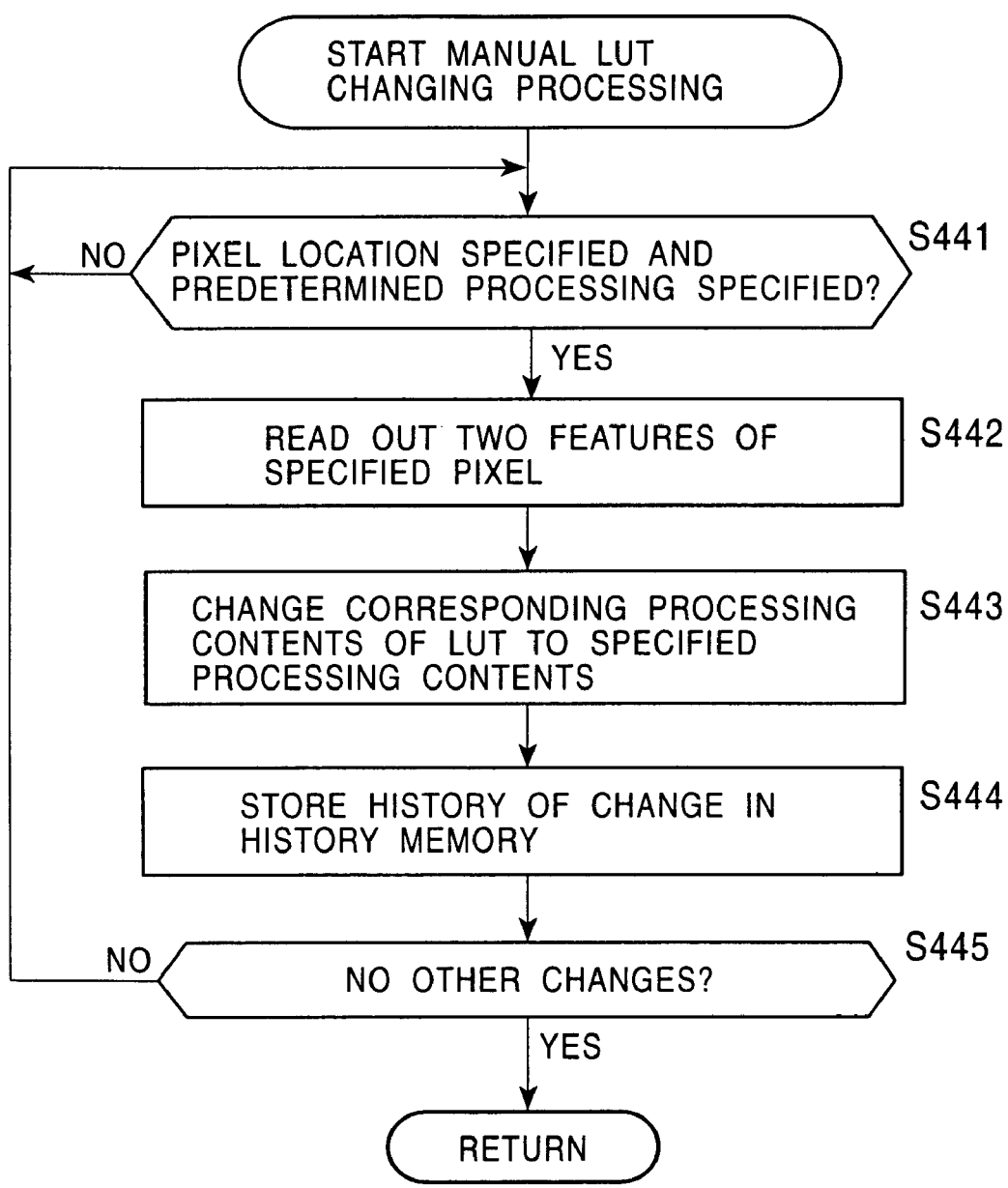
FIG. 96 is a flowchart describing manual LUT changing processing in image optimizing processing with the optimizing device shown in FIG. 91.

After the manual LUT changing processing shown in FIG. 96 is ended, the processing returns to the processing in step FIG. 432 in the flowchart in FIG. 91, the subsequent processing is repeated. In this case, in the event that the LUT is a changed as described above, processing corresponding to the processing contents Y is executed up to the pixel of the LUT wherein the combination of the two types of features is (5, 3), as shown in FIG. 99. Consequently, of the image shown in FIG. 97, processing is changed corresponding to the pixel having the same features as the pixel position P41, i.e., the pixel belonging to (5, 3) on the LUT, and images displayed wherein processing different from that in the case of FIG. 97 is performed on that portion, as shown in FIG. 100, for example. Note that in FIG. 100, an example is shown wherein a pixel having the same features as the pixel at pixel position P41 in FIG. 97 is white.

While description has been made regarding an example wherein (processing contents on) a LUT specified by a combination of teachers for a selected pixel alone are changed, with the processing example described with reference to the flowchart in FIG. 96, changes to the LUT are not restricted to this. That is, for example, an arrangement may be made wherein all nearby portions from the portion where change to the LUT has been specified on the LUT, for example, are changed processing contents. That is, for example, as shown in FIG. 101, in the event that all processing contents are set as Z for the initial state of the LUT (the initial state of the LUT is a so-called default setting, and may be a state wherein all processing contents are not Z), an arrangement may be made wherein, in the event that the processing contents of the position (4, 2) on the LUT are changed to X and the processing contents at the position (5, 2) are changed to Y, as shown in FIG. 102A, due to the processing of the flowchart in FIG. 96, areas near to the changed positions on the LUT may be changed to X or Y as shown in FIG. 102B. That is, in the case of FIG. 102B, the distance from the position (4, 2) on the LUT and the distance from the position (5, 2) thereupon is compared for all positions on the LUT, with all being changed to the processing contents of the position which is close. Consequently, in FIG. 102B, the left half region is made to be the processing contents X, while the right half region is made to be the processing contents Y.

In the same way, as shown in FIG. 103A, in the event that the processing contents of the combination the features at the positions (4, 2), (7, 7) on the LUT are changed to X, and the processing contents of the combination the features at the positions (5, 2), (4, 5) on the LUT are changed to Y, the processing contents at (1, 1), (2, 1), (3, 1), (4, 1), (1, 2), (2, 2), (3, 2), (4, 2), (1, 3), (2, 3), (3, 3), (4, 3), (5, 7), (5, 8), (6, 6), (6, 7), (6, 8), (7, 5), (7, 6), (7, 7), (7, 8), (8, 4), (8, 5,)8, 6), (8, 7), (8, 8), on the LUT are changed to X, as shown in FIG. 103B, and processing contents are Y at all other positions on the LUT.

Further, in the same manner, as shown in FIG. 104A, in the event that the processing contents of the combination the features at the positions (4, 2), (7, 7) on the LUT are changed to X, and the processing contents of the combination the features at the positions (2, 3), (5, 2), (4, 5), (7, 4) on the LUT are changed to Y, the processing contents at (3, 1), (3, 2), (4, 1), (4, 2), (4, 3), (5, 7), (5, 8), (6, 6), (6, 7), (6, 8), (7, 6), (7, 7), (7, 8), (8, 6), (8, 7), (8, 8), on the LUT are changed to X, as shown in FIG. 104B, and processing contents are Y at all other positions on the LUT.

Changing the LUT thus enables batch changing of the processing contents of a combination of multiple features at a single time of processing, with a relatively approximated combination of features.

Now, let us return to description of the flowchart in FIG. 91.

In step S435, and the event that judgment is made that auto LUT changing processing as possible, the flow proceeds to step S437, and auto LUT changing processing is executed.

Figure 106:
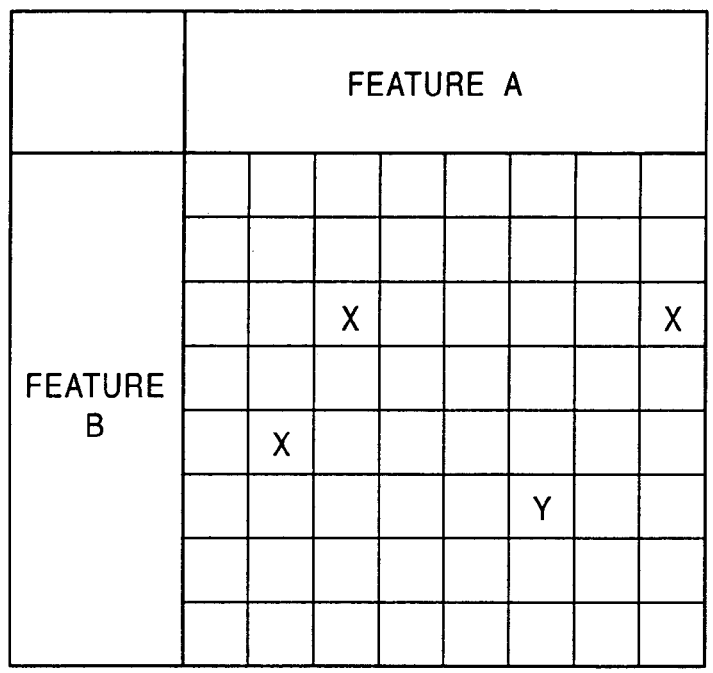
FIG. 106 is a diagram describing auto LUT changing processing in image optimizing processing with the optimizing device shown in FIG. 91.

Now, the auto LUT changing processing will be described, with reference to the flowchart in FIG. 105. In step S461, the processing contents deciding unit 1121 obtains a group which exists for each of the processing contents in the distribution of updating history stored in history memory 1122. That is to say, the history memory 1122 stores a history table which is different from the LUT, recording, for example, the position on the LUT regarding which changing has been specified by the above-described manual LUT changing processing, and the specified processing contents, as shown in FIG. 106. The history table shown in FIG. 106 indicates that change has been instructed for the processing contents for (3, 3), (8, 3), (2, 5), (6, 6) on the LUT, with the processing contents X, X, X, and Y being instructed, respectively.

Now, a group for each processing contents means an area wherein the processing contents on the history table exist with a predetermined density or higher, over a predetermined area or greater.

Figure 107:
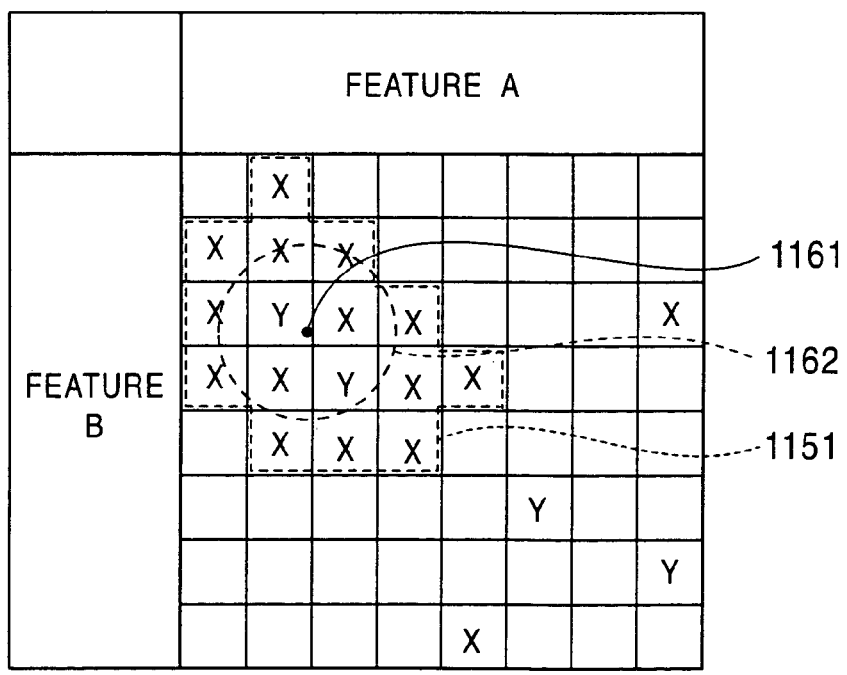
FIG. 107 is a diagram describing auto LUT changing processing in image optimizing processing with the optimizing device shown in FIG. 91.

For example, in the event that a group exists, a group 1151 is formed on the table as shown in FIG. 107, and the processing contents deciding unit 1121 *tames the group 1151. Note that in FIG. 107, the group 1151 is a group of processing contents X, and groups are obtained for each of other processing contents as well.

Also, a group does not exist unless manual LUT processing has been executed a certain number of times, with the updating history being stored in a history member 1122, and also with changing processing being executed to the same processing contents at a position somewhat grouped together on the LUT. Now, in step S435 in FIG. 91, judgment is made regarding whether or not auto LUT changing processing is possible, by whether or not groups of the processing contents exist. That is, in the event that a group exist for each other processing contents, judgment is made that auto LUT changing processing is possible, and if the groups do not exist, judgment is made that auto LUT changing processing is not possible.

In step S462, the processing contents deciding unit 1121 detects the position of the center of gravity of a group obtained in step S461.

That is, for example, in the case in FIG. 107, the group 1151 is formed, and position of center of gravity thereof is obtained from all positions on the history table where processing contents X are specified. In the case in FIG. 107, the center of gravity 1161 is obtained at all positions on the history table where processing contents X are specified within the group 1161.

In step S463, the processing contents deciding unit 1121 converts the processing contents of grids on the LUT corresponding to the combination of features of the respective pixels into processing contents of grids on the history table corresponding to the combination of features of pixels making up groups, corresponding to the contents of processing at the position on the history table existing within a predetermined range from the position of center of gravity of the group, and the processing ends. That is to say, in FIG. 107, all the processing contents on the LUT corresponding to the position on the history table exist in with in the range 1162 which is the range of a circle having a predetermined radius center to on the position of center of gravity 1161, are changed into processing contents X making up the group.

That is, for example, as shown in FIG. 107, in the event that the history table is generated in the state with an LUT configured such as shown in FIG. 108, (2, 3), (3, 4) on the history table with in the range 1162 within a predetermined distance from the center of gravity 1161 store history information of processing contents Y which are a different to the processing contents X making up the group, as shown in FIG. 107, so the processing contents of (2, 3), (3, 4) on the LUT corresponding to (2, 3), (3, 4) on the history table are changed to X. Accordingly, in the event that LUT is configured as shown in FIG. 108, the processing contents of (2, 3) on the LUT are Y, so the processing contents deciding unit 1121 changes the processing contents of (2, 3) on the LUT to X, as shown in FIG. 109. Also, in the case in FIG. 108, the processing contents of (3, 4) on the LUT are X, so the processing contents deciding unit 1121 maintains this state.

Due to this processing, the processing contents on the LUT (grid information) is automatically changed. Note that this processing is not restricted to being performed at the timing of the user instructing changing processing of the LUT, and may be repeatedly executed at predetermined time intervals.

Now, let us return to the description of the flowchart in FIG. 91.

In the event that judgment is made in step S434 is that change of the LUT is not instructed, i.e., in the event that the user its use the image display of the display unit 403 and judges that an image suiting the user's preferences is generated, the processing ends.

Repeating changing of the LUT following user operations by the above processing changes the processing contents registered to each of the grids on the LUT, thereby enabling images suiting the preferences of the user to be generated.

In the above, the processing contents on LUT are changed according to user operations, so it can be said that the "contents of processing" are changed. Also, change is made into one or the other of: a processing system wherein the processing contents of that LUT are changed from the position of center of gravity of the group; or a processing system wherein, according to processing contents at a specified position on the LUT, the processing contents on the LUT at another position on the LUT are changed as shown in FIG. 101 through FIG. 104; depending on whether or not the group is obtained for each processing content, according to processing performed by the user. That is, the changing algorithm for the LUT is changed, so the "structure of processing" of the "contents of processing" can also be said to be changed according to user operations.

Figure 110:
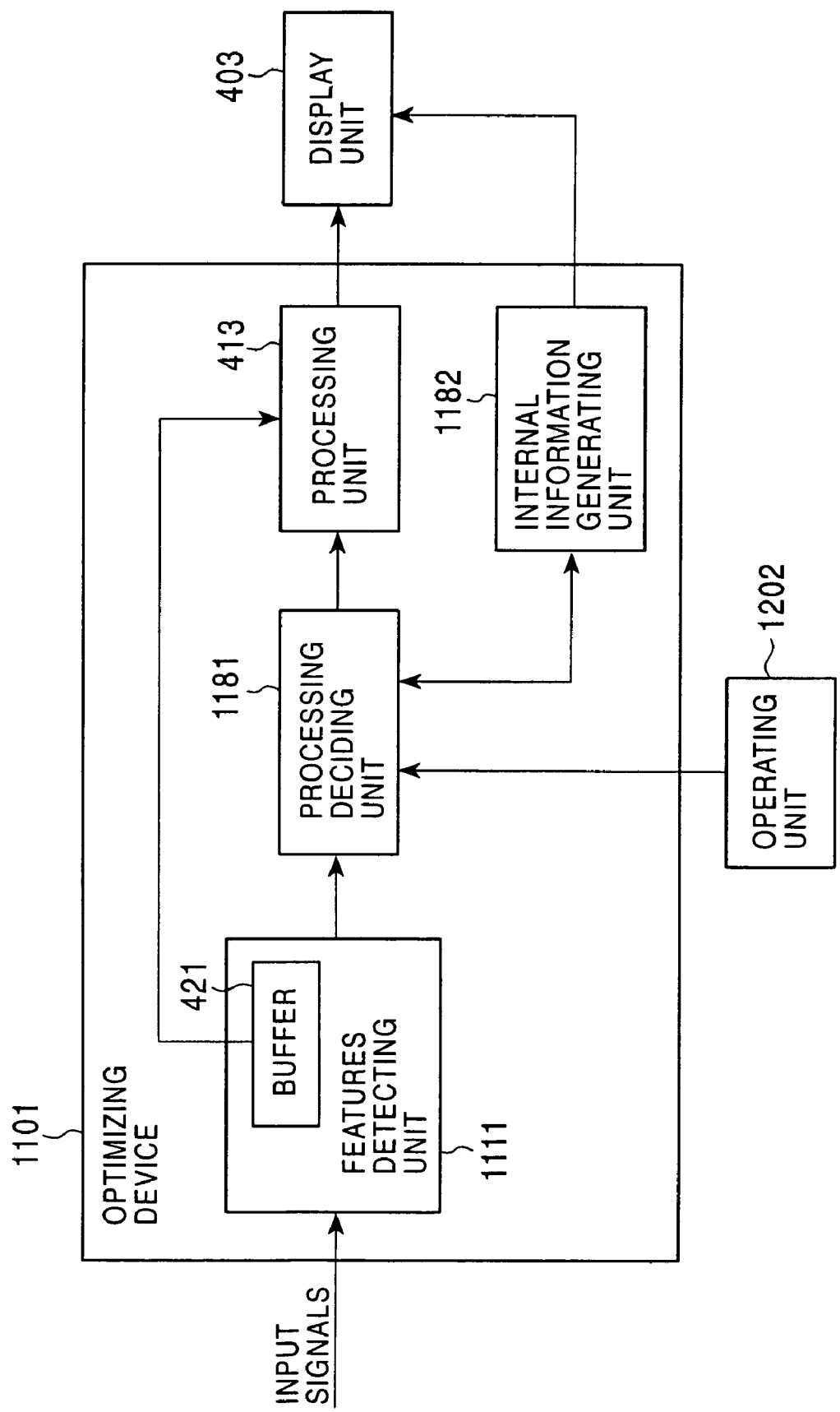
FIG. 110 is a block diagram illustrating a configuration example of another embodiment of an optimizing device to which the present invention has been applied.

Next, another configuration example of a optimizing device 1101 with the processing deciding unit 1181 provided instead of the processing deciding unit 1112 of that optimizing device 1101 shown in FIG. 89, and an internal information generating unit 1182 newly provided, will be described with reference to FIG. 110. In FIG. 110, the configuration is the same as that of the optimizing device 1101 shown in FIG. 89 other than the processing deciding unit 1181 and internal information generating unit 1182 being newly provided.

The processing deciding unit 1181 stores history information whereby the LUT stored in the processing contents database 1191 (FIG. 111) is updated, and changes the LUT corresponding to the history information, while supplying the LUT stored in the processing contents database 1191 to the internal information generating unit 1182.

The internal information generating unit 1182 reads out the LUT stored in the processing contents database 1191, converts this into information which can be displayed on the display unit 403, outputs to the display unit 403, and displays.

Figure 111:
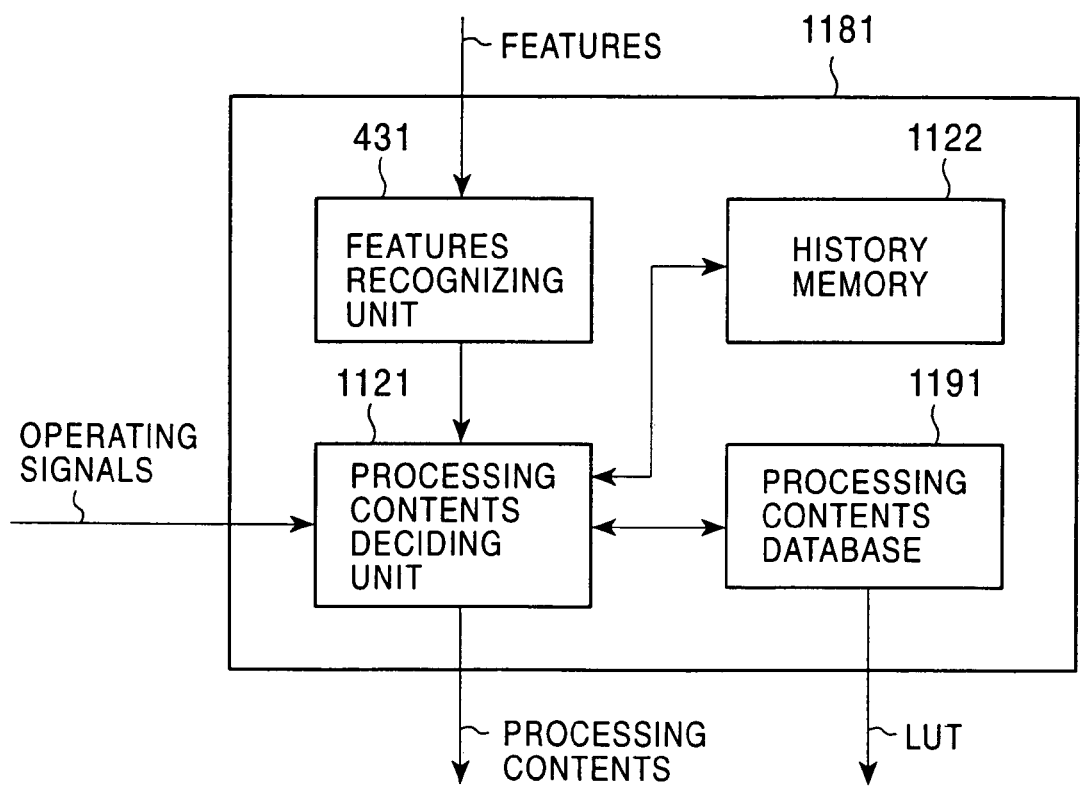
FIG. 111 is a block diagram illustrating a configuration example of the processing deciding unit shown in FIG. 110.

Next, the configuration of the processing deciding unit 1181 will be described with reference to FIG. 111. The processing deciding unit 1181 in FIG. 111 is of the same configuration as the processing deciding unit 1112 except that the processing contents database 1191 is provided instead of the processing contents database 433 shown in FIG. 90.

The processing contents database 1191 stores the LUT, and also supplies information of the LUT to the Internal information generating unit 1182 low as necessary. The other functions are the same as those of the processing contents database 433 shown in FIG. 90.

Figure 112:
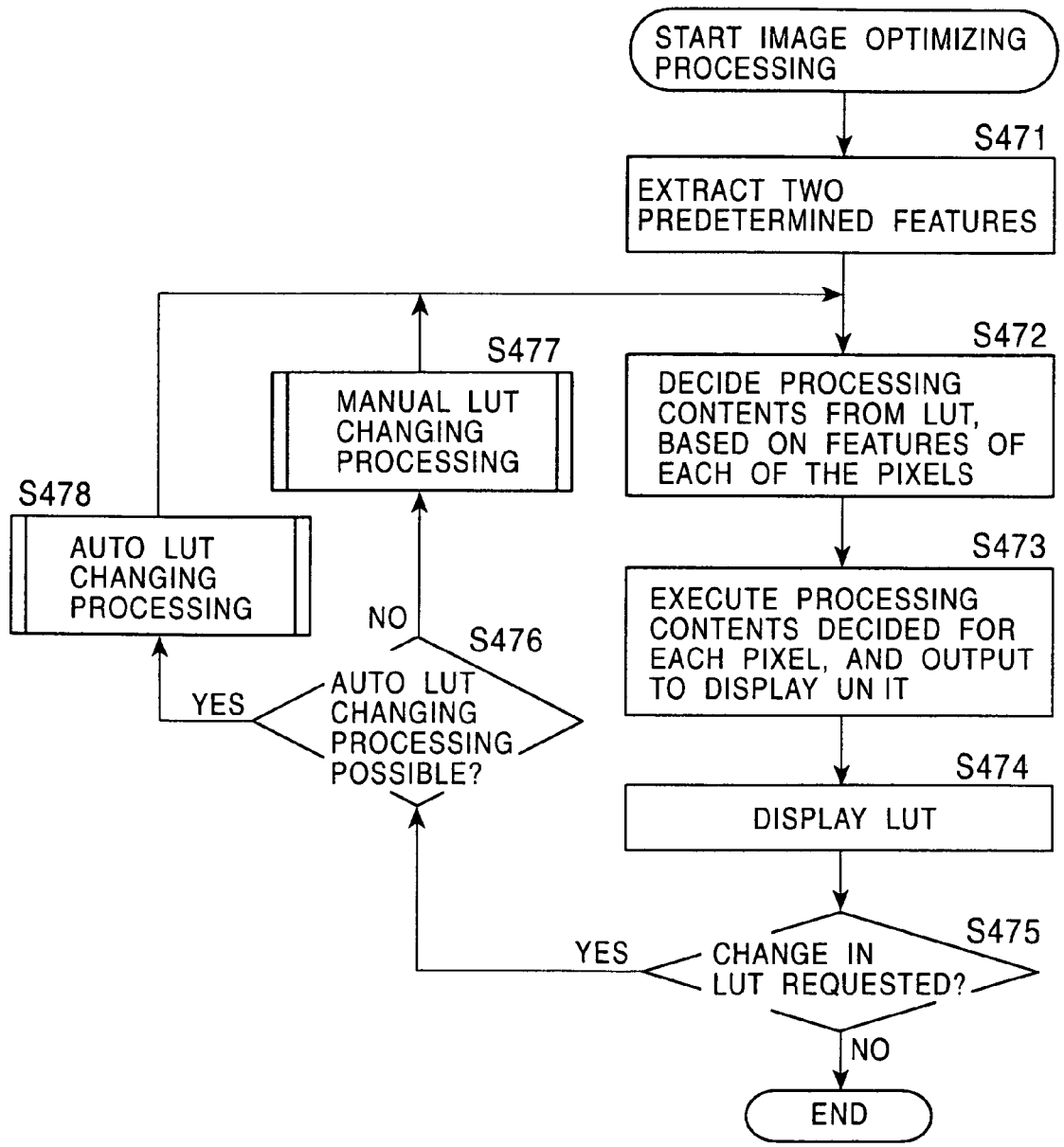
FIG. 112 is a flowchart describing image optimizing processing with the optimizing device shown in FIG. 110.

Next, the telop extraction optimizing processing by the optimizing device 1101 shown in FIG. 110 will be described, with reference to the flowchart shown in FIG. 112. Now, the telop extraction optimizing processing in FIG. 112 is basically the same as the processing described with reference to the flowchart in FIG. 91, wherein the processing in steps S471 through S473 and S475 through S478 in FIG. 112 is processing corresponding to the steps S431 through S437 in FIG. 91. Following the processing in step S473, in step S474, the internal information generating unit 1182 reads out the LUT of the processing contents database 1191 of the processing deciding unit 1181, converts this into image signals that can be displayed on the display unit 403, outputs to the display unit 403, displays (presents) it, proceeds to step S475, and the subsequent processing is repeated.

Due to such processing, the LUT is displayed (presented), so that LUT can be changed while recognizing the processing performed on the image signals which are input signals, and change of the LUT, from the image displayed on the display unit 403.

So far, an example has been described wherein, in manual LUT changing processing, the LUT is changed by specifying pixels on the image processed with the processing contents registered in the LUT displayed on the display unit 403, and processing contents thereof, but an arrangement may be made wherein the internal information generating unit 1182 reads out the LUT stored in the processing contents database 1191 and, for example, displays the processing contents on the LUT on the display unit 403 in a state that this directly operable by the operating unit 1102, so that the processing contents on the LUT can be directly changed.

Figure 113:
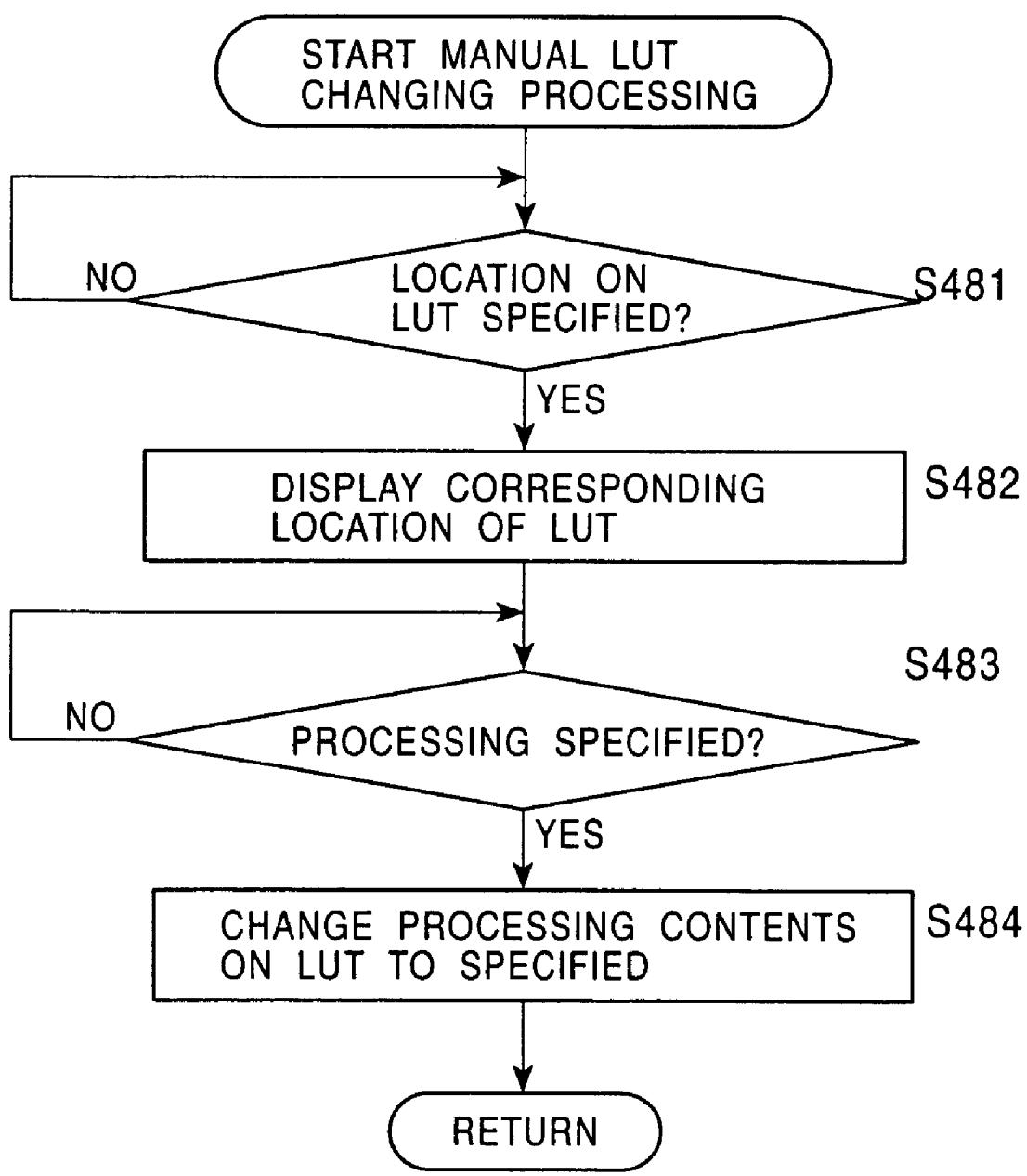
FIG. 113 is a flowchart describing manual LUT changing processing in image optimizing processing with the optimizing device shown in FIG. 110.

Now, manual LUT changing processing for the optimizing device 1101 in FIG. 110 to directly change the values of the above-described LUT will be described with reference to the flowchart in FIG. 113.

In step S481, the processing contents deciding unit 1121 decides whether or not the position has been specified on the LUT, and the processing is repeated until specified. For example, as shown in FIG. 114, in the event that the position (5, 3) on the LUT displayed on the display unit 403 as a position where the processing contents are set to Y is specified, judgment is made that a position has been specified on the LUT, and the processing proceeds to step S482.

In step S482, the internal information generating unit 1182 makes a display on the display unit 403 indicating to position and on the LUT that has been specified. That is, in the case in FIG. 114, positioned displayed frame 1192 is displayed at the specified (5, 3).

In step S483, the processing contents deciding unit 1121 decides whether or not the processing contents have been specified, and repeats the processing until the processing contents are specified. For example, as shown in FIG. 114, specifying by a displaying a drop-down list 1193 at the position where the pointer 1191 is operated (e.g., by right-clicking the mouse serving as the operating unit 1102), and selecting one of the processing contents X, Y, and Z, by the user operating the operating unit 1102, results and judgment that processing contents have been specified, and the processing proceeds to step S484.

In step S484, the processing contents deciding unit 1121 changes the processing contents to the specified processing contents, and ends the processing. That is, in the case of FIG. 114, "X" displayed in the drop-down list 1193 is selected, so, and as shown in FIG. 115, the processing contents of (5, 3) on the LUT are changed from Y to X.

Due to the above processing, the processing contents set on the LUT can be directed changed, and LUT can be operated a while viewing and image processed by the processing contents registered to the LUT, so processing contents suiting the preferences of the user can be readily set.

With optimizing device 1101 in FIG. 110, the processing contents on the grids on the LUT specified by user operations are changed in the manual LUT changing processing, so it can be said that the "contents of processing" are changed by user operations. Also, upon changing history stored in history memory 1122 being accumulated to a certain degree, and a group being detected, the algorithms for changing the LUT are changed from manual LUT changing processing to auto LUT changing processing, so the "structure of processing" is being changed.

Further, the LUT is displayed is internal information relating to processing of the processing deciding unit 1112, while the processing contents of the LUT can be changed while viewing the display LUT, so the user can recognize the correlation relationship between the contents on the LUT and the image displayed on the display unit 403.

Next, the configuration of an optimizing device 1201 as another embodiment wherein the features detecting unit 1111 and processing unit 413 are provided instead of the features detecting unit 411 and processing unit 413 of the optimizing device 401 shown in FIG. 55, will be described, with reference to FIG. 116.

The features detecting unit 1111 is the same as that in the configuration of the optimizing device 1101 in FIG. 89.

The processing unit 1211 subjects input signals read out from the buffer 421 to mapping processing using a coefficient set obtained by learning, for example, based on information of processing contents input from the processing deciding unit 413, outputs to the display unit 403, and displays. The processing deciding unit 413 changes the method of the learning coefficient set, based on operating signals from the operating unit 1202. Now, operating unit 1202 is the same as the operating unit 402.

Figure 117:
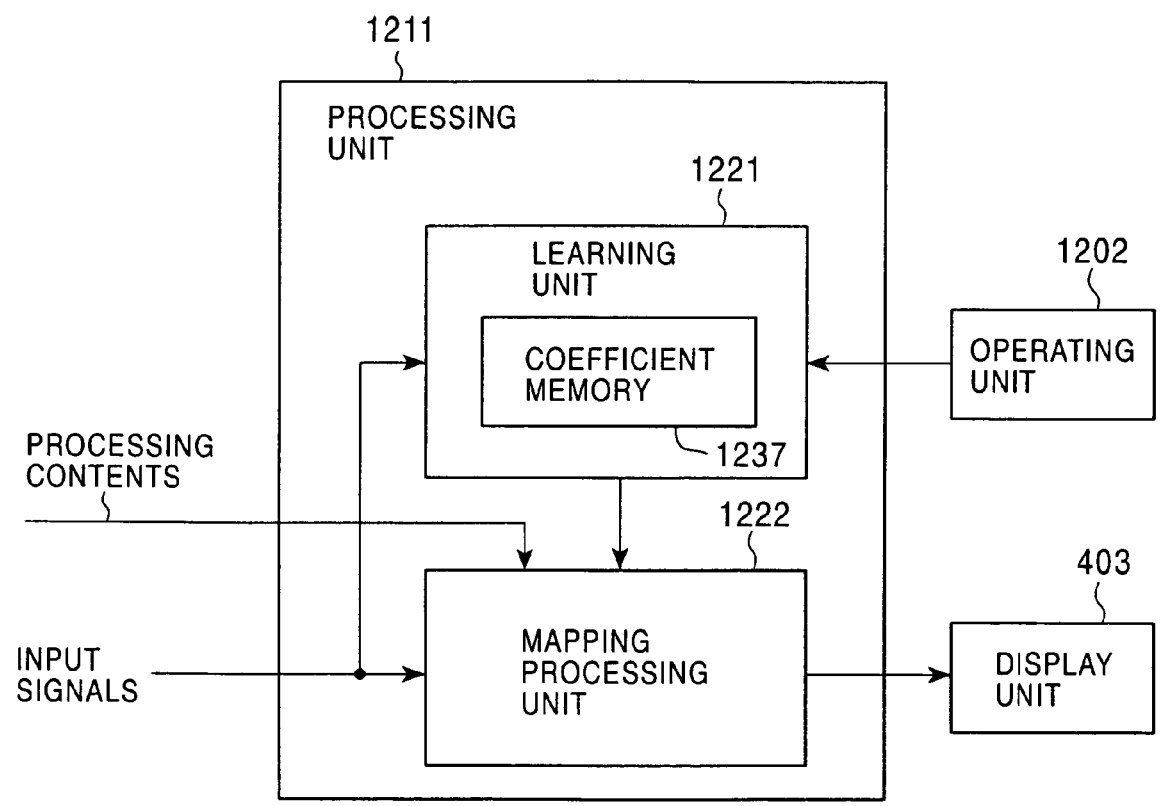

Next, the configuration of the processing unit 1211 will be described with reference to FIG. 117.

The learning device 1221 learns, by least-N'th-power error, coefficient sets necessary for mapping processing of the mapping processing unit 1222 for each of the processing contents, based on the image signals which are input signals read out from the buffer 421 of the features detecting unit 1111, and stores in the coefficient memory 1237. Also, the learning device 1221 learns coefficient sets by changing the value of the exponent N in least-N'th-power error, based on operating signals input from the operating unit 1202.

The mapping processing unit 1222 reads out corresponding coefficient sets to on the coefficient memory 1237 of the learning device 1221, based on the processing contents input from the processing deciding unit 412, performs a mapping processing of the image signals which are input signals read out from the buffer 421 of the features detecting unit 1111, outputs to the display unit 403, and displays.

Next, the detailed configuration of the learning device 1221 will be described with reference to FIG. 118. The tutor data generating unit 1231 is the same as the tutor data generating unit 231 shown in FIG. 30, which generates tutor data from input signal serving as learning data, and outputs this to the least-N'th-power error coefficient computing unit 1236. The student data generating unit 1232 is the same as the student data generating unit 232 in FIG. 30, which generates tutor data from the input signals serving as learning data, and outputs this to the features extracting unit 1233 and prediction tap extracting unit 1235.

The features extracting unit 1233 is the same as the features extracting unit 422 of the features detecting unit 1111, which extracts features from the student data and outputs these to the processing deciding unit 1234. The processing deciding unit 1234 is the same as the processing deciding unit 412, which decides processing contents based on the features input from the features detecting unit 1233, and outputs this to the least-N'th-power error coefficient computing unit 1236. The prediction tap extracting unit 1235 is the same as a prediction tap extracting unit 233, which, with the tutor data sequentially as pixels of interest, extracts from the student data, pixels serving as prediction taps with regard to the pixels of interest, and outputs to the least-N'th-power error coefficient computing unit 1236.

The least-N'th-power error coefficient computing unit 1236 is the same as the least-N'th-power error coefficient computing unit 234 shown in FIG. 30, with regard to the basic configuration and processing contents, which computes coefficient sets by least-N'th-power error from the prediction taps input from the prediction tap extracting unit 1235 and the tutor data, based on information specifying the exponent N necessary for the least-N'th-power error coefficient computing processing input from the operating unit 1202, and outputs this to the coefficient memory 1237, where it is overwritten. However, the least-N'th-power error coefficient computing unit 1236 differs from the least-N'th-power error coefficient computing unit 234 in FIG. 30 in that coefficient sets are generated for each of the processing contents input from the processing deciding unit 1234. The coefficient memory 1237 stores, for each of the processing contents, the coefficient sets being output from the least-N'th-power error coefficient computing unit 1236 for each of the processing contents. FIG. 118 illustrates coefficient sets A through N being stored for each of the processing contents.

Figure 119:
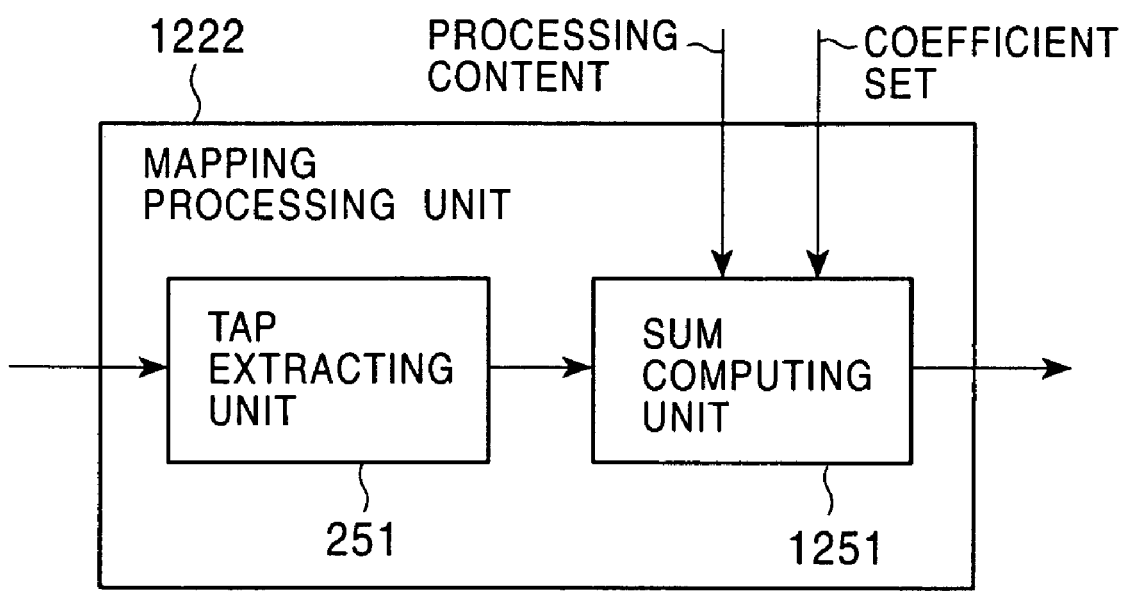

Next, the configuration of the mapping processing unit 1222 will be described with reference to FIG. 119. The tap extracting unit 251 is the same as the mapping processing unit 222 in FIG. 31, which extracts prediction taps from input signal supplied from the buffer 421, with regard to the pixel of interest, and outputs to the sum of product computing unit 1251. The sum of product computing unit 1251 is the same as the sum of product computing unit 252 shown in FIG. 31, which, upon input from the prediction tap extracting unit 251, executes sum of product computing processing using the value of the extracted prediction taps (pixels) and the coefficient sets stored in the coefficient memory 1237 of the learning unit 1221, generates the pixel of interest, performs this on all pixels and outputs to the display unit 403 as output signals, and displays. Note however, that in the sum of product computing processing, the sum of product computing unit 1251 uses, of the coefficient sets A through N stored in the coefficient memory 1237, the coefficient sets corresponding to the processing contents supplied from the processing deciding unit 412.

Figure 120:
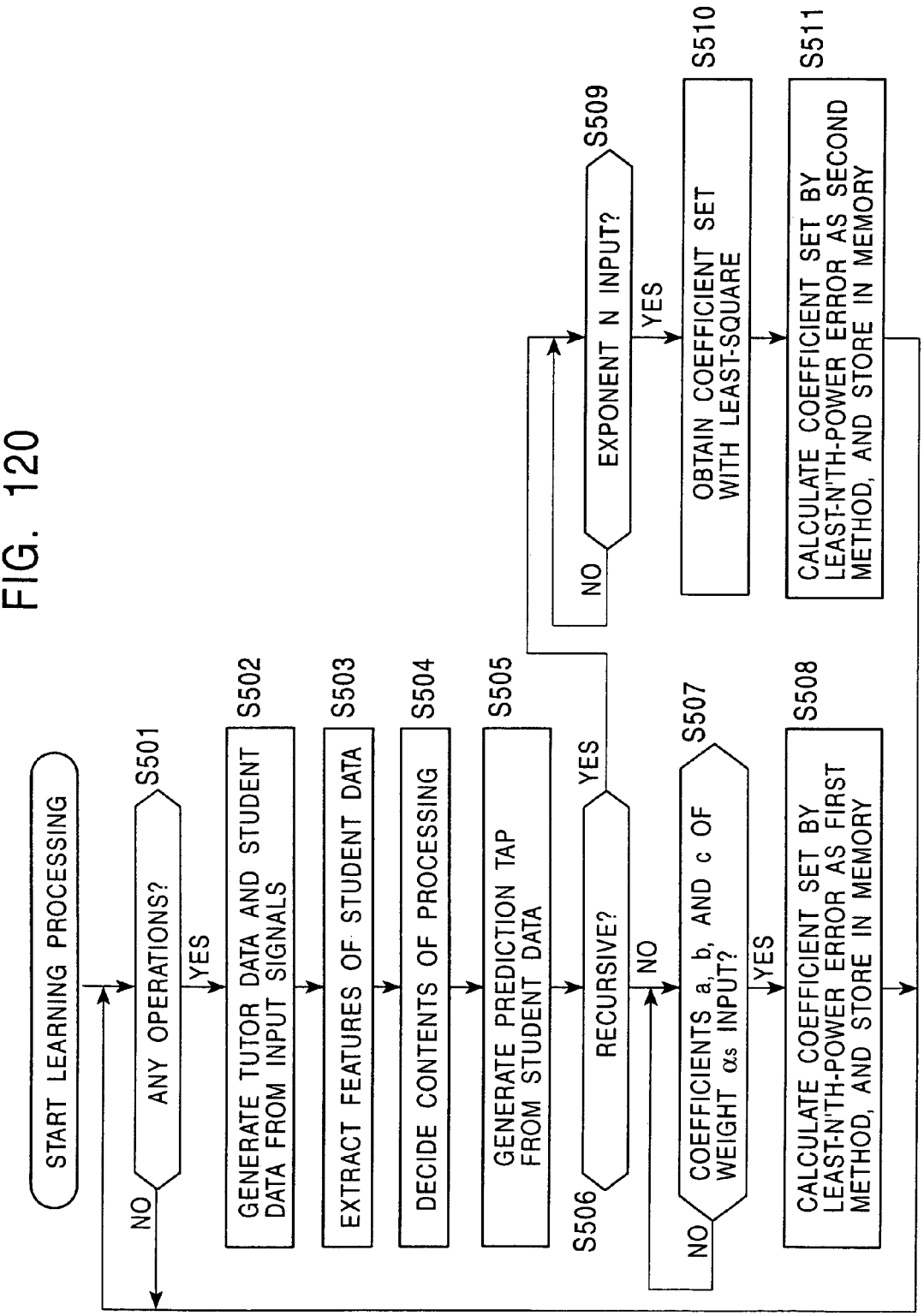

Next, learning processing with image optimizing processing by the optimizing device 1201 shown in FIG. 116, will be described with reference to the flowchart in FIG. 120.

In step S501, judgment is made regarding whether or not the user has operated the operating unit 202, and in the event that judgment is made that this has not been operated, the flow returns to step S501. Also, in the event that in step S501, judgment is made that the operating unit 1202 has been operated, the flow proceeds to step S502.

In step S502, the tutor data generating unit 1231 of the learning device 1221 generates tutor data from the input signals and outputs this to the least-N'th-power error coefficient computing unit 1236, while the student data generating unit 1232 and generates student data from the input signals and outputs this to the features extracting unit 1233 and prediction tap extracting unit 1235, and the flow proceeds to step S503.

Now, as for the data used for generating the student data and tutor data (hereafter may be referred to as learning data) input signals input at a point in the past by a predetermined amount of time from the current point, for example, may be employed. Also, for the learning data, dedicated data may be stored beforehand, instead of using input signals.

In step S503, the features extracting unit 1233 extracts features from the student data at a position corresponding to the pixel of interest (tutor data), and outputs to the processing deciding unit 1234.

In step S504, the processing deciding unit 1234 decides the processing contents for the pixel of the interest based on the features input from the features extracting unit 1233, and outputs this to the least-N'th-power error coefficient computing unit 1236. For example, the processing deciding unit 1234 may perform vector quantizing of one or multiple features from the features extracting unit 1233, and use the quantizing results thereof as information of the processing contents. However, in this case, there is no LUT or the like stored as with the processing deciding unit 1112 in FIG. 89.

In step S505, the prediction tap extracting unit 1235 takes each piece of tutor data as a pixel of interest, generates prediction taps from the student data input from the student data generating unit 1232 with regard to each of the pixel of interest, and outputs to the least-N'th-power error coefficient computing unit 1234, and the flow proceeds to step S506.

In step S506, the least-N'th-power error coefficient computing unit 1236 judges whether or not operating signals for specifying a computing of a coefficient set with least-N'th-power error by the recursive method (second method) have been input from the operating unit 202, and in the event that judgment is made that the user has operated the operating unit 1202, for example, to specify not the recursive method, i.e., the direct method (first method), the flow proceeds to step S507, judgment is made regarding whether coefficients a, b, and c, specifying the weight $\alpha_s$ (specifying the exponent N) in Expression (50) has been input, the processing is repeated until input, and in the event that judgment is made that, for example, the user has operated the operating unit 1202 and values specifying the coefficients a, b, and c have been input, the processing proceeds to step S507.

Is step S507, the least-N'th-power error coefficient computing unit 1236 solves the problem of minimizing the above-described Expression (48) is essentially with least-square-power error, in the state of the coefficients a, b, and c, with the weight $\alpha_s$ input, thereby obtaining the prediction coefficients $w_1, w_2, w_3, \ldots, w_m$, i.e., a coefficient set which is the solution for the exponent N corresponding to the weight $\alpha_s$, by least-N'th-power error, for each of the processing contents input from the processing deciding unit 1234, stores these in the coefficient memory 1237, and the flow returns to step S501.

On the other hand, in the event that a judgment is made that the recursive method is selected in step S506, the processing proceeds to step S509.

In step S509, the least-N'th-power error coefficient computing unit 1236 judges whether or not information specifying the exponent N has been input, the processing is repeated until the exponent N is input, and in the event that judgment is made to that, for example, the user has input information's specifying the exponent N by operating the operating unit 1202, the processing proceeds to step S510.

In step S510, the least-N'th-power error coefficient computing unit 1236 obtains a coefficient set by a solution with the least-N'th-power error method serving as a basis. In step S511, the least-square error coefficient computing unit 1236 obtains the coefficient set by least-N'th-power error corresponding to the input from the operating unit 1202, in a recursive matter for the exponent N as described with reference to Expression (51) through Expression (54), using prediction values obtained from the coefficient sets obtained by least-square-error, for each of the processing contents input from the processing deciding unit 1234, stores these in the coefficient memory 1237, and the flow returns to step S501.

Due to the above processing, coefficient sets are learned in the coefficient memory 1237, for each of the processing contents.

Next, the mapping processing in the image optimizing processing with the optimizing device 1201 shown in FIG. 116 will be described, with reference to the flowchart in FIG. 121.

In step S521, the features detecting unit 1111 detects features of pixels of the input signals at positions corresponding to the pixels of interest (output signals) from the image signals which are input signals, and outputs the detected features to the processing deciding unit 412.

In step S522, the processing deciding unit 412 decides the processing contents based on the features input from the features detecting unit 1111, and outputs this to the processing unit 1211. The processing of the processing deciding unit 412 decides the processing contents by performing the same processing as the processing deciding unit 1234 in FIG. 118. Accordingly, as described above, in the event that the processing deciding unit 1234 performs vector quantizing on one or multiple features from the features extracting unit 1233 and takes the quantizing results thereof as information for the processing contents, at described above, there is no LUT or the like stored in the processing unit 412 shown in FIG. 116, as with the processing deciding unit 1112 in FIG. 89.

In step S523, with the frame of an image serving as output signals corresponding to an image frame serving as current input signals, as a frame of interest, the tap extracting unit 251 of the mapping processing unit 1222 of the processing unit 1211 takes, of the pixels of that frame of the interest, one which has not yet been made the pixel of interest, in raster scan order, for example, as the pixel of interest, extracts a prediction tap from input signals with regard to the pixel of interest, and outputs this to the sum of products computing unit 1251.

In step S524, the sum of products computing unit 1251 of the mapping processing unit 1222 will reads out coefficient sets corresponding to the processing contents input from the processing deciding unit 412, from the coefficient memory 1237 of the learning device 1221.

Then, in step S525, the sum of products computing unit 1251 uses the prediction coefficient corresponding to the processing contents, read out from the coefficient memory 1237 of the learning device 1221, and executes sum of product computing processing with the prediction tap input from the tap extracting unit 251 and a coefficient set read out from the coefficient memory 1237, following the Expression (39). Thus, the sum of products computing unit 1251 obtains the pixel value of the pixel of interest (prediction value). Subsequently, the flow proceeds to step S526, where the tap extracting unit 251 judges whether or not all pixels in the frame of interest had been made to be the pixel of interest, and in the event that judgment is made otherwise, the flow returns to step S521, a pixel which has not yet been made the pixel of interest is taken as a new pixel of interest in raster scan order of the frame of interest, and subsequently, the same processing is repeated.

Also, in the event that judgment is made in step S526 that all pixels in the frame of interest have been made to be the pixel of interest, the flow proceeds to step S527, where the display unit 403 displays the frame of interest made from the pixels obtained with the sum of product computing unit 1251.

The flow then returns to step S521, or the features detecting unit 1111 detects the features of pixels of input signals at a position corresponding to pixel the of the interest (output signals) from the image signals which are input signals, the next frame is taken as the new frame of interest, and subsequently, the same processing is repeated.

Figure 116:
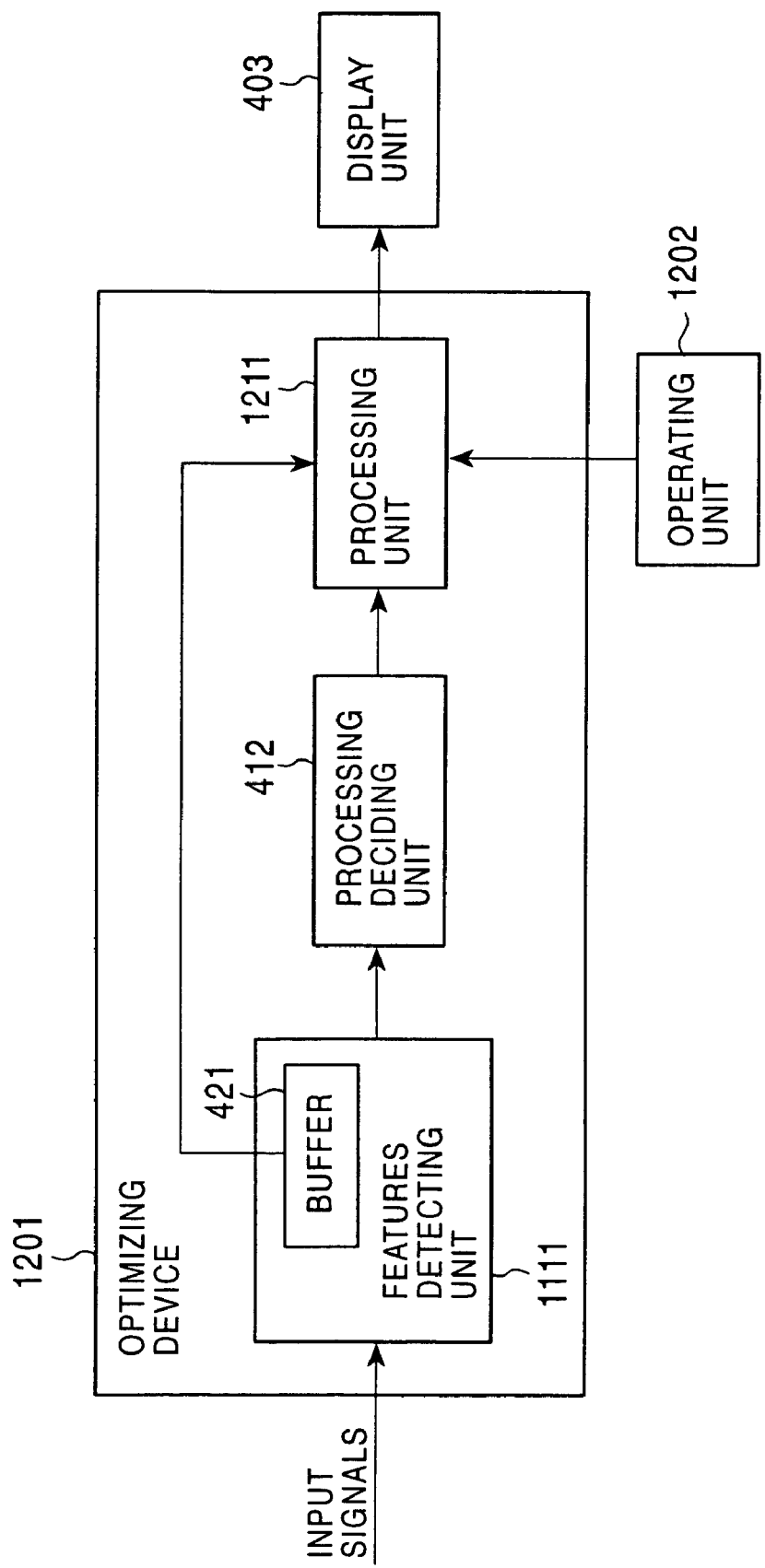

Note that with the optimizing device 1201 in FIG. 116, the exponent N is changed by the user operating the operating unit 1202 (in the direct method, the coefficients a, b, and c specifying the exponent N are changed, while in the recursive method, the exponent N itself is changed), thereby setting what sort of exponent N is to be employed for the least-N'th-power error method, as a learning norm (learning system) of prediction coefficients (coefficient set). That is, the learning algorithms for obtaining coefficients are changed. Accordingly, it can be said that the "structure of processing" is changed so as to obtain an image suiting the preferences of the user.

Next, the configuration of the optimizing device 1301 wherein the internal information generating unit 1312 is provided to the optimizing device 1201 shown in FIG. 116, will be described with reference to FIG. 122.

Figure 122:
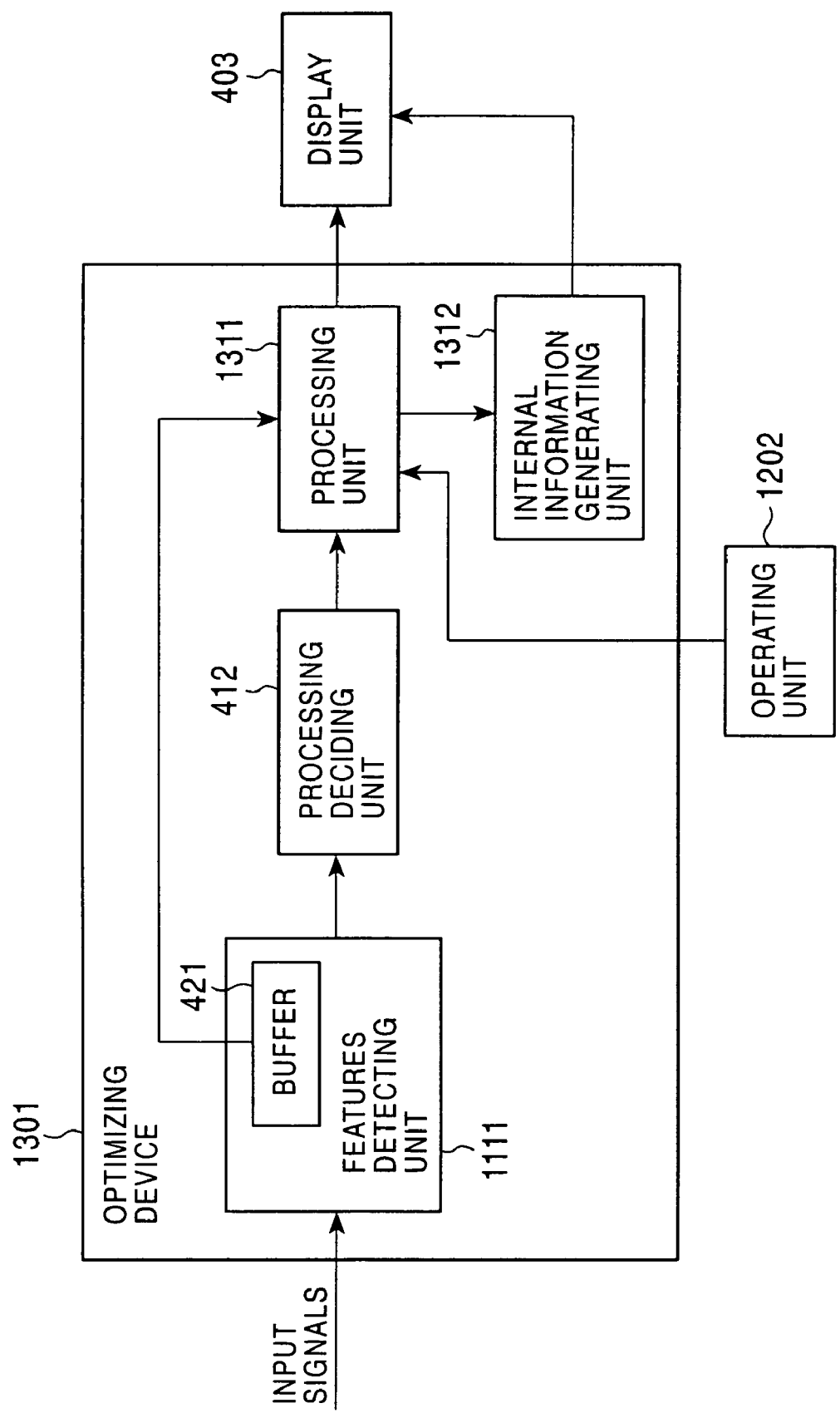

The optimizing device 3101 in FIG. 122 is the same as the optimizing device 1201 in FIG. 116, other than the processing unit 1311 is provided instead of the processing unit 1211, by the internal information generating unit 1312 being provided.

The internal information generating unit 1312 reads out coefficient set information stored for each of the processing contents from the coefficient memory 1321 in the processing unit 1311, for example, as internal information, converts this into information that can be displayed on the display unit 403, and displays.

Figure 123:
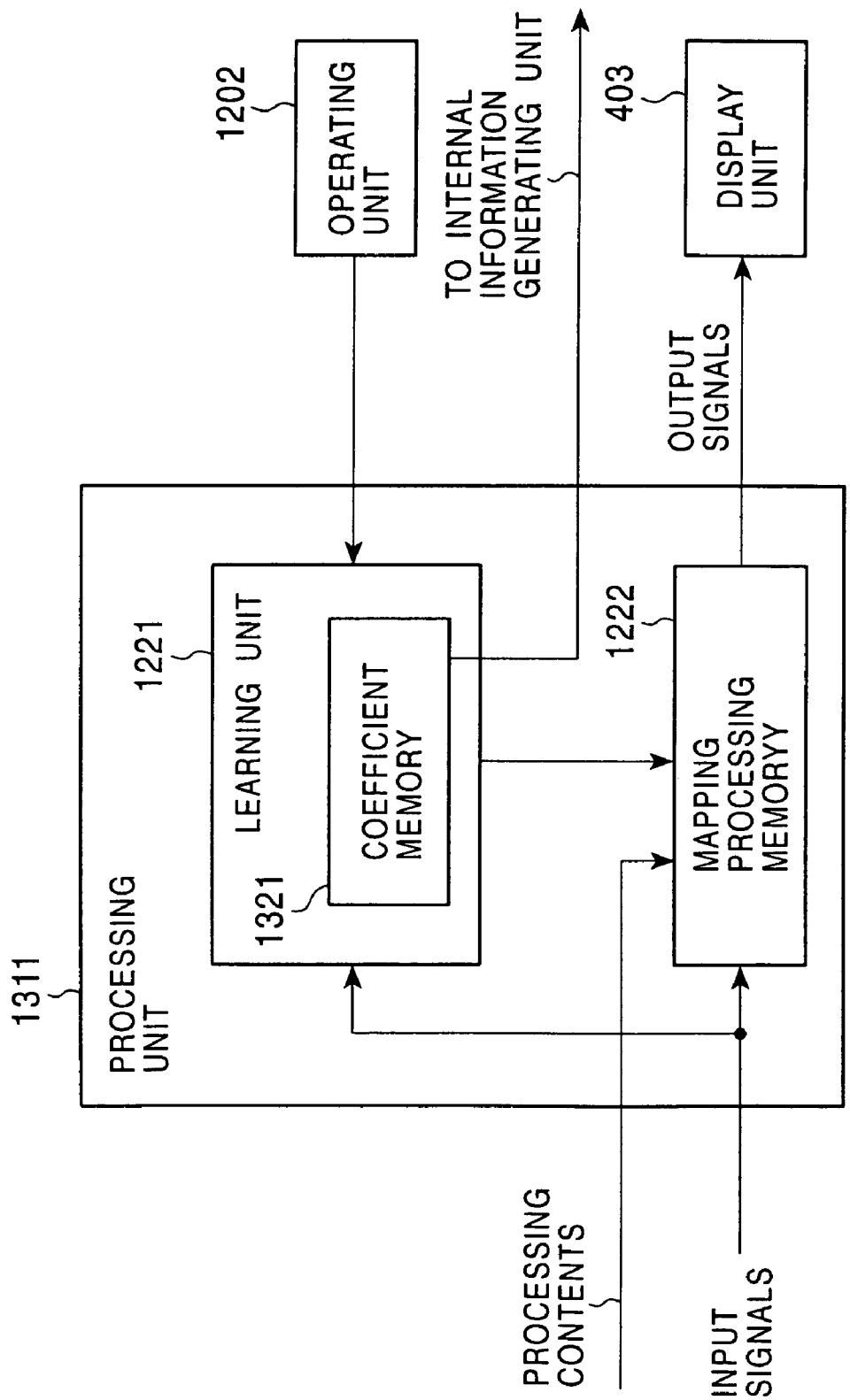

Next, the configuration of the processing unit 1311 will be described with reference to FIG. 123. The basic configuration is the same, but coefficient memory 1321 is provided instead of the coefficient memory 1237, and while the functions thereof are the same, this is connected to the internal information generating unit 1312, with the configuration so that the coefficient sets stored for each of the processing contents are read out.

Next, the image optimizing processing with optimizing device 1301 in FIG. 122 will be described, with reference to the flowchart in FIG. 124. The optimizing device 1301 in FIG. 122 is also made up of learning processing and mapping processing, in the same way as the optimizing device 1201 in FIG. 116. With the learning processing, processing the same as steps S501 through S511 in FIG. 120 are performed in steps S541 through S551.

Further, with the learning processing, following the processing in steps S541 and S551, the flow proceeds to step S552, the internal information generating unit 1312 reads the coefficient sets stored in the coefficient memory 1321 as internal information, and generates image signals that can be displayed based on the values contained in the coefficient sets, outputs to the display unit 403, and displays.

At this time, the image generated by the internal information generating unit 1312 and displayed on the display unit 403 may have a form of a 3-dimensional distribution such as shown in FIG. 39, or 2-dimensional distribution such as shown in FIG. 40, as described above.

Figure 124:
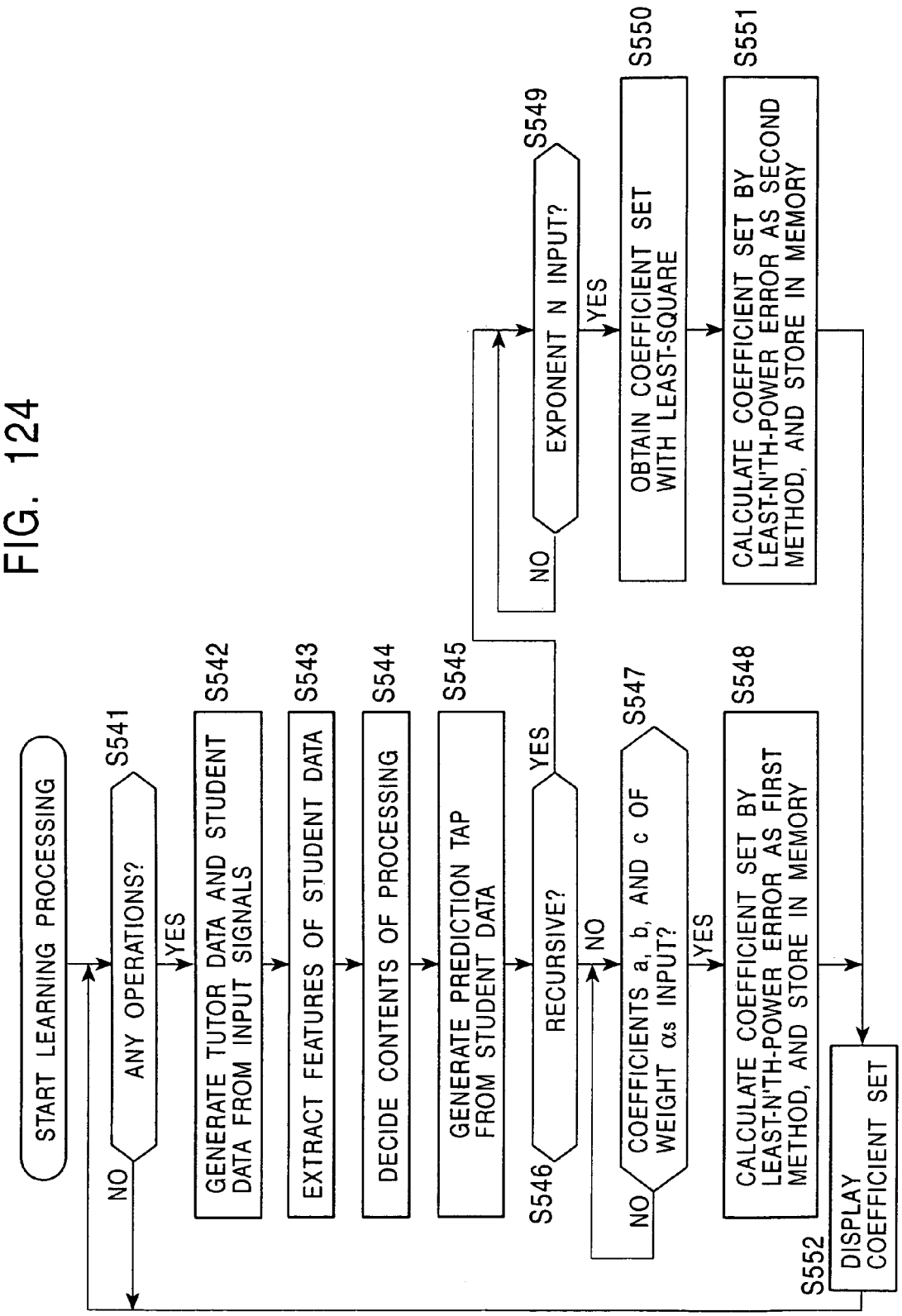

Now, let us return to the description of the flowchart in FIG. 124.

Following the processing in step S552, the flow returns to step S541, and subsequently, the said processing is repeated.

Figure 121:
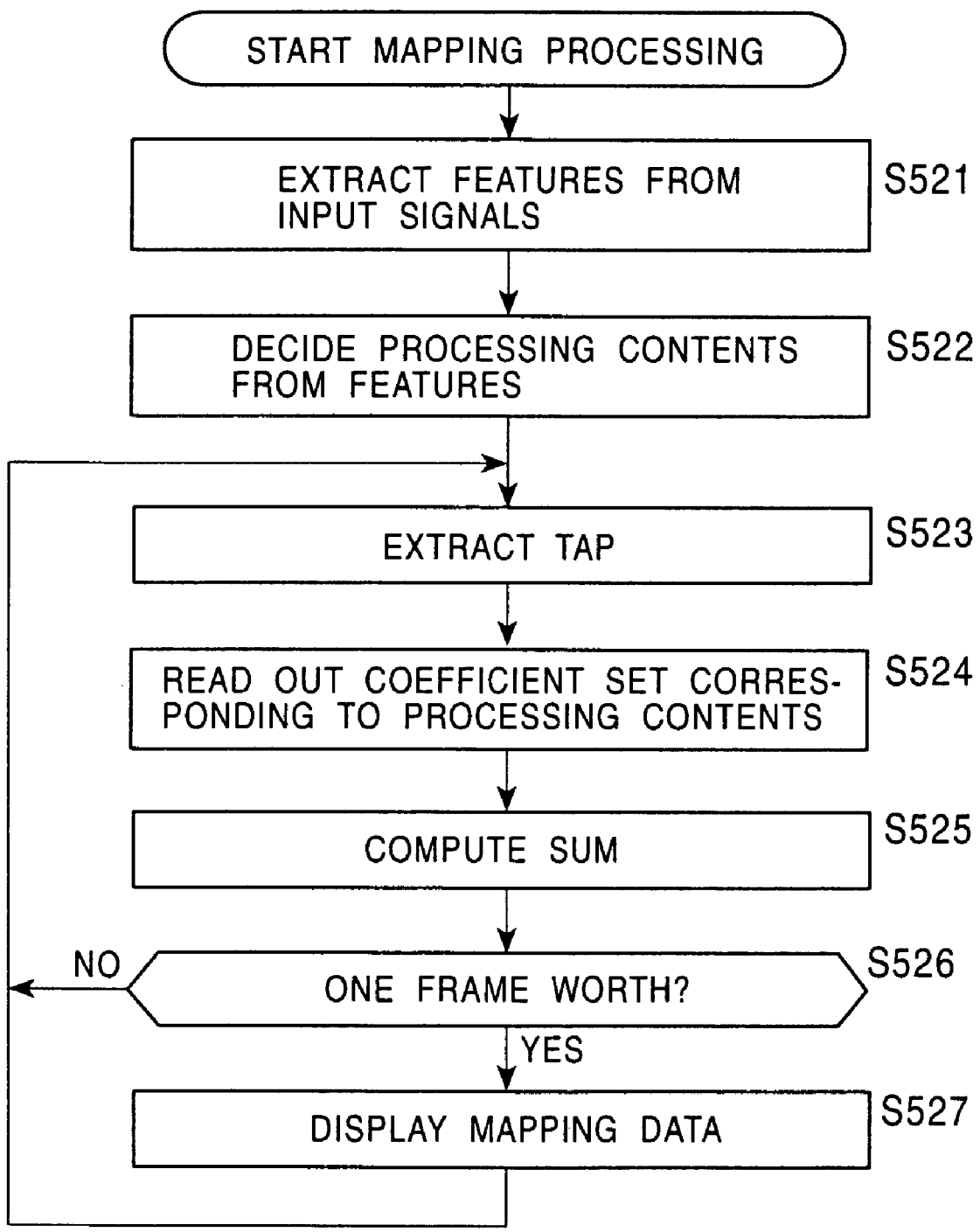
Figure 125:
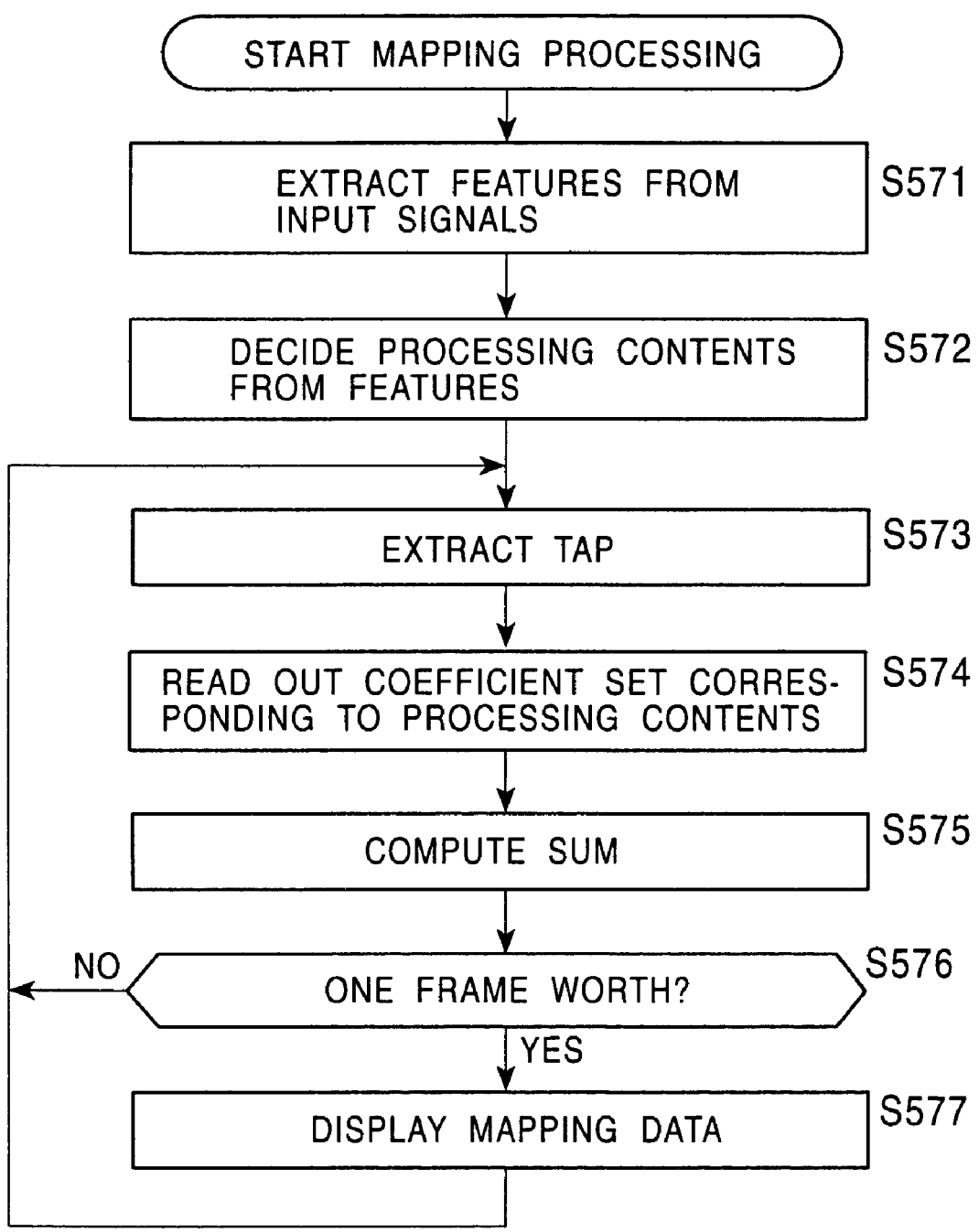

On the other hand, with the mapping processing shown in the flowchart in FIG. 125, in steps S571 through S577, processing the same as that in steps S521 through S527 in FIG. 121 is performed, respectively.

Due to the above processing, the values of coefficient sets (the coefficient values) stored in the coefficient memory 1321 of the processing unit 1311 art display (presented) as internal information relating to processing, so the user operates the operating unit 1202 to so as to obtain an image as output signals suiting his/her own preferences while viewing the coefficient set distribution and processing results of the processing unit 1311 as output signals, thereby changing the learning algorithm for obtaining coefficient sets by changing the exponent N. Accordingly, it can be said that the "structure of processing" is being changed so as to obtain an image suiting the preferences of the user. Also, while the coefficient sets are displayed in the above example, an arrangement may be made wherein internal information relating to the processing, such as for example, whether the current least-N'th-power error method is the direct method or recursive method, is displayed.

Next, an optimizing device 1401 having a configuration provided with a processing unit 1411 instead of the processing unit 1211 of the optimizing device 1201 in FIG. 116, will be described with reference to FIG. 126.

The configuration of the processing unit 1411 is basically the same as the configuration of the processing unit 311 of the optimizing device 301 in FIG. 41, which optimize is input signals based on the operating signals input from the operating unit 1202 and the processing contents input from the processing deciding unit 412, and displays these on the display unit 403.

Next, the configuration of the processing unit 1411 will be described with reference to FIG. 127. Multiple coefficient sets are stored for each of the processing contents in the coefficient memory 1421, with coefficient sets necessary for the mapping processing by the mapping processing unit 1222 being stored. The figure indicates the coefficient sets A through N are stored. These coefficient sets are generated beforehand by learning, with the learning device 1441 in FIG. 128.

Now, the configuration of the learning device 1441 generating these coefficient sets will be described with reference to FIG. 128.

Figure 118:
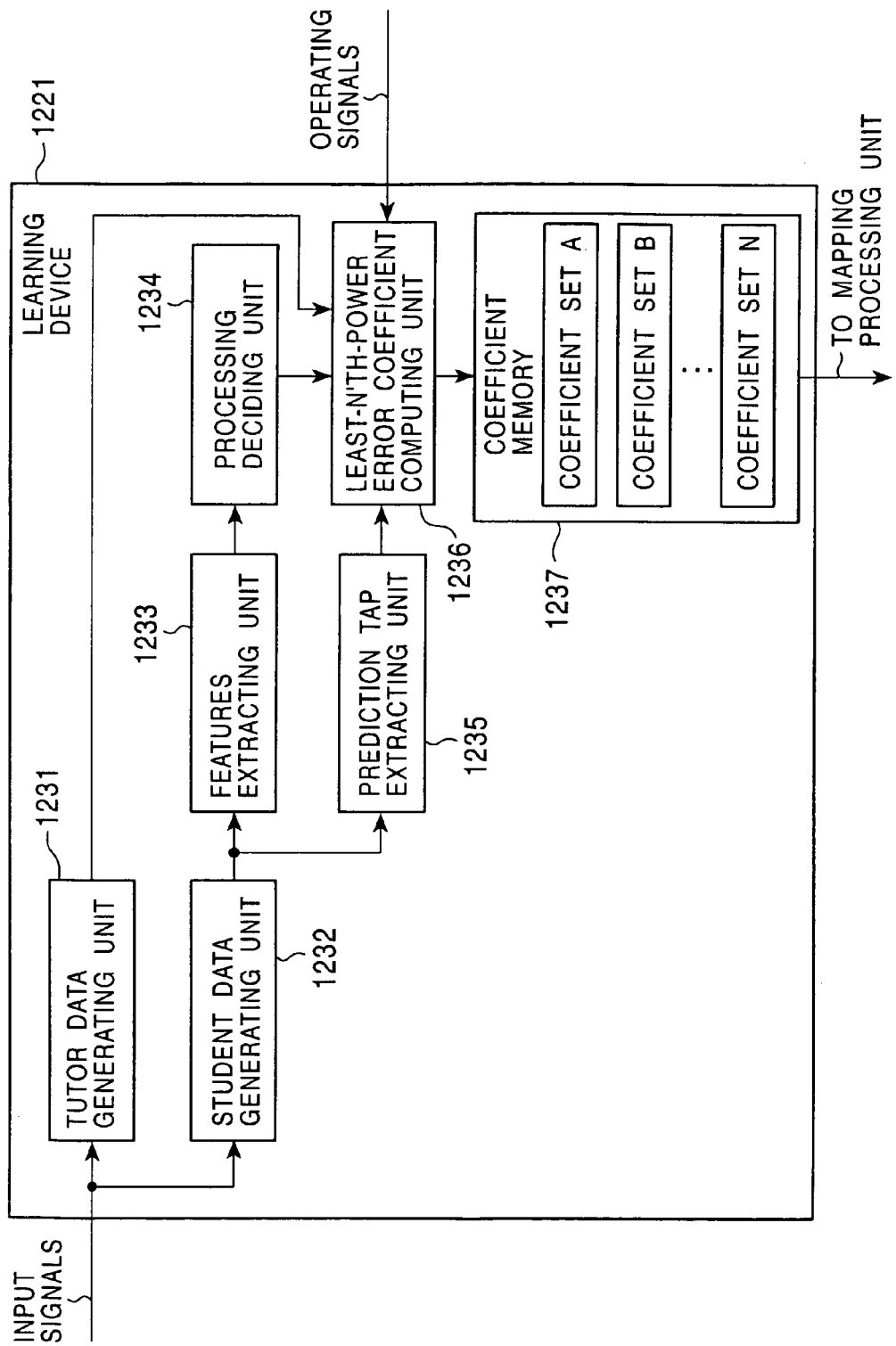

The tutor data generating unit 1451, student data generating unit 1452, features extracting unit 1453, processing deciding unit 1454, and prediction tap extracting unit 1455, of the learning device 1441, correspond to the tutor data generating unit 1231, student data generating unit 1232, features extracting unit 1233, processing deciding unit 1234, and prediction tap extracting unit 1235, of the learning device 1221 shown in FIG. 118, respectively, and accordingly description thereof will be omitted.

Figure 43:
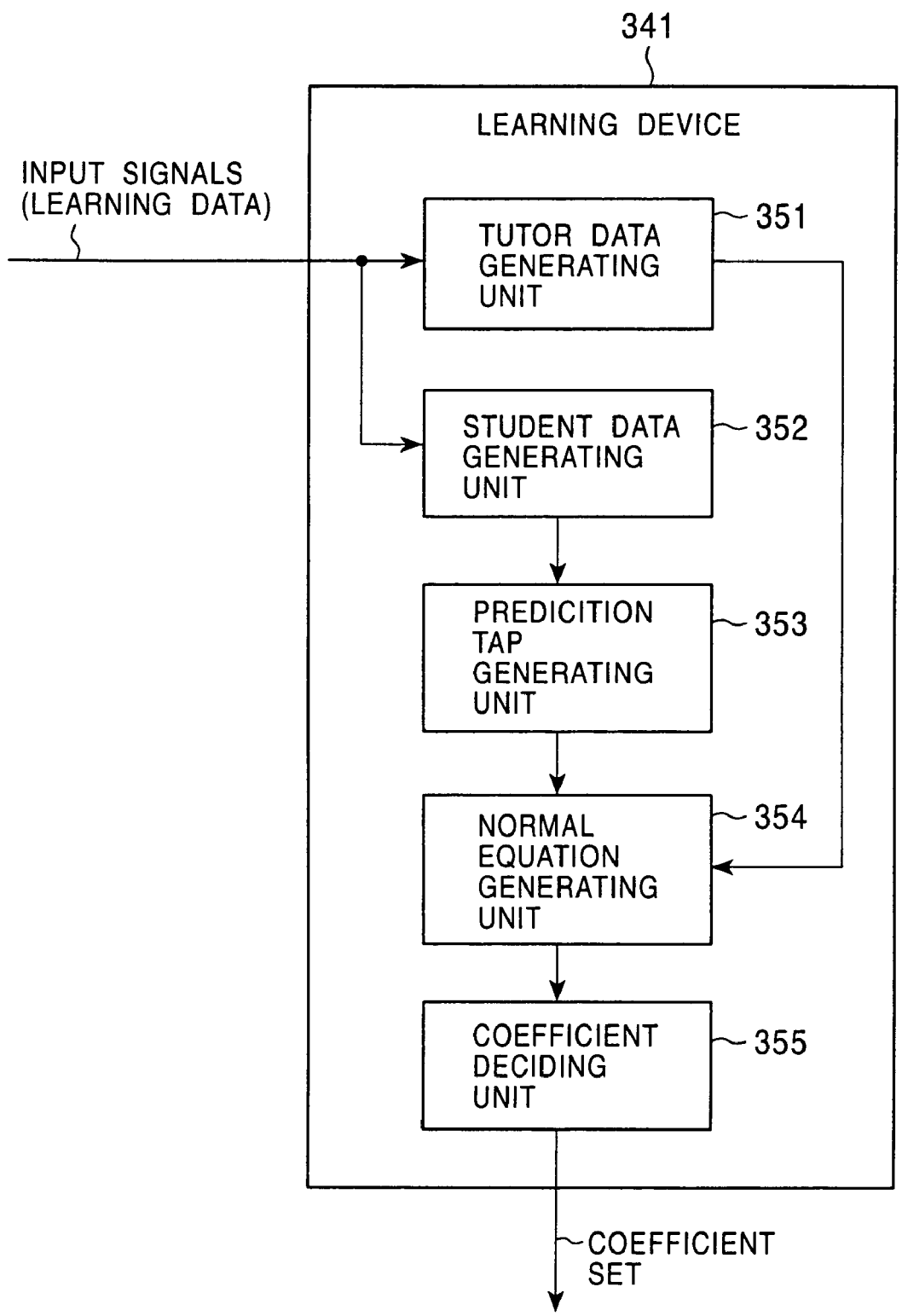
FIG. 43 is a block diagram illustrating a configuration example of a learning device which generates coefficients stored in the coefficient memory shown in FIG. 41 by learning.
Figure 44:
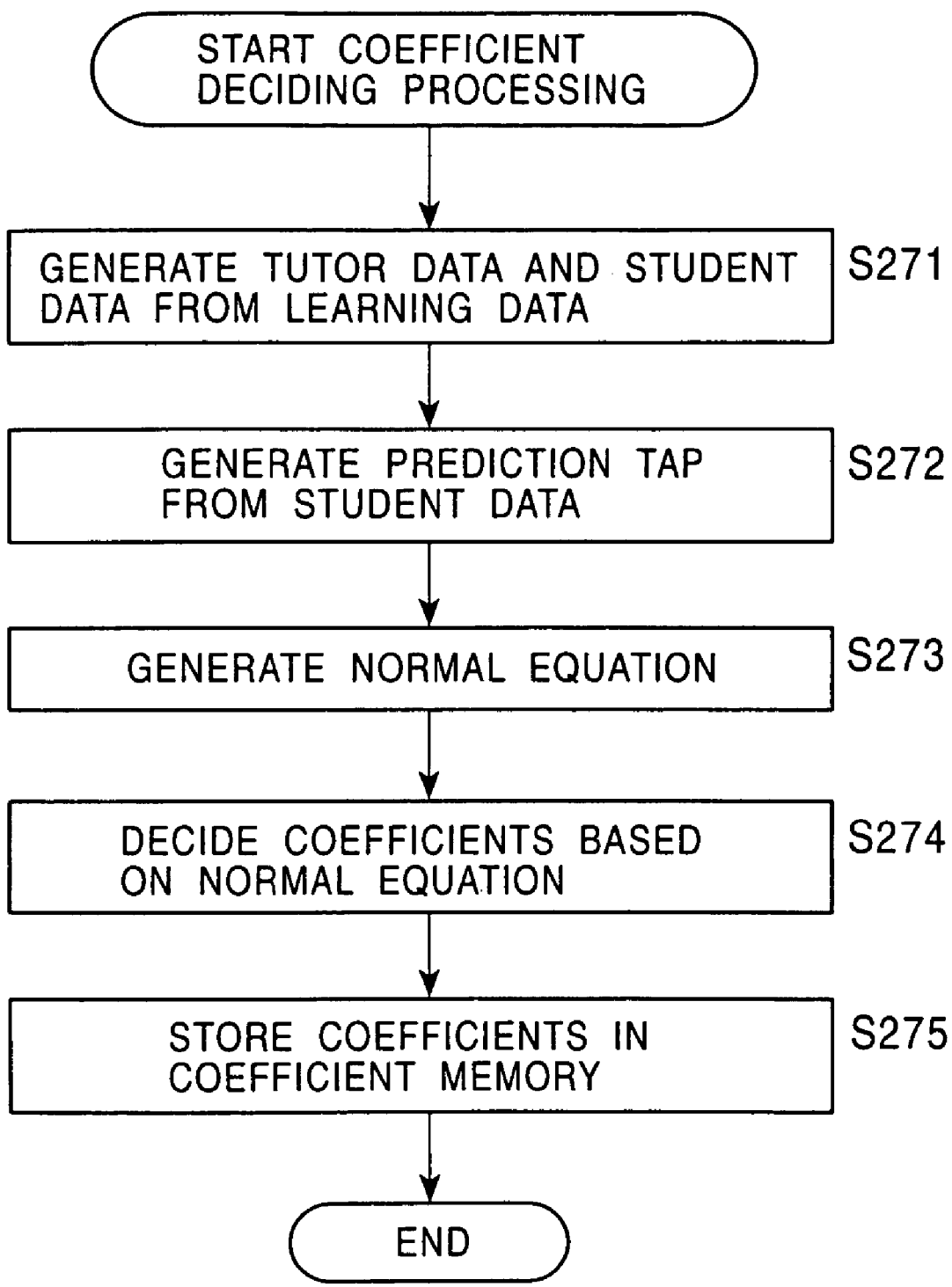
FIG. 44 is a flowchart describing the coefficient deciding processing by the learning device shown in FIG. 43.
Figure 45:
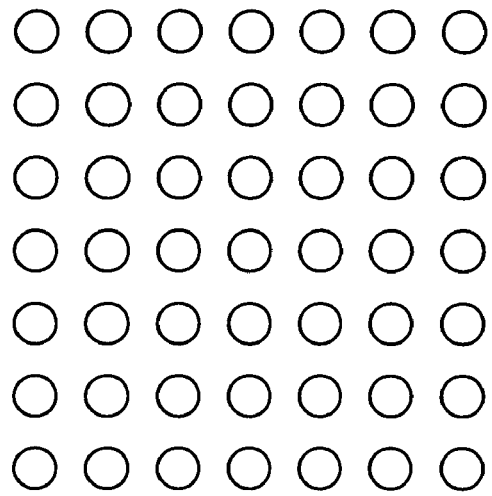
FIG. 45 is a diagram illustrating the configuration of a prediction tap.

The normal equation generating unit 1456 is the same as the normal equation generating unit 354 shown in FIG. 43, which generates a normal equation based on tutor data input from the tutor data generating unit 351 and prediction taps, and outputs to the coefficient deciding unit 1457, but differs in that, at this time, generates and outputs normal equations for each of the pieces of processing contents information input from the processing deciding unit 1454.

The coefficient deciding unit 1457 is the same as the coefficient deciding unit 355 in FIG. 43, which solves the input normal equation is to generate coefficient sets, and at this time it generates coefficient sets correlated with each piece of processing contents information.

Next, the coefficient deciding processing (learning processing) with the learning device 1441 in FIG. 128 will be described, with reference to the flowchart in FIG. 129. In step S591, the tutor data generating unit 1451 generates tutor data from learning data, and outputs this to the normal equation generating unit 1456, while the student data generating unit 1452 generates student data from learning data, and outputs this to the features extracting unit 1453 and the prediction tap extracting unit 1455, and the flow proceeds to step S592.

In step S592, the prediction tap extracting unit 1455 extracts prediction taps from student data with regard to each data of interest, taking each piece of tutor data sequentially as a pixel of interest, and outputs this to the normal equation generating unit 1456, and the flow proceeds to step S593.

In step S593, the features extracting unit 1453 extracts features regarding the student data (pixel) at the position corresponding to the pixel of interest (tutor data), and outputs this to the processing deciding unit 1454.

In step S594, the processing deciding unit 1454 decides the processing contents for each pixel, based on the features extracting it by the features extracting unit 1453, and outputs decided processing contents information to the normal equation generating unit 1456. For example, the processing deciding unit 1454 may subject one or multiple features to vector quantizing, and take the quantizing results as the information for processing contents. Accordingly, there is no LUT stored in the processing deciding unit 1456.

In step S595, the normal equation generating unit 1456 uses the tutor data and prediction taps sets to compute this summation (Σ) of the components of the matrix at the left-hand side of the Expression (46) and the summation (Σ) of the components of the vector of the right-hand side thereof, thereby generating the normal equation which is input from the processing deciding unit 1454 for each piece of processing contents information, and is output to the coefficient deciding unit 1457.

The flow then proceeds to step S596, where the coefficient deciding unit 1457 solves the normal equation input from the normal equation generating unit 1456 for each piece of processing contents information, and obtains a coefficient set by so-called least-square error for each piece of processing contents information, which is stored in the coefficient memory 1421 in step S597.

Due to the above processing, a basic coefficient set (coefficient set serving as an initial value) is stored in the coefficient memory 1421 for each piece of processing contents information. Now, while the above description gives the coefficient set being obtained by least-square error, this may be a coefficient set obtained by a another method, and may be a coefficient set obtained by the above-described least-N'th-power method.

Next, the image optimizing processing of the optimizing device 1401 shown in FIG. 126 will be described with reference to the flowchart in FIG. 130. This image optimizing processing is made up of coefficient changing processing and mapping processing, but the mapping processing is the same as the mapping processing described with FIG. 121 and FIG. 125, so only the coefficient changing processing will be described here.

In step S611, the changing processing unit 332 of the coefficient changing unit 322 judges whether or not operating signals for operating the coefficient values have been input from the operating unit 1202. That is, in the event that the user views the image displayed on the display unit 403 and deems this to be suiting his/her own preferences, the mapping processing will be executed coefficient sets for each piece of processing contents information stored in the coefficient memory 1421, but in the event that this does not suit the preferences of the user, operations for changing the coefficient set stored in the coefficient memory 1421 used for mapping processing, is performed.

For example, in step S611, in the event that judgment is made that operating signals for operating coefficients have been input, i.e., in the event that the operating unit 1202 has been operated so as to change one of the coefficient values of the coefficients stored in the coefficient memory 1421, the flow proceeds to step S612.

In step S612, the changing processing unit 332 controls the coefficient read/write unit 331 to read out the coefficient sets stored in the coefficient memory 321, and the flow proceeds to step S613. In step S613, the changing processing unit 332 makes judgment regarding whether or not the change of the coefficient value input as an operating signal is equal to or more than a predetermined threshold value S11 in comparison with the value contained in the coefficient set beforehand. In the event that, for example, judgement is made in step S613 that the change of the coefficient value input as an operating signal is equal to or more than the threshold value S11 as to the coefficient set value stored in the coefficient memory 1421, the processing proceeds to step S614.

In step S614, the changing processing unit 332 changes the values of the coefficients contained in the coefficient set with the spring model as shown in FIG. 50, and the processing proceeds to step S615.

On the other hand, in the event that judgment is made in step S613 that the changed between the value input as an operating signal that the value of the coefficients set stored in the coefficient memory 1421 is not equal to or more than the threshold value S11, the processing proceeds to step S615.

In step S615, the changing processing unit 332 changes the value of the coefficients contained in the coefficient set with the equilibrium model such as shown in FIG. 51, and the processing proceeds to step S616.

In step S616, the changing processing unit 332 controls the coefficients read/write unit 331 to store the changed coefficient set values in the coefficient memory 1421 by overwriting, the processing returns to step S611, and the subsequent processing is repeated.

Then, in the event that judgment is made in step S611 that the coefficient values have not been operated, i.e., in the event that the user judges that the image displayed on the display unit 403 is an image suiting the preferences of the user, the flow returns to step S611, and subsequently, the same processing is repeated.

Due to the above coefficient changing processing, the user can change coefficient sets and stored for each piece of processing contents information used for mapping processing, and executes processing that is optimal for the user. Now, changing the values of the coefficients in a coefficient set means that the "contents of processing" of the mapping processing with the mapping processing unit 311 are being changed.

Also, with the coefficient changing processing in FIG. 130, in the event that the magnitude of change of the coefficients is equal to or greater than a predetermined threshold value S11, all coefficient values in the coefficient set are changed with the spring model, according to the value of the coefficients operated, and in the event that this is smaller than the threshold value S11, all coefficient values in the coefficient set are changed with the equilibrium model, so the coefficient set changing algorithm for changing the coefficients set changes. Accordingly, with the processing unit 1411 of the optimizing device 1401 in FIG. 126 as well, it can be said that the "contents of processing", and further, the "structure of processing" is also changed, following user operations, whereby signal processing that is optimal for the user is being performed.

Also, in the event that the coefficient set stored in the coefficient memory 1421 is obtained by least-N'th-power error, as described above, an arrangement may be made wherein, for example, coefficient sets corresponding to multiple exponents N are stored in the coefficient memory 1421 beforehand, and the coefficient changing unit 322 changes to a coefficient set corresponding to the specified exponent N, following the operating signals from the operating unit 1202 based on operations made by the user. In this case, the coefficient sets stored in the coefficient memory 1421 are changed to those generated by least-N'th-power error corresponding to the exponent N input from the operating unit 1202, based on user operations. That is, the learning algorithms for obtaining the coefficient sets corresponding to exponents N changed, so it can be said that the "structure of processing" is being changed.

Next, the configuration of an optimizing device 1501 wherein an internal information generating unit 1521 is provided to the optimizing device 1401 shown in FIG. 126, will be described with reference to FIG. 131. With the optimizing device 1501 in FIG. 131, the other configurations are the same as the optimizing processing unit 1401 in FIG. 126 other than an internal information generating unit 1521 being provided, and the processing unit 1511 being provided instead of the processing unit 1411.

The internal information generating unit 1521 reads out coefficient sets stored for each piece of processing contents information stored in the coefficient memory 1531 of the processing unit 1511 for example, as internal information, converts this into image signals which can be displayed on the display unit 403, outputs to the display unit 403, and displays.

Next, the configuration of the processing unit 1521 will be described with reference to FIG. 132. This is basically the same as the configuration of the processing unit 1411 in FIG. 126, except that coefficient memory 1531 is provided instead of the coefficient memory 1421. The coefficient memory 1531 is functionally almost the same as the coefficient memory 1421, but is different in that it is connected to the internal information generating unit 1521, and is of a configuration wherein coefficient sets are read out as appropriate.

Next, image optimizing processing with the optimizing device 1501 shown in FIG. 131 will be described with reference to the flowchart in FIG. 133. As with the image optimizing processing performed by the optimizing processing 1401 shown in FIG. 126, this image optimizing processing is made up of coefficient changing processing and mapping processing, but the mapping processing is the same as the mapping processing described with FIG. 121 and FIG. 125, so only the coefficient changing processing will be described here.

With the coefficient changing processing, processing the same as that in steps S611 through S616 in FIG. 130 is performed in steps S631 through S636, respectively.

Then, in step S636, as with the case in step S636 in FIG. 130, following the post-change coefficient sets being stored in the coefficient memory 1521, the flow proceeds to step S637, where the internal information generating unit 1521 reads but the coefficient of values of the coefficient set stored in the coefficient memory 1531, converts these into image signals which can be displayed on the display unit 403, outputs to the display unit 403, and displays (presents). At this time, the coefficient values of the coefficient set displayed (presented) on the display unit 403 may have, for example, a form of a 3-dimensional distribution such as shown in FIG. 39, or 2-dimensional distribution such as shown in FIG. 40, as described above.

Following the processing in step S637, the flow returns to step S631, and subsequently, the same processing is repeated.

According to the coefficient changing processing in FIG. 133, the values of the coefficient set stored in the coefficient memory 1531 for each piece of processing contents information are displayed as internal information, so the user can operate the operating unit 1202 while viewing these coefficient sets, so as to obtain coefficient sets which execute processing that is optimal for the user.

Also, with the sum of product computing unit 1251 of the mapping processing unit 1222, output signals can be obtained by a computing a higher order expression of an order of two or higher, instead of the linear expression in Expression (39).

Next, the above-described series of processing may be carried out by hardware, or may be carried out by software. In the event that the series of processing is carried out by software, a program making up the software is installed in a general-purpose computer or the like.

Now, FIG. 134 illustrates the configuration example of the first embodiment of a computer to which a program for executing the above-described series of processing is installed.

The program can be stored in a hard disk 2105 or ROM 2103 serving as recording medium built into the computer, beforehand.

Or, the program may be temporarily or permanently stored (recorded) on removable recording media 2111, such as a floppy disk, CD-ROM (Compact Disc Read-Only Memory), MO (magneto-optical) disk, DVD (Digital Versatile Disk), magnetic disk, semiconductor memory, etc. Such a removable recording medium 2111 can be provided as so-called packaged software.

Also, besides being installed from such a removable recording medium 2111 to a computer, the program may be transferred from a download site to the computer by wireless means via a satellite for digital satellite broadcasting, or by cable via a network such as a LAN (Local Area Network) or the Internet, with the computer receiving the program transferred thus with a communication unit 2108 and installing the program in a built-in hard disk 2105.

The computer has a built-in-CPU (Central Processing Unit) 2102. An input/output interface 2110 is connected to the CPU 2102 via a bus 2101, and upon commands being input via the input/output interface 2110 by an input unit 2107 configured of a keyboard, mouse, microphone, etc., operated or the like by a user, the CPU 2102 executes the program stored in the ROM (Read Only Memory) 2103 accordingly. Or, the CPU 2102 loads to RAM (Random Access Memory) 2104 and executes a program stored in the hard disk 2105, a program transferred from a satellite or network and received with the communication unit 2108 and installed in the hard disk 2105, or a program read out from a removable recording medium 2111 mounted to a drive 2109 and installed to the hard disk 2105. Thus, the CPU 2102 performs the processing following the above-described flowchart, or the processing carried out by the configuration of the above-described block diagrams. The CPU 2102 outputs the processing results from an output unit 2106 configured of an LCD (Liquid Crystal Display) or speakers or the like, via the input/output interface 2110, as necessary, for example, or transmits from the communication unit 2108, and further performs recording or the like to the hard disk 2105.

Now, in the specification, the processing steps describing the program for causing the computer to perform various types of processing do not necessarily need to be performed in a time-sequence following the described order in the flowcharts, and the present invention includes executing in parallel or independent processing (e.g., parallel processing or processing by objects).

Also, the program may be processed by one computer, or may be divided among and processed by multiple computers. Further, the program may be transferred to a remote computer to be executed.

While the above has been the description of applying the present invention to noise removal from input signals or auto-driving, the present invention is broadly applicable to applications other than noise removal or auto-driving, e.g., conversion of frequency properties of signals, and so forth.

INDUSTRIAL APPLICABILITY

As described above, according to the present invention, the contents of processing, and further, the structure of processing is changed based on user operations, so processing which is optimal for that user can be performed.

With the present embodiment, internal information is displayed on the same display unit as output signals, but internal information may be displayed on a display unit separate from the display unit for displaying output signals.

The invention claimed is:

1. A signal processing device for processing image signals or audio signals for generating user-desired signals, comprising:
   a signal processor that performs signal processing on input signals in accordance with processing content; and
   an output unit that outputs signal processing results of said signal processor, and internal information of said signal processor to a display, the internal information being changeable parameters to correspondingly determine the processing content with regard to the input signals;
   wherein an algorithm for determining the changeable parameters is changed based on operating signals.

2. The signal processing device according to claim 1,
   wherein said signal processor comprises an output signal generator that generates output signals by linear combination of said input signals and predetermined prediction coefficients;
   wherein said output unit presents said prediction coefficients as internal information of said signal processor; and
   wherein the structure of processing of said signal processor is changed by said prediction coefficients being changed based on said operating signals.

3. The signal processing device according to claim 2, wherein said signal processor further comprises:
   a tutor data generating unit that generates tutor data from predetermined learning data;
   a student data generating unit that generates student data from said learning data; and
   a learning unit that learns a prediction value of said tutor data obtained by linear combination of said student data and said prediction coefficients, and said prediction coefficients which minimize error with the tutor data;
   wherein said output unit generates said output signals using said prediction coefficients obtained by learning with said learning unit.

4. The signal processing device according to claim 3,
   wherein said learning unit learns said prediction coefficients by least-N'th-power error which statistically minimizes an N'th-power-error which is said error to the N'th power; and
   wherein the structure of processing of said signal processing is changed by said error to the N'th power being changed based on said operating signals.

5. The signal processing device according to claim 2, wherein said signal processor further comprises a storing unit that stores said prediction coefficients obtained by predetermined learning beforehand.

6. The signal processing device according to claim 5, wherein said storing unit stores multiple sets of said prediction coefficients.

7. The signal processing device according to claim 6,
   wherein said prediction coefficients are obtained by performing learning to minimize an error between a prediction value of tutor data serving as a tutor for learning that is obtained by linear combination of student data serving as a student for learning and said prediction coefficients, and the tutor data; and
   wherein said multiple sets of prediction coefficients stored in said storing unit contains a set of prediction coefficients obtained by learning by least-N'th-power error which statistically minimizes an N'th-power-error which is said error to the N'th power, and a set of prediction coefficients obtained by learning by least-N'th-power which statistically minimizes an N'th-power-error which is different from N.

8. A signal processing method for processing image signals or audio signals for generating user-desired signals, comprising:
   a signal processing step of performing signal processing on input signals in accordance with processing content;
   an output step of outputting signal processing results of processing in said signal processing step, and internal information of said signal processing step, the internal information being changeable parameters to correspondingly determine the processing content with regard to the input signals; and
   changing an algorithm for determining the changeable parameters is changed based on operating signals.

9. A recording medium storing a computer-readable program, which when executed causes a processing device to process image signals or audio signals for generating user-desired signals, said process comprising:
   a signal processing controlling step of controlling signal processing on input signals in accordance with processing content;
   an output controlling step for controlling output of signal processing results of said signal processing controlling step, and internal information of said signal processing controlling step, the internal information being changeable parameters to correspondingly determine the processing content with regard to the input signals; and
   a changing step of changing an algorithm for determining the changeable parameters is changed based on operating signals.

10. A signal processing device for processing image signals or audio signals for generating user-desired signals, comprising:
    a characteristics detecting unit to detect characteristics from input signals in accordance with processing content;

a processing deciding unit to decide the contents of processing with regard to said input signals, based on characteristics detected by said characteristics detecting unit;

a processing executing unit to execute processing with regard to said input signals, following said processing contents decided by said processing deciding unit; and a presenting unit to present at least one of the internal information of said characteristics detecting unit, said processing deciding unit, and said processing executing unit, the internal information being changeable parameters to correspondingly determine the processing content with regard to the input signals;

wherein an algorithm for determining the changeable parameters is changed based on operating signals.

11. The signal processing device according to claim 10, wherein the contents of processing of said characteristics detecting unit are changed based on said operating signals.

12. The signal processing device according to claim 11, wherein said operating signals are signals specifying, of multiple types of characteristics, a predetermined number of types of characteristics; and wherein said characteristics detecting unit changes the contents of processing thereof so as to detect said predetermined number of types of characteristics.

13. The signal processing device according to claim 12, wherein said characteristics detecting unit detects said predetermined number of types of characteristics from said input signals; and wherein said processing deciding unit decides the contents of processing at said processing executing unit with regard to said input signals, based on said predetermined number of types of characteristics detected from said input signals by said characteristics detecting unit.

14. The signal processing device according to claim 10, wherein said operating signals are signals specifying which of a first or second processing object said input signals are; and wherein said presenting unit presents a distribution of characteristics of said input signals serving as said first and second processing objects, as said internal information.

15. The signal processing device according to claim 14, wherein, when there is input of said operating signals specifying which of a first or second processing object said input signals are, with regard to said distribution presented by said presenting unit, the contents of processing performed on said input signals are changed, based on the operating signals.

16. The signal processing device according to claim 13, wherein said input signals are image signals;

wherein said processing deciding unit decides whether to output said input signals without change, as said processing contents with regard to said input signals, based on said predetermined number of types of characteristics detected from said input signals by said characteristics detecting unit; and wherein said processing executing unit detects a telop within image signals which are said input signals, by selectively outputting said input signals following the decision made by said processing deciding unit.

17. The signal processing device according to claim 10, wherein the processing contents of said processing deciding unit are changed based on said operating signals.

18. The signal processing device according to claim 17, wherein said processing deciding unit comprises:

a storing unit adapted to store a table indicating a correlation relationship between said characteristics and said processing contents with regard to said input signals having said characteristics;

wherein said processing deciding unit decides said processing contents correlated on said table to the characteristics of said input signals detected by said characteristics detecting unit, as processing contents for said input signals; and wherein said presenting unit presents said table as internal information of said processing deciding unit.

19. The signal processing device according to claim 18, wherein said processing deciding unit changes the processing contents of itself, by changing said processing contents in said table, based on said operating signals.

20. The signal processing device according to claim 18, wherein processing for outputting output signals of a first value, and processing for outputting output signals of a second value, exist in said table as processing contents with regard to said input signals; and wherein said processing executing unit binarizes said input signals into said first and second values, following the decision of said processing deciding unit.

21. The signal processing device according to claim 10, wherein the processing contents of said processing executing unit are changed based on said operating signals.

22. The signal processing device according to claim 21, wherein said processing executing unit generates output signals by linear combination of said input signals and predetermined prediction coefficients; and changes the contents of processing thereof, by changing said prediction coefficients based on said operating signals.

23. A signal processing device according to claim 22, wherein said prediction coefficients linearly combined with said input signals are changed so that the sum thereof is 1.

24. A signal processing device according to claim 22, wherein, of prediction coefficients other than prediction coefficients changed based on said operating signals, of the array of prediction coefficients linearly combined with said input signals, those close to prediction coefficients changed based on said operating signals are changed in the same direction as the prediction coefficients changed based on said operating signals, and those distant from prediction coefficients changed based on said operating signals are changed in the opposite direction as the prediction coefficients changed based on said operating signals.

25. A signal processing device according to claim 22, wherein, of prediction coefficients other than prediction coefficients changed based on said operating signals, of the array of prediction coefficients linearly combined with said input signals, those having extreme value with the same polarity as prediction coefficients changed based on said operating signals are changed in the same direction as the prediction coefficients changed based on said operating signals, and those having extreme value with a different polarity as prediction coefficients changed based on said operating signals are changed in the opposite direction as the prediction coefficients changed based on said operating signals.

26. A signal processing method for processing image signals or audio signals for generating user-desired signals, comprising:

a characteristics detecting step of detecting characteristics from input signals in accordance with processing content;

a processing deciding step of deciding the contents of processing with regard to said input signals, based on characteristics detected in said characteristics detecting step;

a processing executing step of executing processing with regard to said input signals, following said processing contents decided in said processing deciding step; and a presenting step of presenting at least one of the internal information of processing in said characteristics detecting step, processing in said processing deciding step, and processing in said processing executing step, the internal information being changeable parameters to correspondingly determine the processing content with regard to the input signals;

wherein an algorithm for determining the changeable parameters is changed based on operating signals.

27. A recording medium storing a computer-readable program, which when executed causes a processing device to process image signals or audio signals for generating user-desired signals, said process comprising:

a characteristics detection controlling step of controlling detection of characteristics from input signals in accordance with processing content;

a processing decision controlling step of controlling decision of the contents of processing with regard to said input signals, based on characteristics detected by the processing in said characteristics detection controlling step;

a processing execution controlling step of controlling execution of processing with regard to said input signals, following said processing contents decided by the processing in said processing decision controlling step; and a presentation controlling step of controlling presentation of at least one of the internal information of processing in said characteristics detection controlling step, processing in said processing detection controlling step, and processing in said processing execution controlling step, the internal information being changeable parameters to correspondingly determine the processing content with regard to the input signals;

wherein an algorithm for determining the changeable parameters is changed based on operating signals.

28. A signal processing device for processing image signals or audio signals for generating user-desired signals, comprising:

an output value generating unit to generate output values by linear combination of input signals and a plurality of coefficients stored beforehand; and a presenting unit to present said output values and said plurality of coefficients;

wherein an algorithm for determining the changeable parameters is changed based on operating signals.

29. A signal processing device according to claim 28, wherein said coefficients linearly combined with said input signals are changed so that the sum thereof is 1.

30. A signal processing device according to claim 28, wherein, in the event that one of said plurality of coefficients is changed based on said operating signals;

of coefficients other than coefficients changed based on said operating signals, of the array of said plurality of coefficients, those close to coefficients changed based on said operating signals are changed in the same direction as the coefficients changed based on said operating signals, and those distant from coefficients changed based on said operating signals are changed in the opposite direction as the coefficients changed based on said operating signals.

31. A signal processing device according to claim 28, wherein, in the event that one of said plurality of coefficients is changed based on said operating signals; of coefficients other than coefficients changed based on said operating signals, of the array of said plurality of coefficients, those having extreme value with the same polarity as coefficients changed based on said operating signals are changed in the same direction as the coefficients changed based on said operating signals, and those having extreme value with a different polarity as coefficients changed based on said operating signals are changed in the opposite direction as the coefficients changed based on said operating signals.

32. A signal processing device according to claim 28, wherein said plurality of coefficients are obtained by performing learning wherein an error between a prediction value of tutor data serving as a tutor for learning which is obtained by linear combination of student data serving as a student for learning and said plurality of coefficients, and the tutor data thereof, is minimized.

33. A signal processing method for processing image signals or audio signals for generating user-desired signals, comprising:

an output value generating step of generating output values by linear combination of input signals and a plurality of coefficients stored beforehand; and a presenting step of presenting said output values and said plurality of coefficients;

wherein an algorithm for determining the changeable parameters is changed based on operating signals.

34. A computer-readable medium storing a computer-readable program, which when executed causes a processing device to process image signals or audio signals for generating user-desired signals, said program comprising:

an output value generation controlling step of controlling generation of output values by linear combination of input signals and a plurality of coefficients stored beforehand; and a presentation controlling step of controlling presentation of said output values and said plurality of coefficients;

wherein an algorithm for determining the changeable parameters is changed based on operating signals.

* * * * *